(12) United States Patent
Akiba et al.

(10) Patent No.: US 7,771,915 B2
(45) Date of Patent: *Aug. 10, 2010

(54) TWO-PHOTON ABSORBING OPTICAL RECORDING MATERIAL AND TWO-PHOTON ABSORBING OPTICAL RECORDING AND REPRODUCING METHOD

(75) Inventors: Masaharu Akiba, Kanagawa (JP); Takeharu Tani, Kanagawa (JP); Hiroo Takizawa, Kanagawa (JP); Yoshio Inagaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1665 days.

This patent is subject to a terminal disclaimer.

(21) Appl. No.: 10/874,344

(22) Filed: Jun. 24, 2004

(65) Prior Publication Data

US 2005/0003133 A1    Jan. 6, 2005

(30) Foreign Application Priority Data

Jun. 27, 2003 (JP) .................. P. 2003-184932
Aug. 1, 2003 (JP) .................. P. 2003-284959
Aug. 25, 2003 (JP) .................. P. 2003-300058

(51) Int. Cl.
    *G03C 1/76* (2006.01)
(52) U.S. Cl. .............. 430/270.15; 430/280.1; 430/281.1; 430/333; 430/338
(58) Field of Classification Search ............ None
     See application file for complete search history.

(56) References Cited

U.S. PATENT DOCUMENTS

| | | | | |
|---|---|---|---|---|
| 3,615,454 | A * | 10/1971 | Cescon et al. ............... | 430/292 |
| 4,917,977 | A * | 4/1990 | Smothers ....................... | 430/1 |
| 6,232,038 | B1 * | 5/2001 | Takasaki et al. .......... | 430/281.1 |
| 6,432,610 | B1 | 8/2002 | Rentzepis et al. | |
| 6,512,606 | B1 * | 1/2003 | Lipson et al. .................. | 359/3 |
| 7,582,390 | B2 * | 9/2009 | Takizawa ...................... | 430/1 |
| 2001/0026381 | A1 * | 10/2001 | Shirakura et al. ............. | 359/35 |
| 2003/0052311 | A1 | 3/2003 | Inagaki et al. | |
| 2004/0204513 | A1 * | 10/2004 | Takizawa et al. .............. | 522/2 |
| 2004/0245432 | A1 * | 12/2004 | Takizawa ................. | 250/208.1 |
| 2005/0019711 | A1 * | 1/2005 | Takizawa .................... | 430/561 |
| 2005/0046915 | A1 * | 3/2005 | Takizawa et al. ............. | 359/3 |
| 2005/0058910 | A1 * | 3/2005 | Takizawa et al. ............. | 430/1 |
| 2005/0221198 | A1 * | 10/2005 | Takizawa et al. ............... | 430/1 |
| 2005/0231776 | A1 * | 10/2005 | Akiba et al. .................. | 359/27 |
| 2006/0078803 | A1 * | 4/2006 | Takizawa et al. ............... | 430/1 |
| 2006/0188790 | A1 * | 8/2006 | Takizawa ........................ | 430/1 |
| 2006/0194122 | A1 * | 8/2006 | Takizawa ........................ | 430/1 |
| 2007/0048666 | A1 * | 3/2007 | Takizawa ................. | 430/281.1 |
| 2007/0207390 | A1 * | 9/2007 | Takizawa et al. ............... | 430/1 |
| 2009/0051988 | A1 * | 2/2009 | Sasaki et al. .................... | 359/3 |

FOREIGN PATENT DOCUMENTS

| | | | |
|---|---|---|---|
| JP | 74-015490 | * | 4/1974 |
| JP | 03-274545 | * | 12/1991 |
| JP | 10-007709 A | | 1/1998 |
| JP | 2001-522119 A | | 11/2001 |
| JP | 2002-334480 A | | 11/2002 |
| JP | 2003-073410 | * | 3/2003 |
| WO | 01/96917 | * | 12/2001 |
| WO | 01/96959 | * | 12/2001 |
| WO | WO 01/96961 | * | 12/2001 |

OTHER PUBLICATIONS

Belfield et al., "Multiphoton-absorbing organic materials for microfabrication, emerging opticval applications, and non-destructive three dimensional imaging", J. Phys. Org. Chem., vol. 13(12) pp. 837-849 (published online Nov. 11, 2000).*
Wu et al. "Two photon exposure of photographic film", J Opt. Soc. Am. B., vol. 16(4) pp. 605-608 (Apr. 1999) 1.*
Close, "Holographic Lens for pilots head-up display" NTIS publication AD-787605 (Jan. 1973) pp. 1, 3-47 & 65-116.*
Satoshi Kawata et al., "Three-Dimensional Optical Data Storage Using Photochromic Materials" (2000), Chem. Rev., vol. 100, No. 5, pp. 1777-1788.
Partial European Search Report dated Apr. 5, 2007.
JP 03-274545 abstract only.
Japanese Office Action dated Oct. 8, 2008.

* cited by examiner

*Primary Examiner*—Martin J Angebranndt
(74) *Attorney, Agent, or Firm*—Sughrue Mion, PLLC

(57) ABSTRACT

A two-photon absorbing optical recording material comprising at least one two-photon absorbing compound and a recording component is provided. Recording is made on it by utilizing the two-photon absorption of the two-photon absorbing compound in the material, and then the material is irradiated with light to thereby detect the difference in the reflectance between the recorded area and the unrecorded area thereof, and the recorded information is thereby reproduced from the material, and also provided are a photosensitive polymer composition and a photon-mode recording method for the material.

19 Claims, No Drawings

TWO-PHOTON ABSORBING OPTICAL RECORDING MATERIAL AND TWO-PHOTON ABSORBING OPTICAL RECORDING AND REPRODUCING METHOD

FIELD OF THE INVENTION

The present invention relates to a two-photon absorbing three-dimensional optical recording material and a two-photon absorbing three-dimensional recording and reproducing method, in which the recording material contains at least a non-resonant two-photon absorbing compound having a large cross-sectional area for non-resonant two-photon absorption, and which is, after information is recorded thereon by utilizing the two-photon absorption of the two-photon absorbing compound therein, irradiated with light so as to detect the reflectance difference for information reproduction. In particular, the invention relates to a two-photon absorbing three-dimensional optical recording material and a two-photon absorbing three-dimensional recording and reproducing method, in which difference of the reflectance or transmittance is caused by any of the refractivity difference or the absorbance difference in the material.

The invention also relates to a material of expressing a non-linear optical effect, in particular, to a photosensitive polymer composition which has a large cross-sectional area for non-resonant two-photon absorption and which enables efficient color formation or coloration from the excited state formed through non-resonant two-photon absorption, and to a color forming method and a recording method with it.

The invention also relates to a photon-mode recording method which comprises at least a first step of forming a latent image through irradiation with light and a second step of amplifying the latent image to form a refractivity difference or an absorbance difference and in which these steps are effected in a dry mode, and to a photon-mode recording material for the recording method.

In particular, the invention relates to a two-photon absorbing optical recording method that comprises at least a first step of forming a latent image through irradiation with light to cause two-photon absorption and a second step of amplifying the latent image to form a refractivity difference or an absorbance difference, and to a two-photon absorbing optical recording material for the recording method.

BACKGROUND OF THE INVENTION

In general, the non-linear optical effect means a non-linear optical response proportional to the square, cube or higher power of photoelectric field applied. Known examples of the secondary non-linear optical effect proportional to the square of photoelectric field applied include second harmonic generation (SHG), optical rectification, photorefractive effect, Pockels effect, parametric amplification, parametric oscillation, light sum frequency mixing and light difference frequency mixing. Examples of the ternary non-linear optical effect proportional to the cube of photoelectric field applied include third harmonic generation (THG), optical Kerr effect, self-induced refractivity change and two-photon absorption.

As the non-linear optical material of exhibiting these non-linear optical effects, a large number of inorganic materials have been heretofore found. However, inorganic materials can be hardly used in practice because so-called molecular design so as to optimize desired non-linear optical characteristics or various properties necessary for the production of a device is difficult. On the other hand, organic compounds can realize not only optimization of desired non-linear optical characteristics by the molecular design but also control of other various properties and therefore, the probability of its practical use is high. Thus, organic compounds are attracting attention as a promising non-linear optical material.

In recent years, among non-linear optical characteristics of the organic compound, ternary non-linear optical effects, particularly, non-resonant two-photon absorption, are being taken notice of. The two-photon absorption is a phenomenon such that a compound is excited by simultaneously absorbing two photons. In the case where the two-photon absorption occurs in the energy region having no (linear) absorption band of the compound, this is called non-resonant two-photon absorption. In the following, even when not particularly specified, two-photon absorption indicates non-resonant two-photon absorption.

The non-resonant two-photon absorption efficiency is proportional to the square of photoelectric field applied (square-law characteristic of two-photon absorption). Therefore, when a laser is irradiated on a two-dimensional plane, two-photon absorption takes place only in the position having a high electric field strength at the center part of laser spot and utterly no two-photon absorption occurs in the portion having a weak electric field strength in the periphery. On the other hand, in a three-dimensional space, two-photon absorption occurs only in the region having a large electric field strength at the focus where the laser rays are converged through a lens, and two-photon absorption does not take place at all in the off-focus region because the electric field strength is weak. As compared with the linear absorption where excitation occurs in all positions proportionally to the strength of photoelectric field applied, in the non-resonant two-photon absorption, excitation occurs only at one point inside the space by virtue of the square-law characteristic and therefore, the space resolution is remarkably enhanced.

Usually, in the case of inducing non-resonant two-photon absorption, a short pulse laser in the near IR region having a wavelength longer than the wavelength region where the (linear) absorption band of a compound is present, and not having the absorption of the compound is used in many cases. Since a near IR ray in a so-called transparent region is used, the excitation light can reach the inside of a sample without being absorbed or scattered and one point inside the sample can be excited with very high space resolution due to the square-law characteristic of non-resonant two-photon absorption. The color change of a compound is, in other words, the change in the refractive index n of the real part and the extinction coefficient k of the imaginary part of the birefringence (n+ik) thereof. Accordingly, if dye precursor color-formation or dye absorption change can be induced in any desired point inside a three-dimensional space by the use of the excitation energy obtained through non-resonant two-photon absorption (or that is, if refractivity change can be induced), then the technology may be applied to three-dimensional recording mediums in which information data can be three-dimensionally written in a three-dimensional space, and to three-dimensional image display mediums in which image can be three-dimensionally displayed.

Optical information recording mediums and image display mediums using non-resonant two-photon absorbing compounds are disclosed in International Laid-Open WO97/09043. In the method disclosed in the publication, a polymer composition that contains a fluorescent two-photon absorbing dye is used for a recording medium and an image display medium, and a femtosecond pulse of Ti:sapphire laser is focused through a lens and radiated onto the recording medium or the image display medium to induce two-photon absorption at around the focus position, and the two-photon absorbing dye is thereby photolyzed and its fluorescent intensity is weakened. In the method, the difference between the thus-weakened fluorescent intensity and the strong fluorescent intensity of the non-irradiated part around the irradiated part is read out. However, the method requires strong light irradiation that causes the photolysis of the two-photon absorbing dye, and is therefore problematic in that the sensitivity of the method is low, and, in addition, since the fluorescent intensity change that radiates in all directions must be read out in the method, the contrast between the recorded area and the unrecorded area is low.

On the other hand, S. Kawata et al., *Chem. Rev.*, Vol. 100, page 1777 (2000) reports an example of an optical recording medium on which information is recorded by inducing absorption change based on the two-photon photochromism of photochromic dyes. In this, however, since the cross-sectional area for two-photon absorption of the photochromic dyes used in the recording medium is small, the sensitivity of the recording medium is extremely low.

On the other hand, an optical information recording medium (optical disc) capable of recording information only once by laser light has been conventionally known and recordable CD (so-called CD-R), recordable DVD (so-called DVD-R) and the like are put into practical use.

For example, in a representative structure of DVD-R, a recording layer comprising a dye is provided on a disc-like substrate where guide grooves (pre-grooves) for tracking the laser light irradiated are formed at a pitch as narrow as a half or less (0.74 to 0.8 μm) of that in CD-R. On the recording layer, a light reflection layer is usually provided and if desired, a protective layer is further provided.

In the recording of information on DVD-R, visible laser light (usually in the range from 630 to 680 nm) is irradiated and absorbed in the irradiated portion of the recording layer, as a result, the temperature is locally elevated to cause physical or chemical changes (for example, production of pits) and in turn, changes in the optical characteristics, whereby the recording of information is effected. In the reading (reproduction) of information, laser light having the same wavelength as the laser light for recording is also irradiated and by detecting the difference in reflectance between the portion of the recording layer where the optical characteristics are changed (recorded area) and the portion where the optical characteristics are not changed (unrecorded area), the information is reproduced. This difference in reflectance is based on so-called "modulation of refractive index" and as the difference in refractive index between the recorded area and the unrecorded area is larger, the ratio of light reflectance, namely, S/N ratio in reproduction is advantageously larger.

Recently, network (e.g., Internet) and high-vision television are rapidly becoming widespread. In addition, the start of HDVT (High Definition Television) broadcasting is near at hand. To cope with such a tendency, demands for a large-capacity recording medium capable of easily and inexpensively recording image information of at least 50 GB, preferably at least 100 GB are increasing also in civilian uses.

Furthermore, in business uses such as use for backup of computer or broadcast, an optical recording medium capable of recording large-volume information of about 1 TB or more at high speed and low cost is being demanded.

However, in view of physical principle, conventional two-dimensional optical recording mediums such as DVD-R can have a capacity of about 25 GB at most even if the wavelength of light for recording/reproduction is shortened, and a recording capacity large enough to satisfy the requirement in future cannot be expected.

Under these circumstances, a three-dimensional optical recording medium is abruptly attracting an attention as an ultimate high-density, high-capacity recording medium. In the three-dimensional optical recording medium, recording is superposed in tens or hundreds of layers in the three-dimensional (thickness) direction to achieve super high-density and super high-capacity recording as large as tens or hundreds of times conventional two-dimensional recording mediums. In order to provide a three-dimensional optical recording medium, access and writing must be performed at any desired position in the three-dimensional (thickness) direction and as a technique therefor, a method of using a two-photon absorbing material and a method of using holography (interference) are known.

In the three-dimensional optical recording medium using a two-photon absorbing material, based on the above-described physical principle, so-called bit recording can be performed over tens or hundreds of times and a higher density recording can be attained. Thus, this is very an ultimate high-density high-capacity optical recording medium.

As for the three-dimensional optical recording medium using a two-photon absorbing material, for example, a method of using a fluorescent material for recording and reproduction and reading the information by fluorescence (see, JP-T-2001-524245 (the term "JP-T" as used herein means a "published Japanese translation of a PCT patent application") by LEVICH, Eugene Boris et al., and JP-T-2000-512061 by PAVEL, Eugen, et al.), and a method of using a photochromic compound and reading the information by absorption or fluorescence (JP-T-2001-522119 by KOROTEEV, Nicolai I., et al., and JP-T-2001-508221 by ARSENOV, Vladimir, et al.) have been proposed. However, in either method, a specific two-photon absorbing material is not set forth and although examples of the two-photon absorbing compound are abstractly described, the two-photon absorbing compound used has a very small two-photon absorbing efficiency. In addition, these methods have a problem, for example, in the nondestructive reading, the long-term storability of record or the S/N ratio on reproduction and these systems are not practicable as an optical recording medium.

Particularly, in view of nondestructive reading, long-term record storage and the like, it is preferred to use an irreversible material and reproduce the information by detecting the change in reflectance (refractivity or absorbance). However, a two-photon absorbing material having such a function is not specifically disclosed in any publication.

Also, JP-A-6-28672 by Satoshi Kawada and Yoshimasa Kawada and JP-A-6-118306 by Satoshi Kawada, Yoshimasa Kawada et al. are disclosing, for example, an apparatus for three-dimensionally recording information by using the modulation of refractive index, and a reproducing apparatus and a reading method for the information, but a method using a two-photon absorbing three-dimensional optical recording material is not specifically described.

As described above, if reaction can be caused by using the excitation energy obtained upon non-resonant two-photon absorption and as a result thereof, the refractive index or the absorbance can be modulated between the laser-focused area and the unfocused area, then modulation of light reflectance due to modulation of refractive index or absorbance can be brought about at any desired position in a three-dimensional space with very high space resolution, and this enables application to a three-dimensional optical recording medium which is considered as an ultimate high-density recording medium. Furthermore, nondestructive reading can be achieved and because of an irreversible material, good storability can be expected, therefore, the practicability is high.

However, since two-photon absorbing compounds usable at present are low in the two-photon absorbing ability, a very high-output laser is necessary as the light source and the recording takes a long time.

In particular, for use in a three-dimensional optical recording medium, it is essential to establish a two-photon absorbing three-dimensional optical recording material capable of undergoing modulation of the refractive index or absorbance by two-photon absorption with high sensitivity. For this purpose, a material that contains a two-photon absorbing compound capable of absorbing two photons with high efficiency and producing an excited state, and a recording component capable of undergoing chemical reaction through electron transfer or energy transfer from the excited state of the two-photon absorbing compound to thereby record the refractivity difference or the absorbance difference may be useful. However, such a material has been heretofore not disclosed at all and establishment thereof is being demanded.

SUMMARY OF THE INVENTION

An object of the present invention is to provide a two-photon absorbing three-dimensional optical recording material and a two-photon absorbing three-dimensional recording and reproducing method, in which the recording material contains at least a two-photon absorbing compound having a large cross-sectional area for two-photon absorption, and, after information is recorded on the recording material by utilizing the two-photon absorption of the two-photon absorbing compound therein, the recording material is irradiated with light so as to detect difference of the reflectance or transmittance for information reproduction from the material. In particular, the invention provides a two-photon absorbing three-dimensional optical recording material and a two-photon absorbing three-dimensional recording and reproducing method, in which difference of the reflectance or transmittance is caused by any of the refractivity difference or the absorbance difference.

Another object of the invention is to provide a photosensitive polymer composition which can induce photon-mode color formation or absorption change (or that is, change of the refractive index n and the extinction coefficient k) capable of giving a large contrast between the light-irradiated part and the non-irradiated part and which, when combined with a high-sensitivity two-photon absorbing compound having a large two-photon absorbing cross-sectional area, enables the increase in the sensitivity thereof, and to provide a color forming method and a recording method using it.

Still another object of the invention is to provide a super high-sensitivity photon-mode recording material having a function of latent image amplification and a recording method with it, in particular to provide a two-photon absorbing optical recording material and a two-photon absorbing optical recording and reproducing method that enable information recording based on the refractivity difference or the absorbance difference therein, and to provide a two-photon absorbing three-dimensional optical recording medium and a three-dimensional volume display using them.

As a result of intensive investigations by the present inventors, the above-described objects of the invention can be attained by the following constitutions.

The first aspect of the invention includes the following:

(1) A two-photon absorbing optical recording material which comprises a two-photon absorbing compound and a recording component and which, after a recording is performed by utilizing a two-photon absorption of the two-photon absorbing compound, is irradiated with light to thereby detect the difference in the reflectance or transmittance between the recorded area and the unrecorded area of the material to perform a reproduction.

(2) The two-photon absorbing optical recording material as described in (1), which is a write-once type material, that is, an unrewritable type one.

(3) The two-photon absorbing optical recording material as described in (1) or (2), wherein difference of the reflectance or transmittance is caused by any of refractivity difference, absorbance difference, foaming, scattering, reflection, diffraction or interference.

(4) The two-photon absorbing optical recording material as described in (3), wherein difference of the reflectance or transmittance is caused by a refractivity difference or absorbance difference.

(5) The two-photon absorbing optical recording material as described in any of (1) to (4), wherein the compound group capable of attaining refractivity difference or absorbance difference recording owing to two-photon absorption includes at least a two-photon absorbing compound capable of absorbing two photons to form an excited state, and a recording component that undergoes chemical reaction through electron transfer or energy transfer from the excited state of the two-photon absorbing compound to thereby record the refractivity difference or the absorbance difference.

(6) The two-photon absorbing optical recording material as described in any of (1) to (5), wherein the recording component contains a dye precursor capable of becoming a color-forming material.

(7) The two-photon absorbing optical recording material as described in (6), wherein the recording component contains a dye precursor capable of becoming a color-forming material of which the absorption wavelength is longer than that of the original state thereof owing to the electron transfer or the energy transfer from the excited state of the two-photon absorbing compound.

(8) The two-photon absorbing optical recording material as described in (5), (6) or (7), wherein the recording component is a refractivity difference recording component, the dye precursor in the refractivity difference recording component can become a color-forming material of which the absorption wavelength is longer than that of the original state thereof owing to the electron transfer or the energy transfer from the excited state of the two-photon absorbing compound, and the color-forming material does not absorb the light irradiated to the material for detecting difference of the reflectance or transmittance thereof after a recording has been performed on the material through two-photon absorption but absorbs light of which the wavelength is shorter than that of the irradiated light to enable refractivity modulation at the recorded area and the unrecorded area and thereby change the reflectance or transmittance of the material in light irradiation thereto, and a two-photon absorbing optical recording and reproducing method using it.

(9) The two-photon absorbing optical recording material as described in (8), wherein the dye precursor in the refractivity difference recording component can become a color-forming material of which the absorption wavelength is longer than that of the original state thereof owing to the electron transfer or the energy transfer from the excited state of the two-photon absorbing compound, and the color-forming material does not absorb the light irradiated to the material for detecting difference of the reflectance or transmittance thereof after a recording has been performed on the material through two-photon absorption but absorbs light which has an absorption maximum within a wavelength range falling between the wavelength of the light irradiated to the material for reproduction and a wavelength shorter by 200 nm than that of the irradiated light, thereby enabling refractivity modulation at the recorded area and the unrecorded area so as to change the reflectance or transmittance of the material in light irradiation thereto, and a two-photon absorbing optical recording and reproducing method using it.

(10) The two-photon absorbing optical recording material as described in (9), wherein the dye precursor in the refractivity difference recording component can become a color-forming material of which the absorption wavelength is longer than that of the original state thereof owing to the electron transfer or the energy transfer from the excited state of the two-photon absorbing compound, and the color-forming material does not absorb the light radiated to the material for detecting difference of the reflectance or transmittance thereof after a recording has been performed on the material through two-photon absorption but absorbs light which has an absorption maximum within a wavelength range falling between the wavelength of the light radiated to the material for reproduction and a wavelength shorter by 100 nm than that of the irradiated light, thereby enabling refractivity modulation at the recorded area and the unrecorded area so as to change the reflectance or transmittance of the material in light radiation thereto, and a two-photon absorbing optical recording and reproducing method using it.

(11) The two-photon absorbing optical recording material as described in (5), (6) or (7), wherein the recording component is an absorbance difference recording component, the dye precursor in the absorbance difference recording component can become a color-forming material of which the absorption wavelength is longer than that of the original state thereof owing to the electron transfer or the energy transfer from the excited state of the two-photon absorbing compound, and the color-forming material absorbs the light irradiated to the material for detecting difference of the reflectance or transmittance thereof after a recording has been performed on the material through two-photon absorption for enabling refractivity modulation at the recorded area and the unrecorded area to thereby change the reflectance or transmittance of the material in light irradiation thereto, and a two-photon absorbing optical recording and reproducing method using it.

(12) The two-photon absorbing optical recording material as described in any of (1) to (11), wherein the wavelength of the light irradiated to the material for a recording thereon through two-photon absorption is the same as that of the light irradiated thereto for detecting difference of the reflectance or transmittance in reproduction, and a two-photon absorbing optical recording and reproducing method using it.

(13) The two-photon absorbing optical recording material as described in any of (5) to (12), wherein the refractivity (absorbance) recording component contains at least an acid color-forming dye precursor as a dye precursor, and an acid generator.

(14) The two-photon absorbing optical recording material as described in (13), wherein the acid generator is any of diaryliodonium salts, sulfonium salts, diazonium salts, metal arene complexes, trihalomethyl-substituted triazines or sulfonates.

(15) The two-photon absorbing optical recording material as described in (13), wherein the acid generator is any of diaryliodonium salts, sulfonium salts, or sulfonates.

(16) The two-photon absorbing optical recording material as described in any of (13) to (15), wherein the color-forming material generated from the acid color-forming dye precursor is a xanthene (fluoran) dye or a triphenylmethane dye.

(17) The two-photon absorbing optical recording material as described in any of (13) to (16), wherein the refractivity (absorbance) recording component contains at least an acid color-forming dye precursor as a dye precursor, an acid generator, and an acid-increasing agent.

(18) The two-photon absorbing optical recording material as described in (17), wherein the acid-increasing agent is represented by any of the following formulae (34-1) to (34-6):

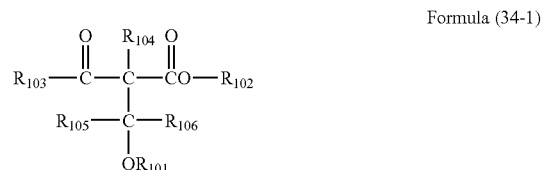

Formula (34-1)

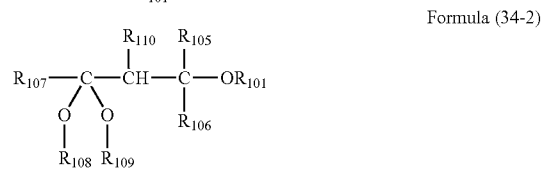

Formula (34-2)

Formula (34-3)

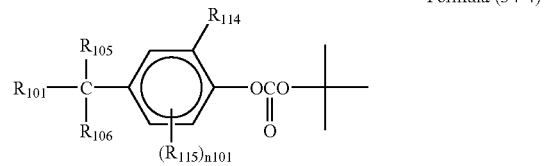

Formula (34-4)

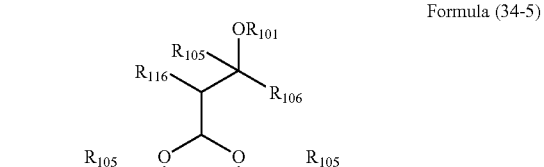

Formula (34-5)

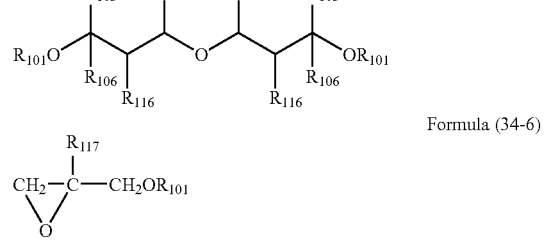

Formula (34-6)

In formulae (34-1) to (34-6), $R_{101}$ represents a group of becoming an acid having a pKa of 5 or less in the form of $R_{101}OH$, $R_{102}$ represents a 2-alkyl-2-propyl group, a 2-aryl-2-propyl group, a cyclohexyl group, a tetrahydropyranyl group or a bis(p-alkoxyphenyl)methyl group, $R_{103}$, $R_{104}$, $R_{115}$ and $R_{117}$ each independently represent a substituent, $R_{105}$, $R_{106}$, $R_{107}$, $R_{110}$, $R_{113}$ and $R_{116}$ each independently represent a hydrogen atom or a substituent, $R_{118}$ and $R_{119}$ each independently represent an alkyl group and may combine with each other to form a ring, $R_{111}$ and $R_{112}$ represent alkyl groups which combine with each other to form a ring, $R_{114}$ represents a hydrogen atom or a nitro group, and n101 represents an integer of 0 to 3.

(19) The two-photon absorbing optical recording material as described in (18), wherein in $R_{101}$ of formulae (34-1) to (34-6), $R_{101}OH$ is a sulfonic acid or an electron-withdrawing group-substituted carboxylic acid.

(20) The two-photon absorbing optical recording material as described in any one of (5) to (12), wherein the refractivity (absorbance) recording component contains at least a base-color forming dye precursor as a type of the dye precursor, and a base generator.

(21) The two-photon absorbing optical recording material as described in (20), wherein the base generator is represented by the following formula (31-1), (31-2), (31-3) or (31-4):

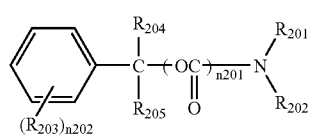

Formula (31-1)

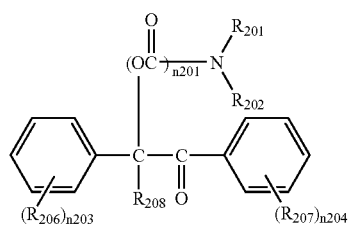

Formula (31-2)

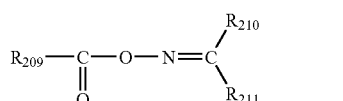

Formula (31-3)

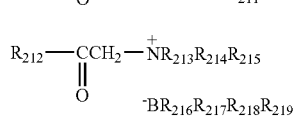

Formula (31-4)

In formulae (31-1) to (31-4), $R_{201}$, $R_{202}$, $R_{213}$, $R_{214}$ and $R_{215}$ each independently represent a hydrogen atom, an alkyl group, an alkenyl group, a cycloalkyl group, an aryl group or a heterocyclic group, $R_{201}$ and $R_{202}$ may combine with each other to form a ring, $R_{213}$, $R_{214}$ and $R_{215}$ may combine with each other to form a ring, $R_{203}$, $R_{206}$, $R_{207}$ and $R_{209}$ each independently represent a substituent, $R_{204}$, $R_{205}$, $R_{208}$, $R_{210}$ and $R_{211}$ each independently represent a hydrogen atom or a substituent, $R_{210}$ and $R_{211}$ may combine with each other to form a ring, $R_{216}$, $R_{217}$, $R_{218}$ and $R_{219}$ each independently represent an alkyl group or an aryl group, $R_{212}$ represents an aryl group or a heterocyclic group, n201 represents an integer of 0 or 1, and n202 to n204 each independently represent an integer of 0 to 5.

(22) The two-photon absorbing optical recording material as described in (21), wherein in formulae (31-1) and (31-2), n201 is 1.

(23) The two-photon absorbing optical recording material as described in (21) or (22), wherein in formula (31-1), $R_{203}$ is a nitro group substituted to the 2-position or 2,6-position, or an alkoxy group substituted to the 3,5-position.

(24) The two-photon absorbing optical recording material as described in (21) or (22), wherein in formula (31-2), $R_{206}$ is an alkoxy group substituted to the 3,5-position.

(25) The two-photon absorbing optical recording material as described in any one of (20) to (24), wherein the base color-forming dye precursor is a non-dissociated form of a dissociation-type azo dye, a dissociation-type azomethine dye, a dissociation-type oxonole dye, a dissociation-type xanthene (fluoran) dye or a dissociation-type triphenylmethane-based dye.

(26) The two-photon absorbing optical recording material as described in any one of (20) to (25), wherein the refractivity (absorbance) recording material contains at least a base color-forming dye precursor as a dye precursor, a base generator and a base-increasing agent.

(27) The two-photon absorbing optical recording material as described in (26), wherein the base-increasing agent is represented by the following formula (35):

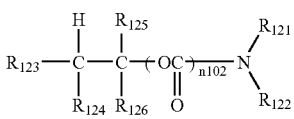

Formula (35)

In formula (35), $R_{121}$ and $R_{122}$ each independently represent a hydrogen atom, an alkyl group, an alkenyl group, a cycloalkyl group, an aryl group or a heterocyclic group, $R_{121}$ and $R_{122}$ may combine with each other to form a ring, $R_{123}$ and $R_{124}$ each independently represent a substituent, $R_{123}$ and $R_{124}$ may combine with each other to form a ring, $R_{125}$ and $R_{126}$ each independently represent a hydrogen atom or a substituent, and n102 represents an integer of 0 or 1.

(28) The two-photon absorbing optical recording material as described in (35), wherein in formula (35), n102 is 1.

(29) The two-photon absorbing optical recording material as described in (27) or (28), wherein the base-increasing agent of formula (35) is represented by the following formula (36-1) or (36-2):

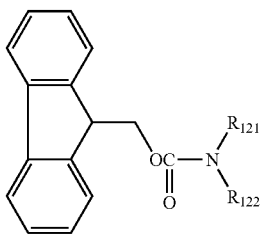

Formula (36-1)

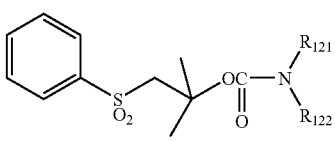

Formula (36-2)

In formulae (36-1) and (36-2), $R_{121}$ and $R_{122}$ have the same meanings as in formula (35).

(30) The two-photon absorbing optical recording material as described in any one of (5) to (12), wherein the refractivity (absorbance) recording component contains at least a dye precursor of the following formula (32):

A1-PD    Formula (32)

In formula (32), A1 and PD are covalently bonded, A1 represents an organic compound moiety having a function of cutting the covalent bond with PD due to electron or energy transfer with the excited state of a two-photon absorbing compound, and PD represents an organic compound moiety of becoming a color-forming material when covalently bonded with A1 and when released as a result of cutting of the covalent bond with A1.

(31) The two-photon absorbing optical recording material as described in (30), wherein the dye precursor of formula (32) is a compound represented by any one of the following formulae (33-1) to (33-6):

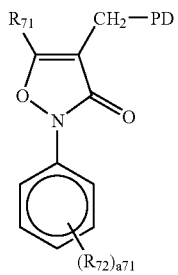

Formula (33-1)

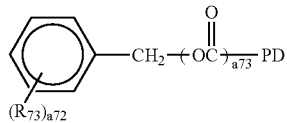

Formula (33-2)

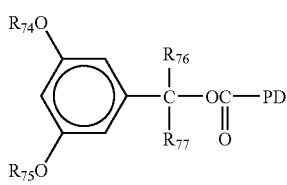

Formula (33-3)

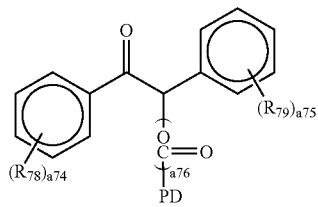

Formula (33-4)

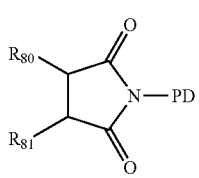

Formula (33-5)

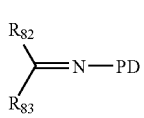

Formula (33-6)

In formulae (33-1) to (33-6), PD has the same meaning as in formula (32), $R_{71}$, $R_{80}$, $R_{81}$ each independently represent a hydrogen atom or a substituent, $R_{72}$, $R_{73}$, $R_{78}$, $R_{79}$, $R_{82}$ and $R_{83}$ each represent a substituent, a71, a72, a74 and a75 each independently represent an integer of 0 to 5, a73 and a76 each independently represent 0 or 1, provided that when a71, a72, a74 and a75 each are 2 or more, multiple $R_{72}$s, $R_{73}$s, $R_{78}$s or $R_{79}$s may be the same or different and may combine with each other to form a ring, and each of the pairs $R_{80}$ and $R_{81}$, and $R_{82}$ and $R_{83}$ may combine with each other to form a ring.

(32) The two-photon absorbing optical recording material as described in (30) or (31), wherein in formulae (32) and (33-1) to (33-6), PD is a group comprising any one of a dissociation-type azo dye, a dissociation-type azomethine dye, a dissociation-type oxonole dye, a triphenylmethane dye and a xanthene dye, and being connected to A1 on the chromophore through a covalent bond.

(33) The two-photon absorbing optical recording material as described in any one of (1) to (32), wherein the two-photon absorbing compound is an organic dye.

(34) The two-photon absorbing optical recording material as described in any one of (1) to (33), wherein the two-photon absorbing compound is a methine dye or a phthalocyanine dye.

(35) The two-photon absorbing optical recording material as described in (34), wherein the two-photon absorbing compound is a cyanine dye, a merocyanine dye, an oxonole dye, a phthalocyanine dye or a compound represented by the following formula (1):

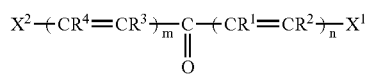

wherein $R^1$, $R^2$, $R^3$ and $R^4$ each independently represent a hydrogen atom or a substituent and some of $R^1$, $R^2$, $R^3$ and $R^4$ may combine with each other to form a ring; n and m each independently represent an integer of 0 to 4 and when n and m each are 2 or more, multiple $R^1$s, $R^2$s, $R^3$s or $R^4$s may be the same or different, provided that n and m are not 0 at the same time; and $X^1$ and $X^2$ each independently represent an aryl group, a heterocyclic group or a group represented by formula (2):

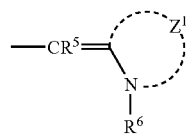

wherein $R^5$ represents a hydrogen atom or a substituent, $R^6$ represents a hydrogen atom, an alkyl group, an alkenyl group, an aryl group or a heterocyclic group, and $Z^1$ represents an atomic group for forming a 5- or 6-membered ring.

(36) The two-photon absorbing optical recording material as described in (35), wherein in the compound represented by formula (1), $R^1$ and $R^3$ are combined to form a ring.

(37) The two-photon absorbing optical recording material as described in (36), wherein in the compound represented by formula (1), $R^1$ and $R^3$ are combined to form a cyclopentanone ring together with the carbonyl group.

(38) The two-photon absorbing optical recording material as described in any one of (35) to (37), wherein in the compound represented by formula (1), $X^1$ and $X^2$ each are the group represented by formula (2).

(39) The two-photon absorbing optical recording material as described in (38), wherein in the compound represented by formula (1), $X^1$ and $X^2$ each are a group represented by formula (2), $R^6$ is an alkyl group, the ring formed by $Z^1$ is an indolenine ring, an azaindolenine ring, a pyrazoline ring, a benzothiazole ring, a thiazole ring, a thiazoline ring, a benzoxazole ring, an oxazole ring, an oxazoline ring, a benzimidazole ring, a thiadiazole ring or a quinoline ring.

(40) The two-photon absorbing optical recording material as described in (39), wherein in the compound represented by formula (1), $X^1$ and $X^2$ each are a group represented by formula (2), $R^6$ is an alkyl group, and the ring formed by $Z^1$ is an indolenine ring, an azaindolenine ring, a benzothiazole ring, a benzoxazole ring or a benzimidazole ring.

(41) The two-photon absorbing optical recording material as described in (35), wherein the cyanine dye is represented by the following formula (3), the merocyanine dye is represented by the following formula (4) and the oxonole dye is represented by the following formula (5):

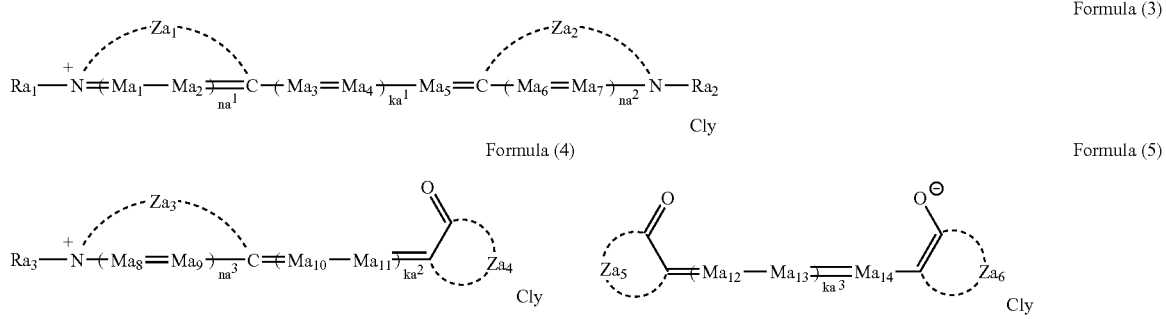

In formulae (3) to (5), $Za_1$, $Za_2$ and $Za_3$ each represent an atomic group for forming a 5- or 6-membered nitrogen-containing heterocyclic ring, $Za_4$, $Za_5$ and $Za_6$ each represent an atomic group for forming a 5- or 6-membered ring, $Ra_1$, $Ra_2$ and $Ra_3$ each independently represent a hydrogen atom, an alkyl group, an alkenyl group, an aryl group or a heterocyclic group, $Ma_1$ to $Ma_{14}$ each independently represent a methine group, which may have a substituent or may form a ring together with another methine group, $na^1$, $na^2$ and $na^3$ each represent 0 or 1, $ka^1$ and $ka^3$ each represent an integer of 0 to 3, provided that when $ka^1$ is 2 or more, multiple $Ma_3$s or $Ma_4$s may be the same or different and when $ka^3$ is 2 or more, multiple $Ma_{12}$s or $Ma_{13}$s may be the same or different, $ka^2$ represents an integer of 0 to 8, provided that when $ka^2$ is 2 or more, multiple $Ma_{10}$s or $Ma_{11}$s may be the same or different, CI represents an ion for neutralizing the electric charge, and y represents a number necessary for the neutralization of electric charge.

(42) The two-photon absorbing optical recording material as described in any one of (1) to (41), wherein the two-photon absorbing compound contains at least one hydrogen bonding group.

(43) The two-photon absorbing optical recording material as described in (42), wherein the hydrogen bonding group is —COOH group or —CONH$_2$ group.

(44) The two-photon absorbing optical recording material as described in any one of (1) to (43), which contains an electron-donating compound having the ability to reduce the radical cation of the two-photon absorbing compound, or an electron-accepting compound having the ability to oxidize the radical anion of the two-photon absorbing compound.

(45) The two-photon absorbing optical recording material as described in (44), which contains an electron-donating compound and in which the electron-donating compound is anyone of alkylamines, anilines, phenylenediamines, triphenylamines, carbazoles, phenothiazines, phenoxazines, phenazines, hydroquinones, catechols, alkoxybenzenes, aminophenols, imidazoles, pyridines, metallocenes, metal complexes and fine particulate semiconductors.

(46) The two-photon absorbing optical recording material as described in (45), wherein the electron-donating compound is phenothiazines.

(47) The two-photon absorbing optical recording material as described in (44), which contains an electron-accepting compound and in which the electron-accepting compound is any one of aromatic compounds having introduced thereinto an electron-withdrawing group, such as dinitrobenzene and dicyanobenzene, heterocyclic compounds, heterocyclic compounds having introduced thereinto an electron-withdrawing group, N-alkylpyridinium salts, benzoquinones, imides, metal complexes and fine particulate semiconductors.

(48) A two-photon absorbing three-dimensional optical recording medium or a two-photon absorbing three-dimensional optical recording and reproducing method, which comprises the two-photon absorbing optical recording material as described in any of (1) to (47).

(49) A two-photon absorbing optical recording medium or a two-photon absorbing three-dimensional optical recording medium, wherein the two-photon absorbing optical recording material or the two-photon absorbing three-dimensional optical recording medium as described in any of (1) to (48) is stored in a light-shielding cartridge at the storage.

(50) An optical recording medium and an optical recording and reproducing method which use the two-photon absorbing optical recording material as described in any of (1) to (49).

(51) A near-field optical recording medium and a near-field optical recoding and reproducing method which use the optical recording medium as described in (50).

(52) A two-photon absorbing optical recording method, which comprises irradiating the two-photon absorbing optical recording material as described in any of (1) to (51) with laser light at a wavelength being longer than the linear absorption band of the two-photon absorbing compound and having no linear absorption, and recording on the material by utilizing the two-photon absorption induced.

(53) A two-photon absorbing optical recording method which comprises using a two-photon absorbing optical recording material as described in any of (5) to (51), that contains a two-photon absorbing compound capable of absorbing two photons to form an excited state thereof, and a recording component including a dye precursor capable of becoming a color-forming material whose absorption wavelength is longer than that of the original state thereof owing to the electron transfer or the energy transfer from the excited state of the two-photon absorbing compound, and in which the recording material is irradiated with laser light at a wavelength being longer than the linear absorption band of the two-photon absorbing compound and having no linear absorption, thereby inducing two-photon absorption to form a color-forming material, and the linear absorption of the color-forming material appears in a longer wavelength side than the long wavelength absorption end of the linear absorption of the two-photon absorbing compound, and, based on this, the refractivity difference or absorbance difference recording is effected.

The second aspect of the invention includes the following:

(1) A photosensitive polymer composition which comprises at least (A) a polymer compound, (B) a two-photon absorbing compound, (C) an acid generator, and (D) a compound capable of exhibiting or changing its color by an acid, and which undergoes color formation or color change through non-resonant two-photon absorption.

(2) The photosensitive polymer composition as described in (1), wherein the two-photon absorbing compound (B) is a two-photon absorbing compound having a two-photon absorbing cross-sectional area of at least 500 GM.

(3) The photosensitive polymer composition as described in (1) or (2), wherein the acid generator (C) is at least one of onium salt compounds, sulfonate compounds, disulfone compounds, metal arene complex compounds, organic halogen compounds, triazine compounds, isocyanuric acid compounds and azole compounds.

(4) The photosensitive polymer composition as described in any of (1) to (3), wherein the acid generator (C) is at least one of onium salt compounds, sulfonate compounds, metal arene complex compounds, organic halogen compounds, triazine compounds and azole compounds.

(5) The photosensitive polymer composition as described in any of (1) to (4), wherein the acid generator (C) is at least one of onium salt compounds, sulfonate compounds and metal arene complex compounds.

(6) The photosensitive polymer composition as described in any of (3) to (5), wherein the onium salt compound is at least one of diazonium salt compounds, iodonium salt compounds and sulfonium salt compounds.

(7) The photosensitive polymer composition as described in any of (1) to (6), wherein the compound (D) capable of exhibiting or changing its color by an acid is at least one of triphenylmethane dyes, phenothiazine dyes, phenoxazine dyes, fluoran dyes, thiofluoran dyes, xanthene dyes, phthalide dyes, diphenylmethane dyes, chromenopyrazole dyes, leucoauramine dyes, methine dyes, azomethine dyes, rhodamine lactam dyes, quinazoline dyes, diazaxanthene dyes, fluorene dyes and spiropyran dyes. Preferred are phthalide dyes (including triphenylmethanephthalide dyes, indolylphthalide dyes, azaphthalide dyes), fluoran dyes, thiofluoran dyes, spiropyran dyes, methine dyes or azomethine dyes.

(8) The photosensitive polymer composition as described in any of (1) to (7), wherein the compound (D) capable of exhibiting or changing its color by an acid is at least one of triphenylmethane dyes, fluoran dyes, thiofluoran dyes, phthalide dyes, indolylphthalide dyes, azaphthalide dyes, rhodamine lactam dyes and spiropyran dyes.

(9) A method for coloring the photosensitive polymer composition of any of (1) to (8), which comprises irradiating the composition with light that has a longer wavelength than the longest absorption wavelength of the composition and is not absorbed by the composition, to thereby color the composition.

(10) The coloration method as described in (9), which comprises irradiating the photosensitive polymer composition of any of (1) to (8) with light that corresponds to the non-resonant two-photon absorption maximum wavelength of the two-photon absorbing compound (B) contained in the polymer composition, to thereby obtain a colored photosensitive polymer composition.

(11) An optical recording material containing the photosensitive polymer composition of any of (1) to (8).

(12) A recording medium containing the photosensitive polymer composition of any of (1) to (8), and a recording method, especially a three-dimensional optical recording medium and a three-dimensional optical recording method.

(13) The recording medium and recording method, especially the three-dimensional optical recording medium and three-dimensional optical recording method as described in (12), which comprises utilizing the light transmittance or reflectance change caused by non-resonant two-photon absorption for recording or reading.

(14) The recording medium and recording method, especially the three-dimensional optical recording medium and three-dimensional optical recording method as described in (12), which comprises utilizing the refractivity change caused by non-resonant two-photon absorption for recording or reading.

(15) An image-forming material containing the photosensitive polymer composition of any of (1) to (8), and an image-forming method, especially a three-dimensional image-forming material and a three-dimensional image-forming method.

The third aspect of the invention includes the following:

(1) A photon-mode recording method of recording on a photon-mode recording material comprising 1) a sensitizing dye and 2) a recording component, the recording component including a dye precursor capable of becoming a color-forming material having an absorption shifted to a longer wavelength than in the original state, and the recording component having: an absorption in a wavelength range differing from that of the sensitizing dye; and the ability to record the refractivity difference or the absorbance difference caused by the electron transfer or the energy transfer from the sensitizing dye or the excited-state color-forming material, the photon-mode recording method comprising: a first step of forming the color-forming material as a latent image through irradiation with light; and a second step of self-sensitizing and self-amplifying the latent image to perform a recording as the refractivity difference or the absorbance difference, wherein the first and second steps are performed with a dry treating.

(2) The photon-mode recording method as described in (1), wherein the second step comprises any of light irradiation, heat application, electric field application or magnetic field application (preferably light irradiation).

(3) The photon-mode recording method as described in (1) or (2), wherein the sensitizing dye is a two-photon absorbing compound, and the first step comprises causing two-photon absorption at least through light irradiation to form the latent image.

(4) The photon-mode recording method as described in any of (1) to (3) using a recording component that comprises at least 1) a sensitizing dye and 2) a dye precursor capable of being a color-forming material of which the absorption wavelength is longer than that of the original state thereof and which has an absorption in a wavelength range differing from that of the sensitizing dye, and that has the ability to record the refractivity difference or the absorbance difference caused through a process of electron transfer or energy transfer from the sensitizing dye or the excited-state color-forming material; the method comprising at least a first step of forming the color-forming material as a latent image through irradiation with light, and a second step of irradiating the latent image of the color-forming material with light that has a wavelength range where the molar absorbance coefficient for linear absorption of the sensitizing dye is at most 5000, to thereby induce linear absorption of the latent image of the color-forming material for self-sensitizing and amplifying the color-forming material and for recording the refractivity difference or the absorbance difference thereof; in which these steps are effected in dry.

(5) The photon-mode recording method as described in any of (1) to (4), wherein in the wavelength range of the light radiated in the second step, the molar absorbance coefficient of the sensitizing dye is at most 1000.

(6) The photon-mode recording method as described in any of (1) to (5), wherein in the wavelength range of the light radiated in the second step, the molar absorbance coefficient of the color-forming material is at least 5000.

(7) The photon-mode recording method as described in (2), wherein the second step comprises any of light irradiation or heat application.

(8) The photon-mode recording method as described in any of (3) to (7), which comprises at least a first step of forming a latent image of a color-forming material of which the absorption profile differs from the linear absorption of the two-photon absorbing compound, through two-photon absorption exposure, and a second step of irradiating the latent image of the color-forming material with light that has a wavelength range where the molar absorbance coefficient for linear (one-photon) absorption of the two-photon absorbing compound is at most 5000, to thereby induce linear absorption of the color-forming material for self-sensitizing and amplifying the color-forming material and for recording the refractivity difference or the absorbance difference thereof.

(9) The photon-mode recording method as described in (8), wherein in the wavelength range of the light radiated in the second step, the molar absorbance coefficient for linear absorption of the two-photon absorbing compound is at most 1000.

(10) The photon-mode recording method as described in (8) or (9), wherein in the wavelength range of the light radiated in the second step, the molar absorbance coefficient of the color-forming material is at least 5000.

(11) The photon-mode recording method as described in any of (1) to (10), wherein the wavelength of the light for latent image formation in the first step is the same as the wavelength of the light for amplifying the latent image for forming the refractivity difference or the absorbance difference in the second step.

(12) The photon-mode recording method as described in any of (1) to (10), wherein the wavelength of the light for amplifying the latent image for forming the refractivity difference or the absorbance difference in the second step is shorter than the wavelength of the light for latent image formation through two-photon absorption recording in the first step.

(13) The photon-mode recording method as described in any of (1) to (12), wherein the recording is unrewritable.

(14) An optical recording and reproducing method using the photon-mode recording material recorded according to the method of any of (1) to (13), which comprises irradiating the recorded material with light to thereby detect the reflectance difference based on the refractivity difference or the absorbance difference of the material for information reproduction from the material.

(15) The two-photon absorbing optical recording and reproducing method as described in (14), wherein the wavelength of the light radiated for recording is the same as that of the light radiated for detecting the reflectance difference for reproduction.

(16) The two-photon absorbing optical recording and reproducing method as described in (14), wherein the wavelength of the light for latent image formation through two-photon absorption recording in the first step is shorter than the wavelength of the light for amplifying the latent image for forming the refractivity difference or the absorbance difference in the second step, and falls within a wavelength range where the molar absorbance coefficient for linear (one-photon) absorption of the two-photon absorbing compound is at most 5000, and the wavelength of the light radiated for recording through two-photon absorption is the same as that of the light radiated for detecting the reflectance difference for reproduction.

(17) The photon-mode recording method as described in any of (1) to (13), wherein the recording component contains at least an acid color-forming dye precursor as a type of the dye precursor, and an acid generator.

(18) The photon-mode recording method as described in (17), wherein the acid generator is any of diaryliodonium salts, sulfonium salts, diazonium salts, metal arene complexes, trihalomethyl-substituted triazines or sulfonates.

(19) The two-photon absorbing optical recording material as described in (17) or (18), wherein the acid generator is any of diaryliodonium salts, sulfonium salts, or sulfonates.

(20) The photon-mode recording method as described in any of (17) to (19), wherein the dye generated by the acid color-forming dye precursor is a xanthene (preferably fluoran) dye or a triphenylmethane dye.

(21) The photon-mode recording method as described in any of (17) to (20), wherein the recording component contains at least an acid color-forming dye precursor as a type of the dye precursor, an acid generator, and an acid-increasing agent.

(22) The photon-mode recording method as described in (21), wherein the acid-increasing agent is represented by any of the following formulae (34-1) to (34-6):

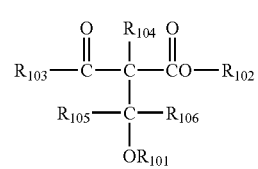

Formula (34-1)

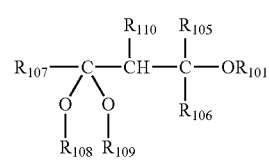

Formula (34-2)

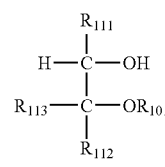

Formula (34-3)

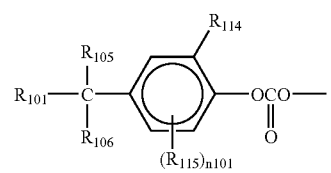

Formula (34-4)

Formula (34-5)

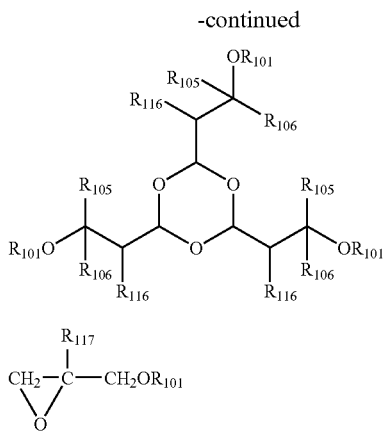

Formula (34-6)

Formula (31-4)

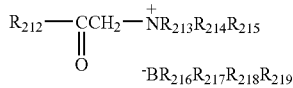

In formulae (34-1) to (34-6), $R_{101}$ represents a group of becoming an acid having a pKa of 5 or less in the form of $R_{101}OH$, $R_{102}$ represents a 2-alkyl-2-propyl group, a 2-aryl-2-propyl group, a cyclohexyl group, a tetrahydropyranyl group or a bis(p-alkoxyphenyl)methyl group, $R_{103}$, $R_{104}$, $R_{115}$ and $R_{117}$ each independently represent a substituent, $R_{105}$, $R_{106}$, $R_{107}$, $R_{110}$, $R_{113}$ and $R_{116}$ each independently represent a hydrogen atom or a substituent, $R_{118}$ and $R_{119}$ each independently represent an alkyl group and may combine with each other to form a ring, $R_{111}$ and $R_{112}$ represent alkyl groups which combine with each other to form a ring, $R_{114}$ represents a hydrogen atom or a nitro group, and n101 represents an integer of 0 to 3.

(23) The photon-mode recording method as described in (23), wherein in formulae (34-1) to (34-6), $R_{101}$ in the form of $R_{101}OH$ is a sulfonic acid or an electron-withdrawing group-substituted carboxylic acid.

(24) The photon-mode recording method as described in any of (1) to (13), wherein the recording component contains at least a base color-forming dye precursor as a type of the dye precursor, and a base generator.

(25) The photon-mode recording method as described in (24), wherein the base generator is represented by any of the following formulae (31-1) to (31-4):

Formula (31-1)

Formula (31-2)

Formula (31-3)

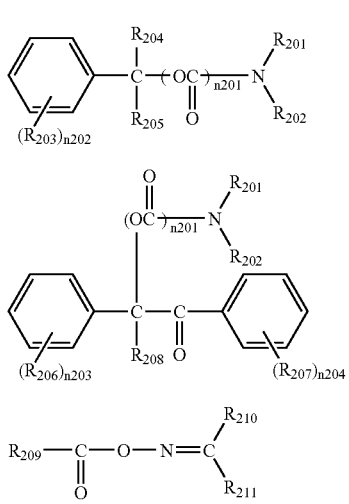

In formulae (31-1) to (31-4), $R_{201}$, $R_{202}$, $R_{213}$, $R_{214}$ and $R_{215}$ each independently represent a hydrogen atom, an alkyl group, an alkenyl group, a cycloalkyl group, an aryl group or a heterocyclic group, $R_{201}$ and $R_{202}$ may combine with each other to form a ring, $R_{213}$, $R_{214}$ and $R_{215}$ may combine with each other to form a ring, $R_{203}$, $R_{206}$, $R_{207}$ and $R_{209}$ each independently represent a substituent, $R_{204}$, $R_{205}$, $R_{208}$, $R_{210}$ and $R_{211}$ each independently represent a hydrogen atom or a substituent, $R_{210}$ and $R_{211}$ may combine with each other to form a ring, $R_{216}$, $R_{217}$, $R_{218}$ and $R_{219}$ each independently represent an alkyl group or an aryl group, $R_{212}$ represents an aryl group or a heterocyclic group, n201 represents an integer of 0 or 1, and n202 to n204 each independently represent an integer of 0 to 5.

(26) The photon-mode recording method as described in (25), wherein in formulae (31-1) and (31-2), n201 is 1.

(27) The photon-mode recording method as described in (26), wherein in formula (31-1), $R_{203}$ is a nitro group substituted to the 2-position or 2,6-position or an alkoxy group substituted to the 3,5-position.

(28) The photon-mode recording method as described in (25) or (26), wherein in formula (31-2), $R_{206}$ is an alkoxy group substituted to the 3,5-position.

(29) The photon-mode recording method as described in any of (24) to (28), wherein the base color-forming dye precursor is a non-dissociated form of a dissociation-type azo dye, a dissociation-type azomethine dye, a dissociation-type oxonole dye, a dissociation-type xanthene (fluoran) dye or a dissociation-type triphenylmethane-based dye.

(30) The photon-mode recording method as described in any of (24) to (29), wherein the recording material contains at least a base color-forming dye precursor as a type of the dye precursor, a base generator and a base-increasing agent.

(31) The photon-mode recording method as described in (30), wherein the base-increasing agent is represented by the following formula (35):

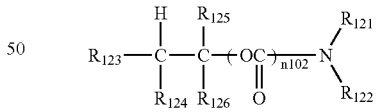

In formula (35), $R_{121}$ and $R_{122}$ each independently represent a hydrogen atom, an alkyl group, an alkenyl group, a cycloalkyl group, an aryl group or a heterocyclic group, $R_{121}$ and $R_{122}$ may combine with each other to form a ring, $R_{123}$ and $R_{124}$ each independently represent a substituent, $R_{123}$ and $R_{124}$ may combine with each other to form a ring, $R_{125}$ and $R_{126}$ each independently represent a hydrogen atom or a substituent, and n102 represents an integer of 0 or 1.

(32) The photon-mode recording method as described in (31), wherein in formula (35), n102 is 1.

(33) The photon-mode recording method as described in (31) or (32), wherein the base-increasing agent of formula (35) is represented by the following formula (36-1) or (36-2):

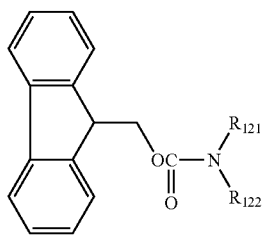

Formula (36-1)

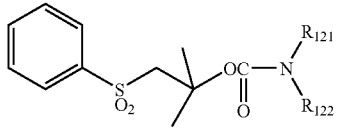

Formula (36-2)

In formulae (36-1) and (36-2), $R_{121}$ and $R_{122}$ have the same meanings as in formula (35).

(34) The photon-mode recording method as described in any of (1) to (16), wherein the recording component contains at least a dye precursor of the following formula (32):

A1-PD　　　　　　Formula (32)

In formula (32), A1 and PD are covalently bonded, A1 represents an organic compound moiety having a function of cutting the covalent bond with PD due to electron or energy transfer with the excited state of a two-photon absorbing compound, and PD represents an organic compound moiety of becoming a color-forming material when covalently bonded with A1 and when released as a result of cutting of the covalent bond with A1.

(35) The photon-mode recording method as described in (34), wherein the dye precursor of formula (32) is a compound represented by any one of the following formulae (33-1) to (33-6):

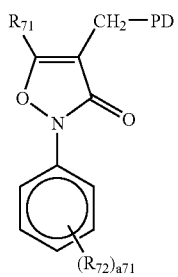

Formula (33-1)

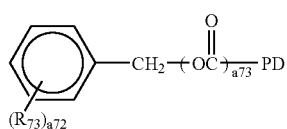

Formula (33-2)

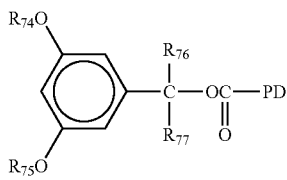

Formula (33-3)

-continued

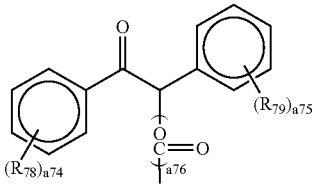

Formula (33-4)

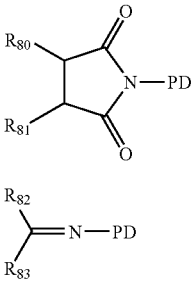

Formula (33-5)

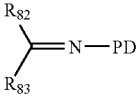

Formula (33-6)

In formulae (33-1) to (33-6), PD has the same meaning as in formula (32), $R_{71}$, $R_{80}$, $R_{81}$ each independently represent a hydrogen atom or a substituent, $R_{72}$, $R_{73}$, $R_{78}$, $R_{79}$, $R_{82}$ and $R_{83}$ each represent a substituent, a71, a72, a74 and a75 each independently represent an integer of 0 to 5, a73 and a76 each independently represent 0 or 1, provided that when a71, a72, a74 and a75 each are 2 or more, multiple $R_{72}$s, $R_{73}$s, $R_{78}$s or $R_{79}$s may be the same or different and may combine with each other to form a ring, and each of the pairs $R_{80}$ and $R_{81}$, and $R_{82}$ and $R_{83}$ may combine with each other to form a ring.

(36) The photon-mode recording method as described in (34) or (35), wherein in formulae (32) and (33-1) to (33-6), PD is a group comprising any one of a dissociation-type azo dye, a dissociation-type azomethine dye, a dissociation-type oxonole dye, a triphenylmethane dye and a xanthene dye, and being connected to A1 through a covalent bond on the chromophore.

(37) The photon-mode recording method as described in any of (1) to (3), wherein the recording component is one described in any of (17) to (36).

(38) The photon-mode recording method as described in any of (1) to (37), wherein the sensitizing dye is an organic dye.

(39) The photon-mode recording method as described in any of (1) to (38), wherein the sensitizing dye is a methine dye or a phthalocyanine dye.

(40) The photon-mode recording method as described in (38), wherein the sensitizing dye is a cyanine dye, a merocyanine dye, an oxonole dye, a phthalocyanine dye or a compound represented by the following formula (1):

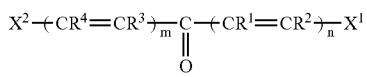

wherein $R^1$, $R^2$, $R^3$ and $R^4$ each independently represent a hydrogen atom or a substituent and some of $R^1$, $R^2$, $R^3$ and $R^4$ may combine with each other to form a ring; n and m each independently represent an integer of 0 to 4 and when n and m each are 2 or more, multiple $R^1$s, $R^2$s, $R^3$s or $R^4$s may be the same or different, provided that n and m are not 0 at the same time; and $X^1$ and $X^2$ each independently represent an aryl group, a heterocyclic group or a group represented by formula (2):

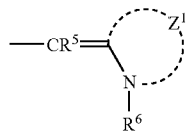

wherein $R^5$ represents a hydrogen atom or a substituent, $R^6$ represents a hydrogen atom, an alkyl group, an alkenyl group, an aryl group or a heterocyclic group, and $Z^1$ represents an atomic group for forming a 5- or 6-membered ring.

(41) The photon-mode recording method as described in (40), wherein in the compound represented by formula (1), $R^1$ and $R^3$ are combined to form a ring.

(42) The photon-mode recording method as described in (41), wherein in the compound represented by formula (1), $R^1$ and $R^3$ are combined to form a cyclopentanone ring together with the carbonyl group.

(43) The photon-mode recording method as described in any of (40) to (42), wherein in the compound represented by formula (1), $X^1$ and $X^2$ each are a group represented by formula (2).

(44) The photon-mode recording method as described in (40), wherein in the compound represented by formula (1), $X^1$ and $X^2$ each are a group represented by formula (2), $R^6$ is an alkyl group, the ring formed by $Z^1$ is an indolenine ring, an azaindolenine ring, a pyrazoline ring, a benzothiazole ring, a thiazole ring, a thiazoline ring, a benzoxazole ring, an oxazole ring, an oxazoline ring, a benzimidazole ring, a thiadiazole ring or a quinoline ring.

(45) The photon-mode recording method as described in any of (40) to (43), wherein in the compound represented by formula (1), $X^1$ and $X^2$ each are a group represented by formula (2), $R^6$ is an alkyl group, and the ring formed by $Z^1$ is an indolenine ring, an azaindolenine ring, a benzothiazole ring, a benzoxazole ring or a benzimidazole ring.

(46) The photon-mode recording method as described in (40), wherein the cyanine dye is represented by the following formula (3), the merocyanine dye is represented by the following formula (4) and the oxonole dye is represented by the following formula (5):

atomic group for forming a 5- or 6-membered ring, $Ra_1$, $Ra_2$ and $Ra_3$ each independently represent a hydrogen atom, an alkyl group, an alkenyl group, an aryl group or a heterocyclic group, $Ma_1$ to $Ma_{14}$ each independently represent a methine group, which may have a substituent or may form a ring together with another methine group, $na^1$, $na^2$ and $na^3$ each represent 0 or 1, $ka^1$ and $ka^3$ each represent an integer of 0 to 3, provided that when $ka^1$ is 2 or more, multiple $Ma_3$s or $Ma_4$s may be the same or different and when $ka^3$ is 2 or more, multiple $Ma_{12}$s or $Ma_{13}$s may be the same or different, $ka^2$ represents an integer of 0 to 8, provided that when $ka^2$ is 2 or more, multiple $Ma_{10}$s or $Ma_{11}$s may be the same or different, CI represents an ion for neutralizing the electric charge, and y represents a number necessary for the neutralization of electric charge.

(47) The photon-mode recording method as described in any of (1) to (46), wherein the sensitizing dye contains at least one hydrogen bonding group.

(48) The photon-mode recording method as described in (47), wherein the hydrogen bonding group is —COOH group or —CONH$_2$ group.

(49) The photon-mode recording method as described in any one of (1) to (48), wherein the sensitizing dye is a two-photon absorbing compound and functions as a sensitizing dye through linear (one-photon) absorption.

(50) The photon-mode recording method as described in any one of (1) to (49), wherein the photon-mode recording material (preferably, the two-photon absorbing optical recording material) used contains an electron-donating compound having the ability to reduce the radical cation of the sensitizing dye, the two-photon absorbing compound, or the dye-forming material generated by the dye precursor, or an electron-accepting compound having the ability to oxidize the radical anion of the sensitizing dye, the two-photon absorbing compound, or the dye-forming material generated by the dye precursor.

Formula (3)

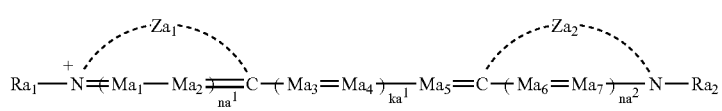

Formula (4)

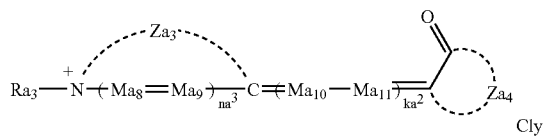

Formula (5)

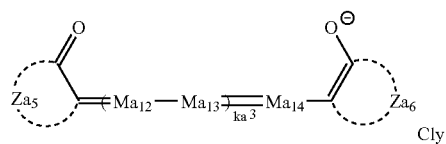

In formulae (3) to (5), $Za_1$, $Za_2$ and $Za_3$ each represent an atomic group for forming a 5- or 6-membered nitrogen-containing heterocyclic ring, $Za_4$, $Za_5$ and $Za_6$ each represent an

(51) The photon-mode recording method as described in (50), wherein the photon-mode recording material contains an electron-donating compound, the electron-donating compound is any one of alkylamines, anilines, phenylenedi amines, triphenylamines, carbazoles, phenothiazines, phenoxazines, phenazines, hydroquinones, catechols, alkoxybenzenes, aminophenols, imidazoles, pyridines, metallocenes, metal complexes and fine particulate semiconductors.

(52) The photon-mode recording method as described in (51), wherein the electron-donating compound is phenothiazines.

(53) The photon-mode recording method as described in (50), wherein the photon-mode recording material contains an electron-accepting compound, and the electron-accepting compound is any one of aromatic compounds having introduced thereinto an electron-withdrawing group, such as dinitrobenzene and dicyanobenzene, heterocyclic compounds, heterocyclic compounds having introduced thereinto an electron-withdrawing group, N-alkylpyridinium salts, benzoquinones, imides, metal complexes and fine particulate semiconductors.

(54) A photon-mode recording method, which comprises a first step of irradiating a two-photon absorbing optical recording material with laser light at a wavelength being longer than the linear absorption band of the two-photon absorbing compound and having no linear absorption, and recording a latent image on the material by utilizing the two-photon absorption induced.

(55) A photon-mode recording material (preferably a two-photon absorbing optical recording material) for the photon-mode recording method of any of (1) to (54).

(56) A two-photon absorbing three-dimensional optical recording medium comprising the two-photon absorbing optical recording material described hereinabove, and a two-photon absorbing three-dimensional recording and reproducing method using the medium.

(57) A photon-mode optical recording medium, a two-photon absorbing recording medium or a two-photon absorbing three-dimensional optical recording medium, wherein the photon-mode optical recording material, the two-photon absorbing recording material or the two-photon absorbing three-dimensional optical recording material described hereinabove is stored in a light-shielding cartridge at the storage.

(58) A three-dimensional volume display comprising the two-photon absorbing optical recording material mentioned above, and a method for producing the three-dimensional volume display.

(59) An optical recording medium or an optical recording and reproducing method that use the photon-mode recording material or the two-photon absorbing optical recording material described hereinabove.

(60) A near-field optical recording medium and a near-field optical recoding and reproducing method that use the optical recording medium as described in (59).

When the two-photon absorbing optical recording material of the invention is used, then the refractive index or the absorbance of the material may be three-dimensionally modulated in the laser-focused (recorded) area and the unfocused (unrecorded) area thereof, and, as a result, the light reflectance of the material may bet hereby varied. To that effect, the invention is applicable to a three-dimensional optical recording medium and a method for recording and reproducing with it.

The photosensitive polymer composition of the invention enables high-sensitivity color change thereof through two-photon absorption induced therein (or that is, through the change in the extinction coefficient k and the change in the refractive index n of the composition).

The photon-mode recording material and recording system of the invention enable ultra-high sensitivity recording and reproduction based on the refractivity difference or the absorbance difference of the material.

Further, when the two-photon absorbing optical recording material of the invention is used, then the refractive index or the absorbance of the material may be three-dimensionally modulated in the laser-focused (recorded) area and the unfocused (unrecorded) area thereof at an extremely high sensitivity. The invention is applicable to a three-dimensional optical recording medium and a method of high-speed recording and reproduction with it.

DETAILED DESCRIPTION OF THE INVENTION

The first aspect of the invention (two-photon absorbing optical recording material, etc.) is described in detail hereinunder.

The two-photon absorbing optical recording material of the invention contains at least a two-photon absorbing compound and a recording component, and is characterized in that, after information is recorded thereon by utilizing the two-photon absorption of the two-photon absorbing compound so as to change the recording component, this is irradiated with light to thereby detect the difference in the reflectance or transmittance of the material for information reproduction from it.

Preferably, the two-photon absorbing optical recording material is not processed in wet.

Also preferably, the system of recording on the material is a write-once system, that is, unrewritable system.

When recording is made on the two-photon absorbing optical recording material of the invention by utilizing the two-photon absorption of the two-photon absorbing compound therein, and when the thus-recorded material is irradiated with light to detect the difference in the reflectance or transmittance thereof for information reproduction from it, the difference in the reflectance or transmittance is preferably caused by any of refractivity difference, absorbance difference, foaming, scattering, metal reflection, diffraction or interference. Relative to the light to be radiated to the recording material, the relative difference in the reflectance or transmittance between the recorded area and the unrecorded area of the material is preferably at least 0.1%, more preferably at least 1%, even more preferably at least 10%.

When the difference in the reflectance or transmittance is induced by foaming through the two-photon absorption of the two-photon absorbing compound, then the compound group described in Japanese Patent Application No. 2003-274096 is preferably used herein. In this case, the foaming size is preferably from 50 nm to 5 μm.

When the difference in the reflectance or transmittance is induced by scattering, for example, it is desirable that inorganic or organic compound particles are formed through two-photon absorption of the two-photon absorbing compound. In this case, the size of the particles formed is preferably from 50 nm to 5 μm.

When the difference in the reflectance or transmittance is induced by metal reflection, for example, it is desirable that a metal ion is reduced to the metal or a metal is oxidized into the metal ion through two-photon absorption of the two-photon absorbing compound to thereby bring about the reflectance or transmittance change.

When recording is made on the two-photon absorbing optical recording material of the invention by utilizing the two-photon absorption of the two-photon absorbing compound therein, and when the thus-recorded material is irradiated with light to detect the difference in the reflectance or transmittance thereof for information reproduction from it, the difference in the reflectance or transmittance is preferably caused by refractivity difference or absorbance difference.

Preferably, the refractivity difference may be formed through polymerization to be caused by two-photon absorption of a two-photon absorbing compound, for example, as in Japanese Patent Application No. 2003-146527, but more preferably, the recording material contains, as a compound group capable of attaining refractivity difference or absorbance difference recording owing to two-photon absorption, at least a two-photon absorbing compound capable of absorbing two photons to form an excited state, and a recording component that undergoes chemical reaction through electron transfer or energy transfer from the excited state of the two-photon absorbing compound to thereby record the refractivity difference or the absorbance difference.

More preferably, the recording component contains a dye precursor capable of being a color-forming material of which the absorption wavelength is longer than that of the original state thereof owing to the electron transfer or the energy transfer from the excited state of the two-photon absorbing compound.

In general, the refractive index of dye may have a high value within a region of from around the linear absorption maximum wavelength ($\lambda$max) to a wavelength longer than it, and, in particular, it may have an extremely high value within a region of from $\lambda$max to a wavelength longer by around 200 nm than $\lambda$max. Some dyes may have a refractive index of more than 2, as the case may be, more than 2.5 in that region. On the other hand, other organic compounds for binder polymer or the like, not serving as dye, generally have a refractive index of from 1.4 to 1.6 or so.

Accordingly, it is understood that, when a dye precursor is colored through two-photon absorption of two-photon absorbing compound, then it forms not only absorbance difference but also great refractivity difference.

In the two-photon absorbing optical recording material of the invention, it is desirable that the refractive index of the dye formed by the recording component is the greatest at around the wavelength of the laser used for reproduction. Also preferably, the same laser is used for recording and reproduction.

Preferably, the refractive index of the film of the dye alone formed from the recording component is at least 1.8, more preferably at least 2, most preferably at least 2.2 at the recording wavelength.

From the above, for the two-photon absorbing optical recording material of the invention and for the recording and reproduction method with it, it is desirable that the recording component is a refractivity difference recording component, the dye precursor contained in the refractivity difference recording component can be a color-forming material of which the absorption wavelength is longer than that of the original state thereof owing to the electron transfer or the energy transfer from the excited state of the two-photon absorbing compound, and the color-forming material does not absorb the light radiated to the material for detecting the difference in the reflectance or transmittance thereof after information recording has been effected on the material through two-photon absorption but absorbs light of which the wavelength is shorter than that of the radiated light for enabling refractivity modulation at the recorded area and the unrecorded area to thereby change the reflectance or transmittance of the material in light radiation thereto.

In this case, it is more desirable that the dye precursor contained in the refractivity difference recording component can be a color-forming material of which the absorption wavelength is longer than that of the original state thereof owing to the electron transfer or the energy transfer from the excited state of the two-photon absorbing compound, and the color-forming material does not absorb the light radiated to the material for detecting the difference in the reflectance or transmittance thereof after information recording has been effected on the material through two-photon absorption but absorbs light which has an absorption maximum within a wavelength range falling between the wavelength of the light radiated to the material for reproduction and a wavelength shorter by 200 nm, even more preferably by 100 nm than that of the radiated light, thereby enabling refractivity modulation at the recorded area and the unrecorded area so as to change the reflectance or transmittance of the material in light radiation thereto.

On the other hand, for the two-photon absorbing optical recording material of the invention and for the recording and reproduction method with it, it is also desirable that the recording component is an absorbance difference recording component, the dye precursor contained in the absorbance difference recording component can be a color-forming material of which the absorption wavelength is longer than that of the original state thereof owing to the electron transfer or the energy transfer from the excited state of the two-photon absorbing compound, and the color-forming material absorbs the light radiated to the material for detecting the difference in the reflectance or transmittance thereof after information recording has been effected on the material through two-photon absorption for enabling refractivity modulation at the recorded area and the unrecorded area to thereby change the reflectance or transmittance of the material in light radiation thereto.

In any case where the difference in the reflectance or transmittance is caused by refractivity difference or absorbance difference, it is more desirable that the wavelength of the light radiated to the material for information recording thereon through two-photon absorption is the same as that of the light radiated thereto for detecting the difference in the reflectance or transmittance in reproduction of the recorded information.

Accordingly, when the difference in the reflectance or transmittance results from the refractivity difference, then the recording material is preferably so designed that the refractivity difference between the recorded area and the unrecorded area could be the largest at around the recording/reproduction wavelength; but when the difference in the reflectance or transmittance results from the absorbance difference, then the recording material is preferably so designed that the absorbance difference between the recorded area and the unrecorded area could be the largest at around the recording/reproduction wavelength.

Preferably, laser is used for recording on the two-photon absorbing optical recording material of the invention. The light for use in the invention is preferably UV light, visible light or IR light at a wavelength of 200 to 2,000 nm, more preferably UV light, visible light or IR light at a wavelength of 300 to 1,000 nm, even more preferably visible light or IR light at 400 to 800 nm.

The laser which can be used is not particularly limited, but specific examples of the laser which can be preferably used include a solid or fiber laser having an oscillation wavelength in the vicinity of center wavelength of 1,000 nm, such as Ti-sapphire, a semiconductor, solid or fiber laser having an oscillation wavelength in the vicinity of 780 nm, which is also used in CD-R and the like, a semiconductor or solid laser having an oscillation wavelength in the range from 620 to 680 nm, which is also used in DVD-R and the like, and a GaN laser having an oscillation wavelength in the vicinity of 400 to 415 nm.

In addition, a solid or semiconductor SHG laser having an oscillation wavelength in the visible light region, such as YAG.SHG laser, may also be preferably used.

The laser for use in the invention may be either a pulse oscillation laser or a CW laser.

The light used at the time of information reproduction is also preferably laser light and although the power or pulse shape may be the same or different, the reproduction is preferably performed by using the same laser as used for recording the information.

When recording is made on the two-photon absorbing optical recording material of the invention, then it is desirable that the two-photon absorption induced through irradiation with laser light having a longer wavelength than that of the linear absorption band of the two-photon absorbing compound but not having linear absorption is utilized for the recording.

More preferably, therefore, the refractivity difference or absorbance difference recording is effected by utilizing the phenomenon that the linear absorption of the color-forming material formed by inducing the two-photon absorption through irradiation with laser light having a longer wavelength than that of the linear absorption band of the two-photon absorbing compound but not having linear absorption appears in a longer wavelength range than the longest wavelength absorption end of the linear absorption of the two-photon absorbing compound.

Preferably, the two-photon absorbing optical recording material of the invention contains, in addition to the two-photon absorbing compound and the recording component, a binder, and if desired, an electron-donating compound, an electron-accepting compound, a polymerizable monomer, a polymerizable oligomer, a polymerization initiator, a crosslinking agent, a heat stabilizer, a plasticizer, a solvent and other additives.

Preferably, the size of the reacted part or the colored part formed through recording on the two-photon absorbing optical recording material of the invention falls within a range of from 10 nm to 100μμ, more preferably from 50 nm to 5 μm, even more preferably from 50 nm to 2 μm.

For enabling the reproduction from the recorded material, the size of the reacted part or the colored part is preferably from ¹⁄₂₀ to 20 times, more preferably from ¹⁄₁₀ to 10 times, most preferably from ⅕ to 5 times the wavelength of the radiated light.

After two-photon recording on the two-photon absorbing optical recording material of the invention, the material may be processed for fixation with light (ordinary one-photon) or heat, or with the two.

In particular, when an acid-increasing agent or a base-increasing agent is used in the two-photon absorbing optical recording material of the invention, it is especially desirable that the recorded material is fixed under heat in order that the acid-increasing agent or the base-increasing agent therein could function more effectively.

For fixation by light, the two-photon absorbing optical recording material is irradiated with UV light or visible light in the entire surface thereof (non-interference exposure). The light source to be used is preferably visible light laser, UV laser, carbon arc, high-pressure mercury lamp, xenon lamp, metal halide lamp, fluorescent lamp, tungsten lamp, LED, organic EL, etc.

For the light source in the fixing by light, the laser used for the recording is also preferably used as it is or by changing the power, pulse, concentration, wavelength or the like.

In the case of fixing by heat, the fixing step is preferably performed at from 40 to 160° C., more preferably at from 60 to 130° C.

In the case of performing the fixing by using both light and heat, the light and the heat may be applied simultaneously or separately.

In the two-photon absorbing optical recording material of the invention, it is desirable that the chemical reaction or color-forming reaction to be caused through two-photon absorption does not include pyrolysis, or that is, the reaction is a photon-mode reaction for higher sensitivity of the material.

Specifically, it is desirable that information recording on the two-photon absorbing optical recording material of the invention is effected in a mechanism differing from that popularized for ordinary CD-R and DVD-R, for high-speed writing and transferring on the recording material.

The two-photon absorbing optical recording material of the invention is favorably used in optical recording mediums such as DVD-R, DVD-BL (BR); near-field optical recording mediums, three-dimensional optical recording mediums, etc. More preferably, it is used in three-dimensional optical recording mediums. Specifically, the two-photon absorbing optical recording material of the invention is preferably a two-photon absorbing three-dimensional optical recording material.

When the two-photon absorbing optical recording material of the invention is used in optical recording mediums, then the recording material is preferably stored in a light-shielding cartridge at the storage.

The two-photon absorbing compound and the two-photon absorbing optical recording material of the invention may be for three-photon or more multi-photon absorption.

The components of the two-photon absorbing optical recording material of the invention are described in detail hereinunder.

The two-photon absorbing compound in the two-photon absorbing optical recording material of the invention is described.

The two-photon absorbing compound for use in the invention is a compound of undergoing non-resonant two-photon absorption (a phenomenon that two photons are simultaneously absorbed in the energy region having no (linear) absorption band of the compound to cause excitation).

At the application to the two-photon absorbing optical recording material, particularly, two-photon absorbing three-dimensional optical recording material, in order to achieve a high transfer (recording) rate, a two-photon absorbing compound capable of undergoing two-photon absorption with high sensitivity and efficiently producing an excited state is necessary.

The efficiency of two-photon absorption by the two-photon absorbing compound is expressed by a two-photon absorbing cross-sectional area δ and defined by 1 $GM=1\times10^{-50}$ $cm^4$ s/photon. In the two-photon absorbing optical recording material of the invention, the two-photon absorbing cross-sectional area δ of the two-photon absorbing compound is preferably 100 GM or more in view of, for example, increase in the writing speed or reduction in the size and cost of laser, more preferably 1,000 GM or more, still more preferably 5,000 GM or more, and most preferably 10,000 GM or more.

In the invention, when a specific moiety is called "a group", unless otherwise indicated, this means that the group may or may not be substituted by one or more (up to the maximum possible number) substituents. For example, "an alkyl group" means a substituted or unsubstituted alkyl group. The substituent which can be used for the compound in the invention may be any substituent.

Also, in the invention, when a specific moiety is called "a ring" or when "a ring" is contained in "a group", unless otherwise indicated, the ring may be a monocyclic ring or a condensed ring or may or may not be substituted.

For example, "an aryl group" may be a phenyl group or a naphthyl group or may be a substituted phenyl group.

Incidentally, the dye as used herein is a generic term of compounds having a part of the absorption in the UV region (preferably from 200 to 400 nm), visible region (from 400 to 700 nm) or near IR region (preferably from 700 to 2,000 nm), preferably a generic term of compounds having a part of the absorption in the visible region.

The two-photon absorbing compound for use in the invention may be any compound, but examples thereof include cyanine dyes, hemicyanine dyes, streptocyanine dyes, styryl dyes, pyrylium dyes, merocyanine dyes, trinuclear merocyanine dyes, tetranuclear merocyanine dyes, rhodacyanine dyes, complex cyanine dyes, complex merocyanine dyes, allopolar dyes, arylidene dyes, oxonole dyes, hemioxonole dyes, aquarium dyes, croconium dyes, azulenium dyes, coumarin dyes, ketocoumarin dyes, styrylcoumarin dyes, pyran dyes, anthraquinone dyes, quinone dyes, triphenylmethane dyes, diphenylmethane dyes, xanthene dyes, thioxanthene dyes, phenothiazine dyes, phenoxazine dyes, phenazine dyes, azo dyes, azomethine dyes, fluorenone dyes, diarylethene dyes, spiropyran dyes, flugido dyes, perylene dyes, phthaloperylene dyes, indigo dyes, polyene dyes, acridine dyes, acridinone dyes, diphenylamine dyes, quinacridone dyes, quinophthalone dyes, porphyrin dyes, azaporphyrin dyes, chlorophyll dyes, phthalocyanine dyes, condensed aromatic dyes, styrene-based dyes, metallocene dyes, metal complex dyes, phenylene vinylene dyes and stilbazolium dyes. Among these, preferred are cyanine dyes, hemicyanine dyes, streptocyanine dyes, styryl dyes, pyrylium dyes, merocyanine dyes, trinuclear merocyanine dyes, tetranuclear merocyanine dyes, rhodacyanine dyes, complex cyanine dyes, complex merocyanine dyes, allopolar dyes, arylidene dyes, oxonole dyes, hemioxonole dyes, aquarium dyes, croconium dyes, azulenium dyes, coumarin dyes, ketocoumarin dyes, styrylcoumarin dyes, pyran dyes, anthraquinone dyes, quinone dyes, triphenylmethane dyes, diphenylmethane dyes, thioxanthene dyes, phenothiazine dyes, phenoxazine dyes, phenazine dyes, azo dyes, azomethine dyes, perylene dyes, phthaloperylene dyes, indigo dyes, polyene dyes, acridine dyes, acridinone dyes, diphenylamine dyes, quinacridone dyes, quinophthalone dyes, porphyrin dyes, azaporphyrin dyes, chlorophyll dyes, phthalocyanine dyes, condensed aromatic dyes, styrene-based dyes, metallocene dyes, metal complex dyes and stilbazolium dyes, more preferred are cyanine dyes, hemicyanine dyes, streptocyanine dyes, styryl dyes, pyrylium dyes, merocyanine dyes, trinuclear merocyanine dyes, tetranuclear merocyanine dyes, rhodacyanine dyes, complex cyanine dyes, complex merocyanine dyes, allopolar dyes, arylidene dyes, oxonole dyes, hemioxonole dyes, aquarium dyes, croconium dyes, azulenium dyes, ketocoumarin dyes, styrylcoumarin dyes, pyran dyes, anthraquinone dyes, quinone dyes, triphenylmethane dyes, diphenylmethane dyes, thioxanthene dyes, phenothiazine dyes, phenoxazine dyes, phenazine dyes, azo dyes, azomethine dyes, indigo dyes, polyene dyes, acridine dyes, acridinone dyes, diphenylamine dyes, quinacridone dyes, quinophthalone dyes, azaporphyrin dyes, chlorophyll dyes, phthalocyanine dyes, condensedaromatic dyes, metallocene dyes and metal complex dyes, even more preferred are cyanine dyes, hemicyanine dyes, streptocyanine dyes, styryl dyes, pyrylium dyes, merocyanine dyes, arylidene dyes, oxonole dyes, aquarium dyes, ketocoumarin dyes, styrylcoumarin dyes, pyran dyes, thioxanthene dyes, phenothiazine dyes, phenoxazine dyes, phenazine dyes, azo dyes, polyene dyes, azaporphyrin dyes, chlorophyll dyes, phthalocyanine dyes and metal complex dyes, yet still more preferred are cyanine dyes, merocyanine dyes, arylidene dyes, oxonole dyes, aquarium dyes, azo dyes and phthalocyanine dyes, further more preferred are cyanine dyes, merocyanine dyes and oxonole dyes, and most preferred are cyanine dyes.

These dyes are described in detail, for example, in F. M. Harmer, *Heterocyclic Compounds-Cyanine Dyes and Related Compounds*, John Wiley & Sons, New York, London (1964), D. M. Sturmer, *Heterocyclic Compounds-Special topics in heterocyclic chemistry*, Chap. 18, Section 14, pp. 482-515, John Wiley & Sons, New York, London (1977), and *Rodd's Chemistry of Carbon Compounds*, 2nd Ed., Vol. IV, Part B, Chap. 15, pp. 369-422, Elsevier Science Publishing Company Inc., New York (1977).

Specific examples of the cyanine, merocyanine and oxonole dyes include those described in F. M. Harmer, *Heterocyclic Compounds-Cyanine Dyes and Related Compounds*, John Wiley & Sons, New York, London (1964).

As for the formulae of the cyanine and merocyanine dyes, formulae (XI) and (XII) described on pages 21 and 22 of U.S. Pat. No. 5,340,694 are preferred (however, the numbers represented by n12 and n15 are not limited and each are an integer of 0 or more (preferably from 0 to 4)).

When the two-photon absorbing compound for use in the invention is a cyanine dye, the cyanine dye is preferably represented by formula (3).

In formula (3), $Za_1$ and $Za_2$ each represent an atomic group for forming a 5- or 6-membered nitrogen-containing heterocyclic ring. Preferred examples of the 5- or 6-membered nitrogen-containing heterocyclic ring formed include oxazole nuclei having a carbon number (hereinafter referred to as "a C number") of 3 to 25 (e.g., 2-3-methyloxazolyl, 2-3-ethyloxazolyl, 2-3,4-diethyloxazolyl, 2-3-methylbenzoxazolyl, 2-3-ethylbenzoxazolyl, 2-3-sulfoethylbenzoxazolyl, 2-3-sulfopropylbenzoxazolyl, 2-3-methylthioethylbenzoxazolyl, 2-3-methoxyethylbenzoxazolyl, 2-3-sulfobutylbenzoxazolyl, 2-3-methyl-β-naphthoxazolyl, 2-3-methyl-α-naphthoxazolyl, 2-3-sulfopropyl-β-naphthoxazolyl, 2-3-sulfopropyl-β-naphthoxazolyl, 2-3-(3-naphthoxyethyl)benzoxazolyl, 2-3,5-dimethylbenzoxazolyl, 2-6-chloro-3-methylbenzoxazolyl, 2-5-bromo-3-methylbenzoxazolyl, 2-3-ethyl-5-methoxybenzoxazolyl, 2-5-phenyl-3-sulfopropylbenzoxazolyl, 2-5-(4-bromophenyl)-3-sulfobutylbenzoxazolyl, 2-3-dimethyl-5,6-dimethylthiobenzoxazolyl, 2-3-sulfopropyloxazolyl, 2-3-sulfopropyl-γ-naphthoxazolyl, 2-3-ethyl-α-naphthoxazolyl, 2-5-chloro-3-ethyl-α-naphthoxazolyl, 2-5-chloro-3-ethylbenzoxazolyl, 2-5-chloro-3-sulfopropylbenzoxazolyl, 2-5,6-dichloro-3-sulfopropylbenzoxazolyl, 2-5-bromo-3-sulfopropylbenzoxazolyl, 2-3-ethyl-5-phenylbenzoxazolyl, 2-5-(1-pyrrolyl)-3-sulfopropylbenzoxazolyl, 2-5,6-dimethyl-3-sulfopropylbenzoxazolyl, 2-3-ethyl-5-sulfobenzoxazolyl), thiazole nuclei having a C number of 3 to 25 (e.g., 2-3-methylthiazolyl, 2-3-ethylthiazolyl, 2-3-sulfopropylthiazolyl, 2-3-sulfobutylthiazolyl, 2-3,4-dimethylthiazolyl, 2-3,4,4-trimethylthiazolyl, 2-3-carboxyethylthiazolyl, 2-3-methylbenzothiazolyl, 2-3-ethylbenzothiazolyl, 2-3-butylbenzothiazolyl, 2-3-sulfopropylbenzothiazolyl, 2-3-sulfobutylbenzothiazolyl, 2-3-methyl-β-naphthothiazolyl, 2-3-sulfopropyl-γ-naphthothiazolyl, 2-3-(1-naphthoxyethyl)benzothiazolyl, 2-3,5-dimethylbenzothiazolyl, 2-6-chloro-3-methylbenzothiazolyl, 2-6-iodo-3-ethylbenzothiazolyl, 2-5-bromo-3-methylbenzothiazolyl, 2-3-ethyl-5-methoxybenzothiazolyl, 2-5-phenyl-3-sulfopropylbenzothiazolyl, 2-5-(4-bromophenyl)-3-sulfobutylbenzothiazolyl, 2-3-dimethyl-5,6- dimethylthiobenzothiazolyl, 2-5-chloro-3-ethylbenzothiazolyl, 2-5-chloro-3-sulfopropylbenzothiazolyl, 2-3-ethyl-5-iodobenzothiazolyl), imidazole nuclei having a C number of 3 to 25 (e.g., 2-1,3-diethylimidazolyl, 2-1,3-dimethylimidazolyl, 2-1-methylbenzimidazolyl, 2-1,3,4-triethylimidazolyl, 2-1,3-diethylbenzimidazolyl, 2-1,3,5-trimethylbenzimidazolyl, 2-6-chloro-1,3-dimethylbenzimidazolyl, 2-5,6-dichloro-1,3-diethylbenzimidazolyl, 2-1,3-disulfopropyl-5-cyano-6-chlorobenzimidazolyl, 2-5,6-dichloro-3-ethyl-1-sulfopropylbenzimidazolyl, 2-5-chloro-6-cyano-1,3-diethylbenzimidazolyl, 2-5-chloro-1,3-diethyl-6-trifluoromethylbenzimidazolyl), indolenine nuclei having a C number of 10 to 30 (e.g., 3,3-dimethyl-1-pentylindolenine, 3,3-dimethyl-1-sulfopropylindolenine, 5-carboxyl-1,3,3-trimethylindolenine, 5-carbamoyl-1,3,3-trimethylindolenine, 1,3,3-trimethyl-4,5-benzoindolenine), quinoline nuclei having a C number of 9 to 25 (e.g., 2-1-methylquinolyl, 2-1-ethylquinolyl, 2-1-methyl-6-chloroquinolyl, 2-1,3-diethylquinolyl, 2-1-methyl-6-methylthioquinolyl, 2-1-sulfopropylquinolyl, 4-1-methylquinolyl, 4-1-pentylquinolyl, 4-1-sulfoethylquinolyl, 4-1-methyl-7-chloroquinolyl, 4-1,8-diethylquinolyl, 4-1-methyl-6-methylthioquinolyl, 4-1-sulfopropylquinolyl), selenazole nuclei having a C number of 3 to 25 (e.g., 2-3-methylbenzoselenazolyl), pyridine nuclei having a C number of 5 to 25 (e.g., 2-pyridyl), thiazoline nuclei, oxazoline nuclei, selenazoline nuclei, tetrazoline nuclei, tetrazole nuclei, benzotellurazole nuclei, imidazoline nuclei, imidazo[4,5-quinoxaline] nuclei, oxadiazole nuclei, thiadiazole nuclei, tetrazole nuclei and pyrimidine nuclei.

These may be substituted and preferred examples of the substituent include an alkyl group (preferably having a C number of 1 to 20, e.g., methyl, ethyl, n-propyl, isopropyl, n-butyl, n-pentyl, benzyl, 3-sulfopropyl, 4-sulfobutyl, carboxymethyl, 5-carboxypentyl), an alkenyl group (preferably having a C number of 2 to 20, e.g., vinyl, allyl, 2-butenyl, 1,3-butadienyl), a cycloalkyl group (preferably having a C number of 3 to 20, e.g., cyclopentyl, cyclohexyl), an aryl group (preferably having a C number of 6 to 20, e.g., phenyl, 2-chlorophenyl, 4-methoxyphenyl, 3-methylphenyl, 1-naphthyl), a heterocyclic group (preferably having a C number of 1 to 20, e.g., pyridyl, thienyl, furyl, thiazolyl, imidazolyl, pyrazolyl, pyrrolidino, piperidino, morpholino), an alkynyl group (preferably having a C number of 2 to 20, e.g., ethynyl, 2-propynyl, 1,3-butadynyl, 2-phenylethynyl), a halogen atom (e.g., F, Cl, Br, I), an amino group (preferably having a C number of 0 to 20, e.g., amino, dimethylamino, diethylamino, dibutylamino, anilino), a cyano group, a nitro group, a hydroxyl group, a mercapto group, a carboxyl group, a sulfo group, a phosphonic acid group, an acyl group (preferably having a C number of 1 to 20, e.g., acetyl, benzoyl, salicyloyl, pivaloyl), an alkoxy group (preferably having a C number of 1 to 20, e.g., methoxy, butoxy, cyclohexyloxy), an aryloxy group (preferably having a C number of 6 to 26, e.g., phenoxy, 1-naphthoxy), an alkylthio group (preferably having a C number of 1 to 20, e.g., methylthio, ethylthio), an arylthio group (preferably having a C number of 6 to 20, e.g., phenylthio, 4-chlorophenylthio), an alkylsulfonyl group (preferably having a C number of 1 to 20, e.g., methanesulfonyl, butanesulfonyl), an arylsulfonyl group (preferably having a C number of 6 to 20, e.g., benzenesulfonyl, paratoluenesulfonyl), a sulfamoyl group (preferably having a C number of 0 to 20, e.g., sulfamoyl, N-methylsulfamoyl, N-phenylsulfamoyl), a carbamoyl group (preferably having a C number of 1 to 20, e.g., carbamoyl, N-methylcarbamoyl, N,N-dimethylcarbamoyl, N-phenylcarbamoyl), an acylamino group (preferably having a C number of 1 to 20, e.g., acetylamino, benzoylamino), an imino group (preferably having a C number of 2 to 20, e.g., phthalimino), an acyloxy group (preferably having a C number of 1 to 20, e.g., acetyloxy, benzoyloxy), an alkoxycarbonyl group (preferably having a C number of 2 to 20, e.g., methoxycarbonyl, phenoxycarbonyl) and a carbamoylamino group (preferably having a C number of 1 to 20, e.g., carbamoylamino, N-methylcarbamoylamino, N-phenylcarbamoylamino). Among these, more preferred are an alkyl group, an aryl group, a heterocyclic group, a halogen atom, a cyano group, a carboxyl group, a sulfo group, an alkoxy group, a sulfamoyl group, a carbamoyl group and an alkoxycarbonyl group.

These heterocyclic rings each may be further condensed with another ring. Preferred examples of the ring with which the heterocyclic ring is condensed include a benzene ring, a benzofuran ring, a pyridine ring, a pyrrole ring, an indole ring and a thiophene ring.

The 5- or 6-membered nitrogen-containing heterocyclic ring formed by $Za_1$ and $Za_2$ is more preferably an oxazole nucleus, an imidazole nucleus, a thiazole nucleus or an indolenine ring, still more preferably an oxazole nucleus, an imidazole nucleus or an indolenine ring, and most preferably an oxazole nucleus.

$Ra_1$ and $Ra_2$ each independently represent a hydrogen atom, an alkyl group (preferably having a C number of 1 to 20, e.g., methyl, ethyl, n-propyl, isopropyl, n-butyl, n-pentyl, benzyl, 3-sulfopropyl, 4-sulfobutyl, 3-methyl-3-sulfopropyl, 2'-sulfobenzyl, carboxymethyl, 5-carboxypentyl), an alkenyl group (preferably having a C number of 2 to 20, e.g., vinyl, allyl), an aryl group (preferably having a C number of 6 to 20, e.g., phenyl, 2-chlorophenyl, 4-methoxyphenyl, 3-methylphenyl, 1-naphthyl) or a heterocyclic group (preferably having a C number of 1 to 20, e.g., pyridyl, thienyl, furyl, thiazolyl, imidazolyl, pyrazolyl, pyrrolidino, piperidino, morpholino), preferably an alkyl group (preferably an alkyl group having a C number of 1 to 6) or a sulfoalkyl group (preferably 3-sulfopropyl, 4-sulfobutyl, 3-methyl-3-sulfopropyl or 2'-sulfobenzyl).

$Ma_1$ to $Ma_7$ each independently represent a methine group and the methine group may have a substituent (preferred examples of the substituent are the same as examples of the substituent on $Za_1$ and $Za_2$). The substituent is preferably an alkyl group, a halogen atom, a nitro group, an alkoxy group, an aryl group, a nitro group, a heterocyclic group, an aryloxy group, an acylamino group, a carbamoyl group, a sulfo group, a hydroxy group, a carboxy group, an alkylthio group or a cyano group, more preferably an alkyl group.

$Ma_1$ to $Ma_7$ each are preferably an unsubstituted methine group or an alkyl group (preferably having a C number of 1 to 6)-substituted methine group, more preferably an unsubstituted methine group, an ethyl group-substituted methine group or a methyl group-substituted methine group.

$Ma_1$ to $Ma_7$ may combine with each other to form a ring, and preferred examples of the ring formed include a cyclohexene ring, a cyclopentene ring, a benzene ring and a thiophene ring.

$na^1$ and $na^2$ each are 0 or 1, preferably both are 0.

$ka^1$ represents an integer of 0 to 3, preferably 1 to 3, more preferably 1 or 2.

When $ka^1$ is 2 or more, multiple $Ma_3$s or $Ma_4$s may be the same or different.

CI represents an ion for neutralizing the electric charge, and y represents a number necessary for the neutralization of electric charge.

When the two-photon absorbing compound for use in the invention is a merocyanine dye, the merocyanine dye is preferably represented by formula (4).

In formula (4), $Za_3$ represents an atomic group for forming a 5- or 6-membered nitrogen-containing heterocyclic ring (preferred examples are the same as those for $Za_1$ and $Za_2$) and the heterocyclic group may be substituted (preferred examples of the substituent are the same as examples of the substituent on $Za_1$ and $Za_2$) or may be further condensed with another ring.

The 5- or 6-membered nitrogen-containing heterocyclic ring formed by $Za_3$ is more preferably an oxazole nucleus, an imidazole nucleus, a thiazole nucleus or an indolenine nucleus, still more preferably an oxazole nucleus or an indolenine nucleus.

$Za_4$ represents an atomic group for forming a 5- or 6-membered ring. The ring formed by $Za_4$ is a moiety generally called an acidic nucleus and this nucleus is defined in James (compiler), *The Theory of the Photographic Process*, 4th Ed., page 198, Macmillan (1977). The ring formed by $Za_4$ is preferably a nucleus such as 2-pyrazolon-5-one, pyrazolidine-3,5-dione, imidazolin-5-one, hydantoin, 2- or 4-thiohydantoin, 2-iminooxazolidin-4-one, 2-oxazolin-5-one, 2-thioxazoline-2,4-dione, isorhodanine, rhodanine, indane-1,3-dione, thiophen-3-one, thiophen-3-one-1,1-dioxide, indolin-2-one, indolin-3-one, 2-oxoindazolium, 5,7-dioxo-6,7-dihydrothiazolo[3,2-a]pyrimidine, 3,4-dihydroisoquinolin-4-one, 1,3-dioxane-4,6-dione, barbituric acid, 2-thiobarbituric acid, coumarin-2,4-dione, indazolin-2-one, pyrido[1,2-a]pyrimidine-1,3-dione, pyrazolo[1,5-b]quinazolone or pyrazolopyridone.

The ring formed by $Za_4$ is more preferably 2-pyrazolon-5-one, pyrazolidine-3,5-dione, rhodanine, indane-1,3-dione, thiophen-3-one, thiophen-3-one-1,1-dioxide, 1,3-dioxane-4,6-dione, barbituric acid, 2-thiobarbituric acid or coumarin-2,4-dione, still more preferably pyrazolidine-3,5-dione, indane-1,3-dione, 1,3-dioxane-4,6-dione, barbituric acid or 2-thiobarbituric acid, most preferably pyrazolidine-3,5-dione, barbituric acid or 2-thiobarbituric acid.

The ring formed by $Za_4$ may be substituted (preferred examples of the substituent are the same as examples of the substituent on $Za_3$) and the substituent is more preferably an alkyl group, an aryl group, a heterocyclic group, a halogen atom, a cyano group, a carboxyl group, a sulfo group, an alkoxy group, a sulfamoyl group, a carbamoyl group or an alkoxycarbonyl group.

These heterocyclic rings each may be further condensed with another ring. Preferred examples of the ring with which the heterocyclic ring is condensed include a benzene ring, a benzofuran ring, a pyridine ring, a pyrrole ring, an indole ring and a thiophene ring.

$Ra_3$ is a hydrogen atom, an alkyl group, an alkenyl group, an aryl group or a heterocyclic group (preferred examples of these groups are the same as those for $Ra_1$ and $Ra_2$), preferably an alkyl group (more preferably an alkyl group having a C number of 1 to 6) or a sulfoalkyl group (more preferably 3-sulfopropyl, 4-sulfobutyl, 3-methyl-3-sulfopropyl or 2'-sulfobenzyl).

$Ma_8$ to $Ma_{11}$ each represent a methine group and the methine group may have a substituent (preferred examples of the substituent are the same as examples of the substituent on $Za_1$ and $Za_2$). The substituent is preferably an alkyl group, a halogen atom, a nitro group, an alkoxy group, an aryl group, a nitro group, a heterocyclic group, an aryloxy group, an acylamino group, a carbamoyl group, a sulfo group, a hydroxy group, a carboxy group, an alkylthio group or a cyano group, more preferably an alkyl group.

$Ma_8$ to $Ma_{11}$ each are preferably an unsubstituted methine group or an alkyl group (preferably having a C number of 1 to 6)-substituted methine group, more preferably an unsubstituted methine group, an ethyl group-substituted methine group or a methyl group-substituted methine group.

$Ma_8$ to $Ma_{11}$ may combine with each other to form a ring and preferred examples of the ring formed include a cyclohexene ring, a cyclopentene ring, a benzene ring and a thiophene ring.

$na^3$ is 0 or 1, preferably 0.

$ka^2$ represents an integer of 0 to 8, preferably 0 to 4, more preferably 1 to 3.

When $ka^2$ is 2 or more, multiple $Ma_{10}$s or $Ma_{11}$s may be the same or different.

CI represents an ion for neutralizing the electric charge, and y represents a number necessary for the neutralization of electric charge.

When the two-photon absorbing compound for use in the invention is an oxonole dye, it is preferably represented by formula (5).

In formula (5), $Za_5$ and $Za_6$ each represent an atomic group for forming a 5- or 6-membered ring (preferred examples are the same as those for $Za_4$) and the heterocyclic ring may be substituted (preferred examples of the substituent are the same as examples of the substituent on $Za_4$) or may be further condensed with another ring.

The ring formed by $Za_5$ and $Za_6$ is preferably 2-pyrazolon-5-one, pyrazolidine-3,5-dione, rhodanine, indane-1,3-dione, thiophen-3-one, thiophen-3-one-1,1-dioxide, 1,3-dioxane-4,6-dione, barbituric acid, 2-thiobarbituric acid or coumarin-2,4-dione, more preferably barbituric acid or 2-thiobarbituric acid, and most preferably barbituric acid.

$Ma_{12}$ to $Ma_{14}$ each represent a methine group, and the methine group may have a substituent (preferred examples of the substituent are the same as examples of the substituent on $Za_5$ and $Za_6$). The substituent is preferably an alkyl group, a halogen atom, a nitro group, an alkoxy group, an aryl group, a nitro group, a heterocyclic group, an aryloxy group, an acylamino group, a carbamoyl group, a sulfo group, a hydroxy group, a carboxy group, an alkylthio group or a cyano group, more preferably an alkyl group, a halogen atom, an alkoxy group, an aryl group, a heterocyclic group, a carbamoyl group or a carboxy group, still more preferably an alkyl group, an aryl group or a heterocyclic group.

$Ma_{12}$ to $Ma_{14}$ each are preferably an unsubstituted methine group.

$Ma_{12}$ to $Ma_{14}$ may combine with each other to form a ring and preferred examples of the ring formed include a cyclohexene ring, a cyclopentene ring, a benzene ring and a thiophene ring.

$ka^3$ represents an integer of 0 to 3, preferably 0 to 2, more preferably 1 or 2.

When $ka^3$ is 2 or more, multiple $Ma_{12}$s or $Ma_{13}$s may be the same or different.

CI represents an ion for neutralizing the electric charge, and y represents a number necessary for the neutralization of electric charge.

The compound for use in the invention is also preferably represented by formula (1).

In formula (1), $R^1$, $R^2$, $R^3$ and $R^4$ each independently represent a hydrogen atom or a substituent and the substituent is preferably an alkyl group (preferably having a C number of 1 to 20, e.g., methyl, ethyl, n-propyl, isopropyl, n-butyl, n-pentyl, benzyl, 3-sulfopropyl, 4-sulfobutyl, 3-methyl-3-sulfopropyl, 2'-sulfobenzyl, carboxymethyl, 5-carboxypentyl), an alkenyl group (preferably having a C number of 2 to 20, e.g., vinyl, allyl), a cycloalkyl group (preferably having a C number of 3 to 20, e.g., cyclopentyl, cyclohexyl), an aryl group (preferably having a C number of 6 to 20, e.g., phenyl, 2-chlorophenyl, 4-methoxyphenyl, 3-methylphenyl, 1-naphthyl) or a heterocyclic group (preferably having a C number of 1 to 20, e.g., pyridyl, thienyl, furyl, thiazolyl, imidazolyl, pyrazolyl, pyrrolidino, piperidino, morpholino).

$R^1$, $R^2$, $R^3$ and $R^4$ each are preferably a hydrogen atom or an alkyl group. Some (preferably two) of $R^1$, $R^2$, $R^3$ and $R^4$ may combine with each other to form a ring. In particular, $R^1$ and $R^3$ preferably combine to form a ring and at this time, the ring formed together with the carbon atom of carbonyl is preferably a 6-, 5- or 4-membered ring, more preferably a 5- or 4-membered ring, and most preferably a 5-membered ring.

In formula (1), n and m each independently represent an integer of 0 to 4, preferably 1 to 4, but n and m are not 0 at the same time.

When n and m each are 2 or more, multiple $R^1$s, $R^2$s, $R^3$s or $R^4$s may be the same or different.

$X^1$ and $X^2$ each independently represent an aryl group [preferably having a C number of 6 to 20 and preferably a substituted aryl group (for example, a substituted phenyl group or a substituted naphthyl group and preferred examples of the substituent are the same as the substituents for $Ma_1$ to $Ma_7$), more preferably an aryl group substituted by an alkyl group, an aryl group, a heterocyclic group, a halogen atom, an amino group, a hydroxyl group, an alkoxy group, an aryloxy group or an acylamino group, still more preferably an aryl group substituted by an alkyl group, an amino group, a hydroxyl group, an alkoxy group or an acylamino group, and most preferably a phenyl group substituted by a dialkylamino group or a diarylamino group at the 4-position; at this time, multiple substituents may combine to form a ring and preferred examples of the ring formed include a julolidine ring], a heterocyclic group (preferably having a C number of 1 to 20 and preferably a 3- to 8-membered ring, more preferably a 5- or 6-membered ring, for example, pyridyl, thienyl, furyl, thiazolyl, imidazolyl, pyrazolyl, pyrrolyl, indolyl, carbazolyl, phenathiazino, pyrrolidino, piperidino or morpholino with indolyl, carbazolyl, pyrrolyl and phenathiazino being preferred; the heterocyclic ring may be substituted and preferred examples of the substituent are the same as those described above for the aryl group), or a group represented by formula (2).

In formula (2), $R^5$ represents a hydrogen atom or a substituent (preferred examples are the same as those for $R^1$ to $R^4$), preferably a hydrogen atom or an alkyl group, more preferably a hydrogen atom.

$R^6$ represents a hydrogen atom, an alkyl group, an alkenyl group, an aryl group or a heterocyclic group (preferred examples of the substituent for these groups are the same as those for $R^1$ to $R^4$), preferably an alkyl group (preferably an alkyl group having a C number of 1 to 6).

$Z^1$ represents an atomic group for forming a 5- or 6-membered ring.

The heterocyclic ring formed is preferably an indolenine ring, an azaindolenine ring, a pyrazoline ring, a benzothiazole ring, a thiazole ring, a thiazoline ring, a benzoxazole ring, an oxazole ring, an oxazoline ring, a benzimidazole ring, an imidazole ring, a thiadiazole ring, a quinoline ring or a pyridine ring, more preferably an indolenine ring, an azaindolenine ring, a pyrazoline ring, a benzothiazole ring, a thiazole ring, a thiazoline ring, a benzoxazole ring, an oxazole ring, an oxazoline ring, a benzimidazole ring, a thiadiazole ring or a quinoline ring, and most preferably an indolenine ring, an azaindolenine ring, a benzothiazole ring, a benzoxazole ring or a benzimidazole ring.

The heterocyclic ring formed by $Z^1$ may have a substituent (preferred examples of the substituent are the same as examples of the substituent on $Za_1$ and $Za_2$) and the substituent is more preferably an alkyl group, an aryl group, a heterocyclic group, a halogen atom, a carboxyl group, a sulfo group, an alkoxy group, a carbamoyl group or an alkoxycarbonyl group.

$X^1$ and $X^2$ each are preferably an aryl group or a group represented by formula (2), more preferably an aryl group substituted by a dialkylamino group or a diarylamino group at the 4-position, or a group represented by formula (2).

The two-photon absorbing compound for use in the invention preferably contains a hydrogen bonding group in the molecule. The hydrogen bonding group as used herein means a group of donating or accepting hydrogen in the hydrogen bonding, and a group having both properties of donating and accepting hydrogen is preferred.

The compound having a hydrogen bonding group for use in the invention preferably exhibits an aggregating interaction in the solution or solid state by causing interaction between hydrogen bonding groups with each other. The interaction may be intramolecular interaction or intermolecular interaction but is preferably intermolecular interaction.

The hydrogen bonding group for use in the invention is preferably —COOH, —CONHR$^{11}$, —SO$_3$H, —SO$_2$NHR$^{12}$, —P(O)(OH)OR$^{13}$, —OH, —SH, —NHR$^{14}$, —NHCOR$^{15}$ or —NR$^{16}$C(O)NHR$^{17}$, wherein $R^{11}$ and $R^{12}$ each independently represent a hydrogen atom, an alkyl group (preferably having a carbon number (hereinafter referred to as "a C number") of 1 to 20, e.g., methyl, ethyl, n-propyl, isopropyl, n-butyl, n-pentyl, benzyl, 3-sulfopropyl, 4-sulfobutyl, carboxymethyl, 5-carboxypentyl), an alkenyl group (preferably having a C number of 2 to 20, e.g., vinyl, allyl), an aryl group (preferably having a C number of 6 to 20, e.g., phenyl, 2-chlorophenyl, 4-methoxyphenyl, 3-methylphenyl, 1-naphthyl), a heterocyclic group (preferably having a C number of 1 to 20, e.g., pyridyl, thienyl, furyl, thiazolyl, imidazolyl, pyrazolyl, pyrrolidino, piperidino, morpholino), —COR$^{18}$ or —SO$_2$R$^{19}$, and $R^{13}$ to $R^{19}$ each independently represent a hydrogen atom, an alkyl group, an alkenyl group, an aryl group or a heterocyclic group (preferred examples of these groups are the same as those for $R^{11}$ and $R^{12}$).

$R^{11}$ is preferably a hydrogen atom, an alkyl group, an aryl group, —COR$^{18}$ group or —SO$_2$R$^{19}$ group and at this time, $R^{18}$ and $R^{19}$ each are preferably an alkyl group or an aryl group.

$R^{11}$ is more preferably a hydrogen atom, an alkyl group or —SO$_2$R$^{19}$ group, and most preferably a hydrogen atom.

$R^{12}$ is preferably a hydrogen atom, an alkyl group, an aryl group, —COR$^{18}$ group or —SO$_2$R$^{19}$ group and at this time, $R^{18}$ and $R^{19}$ each are preferably an alkyl group or an aryl group.

$R^{12}$ is more preferably a hydrogen atom, an alkyl group or —COR$^{18}$ group, and most preferably a hydrogen atom.

$R^{13}$ is preferably a hydrogen atom, an alkyl group or an aryl group, more preferably a hydrogen atom.

$R^{14}$ is preferably a hydrogen atom, an alkyl group or an aryl group.

$R^{15}$ is preferably an alkyl group or an aryl group.

$R^{16}$ is preferably a hydrogen atom, and $R^{17}$ is preferably a hydrogen atom, an alkyl group or an aryl group.

The hydrogen bonding group is more preferably —COOH, —CONHR$^{11}$, —SO$_2$NHR$^{12}$, —NHCOR$^{15}$ or —NR$^{16}$C(O) NHR$^{17}$, still more preferably —COOH, —CONHR$^{11}$ or —SO$_2$NHR$^{12}$, and most preferably —COOH or —CONH$_2$.

The two-photon absorbing compound for use in the invention may be used in the monomer state or in the aggregated state.

Incidentally, the state where dye chromophores are fixed with each other to give a specific spatial disposition by a bonding force such as covalent bonding, coordinate bonding or various intermolecular forces (e.g., hydrogen bonding, van der Waals force, Coulomb force) is generally called an associated (or aggregated) state.

The two-photon absorbing compound for use in the invention may be used in the intermolecular aggregated state or in a state where two or more chromophores of undergoing two-photon absorption are present in the molecule and these undergo two-photon absorption in the intramolecular aggregated state.

For reference, the aggregate is described below. The aggregate is described in detail, for example, in James (compiler), *The Theory of the Photographic Process*, 4th ed., Chap. 8, pp. 218-222, Macmillan (1977), and Takayoshi Kobayashi, *J-Aggregates*, World Scientific Publishing Co. Pte. Ltd. (1996).

The monomer means a one-molecule form. From the standpoint of absorption wavelength thereof, an aggregate where the absorption shifts to the shorter wavelength side with respect to the monomer absorption is called an H-aggregate (a two-molecule form is specially called a dimer), and an aggregate where the absorption shifts to the longer wavelength side is called a J-aggregate.

From the standpoint of structure of the aggregate, in the case of a brickwork aggregate, an aggregate having a small shear angle is called a J-aggregate and an aggregate having a large shear angle is called an H-aggregate. The brickwork aggregate is described in detail in *Chemical Physics Letters*, Vol. 6, page 183 (1970). As an aggregate having a structure similar to the brickwork aggregate, an aggregate having a ladder or staircase structure is known. The aggregate having a ladder or staircase structure is described in detail in *Zeitschrift fur Physikalische Chemie*, Vol. 49, page 324 (1941).

Also, as an aggregate of forming a structure other than the brickwork structure, an aggregate taking a herringbone structure is known (this aggregate can be called a herringbone aggregate).

The herringbone aggregate is described in Charles Reich, *Photographic Science and Engineering*, Vol. 18, No. 3, page 335 (1974). The herringbone aggregate has two absorption maximums attributable to the aggregate.

As described above, whether the dye takes an aggregated state can be confirmed by the change in the absorption (absorption $\lambda$max, $\epsilon$, absorption profile) from the monomer state.

The compound for use in the invention may be shifted to shorter wavelength side (H-aggregate), longer wavelength side (J-aggregate) or both sides, but preferably forms a J-aggregate.

The intermolecular aggregated state of a compound can be formed by various methods.

For example, in the case of a solution system, a method of dissolving the compound in an aqueous solution having added thereto a matrix such as gelatin (for example, an aqueous 0.5 wt % gelatin/$10^{-4}$ M compound solution) or in an aqueous solution having added thereto a salt such as KCl (for example, an aqueous 5% KCl/$2\times10^{-3}$ M compound solution), or a method of dissolving the compound in a good solvent and then adding thereto a bad solvent (for example, DMF-water system or chloroform-toluene system) may be used.

In the case of a film system, methods such as polymer dispersion system, amorphous system, crystal system and LB film system may be used.

Furthermore, the intermolecular aggregated state may also be formed by the adsorption, chemical bonding or self-organization to a bulk or fine particulate (from μm to nm size) semiconductor (for example, silver halide or titanium oxide) or to a bulk or fine particulate metal (for example, gold, silver or platinum). The spectral sensitization by the J-aggregation adsorption of cyanine dye on a silver halide crystal, which is performed in the field of silver salt color photography, utilizes this technique.

As for the number of compounds participating in the intermolecular aggregation, two compounds may be used or a very large number of compounds may be used.

Specific preferred examples of the two-photon absorbing compound for use in the invention are set forth below, however, the invention is not limited thereto.

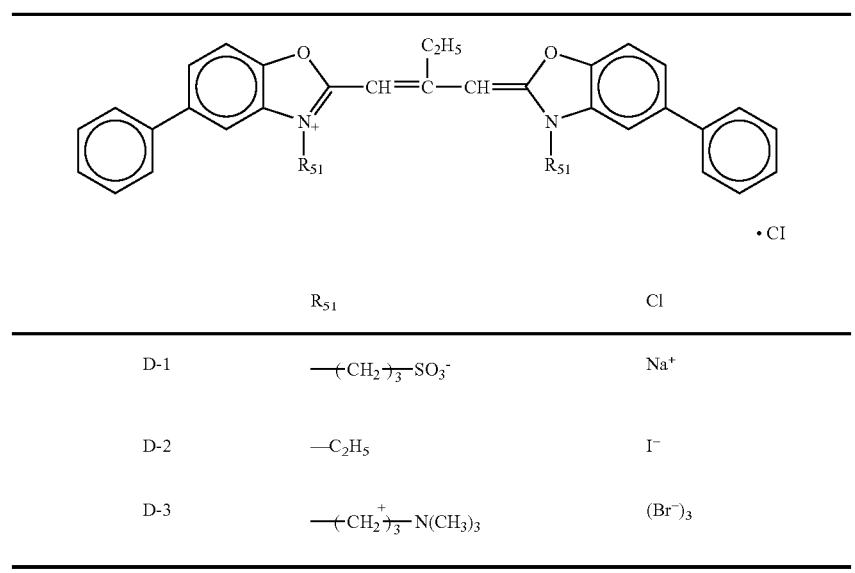

| | $R_{51}$ | Cl |
|---|---|---|
| D-1 | $-(CH_2)_{\overline{3}}-SO_3^-$ | $Na^+$ |
| D-2 | $-C_2H_5$ | $I^-$ |
| D-3 | $-(CH_2)_{\overline{3}}-\overset{+}{N}(CH_3)_3$ | $(Br^-)_3$ |

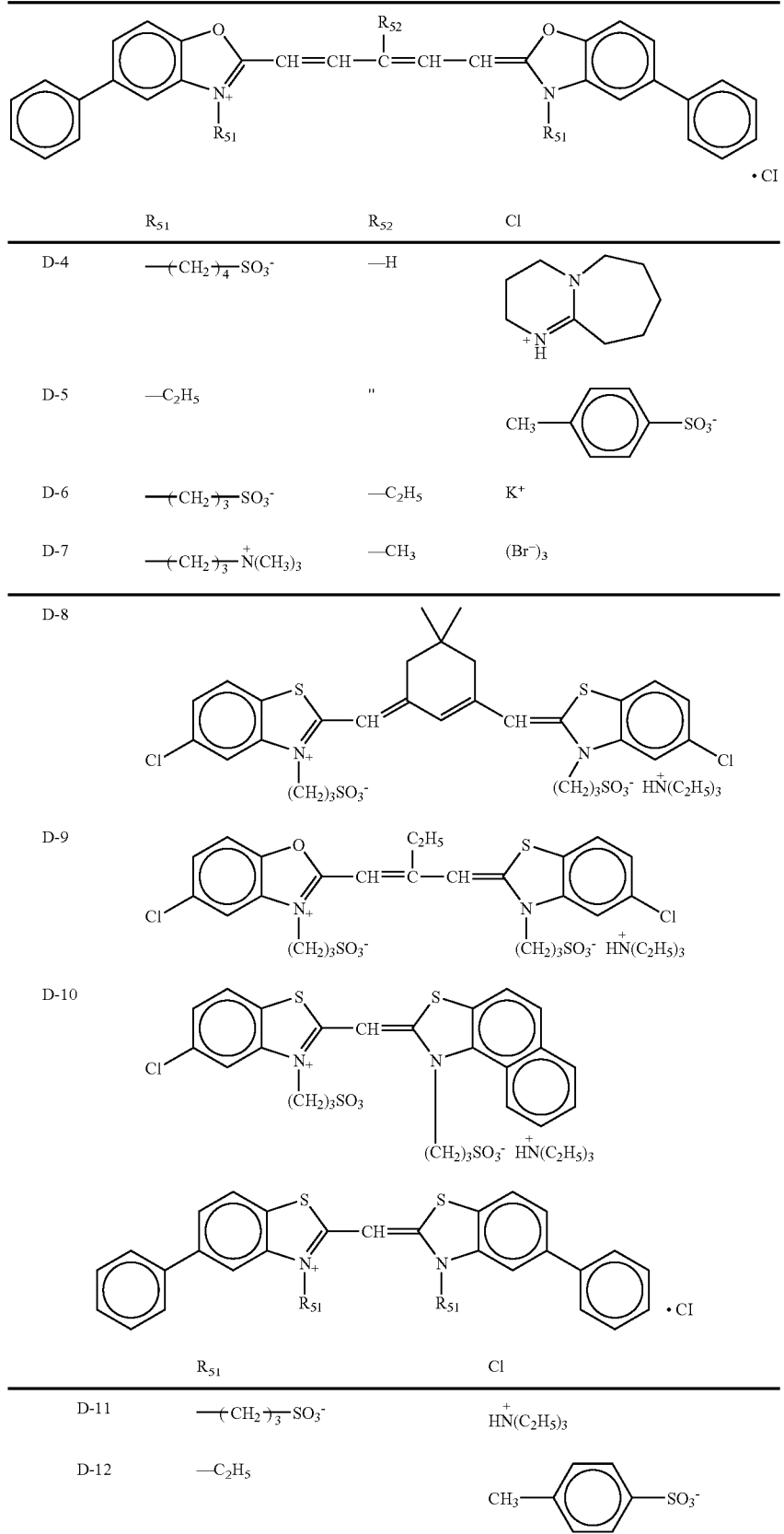

-continued
| | | | | |
|---|---|---|---|---|
| D-13 | $-(CH_2)_4-NH-C(=\overset{+}{N}H_2)NH_2$ | | $(Br^-)_3$ | |
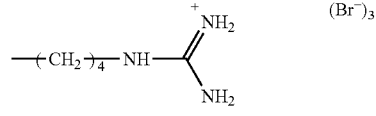
| | $R_{51}$ | $R_{53}$ | $n_{51}$ | Cl |
|---|---|---|---|---|
| D-14 | $-(CH_2)_3-SO_3^-$ | —Cl | 1 | $Na^+$ |
| D-15 | $-C_2H_5$ | " | 1 | $I^-$ |
| D-16 | $-(CH_2)_4-SO_3^-$ | $-CF_3$ | " | $K^+$ |
| D-17 | " | —CN | " | $H\overset{+}{N}(C_2H_5)_3$ |
| D-18 | " | —Cl | 2 | 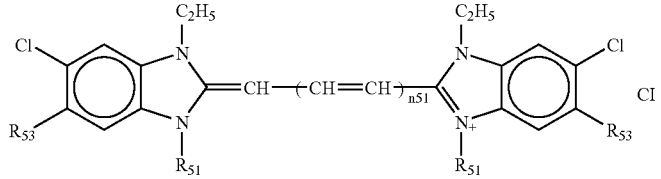 |
| D-19 | $-(CH_2)_3-SO_3^-$ | —CN | " | " |
| D-20 | $-C_2H_5$ | " | " | 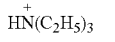 |
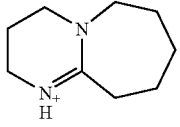
| | $R_{51}$ | $R_{54}$ | $n_{51}$ | Cl |
|---|---|---|---|---|
| D-21 | $-(CH_2)_3-SO_3^-$ | —H | 1 |  |
| D-22 | $-C_4H_9$ | —COOH | " | 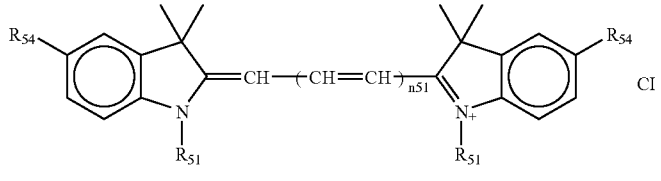 |
| D-23 | $-CH_3$ | —H | 2 | $I^-$ |
| D-24 | $-(CH_2)_3-SO_3^-$ | —COOH | " | $Na^+$ |
| D-25 | $-(CH_2)_4-SO_3^-$ | —H | 3 | $K^+$ |
| D-26 | $-(CH_2)_3-SO_3^-$ | —COOH | " | " |
| D-27 | $-CH_3$ | $-CONH_2$ | " |  |

-continued

D-28
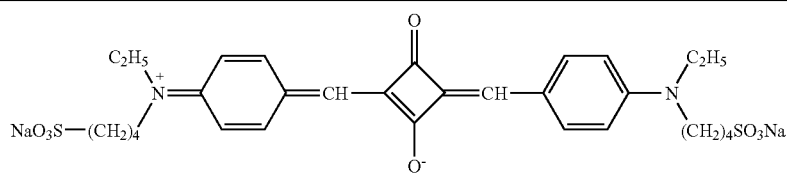

D-29
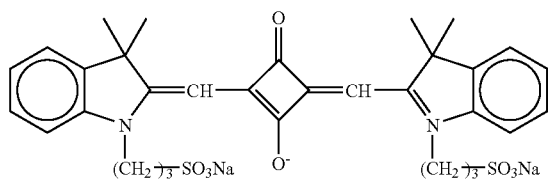

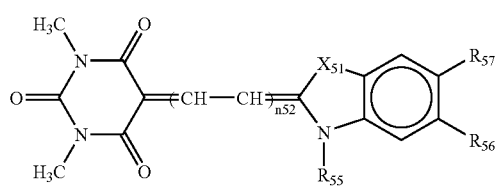

| | $R_{55}$ | $R_{56}$ | $R_{57}$ | $X_{51}$ | $n_{52}$ |
|---|---|---|---|---|---|
| D-30 | —(CH$_2$)$_3$—SO$_3^-$ $^+$HN(C$_2$H$_5$)$_3$ | —Cl | —H | —O— | 1 |
| D-31 | —C$_2$H$_5$ | —H | —COOH | " | 2 |
| D-32 | —(CH$_2$)$_3$—$^+$N(CH$_3$)$_3$ Br$^-$ | —C$_6$H$_5$ | —H | " | " |
| D-33 | —(CH$_2$)$_4$—SO$_3^-$ $^+$HN(C$_2$H$_5$)$_3$ | —CH$_3$ | —CH$_3$ | —S— | " |
| D-34 | —(CH$_2$)$_3$—SO$_3^-$ $^+$HN(C$_2$H$_5$)$_3$ | —H | —H | —C(CH$_3$)$_2$— | " |
| D-35 | —CH$_3$ | " | " | " | " |
| D-36 | —(CH$_2$)$_3$—SO$_3$Na | " | —COOH | " | " |
| D-37 | —CH$_3$ | " | —CONH$_2$ | " | " |
| D-38 | —(CH$_2$)$_3$—SO$_3^-$ $^+$HN(C$_2$H$_5$)$_3$ | " | —H | " | 3 |

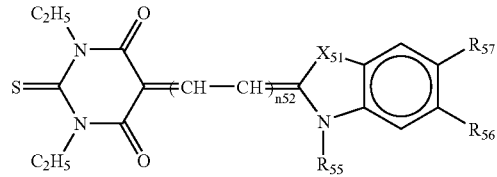

| | $R_{55}$ | $R_{56}$ | $R_{57}$ | $X_{51}$ | $n_{52}$ |
|---|---|---|---|---|---|
| D-39 | —(CH$_2$)$_3$—SO$_3^-$ $^+$HN(C$_2$H$_5$)$_3$ | —Cl | —H | —S— | 1 |
| D-40 | —C$_2$H$_5$ | —H | —CONH$_2$ | —O— | 2 |
| D-41 | —(CH$_2$)$_4$—SO$_3^-$ $^+$HN(C$_2$H$_5$)$_3$ | —CH$_3$ | —CH$_3$ | —S— | " |
| D-42 | —(CH$_2$)$_3$—SO$_3^-$ $^+$HN(C$_2$H$_5$)$_3$ | —H | —H | —C(CH$_3$)$_2$— | " |

-continued
| | | | | | |
|---|---|---|---|---|---|
| D-43 | ─(CH₂)₃─SO₃Na | " | ─COOH | " | " |
| D-44 | ─CH₃ | " | ─CONH₂ | " | " |
| D-45 | " | " | " | " | 3 |
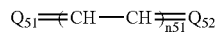
| | $Q_{51}$ | $Q_{52}$ | $n_{51}$ |
|---|---|---|---|
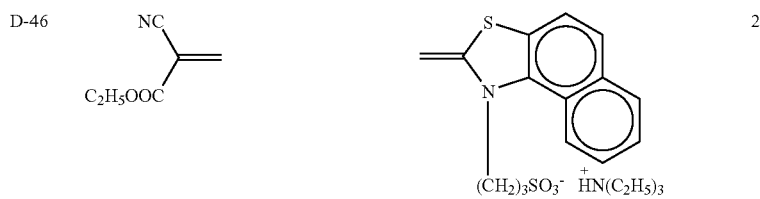
D-46 · · · 2
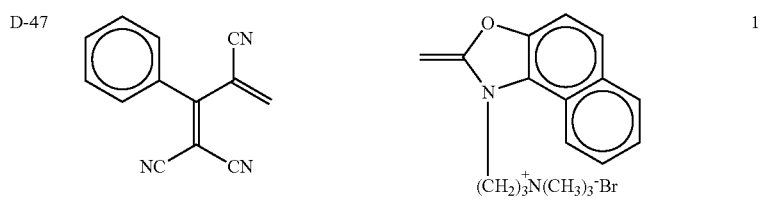
D-47 · · · 1
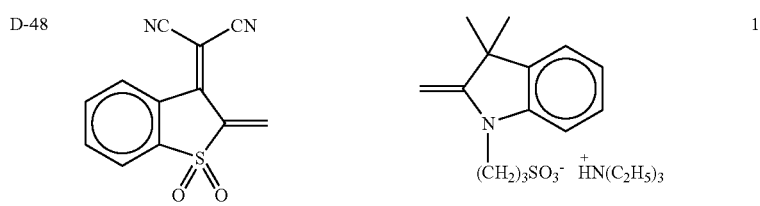
D-48 · · · 1
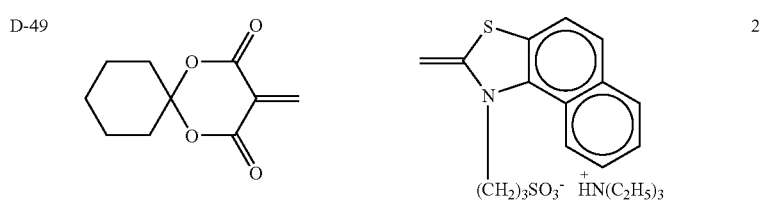
D-49 · · · 2
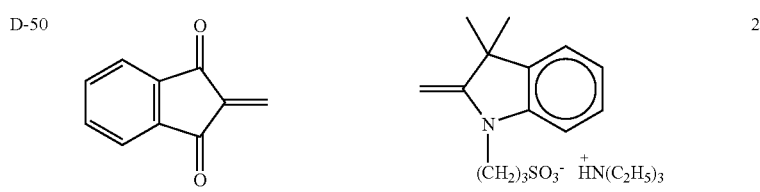
D-50 · · · 2
D-51 · " · 2

-continued
| | | | |
|---|---|---|---|
| D-52 | 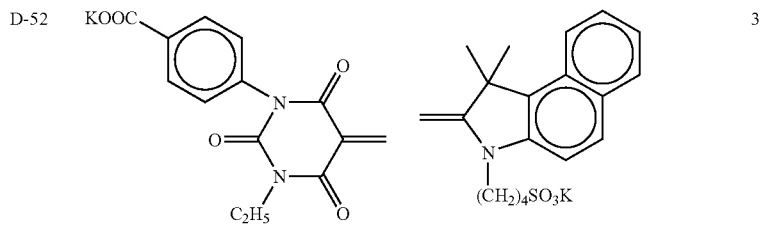 | | 3 |
| D-53 | 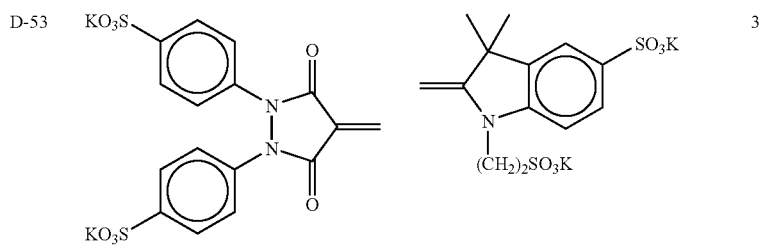 | | 3 |
| D-54 | 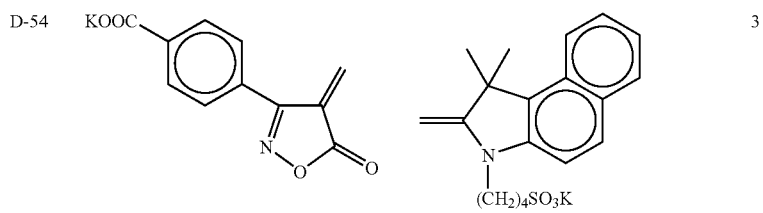 | | 3 |
| D-55 | 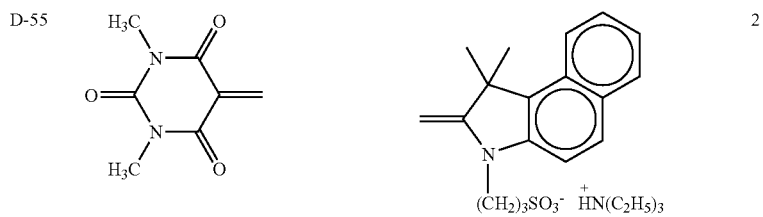 | | 2 |
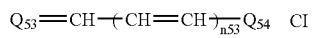
| | $Q_{53}$ | $Q_{54}$ | $n_{53}$ | Cl |
|---|---|---|---|---|
| D-56 | | | 2 | H⁺ |
| D-57 | | | 1 | |
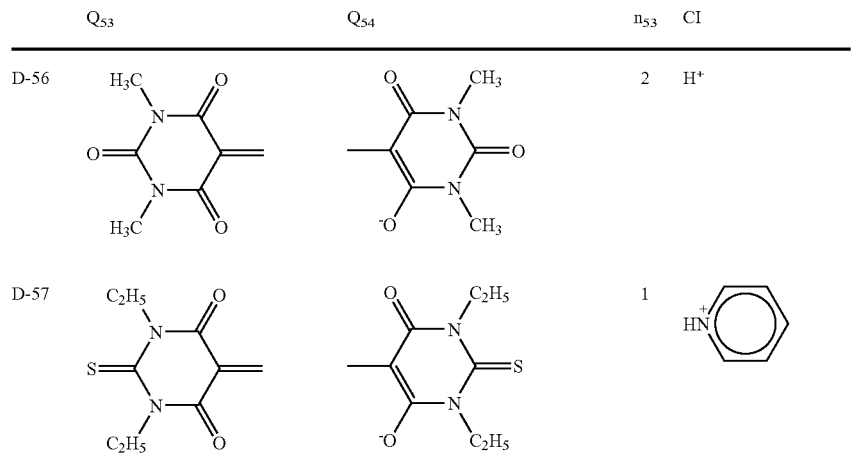

-continued
D-58 " " 2 $\overset{+}{H}N(C_2H_5)_3$
D-59 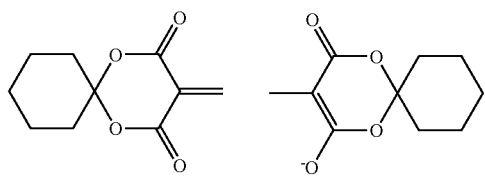 2 $H^+$
D-60 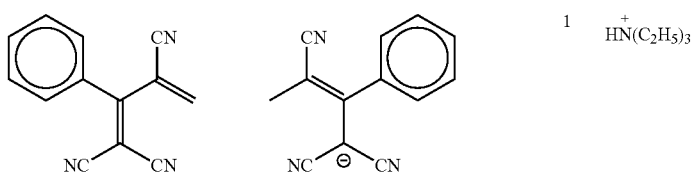 1 $\overset{+}{H}N(C_2H_5)_3$
D-61 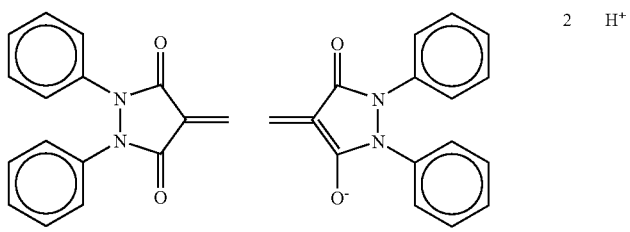 2 $H^+$
D-62 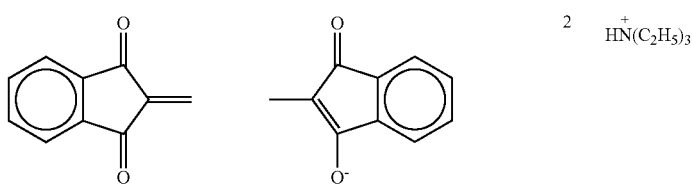 2 $\overset{+}{H}N(C_2H_5)_3$
D-63 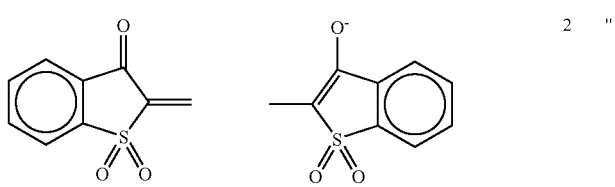 2 "

-continued
D-64 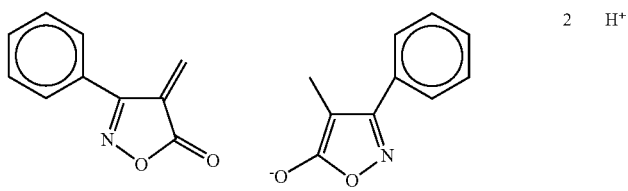
D-65 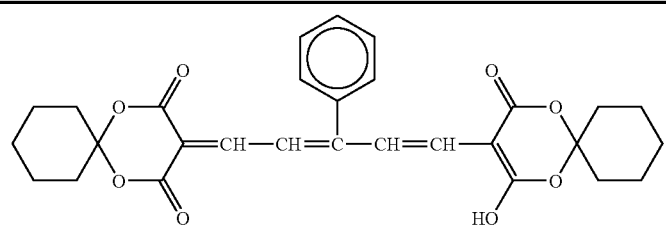
D-66 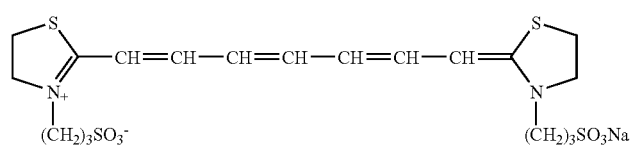
D-67 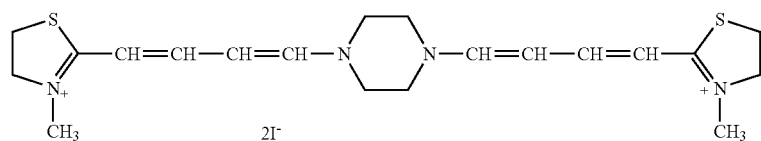
D-68 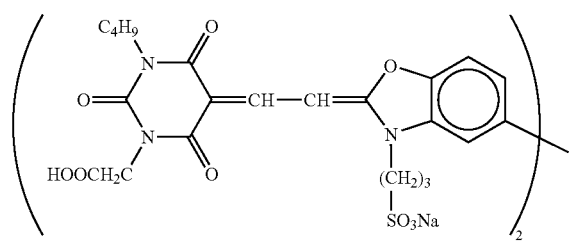
D-69 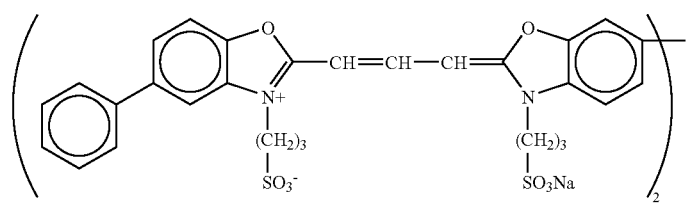
D-70 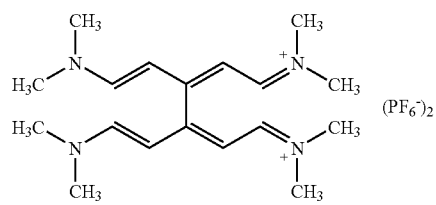
D-71 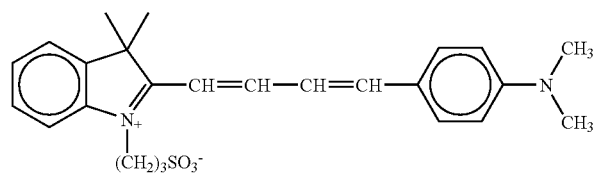

-continued
D-72
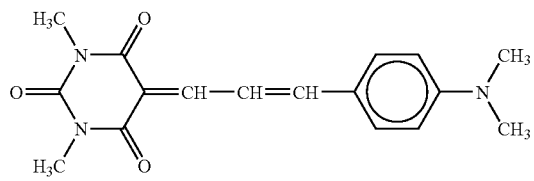
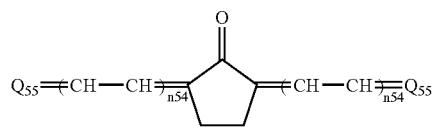
| Q₅₅ | n₅₄ |
|---|---|
| D-73 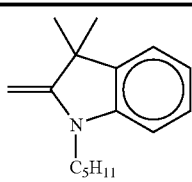 | 2 |
| D-74 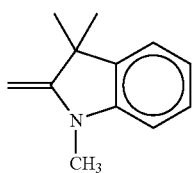 | 1 |
| D-75 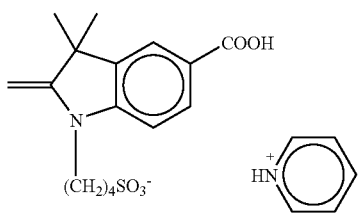 | 1 |
| D-76 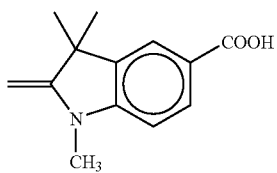 | 2 |
| D-77 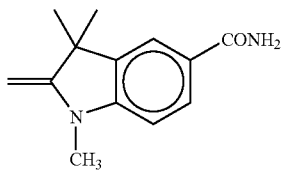 | 2 |
| D-78 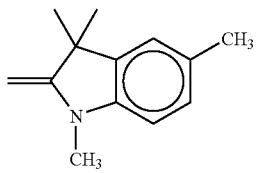 | 2 |

-continued
| | | |
|---|---|---|
| D-79 | 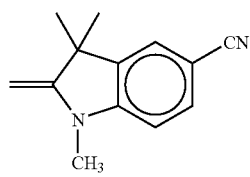 | 2 |
| D-80 | 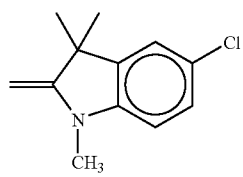 | 2 |
| D-81 | 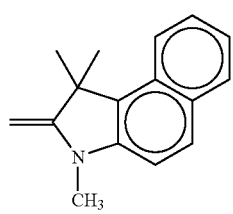 | 2 |
| D-82 | 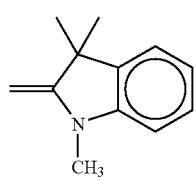 | 2 |
| D-83 | 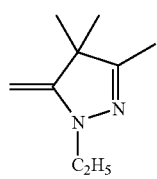 | 2 |
| D-84 | 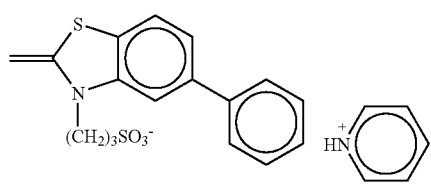 | 1 |
| D-85 | 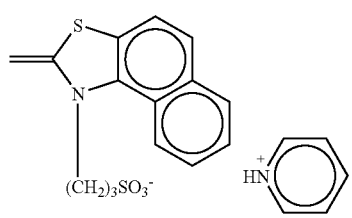 | 1 |
| D-86 | 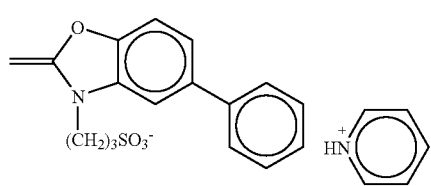 | 1 |

-continued

D-87 [structure: 2-methylene-3-(3-trimethylammoniopropyl)-5-phenylbenzoxazoline bromide] 1

D-88 [structure: 1-ethyl-2-methylene-1,2-dihydroquinoline] 1

D-89 [structure: 1-pentyl-4-methylene-1,4-dihydroquinoline] 1

[structure: bis-indoline pentamethine ketone with $(CH_2)_{n55}$ bridge, carboxamide substituents, N-methyl groups]

| | $n_{55}$ |
|---|---|
| D-90 | 0 |
| D-91 | 1 |
| D-92 | 3 |

[structure: bis(4-aminophenyl) cyclopentanone polymethine with $R_{58}$, $R_{59}$ on nitrogens, $n_{56}$ CH=CH units]

| | $R_{58}$ | $R_{59}$ | $n_{56}$ |
|---|---|---|---|
| D-93 | —$C_2H_5$ | —$C_2H_5$ | 0 |
| D-94 | —$CH_3$ | —$CH_3$ | 1 |
| D-95 | " | —$(CH_2)_3$—$SO_3Na$ | 4 |
| D-96 | " | —$CH_3$ | 2 |

-continued
| | | | |
|---|---|---|---|
| D-97 | " | —COOH | " |
| D-98 | " | —CH₃ | 3 |
| D-93 | 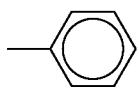 | 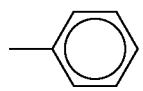 | 2 |
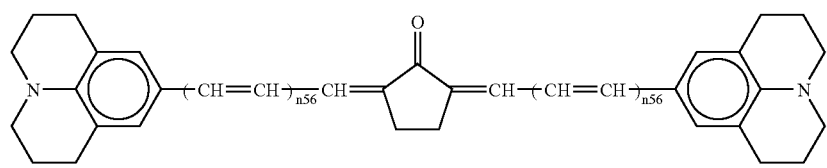
| | $n_{56}$ |
|---|---|
| D-100 | 1 |
| D-101 | 2 |
| D-102 | 3 |
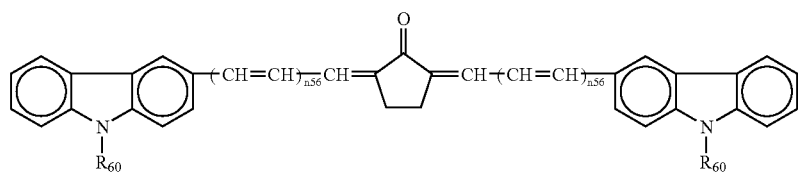
| | $R_{60}$ | $n_{56}$ |
|---|---|---|
| D-103 | —C₂H₅ | 0 |
| D-104 | " | 1 |
| D-105 | " | 2 |

-continued

| | | |
|---|---|---|
| D-106 | —CH₂COOH | " |
| D-107 | —(CH₂)₃—SO₃Na | " |

$$\text{phenothiazine-}(CH=CH)_{n56}CH=\underset{O}{\underset{\|}{C}}\text{(cyclopentanone)}=CH-(CH=CH)_{n56}\text{-phenothiazine}$$

$n_{56}$

| | $n_{56}$ |
|---|---|
| D-108 | 1 |
| D-109 | 2 |

$$Q_{56}=\text{(cycloheptadienone)}=Q_{56}$$

$Q_{56}$

| | |
|---|---|
| D-110 | =CH—CH=CH—C₆H₄—N(CH₃)₂ |
| D-111 | =CH—CH=CH—CH=(3,3-dimethylindoline, N-C₅H₁₁) |

D-112: benzothiazolium (N⁺-C₂H₅)—CH=CH—julolidine, I⁻

D-113: 5-chlorobenzoxazolium (N⁺-C₂H₅)—CH=CH—CH=CH—CH=CH—C₆H₄—N(CH₃)₂, CH₃-C₆H₄-SO₃⁻

D-114: 1,2-diphenylpyrazolidine-3,5-dione=CH—CH=CH—C₆H₃(CH₃)—N(CH₃)₂

D-115
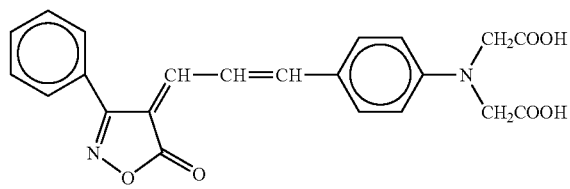
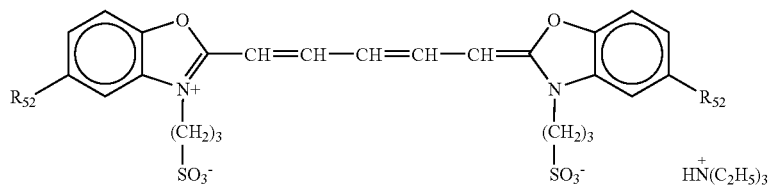
R₅₂
| | |
|---|---|
| D-116 | —F |
| D-117 | —Cl |
| D-118 | —Br |
| D-119 | —I |
| D-120 | H |
| D-121 | 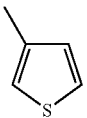 |
| D-122 | 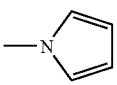 |
D-123 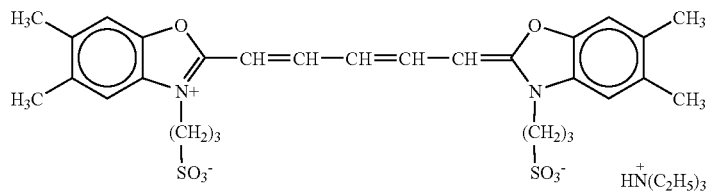
D-124 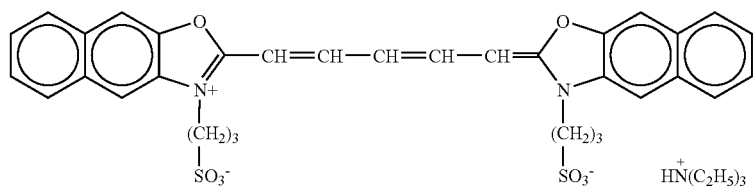
D-125 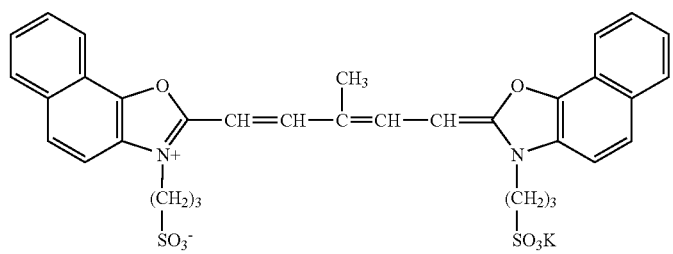

-continued
D-126 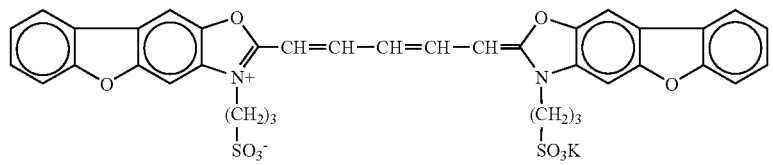
D-127 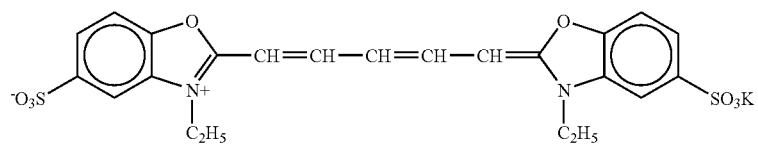
D-128 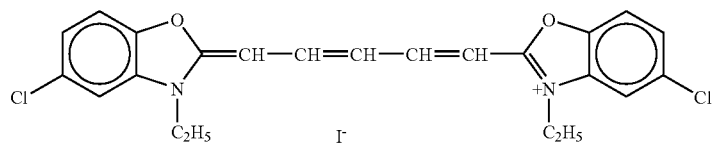
D-129 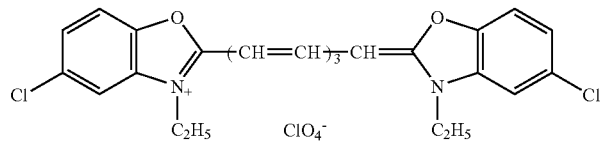
D-130 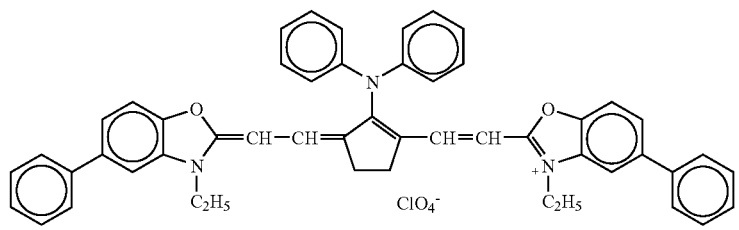
D-131 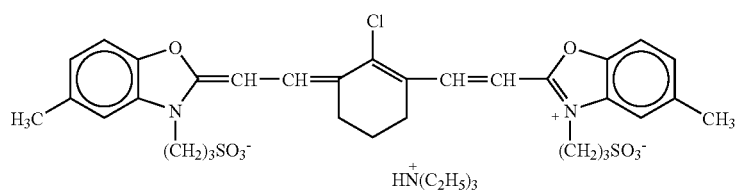
D-132 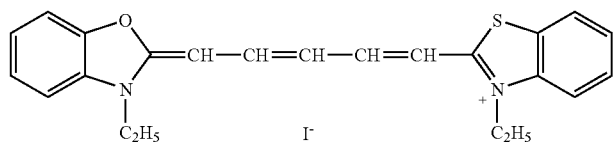

-continued
D-133 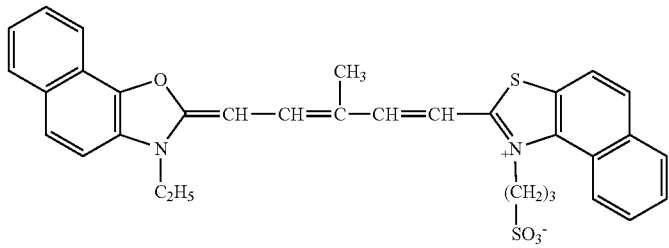
D-134 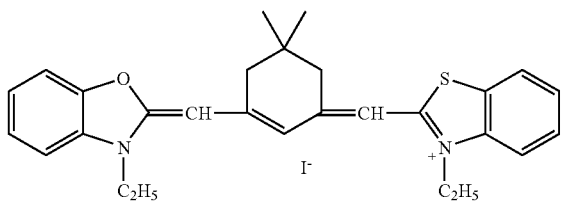
D-135 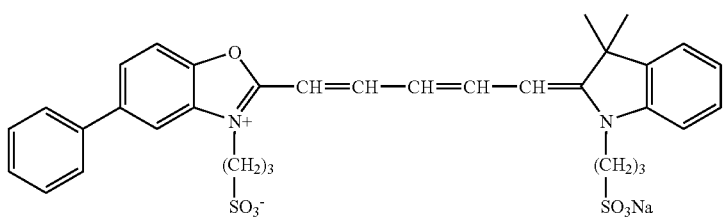
D-136 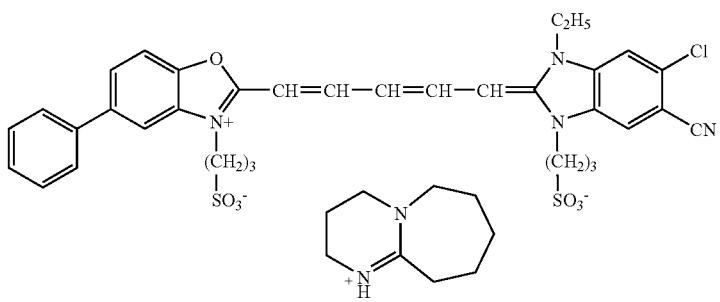
D-137 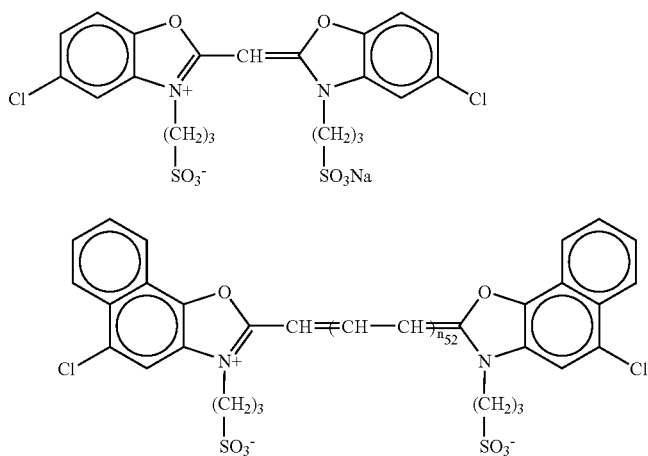
| | n52 |
|---|---|
| D-138 | 1 |
| D-139 | 2 |

-continued
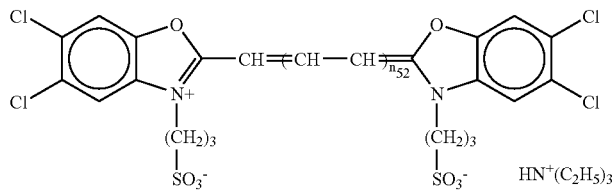
| | n52 |
|---|---|
| D-140 | 1 |
| D-141 | 2 |
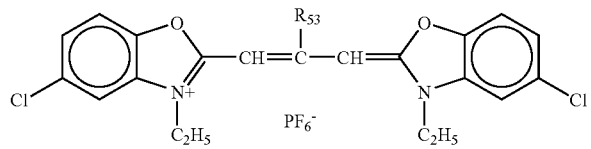
| | R53 |
|---|---|
| D-142 | —H |
| D-143 | —C$_2$H$_5$ |
D-144
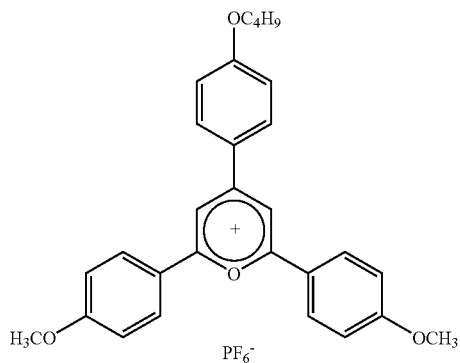
D-145
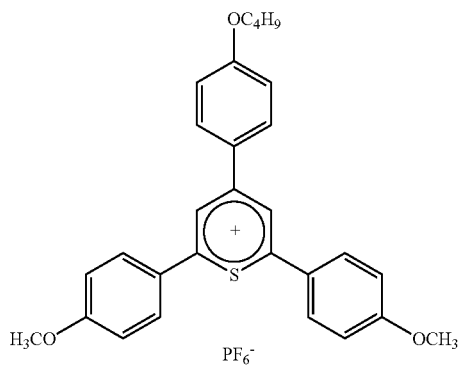
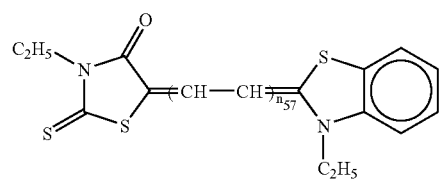
| | n57 |
|---|---|
| D-146 | 0 |
| D-147 | 1 |
| D-148 | 2 |

-continued
D-149 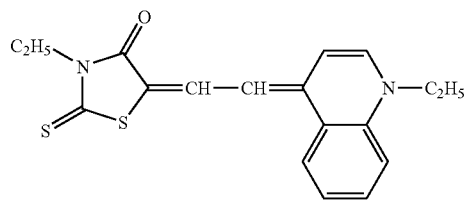
D-150 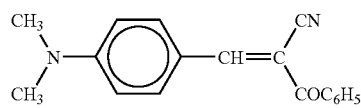
D-151 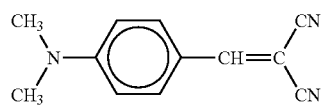
D-152 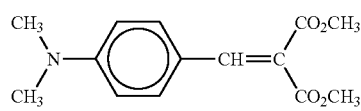
D-153 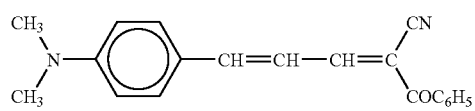
D-154 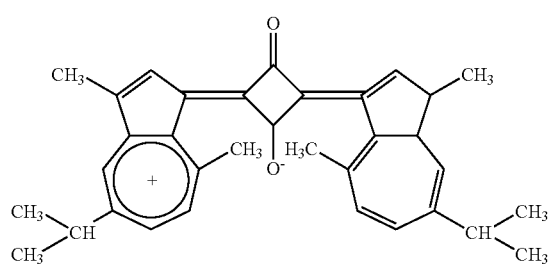
D-155 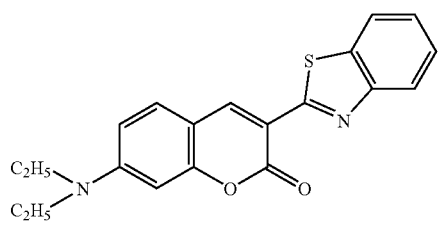
D-156 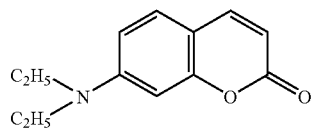
D-157 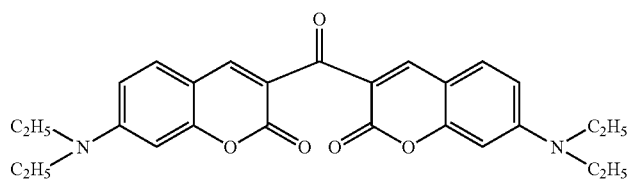

-continued
D-158 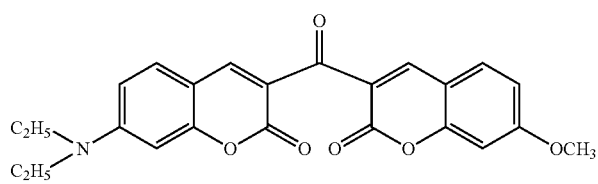
D-159 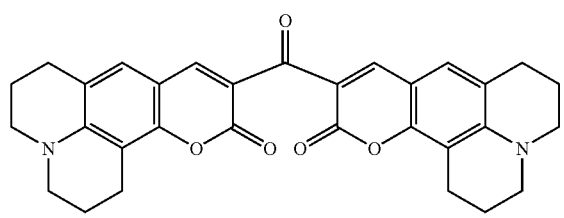
D-160 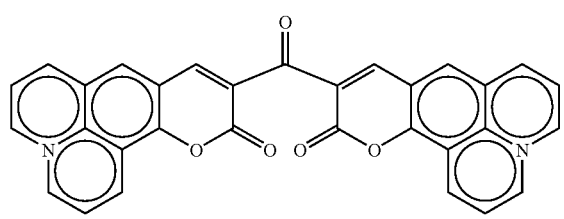
D-161 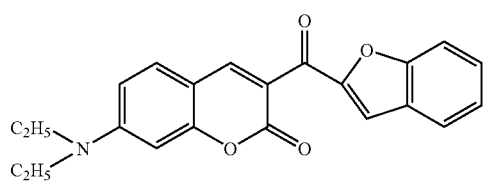
D-162 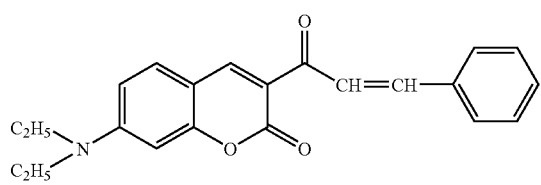
D-163 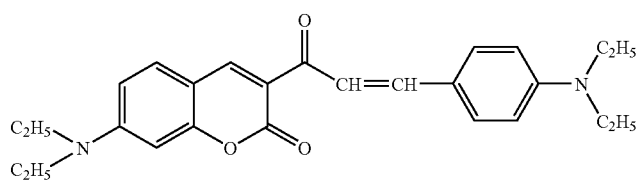
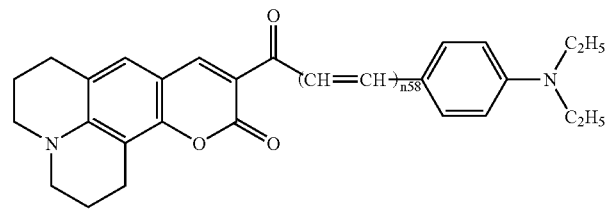
| | n58 |
|---|---|
| D-164 | 2 |
| D-165 | 3 |
| D-166 | 4 |

-continued
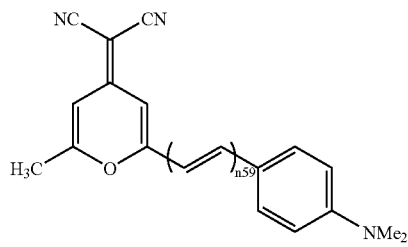
| | n59 |
|---|---|
| D-167 | 1 |
| D-168 | 2 |
| D-169 | 3 |
| D-170 | 4 |
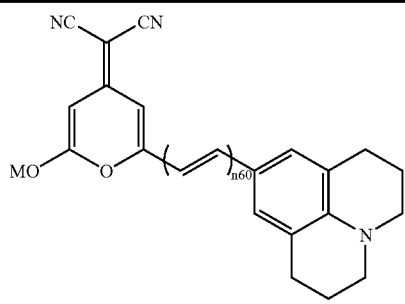
| | n60 |
|---|---|
| D-171 | 1 |
| D-172 | 2 |
| D-173 | 3 |
D-174
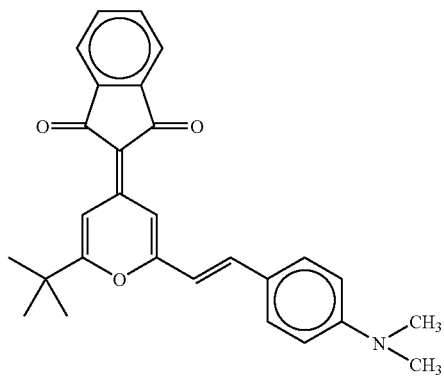
D-175
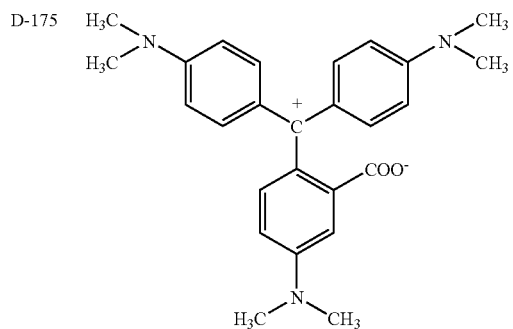

-continued
D-176 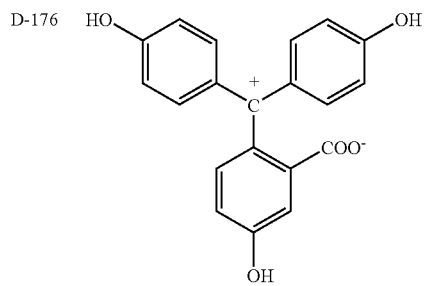
D-177 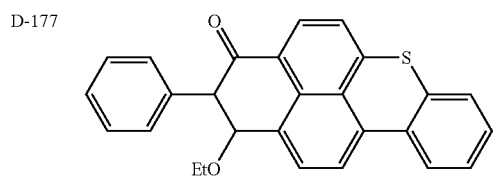
D-178 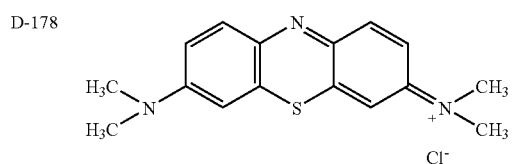
D-179 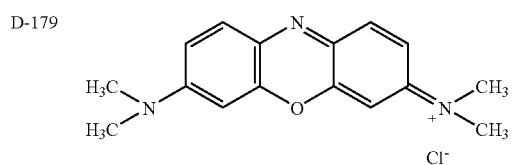
D-180 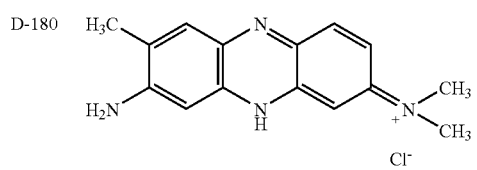
D-181 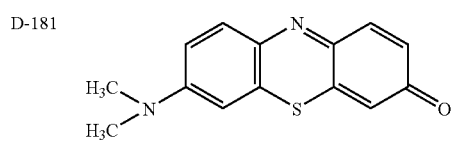

-continued
D-182
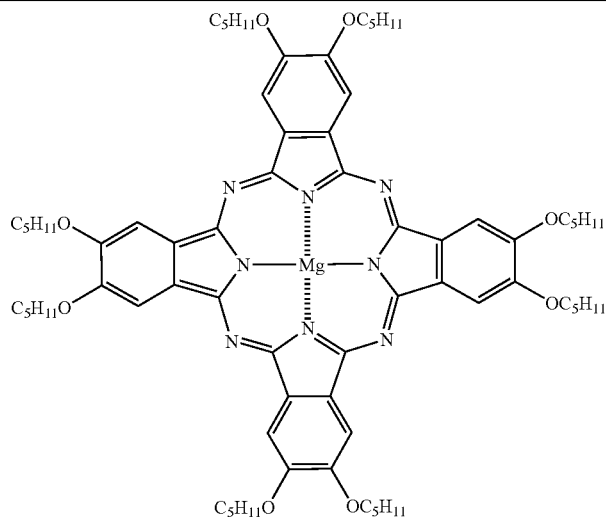
D-183
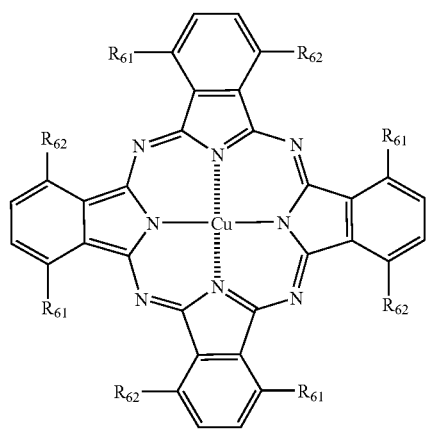
$R_{61}/R_{62}$  One of $R_{61}$ and $R_{62}$ is H, and the other is —$SO_2C_4H_9^{-1}$ (mixture)
D-184
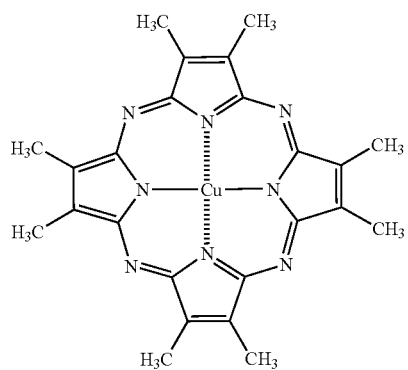

-continued
D-185
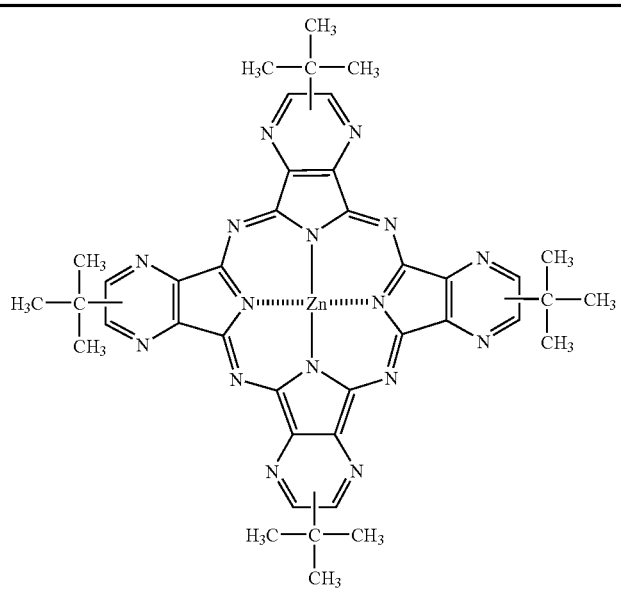
D-186
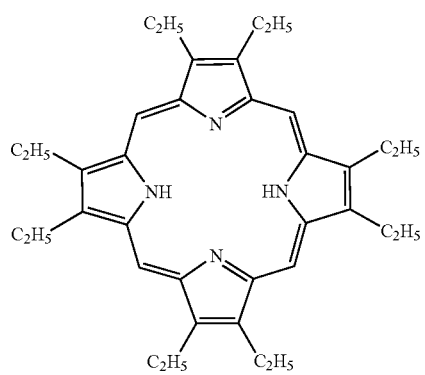
D-187
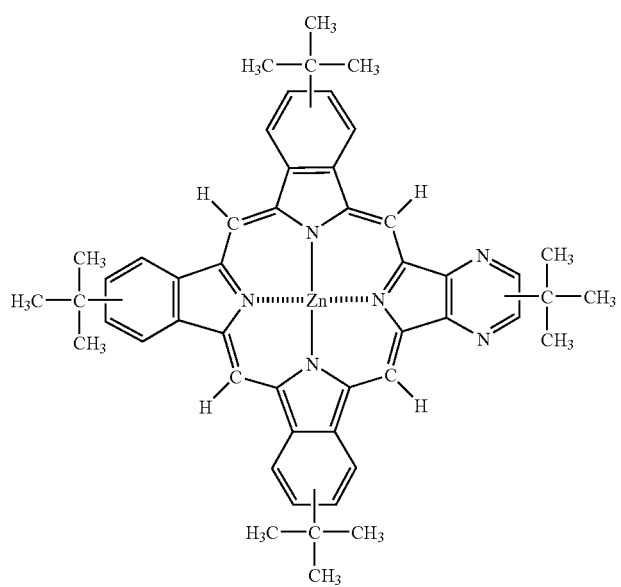

-continued
D-188
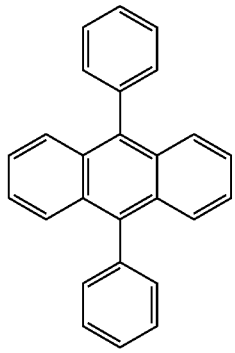
D-189
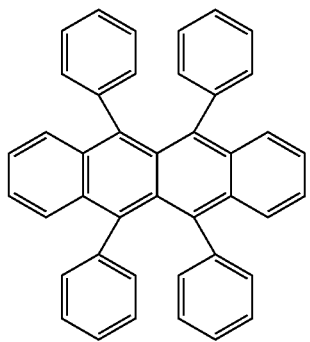
D-190
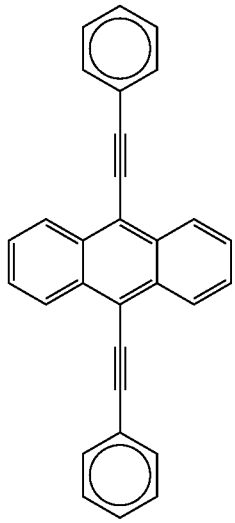

-continued
D-191
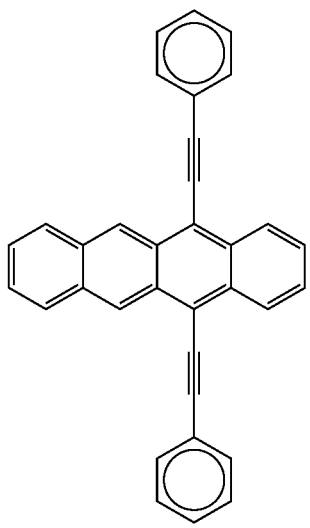
D-192
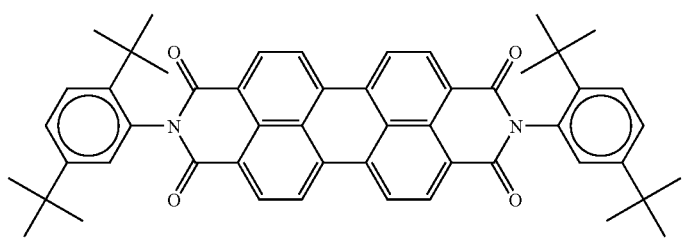
D-193
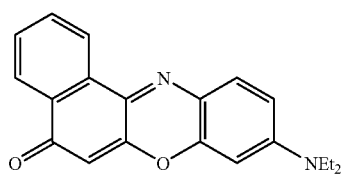
D-194
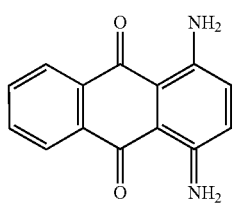
D-195
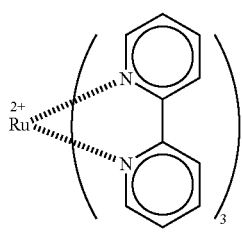

-continued
D-196
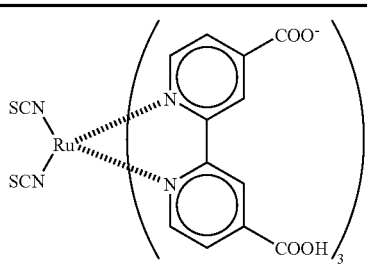
D-197
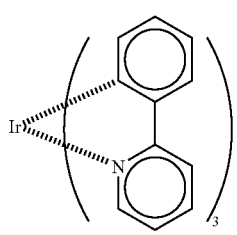
D-198
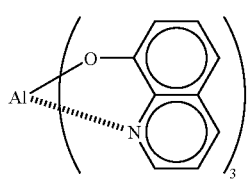
D-199
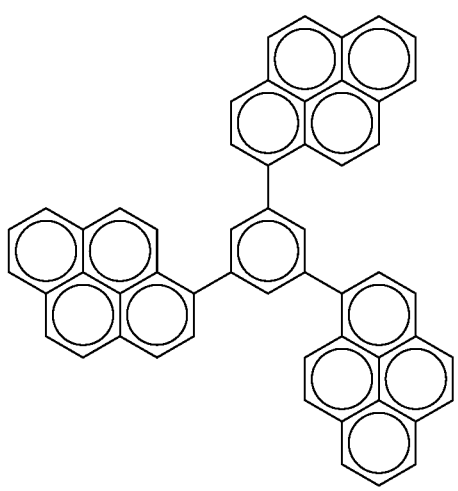
D-200
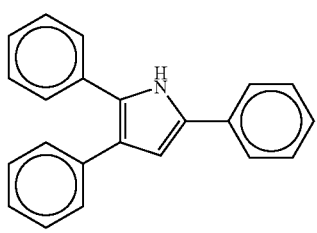
D-201
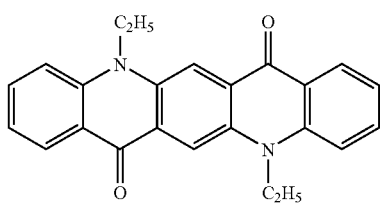

-continued
D-202 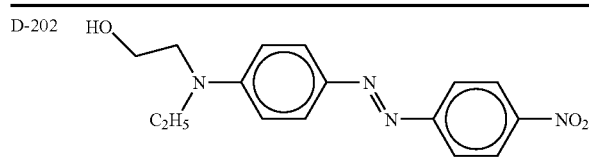
D-203 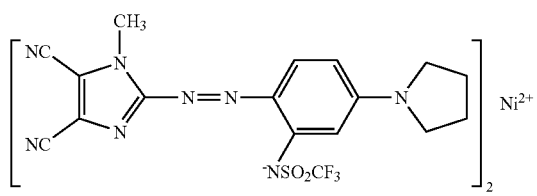
D-204 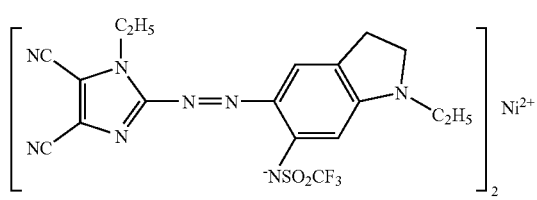
D-205 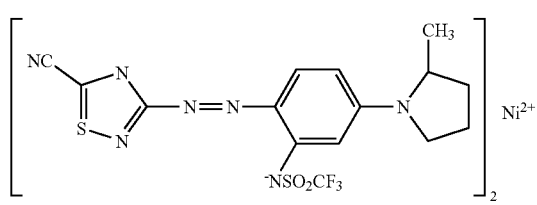
D-206 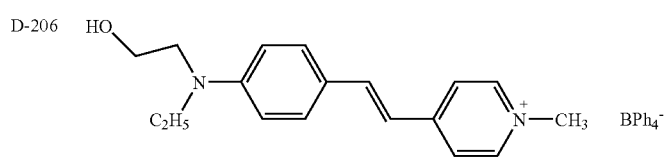
D-207 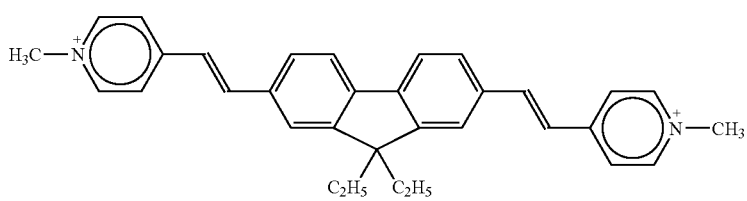
D-208 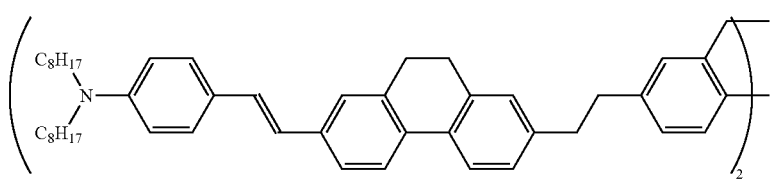
D-209 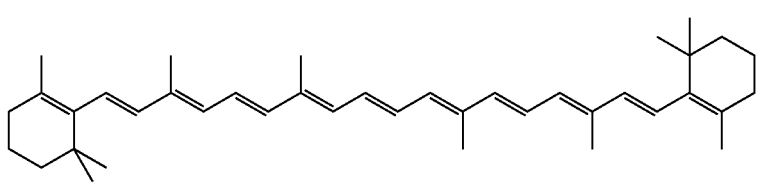

-continued
D-210
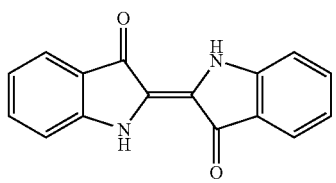
D-211
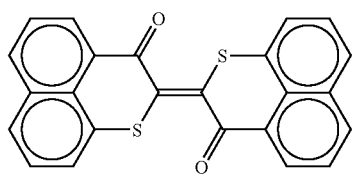
D-212
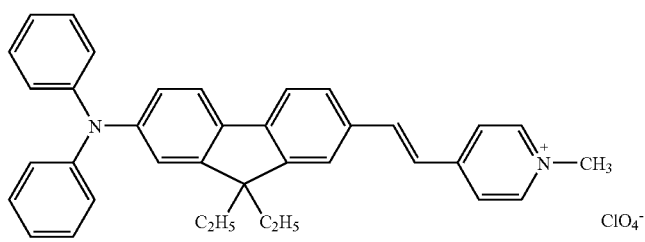
D-213
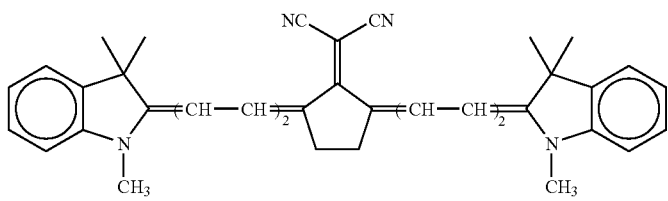
D-214
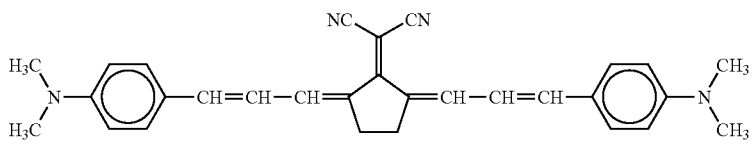
D-215
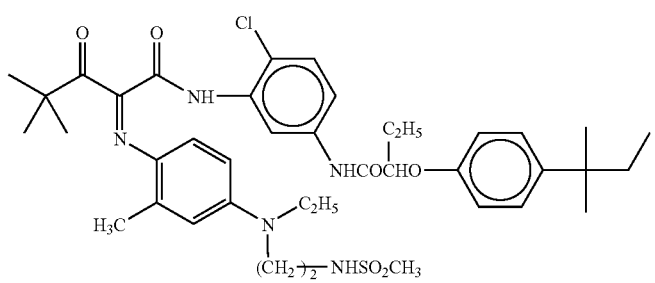
D-216
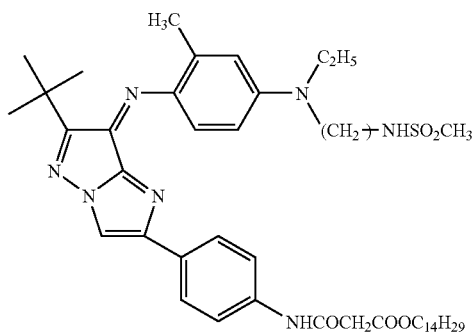

-continued

D-217
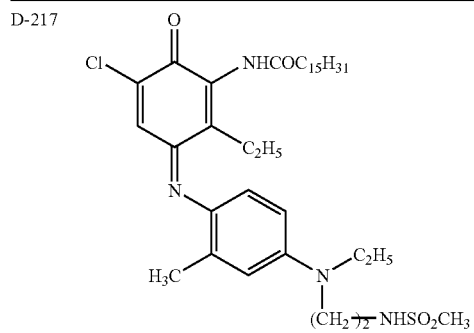

D-218
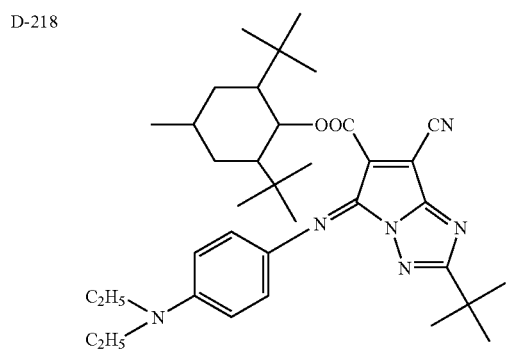

D-219
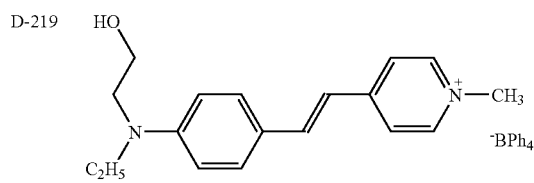

D-220
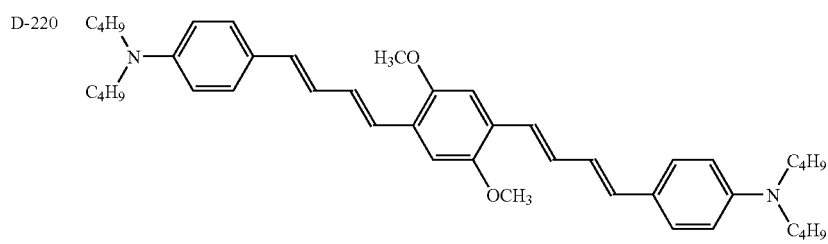

D-221
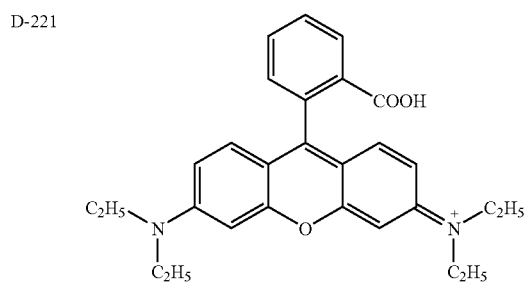

When the difference in the reflectance or transmittance is caused by any of the refractivity difference or the absorbance difference in the two-photon absorbing optical recording material of the invention, preferred embodiments of the recording component of the material are described in detail.

Preferably, the recording component contains an ingredient capable of undergoing chemical reaction with a two-photon absorbing compound that has been in an excited state through two-photon absorption, in a mode of electron transfer or energy transfer from the excited two-photon absorbing compound to thereby record the refractivity difference or the absorbance difference.

In this case, it is important that the refractivity difference or the absorbance difference occurs between the site where the chemical reaction has occurred (recorded area or laser-focused area) and the site where no chemical reaction has occurred (unrecorded area or laser-unfocused area).

As so mentioned hereinabove, in general, the refractive index of dye may have a high value within a region of from around the absorption maximum wavelength (λmax) to a wavelength longer than it, and, in particular, it may have an extremely high value within a region of from λmax to a wavelength longer by around 200 nm than λmax. Some dyes may have a refractive index of more than 2, as the case may be, more than 2.5 in that region.

On the other hand, other organic compounds for binder polymer or the like, not serving as dye, generally have a refractive index of from 1.4 to 1.6 or so.

Accordingly, it is desirable that the recording component for use in the invention contains a dye precursor capable of being a color-forming material through direct electron transfer or energy transfer from the excited state of a two-photon absorbing compound or by the action of an acid or a base generated through electron transfer or energy transfer to an acid generator or a base generator from the excited state of a two-photon absorbing compound, in which the absorption of the resulting color-forming material differs from that of the original dye precursor.

As the recording component in the two-photon absorbing optical recording material of the invention, the following combinations are preferred:

A) a combination comprising at least an acid color-forming dye precursor as the dye precursor and an acid generator and if desired, further containing an acid-increasing agent, B) a combination comprising at least a base color-forming dye precursor as the dye precursor and a base generator and if desired, further containing a base-increasing agent, C) a combination comprising a compound where an organic compound moiety having a function of cutting the covalent bond due to electron or energy transfer with the excited state of a two-photon absorbing compound is covalently bonded with an organic compound moiety of becoming a color-forming material when covalently bonded and when released, and if desired, further containing a base, and D) a combination comprising a compound capable of undergoing a reaction due to electron transfer with the excited state of a two-photon absorbing compound and changing the absorption profile.

In any of these cases, when an energy transfer mechanism from the excited state of a two-photon absorbing compound is used, the mechanism may be either a Forster mechanism where energy transfer occurs from the singlet excited state of a two-photon absorbing compound, or a Dexter mechanism where energy transfer occurs from the triplet excited state thereof.

At this time, in order to cause energy transfer with good efficiency, the excitation energy of the two-photon absorbing compound is preferably larger than the excitation energy of the dye precursor.

In the case of electron transfer mechanism from the excited state of a two-photon absorbing compound, this may be either a mechanism where electron transfer occurs from the singlet excited state of a two-photon absorbing compound, or a mechanism where electron transfer occurs from the triplet excited state thereof.

The excited state of a two-photon absorbing compound may give an electron to a dye precursor, acid generator or base generator or may receive an electron. In the case of giving an electron from the excited state of a two-photon absorbing compound, in order to cause efficient occurrence of electron transfer, the orbital (LUMO) where an excited electron is present in the excited state of the two-photon absorbing compound preferably has a higher energy than the LUMO orbital of the dye precursor or acid or base generator.

In the case where the excited state of a two-photon absorbing compound receives an electron, in order to cause efficient occurrence of electron transfer, the orbital (HOMO) where a hole is present in the excited state of the two-photon absorbing compound preferably has a lower energy than the HOMO orbital of the dye precursor or acid or base generator.

The preferred combinations of the recording component for use in the two-photon absorbing optical recording material of the invention and in the composition comprising it are described in detail below.

The case where the recording component in the two-photon absorbing optical recording material of the invention and in the composition comprising it contains at least an acid color-forming dye precursor as a type of the dye precursor and further contains an acid generator is described below.

The acid generator is a compound capable of generating an acid as result of energy or electron transfer from the excited state of a two-photon absorbing compound. The acid generator is preferably stable in a dark place. The acid generator for use in the invention is preferably a compound capable of generating an acid as a result of electron transfer from the excited state of a two-photon absorbing compound.

As the acid generator for use in the invention, the following 6 systems are preferred.

If desired, two or more of these acid generators may be combined into a mixture for use in the invention.

1) Trihalomethyl-substituted triazine-based acid generator,

2) Diazonium salt-based acid generator,

3) Diaryliodonium salt-based acid generator,

4) Sulfonium salt-based acid generator,

5) Metal arene complex-based acid generator,

6) Sulfonic acid ester-based acid generator.

The above-mentioned preferred systems are described concretely hereinunder.

1) Trihalomethyl-Substituted Triazine-Based Acid Generator:

The trihalomethyl-substituted triazine-based acid generator is preferably represented by the following formula (11):

Formula (11):

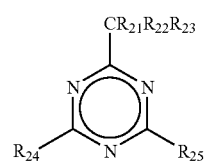

In formula (11), $R_{21}$, $R_{22}$ and $R_{23}$ each independently represent a halogen atom, preferably a chlorine atom, $R_{24}$ and $R_{25}$ each independently represent a hydrogen atom, —$CR_{21}R_{22}R_{23}$ or other substituent.

Preferred examples of the substituent include an alkyl group (preferably having a C number of 1 to 20, e.g., methyl, ethyl, n-propyl, isopropyl, n-butyl, n-pentyl, benzyl, 3-sulfopropyl, 4-sulfobutyl, carboxymethyl, 5-carboxypentyl), an alkenyl group (preferably having a C number of 2 to 20, e.g., vinyl, allyl, 2-butenyl, 1,3-butadienyl), a cycloalkyl group (preferably having a C number of 3 to 20, e.g., cyclopentyl, cyclohexyl), an aryl group (preferably having a C number of 6 to 20, e.g., phenyl, 2-chlorophenyl, 4-methoxyphenyl, 3-methylphenyl, 1-naphthyl), a heterocyclic group (preferably having a C number of 1 to 20, e.g., pyridyl, thienyl, furyl, thiazolyl, imidazolyl, pyrazolyl, pyrrolidino, piperidino, morpholino), an alkynyl group (preferably having a C number of 2 to 20, e.g., ethynyl, 2-propynyl, 1,3-butadynyl, 2-phenylethynyl), a halogen atom (e.g., F, Cl, Br, I), an amino group (preferably having a C number of 0 to 20, e.g., amino, dimethylamino, diethylamino, dibutylamino, anilino), a cyano group, a nitro group, a hydroxyl group, a mercapto group, a carboxyl group, a sulfo group, a phosphonic acid group, an acyl group (preferably having a C number of 1 to 20, e.g., acetyl, benzoyl, salicyloyl, pivaloyl), an alkoxy group (preferably having a C number of 1 to 20, e.g., methoxy, butoxy, cyclohexyloxy), an aryloxy group (preferably having a C number of 6 to 26, e.g., phenoxy, 1-naphthoxy), an alkylthio group (preferably having a C number of 1 to 20, e.g., methylthio, ethylthio), an arylthio group (preferably having a C number of 6 to 20, e.g., phenylthio, 4-chlorophenylthio), an alkylsulfonyl group (preferably having a C number of 1 to 20, e.g., methanesulfonyl, butanesulfonyl), an arylsulfonyl group (preferably having a C number of 6 to 20, e.g., benzenesulfonyl, paratoluenesulfonyl), a sulfamoyl group (preferably having a C number of 0 to 20, e.g., sulfamoyl, N-methylsulfamoyl, N-phenylsulfamoyl), a carbamoyl group (preferably having a C number of 1 to 20, e.g., carbamoyl, N-methylcarbamoyl, N,N-dimethylcarbamoyl, N-phenylcarbamoyl), an acylamino group (preferably having a C number of 1 to 20, e.g., acetylamino, benzoylamino), an imino group (preferably having a C number of 2 to 20, e.g., phthalimino), an acyloxy group (preferably having a C number of 1 to 20, e.g., acetyloxy, benzoyloxy), an alkoxycarbonyl group (preferably having a C number of 2 to 20, e.g., methoxycarbonyl, phenoxycarbonyl) and a carbamoylamino group (preferably having a C number of 1 to 20, e.g., carbamoylamino, N-methylcarbamoylamino, N-phenylcarbamoylamino). Among these, more preferred are an alkyl group, an aryl group, a heterocyclic group, a halogen atom, a cyano group, a carboxyl group, a sulfo group, an alkoxy group, a sulfamoyl group, a carbamoyl group and an alkoxycarbonyl group.

$R_{24}$ is preferably —$CR_{21}R_{22}R_{23}$, more preferably —$CCl_3$, and $R_{25}$ is preferably —$CR_{21}R_{22}R_{23}$, an alkyl group, an alkenyl group or an aryl group.

Specific examples of the trihalomethyl-substituted triazine-based acid generator include 2-methyl-4,6-bis(trichloromethyl)-1,3,5-triazine, 2,4,6-tris(trichloromethyl)-1,3,5-triazine, 2-phenyl-4,6-bis(trichloromethyl)-1,3,5-triazine, 2-(4'-methoxyphenyl)-4,6-bis(trichloromethyl)-1,3,5-triazine, 2-(4'-trifluoromethylphenyl)-4,6-bis(trichloromethyl)-1,3,5-triazine, 2,4-bis(trichloromethyl)-6-(p-methoxyphenylvinyl)-,3,5-triazine and 2-(4'-methoxy-1'-naphthyl)-4,6-bis(trichloromethyl)-1,3,5-triazine. Preferred examples thereof also include the compounds described in British Patent 1,388,492 and JP-A-53-133428.

2) Diazonium Salt-Based Acid Generator

The diazonium salt-based acid generator is preferably represented by the following formula (12):

Formula (12):

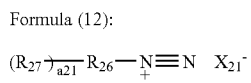

wherein $R_{26}$ represents an aryl group or a heterocyclic group, preferably an aryl group, more preferably a phenyl group; $R_{27}$ represents a substituent (preferred examples of the substituent are the same as those of the substituent described above for $R_{24}$); a21 represents an integer of 0 to 5, preferably 0 to 2, and when a21 is 2 or more, multiple $R_{27}$s may be the same or different or may combine with each other to form a ring; and $X_{21}^-$ is an anion such that $HX_{21}$ becomes an acid having a pKa of 4 or less (in water, 25° C.), preferably 3 or less, more preferably 2 or less, and preferred examples thereof include chloride, bromide, iodide, tetrafluoroborate, hexafluorophosphate, hexafluoroarcenate, hexafluoroantimonate, perchlorate, trifluoromethanesulfonate, 9,10-dimethoxyanthracene-2-sulfonate, methanesulfonate, benzenesulfonate, 4-trifluoromethylbenzenesulfonate, tosylate and tetra(pentafluorophenyl)borate.

Specific examples of the diazonium-based acid generator include the above-described $X_{21}^-$ salts of benzenediazonium, 4-methoxydiazonium and 4-methyldiazonium.

3) Diaryliodonium Salt-Based Acid Generator

The diaryliodonium salt-based acid generator is preferably represented by the following formula (13):

Formula (13):

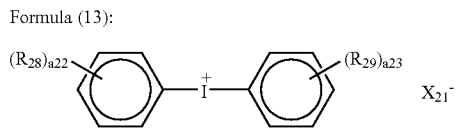

In formula (13), $X_{21}^-$ has the same meaning as in formula (12), $R_{28}$ and $R_{29}$ each independently represent a substituent (preferred examples of the substituent are the same as those of the substituent described above for $R_{24}$), preferably an alkyl group, an alkoxy group, a halogen atom, a cyano group or a nitro group, a22 and a23 each independently represent an integer of 0 to 5, preferably 0 or 1, and when a21 is 2 or more, multiple $R_{28}$s or $R_{29}$s may be the same or different and may combine with each other to form a ring.

Specific examples of the diaryliodonium salt-based acid generator include chloride, bromide, iodide, tetrafluoroborate, hexafluorophosphate, hexafluoroarcenate, hexafluoroantimonate, perchlorate, trifluoromethanesulfonate, 9,10-dimethoxyanthracene-2-sulfonate, methanesulfonate, benzenesulfonate, 4-trifluoromethylbenzenesulfonate, tosylate, tetra(pentafluorophenyl)borate perfluorobutanesulfonate and pentafluorobenzenesulfonate of diphenyliodonium, 4,4'-dichlorodiphenyliodonium, 4,4'-dimethoxydiphenyliodonium, 4,4'-dimethyldiphenyliodonium, 4,4'-di-t-butyldiphenyliodonium, 3,3'-dinitrodiphenyliodonium, phenyl(p-methoxyphenyl)iodonium, phenyl(p-octyloxyphenyl)iodonium and bis(p-cyanophenyl)iodonium.

Other examples include compounds described in *Macromolecules*, Vol. 10, page 1307 (1977), and diaryliodonium salts described in JP-A-58-29803, JP-A-1-287105 and Japanese Patent Application No. 3-5569.

4) Sulfonium Salt-Based Acid Generator:

The sulfonium salt-based acid generator is preferably represented by the following formula (14):

Formula (14):

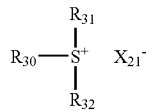

In formula (14), $X_{21}^-$ has the same meaning as in formula (12), and $R_{30}$, $R_{31}$ and $R_{32}$ each independently represent an alkyl group, an aryl group or a heterocyclic group (preferred examples of these groups are the same as those for $R_{24}$), preferably an alkyl group, a phenacyl group or an aryl group.

Specific examples of the sulfonium salt-based acid generator include chloride, bromide, tetrafluoroborate, hexafluorophosphate, hexafluoroarcenate, hexafluoroantimonate, perchlorate, trifluoromethanesulfonate, 9,10-dimethoxyanthracene-2-sulfonate, methanesulfonate, benzenesulfonate, 4-trifluoromethylbenzenesulfonate, tosylate, tetra(pentafluorophenyl)borate, perfluorobutanesulfonate and pentafluorobenzenesulfonate of sulfonium salts such as triphenylsulfonium, diphenylphenacylsulfonium, dimethylphenacylsulfonium, benzyl-4-hydroxyphenylmethylsulfonium, 4-tertiary-butyltriphenylsulfonium, tris(4-methylphenyl)sulfonium, tris(4-methoxyphenyl)sulfonium, 4-phenylthiotriphenylsulfonium and bis-1-(4-(diphenylsulfonium)phenyl)sulfide.

5) Metal Arene Complex-Based Acid Generator:

In the metal arene complex-based acid generator, the metal is preferably iron or titanium.

Specific preferred examples of the metal arene complex-based acid generator include iron arene complexes described in JP-A-1-54440, European Patent Nos. 109851 and 126712, and *J. Imag. Sci.*, Vol. 30, page 174 (1986), iron arene organic boron complexes described in *Organometallics*, Vol. 8, page 2737 (1989), iron arene complex salts described in *Prog. Polym. Sci.*, Vol. 21, pp. 7-8 (1996), and titanocenes described in JP-A-61-151197.

6) Sulfonic Acid Ester-Based Acid Generator:

Preferred examples of the sulfonic acid ester-based acid generator include sulfonic acid esters, nitrobenzyl sulfonates and imidosulfonates.

Specific preferred examples of the sulfonic acid esters include benzoin tosylate and pyrogallol trimesylate. Specific preferred examples of the nitrobenzyl sulfonates include o-nitrobenzyl tosylate, 2,6-dinitrobenzyl tosylate, 2',6'-dinitrobenzyl-4-nitrobenzene sulfonate, p-nitrobenzyl-9,10-diethoxyanthracene-2-sulfonate and 2-nitrobenzyl trifluoromethylsulfonate. Specific preferred examples of the imidosulfonates include N-tosylphthalimide, 9-fluorenylidene aminotosylate and α-cyanobenzylidene tosylamine.

Here, as the acid generator, those described, for example, in S. Peter Pappas (compiler), *UV Curing; Science and Technology*, pp. 23-76, *A Technology Marketing Publication*, and B. Klingert, M. Riediker and A. Roloff, *Comments Inorg. Chem.*, Vol. 7, No. 3, pp. 109-138 (1988) can also be used.

Other acid generators than the above for use in the invention are, for example, o-nitrobenzyl-protected acid generators as in S. Hayase et al., *J. Polymer Sci.*, 25, 753 (1987), E. Reichmanis et al., *J. Polymer Sci., Polymer Chem. Ed.*, 23, 1 (1985), D. H. R. Barton et al., *J. Chem. Soc.*, 3571 (1965), P. M. Collins et al., *J. Chem. Soc.*, Perkin I, 1695 (1975), M. Rudinstein et al., *Tetrahedron Lett.*, (17), 1445 (1975), J. W. Walker et al., *J. Am. Chem. Soc.*, 110, 7170 (1988), S. C. Busman et al., *J. Imaging Technol.*, 11(4), 191 (1985), H. M. Houlihan et al., *Macromolecules*, 21, 2001 (1988), P. M. Collins et al., *J. Chem. Soc., Chem. Commun.*, 532 (1972), S. Hayase et al., *Macromolecules*, 18, 1977 (1985), E. Reichmanis et al., *J. Electrochem. Soc., Solid State Sci. Technol.*, 130(6), F. M. Houlihan et al., *Macromolecules*, 21, 2001 (1988), EP Nos. 290,750, 046,083, 156,535, 271,851, 388, 343, U.S. Pat. Nos. 3,901,710, 4,181,531, JP-A-60-198538, 53-133022; halogenosulforane derivatives (concretely, 3,4-dibromosulforane, 3,4-dichlorosulforane), halogen-containing alkylene glycol ether compounds such as methyleneglycol bis(2,3-dibromopropyl) ether, halogen-containing ketones such as 1,1,3,3-tetrabromoacetone and hexachloroacetone, and halogen-containing alcohols such as 2,3-dibromopropanol, as in JP-A-4-338757.

For the acid generator for the invention, also usable is a polymer with an acid-generating group introduced into the backbone chain or the side chain thereof. In case where the acid generator in the invention is such a polymer with an acid-generating group introduced into the backbone chain or the side chain thereof, the polymer may play the role of binder.

Concretely, the polymer for use in the invention, which has an acid-generating group or compound introduced into the backbone chain or the side chain thereof, includes, for example, the compounds disclosed in M. E. Woodhouse et al., *J. Am. Chem. Soc.*, 104, 5586 (1982), S. P. Pappas et al., *J. Imaging Sci.*, 30(5), 218 (1986), S. Kondo et al., *Makromol. Chem., Rapid Commun.*, 9, 625 (1988), J. V. Crivello et al., *J. Polymer Sci., Polymer Chem. Ed.*, 17, 3845 (1979), U.S. Pat. No. 3,849,137, German Patent 3,914,407, JP-A-63-26653, 55-164824, 62-69263, 63-146037, 63-163452, 62-153853, 63-146029, 2000-143796.

The acid generator for use in the invention is more preferably any of the following:

3) diaryliodonium salt-based acid generator, 4) sulfonium salt-based acid generator, and 6) sulfonic acid ester-based acid generator.

The above-mentioned acid generators may all serve as a cation-polymerization initiator.

In addition, the following may serve both as a cation-polymerization initiator and a radical-polymerization initiator.

1) Trihalomethyl-substituted triazine-based acid generator,

2) Diazonium salt-based acid generator,

3) Diaryliodonium salt-based acid generator,

4) Sulfonium salt-based acid generator,

5) Metal arene complex-based acid generator.

Accordingly, the two-photon absorbing optical recording material of the invention as well as the composition comprising the material may contain a polymerizable monomer, a polymerizable binder, a reactive binder and a crosslinking agent in order that the material and the composition could be hardened through polymerization or crosslinking thereof during recoding on it.

The recording component in the two-photon absorbing optical recording material and its composition of the invention may contain at least an acid color-forming dye precursor as a type of the dye precursor, and an acid generator. The acid color-forming dye precursor is described below.

The acid color-forming dye precursor for use in the invention is a dye precursor which can become a color-forming material changed in the absorption from the original state, under the action of the acid generated by the acid generator. The acid color-forming dye precursor is preferably a compound of which absorption is shifted to the lower wavelength side under the action of an acid, more preferably a compound which is colorless but is colored under the action of an acid.

Preferred examples of the acid color-forming dye precursor include triphenylmethane compounds, phthalide compounds (including indolylphthalide, azaphthalide and triphenylmethanephthalide compounds), phenothiazine compounds, phenoxazine compounds, fluoran compounds, thiofluoran compounds, xanthene compounds, diphenylmethane compounds, chromenopyrazole compounds, leucoauramine, methine compounds, azomethine compounds, rhodamine lactam compounds, quinazoline compounds, diazaxanthene compounds, fluorene compounds and spiropyran compounds. Specific examples of these compounds are disclosed, for example, in JP-A-2002-156454 and patents cited therein, JP-A-2000-281920, JP-A-11-279328 and JP-A-8-240908.

The acid color-forming dye precursor is more preferably a leuco dye having a partial structure such as lactone, lactam, oxazine and spiropyran, and examples thereof include fluoran compounds, thiofluoran compounds, phthalide compounds, rhodamine lactam compounds and spiropyran compounds.

The dye produced from the acid color-forming dye precursor in the recording component in the invention is preferably a xanthene (fluoran) dye or a triphenylmethane dye.

If desired, these acid color-forming dye precursors may be used as a mixture of two or more thereof in any desired ratio.

Specific examples of the acid color-forming dye precursor preferred for the recording component in the invention are described below, however, the invention is not limited to these specific examples.

The phthalide dye precursor is preferably represented by the following formula (21):

Formula (21):

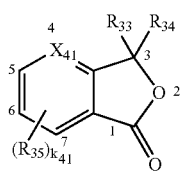

In formula (21), $X_{41}$, represents CH or N, $R_{33}$ and $R_{34}$ each independently represent an alkyl group having a carbon number (hereinafter referred to as "a C number") of 1 to 20, an aryl group having a C number of 6 to 24, a heterocyclic group having a C number of 1 to 24 or a group represented by the following formula (22), $R_{35}$ represents a substituent (preferred examples of the substituent are the same as those of the substituent described for $R_{24}$), $R_{35}$ more preferably represents a halogen atom such as chlorine atom and bromine atom, an alkyl group having a C number of 1 to 20, an alkoxy group having a C number of 1 to 20, an amino group, an alkylamino group containing an alkyl group having a C number of 1 to 20, a dialkylamino group containing alkyl groups each independently having a C number of 1 to 20, an arylamino group containing an aryl group having a C number of 6 to 24, a diarylamino group containing aryl groups each independently having a C number of 6 to 24, a hydroxyl group, an alkoxy group having a C number of 1 to 20, or a heterocyclic group, $k_{41}$ represents an integer of 0 to 4, and when $k_{41}$ is an integer of 2 or more, multiple $R_{35}$s each independently represent a group described above. These groups each may further have a substituent and preferred examples of the substituent include the groups described for $R_{24}$.

Formula (22):

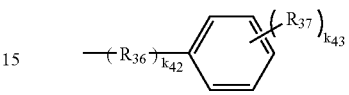

In formula (22), $R_{36}$ represents an alkylene group having a C number of 1 to 3, $k_{42}$ represents an integer of 0 to 1, $R_{37}$ represents a substituent (preferred examples of the substituent are the same as those of the substituent described for $R_{24}$), $R_{37}$ more preferably represents a halogen atom such as chlorine atom and bromine atom, an alkyl group having a C number of 1 to 20, an alkoxy group having a C number of 1 to 20, an amino group, an alkylamino group containing an alkyl group having a C number of 1 to 20, a dialkylamino group containing alkyl groups each independently having a C number of 1 to 20, an arylamino group containing an aryl group having a C number of 6 to 24, a diarylamino group containing aryl groups each independently having a C number of 6 to 24, a hydroxyl group, an alkoxy group having a C number of 1 to 20, or a heterocyclic group, $k_{43}$ represents an integer of 0 to 5, and when $k_{43}$ is an integer of 2 or more, multiple $R_{37}$s each independently represent a group described above. These groups each may further have a substituent and preferred examples of the substituent include the groups described for $R_{24}$.

The heterocyclic group represented by $R_{33}$ and $R_{34}$ in formula (21) is preferably an indolyl group represented by the following formula (23):

Formula (23):

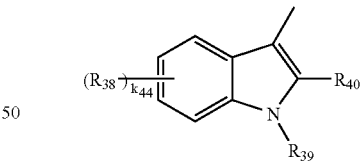

In formula (23), $R_{38}$ represents a substituent (preferred examples of the substituent are the same as those of the substituent described for $R_{24}$), $R_{38}$ more preferably represents a halogen atom such as chlorine atom and bromine atom, an alkyl group having a C number of 1 to 20, an alkoxy group having a C number of 1 to 20, an amino group, an alkylamino group containing an alkyl group having a C number of 1 to 20, a dialkylamino group containing alkyl groups each independently having a C number of 1 to 20, an arylamino group containing an aryl group having a C number of 6 to 24, a diarylamino group containing aryl groups each independently having a C number of 6 to 24, a hydroxyl group, an alkoxy group having a C number of 1 to 20, or a heterocyclic group, $k_{44}$ represents an integer of 0 to 4, and when $k_{44}$ is an integer of 2 or more, multiple $R_{38}$s each independently represent a group described above, $R_{39}$ represents a hydrogen atom or an alkyl group having a C number of 1 to 20, $R_{40}$ represents an alkyl group having a C number of 1 to 20 or an alkoxy group having a C number of 1 to 20. These groups each may further have a substituent and preferred examples of the substituent include the groups described for $R_{24}$.

Specific examples of the phthalide dye precursor (including indolylphthalide dye precursor and azaphthalide dye precursor) include 3,3-bis(4-diethylaminophenyl)-6-diethylaminophthalide, 4-(4-diethylaminophenyl)-3-(1-ethyl-2-methylindol-3-yl)phthalide, 3-(4-dimethylaminophenyl)-3-(1,3-dimethylindol-3-yl)phthalide, 3,3-bis(1-n-butyl-2-methylindol-3-yl)phthalide, 3,3-bis(1-ethyl-2-methylindol-3-yl)phthalide, 3-(4-diethylamino-2-ethoxyphenyl)-3-(1-ethyl-2-methylindol-3-yl)-4-azaphthalide, 3,3-bis(4-hydroxyphenyl)-6-hydroxyphthalide, 3,3-bis(4-hexyloxyphenyl)phthalide and 3,3-bis(4-hexyloxyphenyl)-6-methoxyphthalide.

The phthalide dye precursor represented by formula (21) is more preferably a triphenylmethane phthalide dye precursor represented by the following formula (24):

Formula (24):

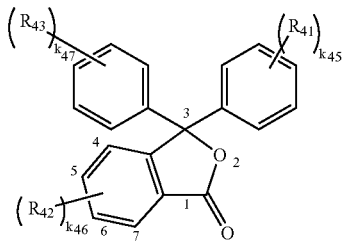

In formula (24), $R_{41}$, $R_{42}$ and $R_{43}$ each independently represent a substituent (preferred examples of the substituent are the same as those of the substituent described for $R_{24}$), the substituent represented by $R_{41}$, $R_{42}$ and $R_{43}$ is more preferably a halogen atom such as chlorine atom and bromine atom, an alkyl group having a C number of 1 to 20, an alkoxy group having a C number of 1 to 20, an amino group, an alkylamino group containing an alkyl group having a C number of 1 to 20, a dialkylamino group containing alkyl groups each independently having a C number of 1 to 20, an arylamino group containing an aryl group having a C number of 6 to 24, a diarylamino group containing aryl groups each independently having a C number of 6 to 24, a hydroxyl group, an alkoxy group having a C number of 1 to 20, or a heterocyclic group, $k_{45}$, $k_{46}$ and $k_{47}$ each independently represent an integer of 0 to 4, and when $k_{45}$, $k_{46}$ and $k_{47}$ each are an integer of 2 or more, multiple $R_{41}$s, $R_{42}$s or $R_{43}$s each independently represent a group described above. These groups each may further have a substituent and preferred examples of the substituent include the groups described for $R_{24}$.

Specific examples of the triphenylmethanephthalide-base dye precursor include 3,3-bis(p-dimethylaminophenyl)-6-dimethylaminophthalide (that is, crystal violet lactone), 3,3-bis(p-dimethylaminophenyl)phthalide, 3,3-bis(p-dihexylaminophenyl)-6-dimethylaminophthalide, 3,3-bis(p-dioctylaminophenyl)phthalide, 3,3-bis(p-dimethylaminophenyl)-6-diethylaminophthalide, 4-hydroxy-4'-dimethylaminotriphenylmethane lactone, 4,4'-bisdihydroxy-3,3'-bisdiaminotriphenylmethane lactone, 3,3-bis(4-hydroxyphenyl)-4-hydroxyphthalide, 3,3-bis(4-hexyloxyphenyl)phthalide and 3,3-bis(4-hexyloxyphenyl)-6-methoxyphthalide.

The fluoran dye precursor is preferably represented by the following formula (25):

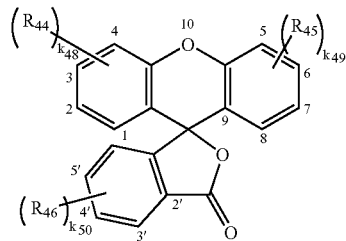

In formula (25), $R_{44}$, $R_{45}$ and $R_{46}$ each independently represent a substituent (preferred examples of the substituent are the same as those of the substituent described for $R_{24}$), the substituent represented by $R_{44}$, $R_{45}$ and $R_{46}$ is more preferably a halogen atom such as chlorine atom and bromine atom, an alkyl group having a C number of 1 to 20, an alkoxy group having a C number of 1 to 20, an amino group, an alkylamino group containing an alkyl group having a C number of 1 to 20, a dialkylamino group containing alkyl groups each independently having a C number of 1 to 20, an arylamino group containing an aryl group having a C number of 6 to 24, a diarylamino group containing aryl groups each independently having a C number of 6 to 14, a hydroxyl group or a heterocyclic group, $k_{48}$, $k_{49}$ and $k_{50}$ each independently represent an integer of 0 to 4, and when $k_{48}$, $k_{49}$ and $k_{50}$ each are an integer of 2 or more, multiple $R_{44}$s, $R_{45}$s or $R_{46}$s each independently represent a group described above. These groups each may further have a substituent and preferred examples of the substituent include the groups described for $R_{24}$.

Specific examples of the fluoran dye precursor include 3-diethylamino-6-(2-chloroanilino)fluoran, 3-dibutylamino-6-(2-chloroanilino)fluoran, 3-diethylamino-7-methyl-6-anilinofluoran, 3-dibutylamino-7-methyl-6-anilinofluoran, 3-dipentylamino-7-methyl-6-anilinofluoran, 3-(N-ethyl-N-isopentylamino)-7-methyl-6-anilinofluoran, 3-diethylamino-7-methyl-6-xylidinofluoran, 3-diethylamino-6,7-benzofluoran, 3-diethylamino-7-methoxy-6,7-benzofluoran, 1,3-dimethyl-6-diethylaminofluoran, 2-bromo-3-methyl-6-dibutylaminofluoran, 2-N,N-dibenzylamino-6-diethylaminofluoran, 3-dimethylamino-6-methoxyfluoran, 3-diethylamino-7-methyl-6-chlorofluoran, 3-diethylamino-6-methoxyfluoran, 3,6-bisdiethylaminofluoran, 3,6-dihexyloxyfluoran, 3,6-dichlorofluoran and 3,6-diacetyloxyfluoran.

Specific examples of the rhodamine lactam dye precursor include Rhodamine-B-anilinolactam, rhodamine(p-nitroanilino)lactam, Rhodamine-B-(p-chloroanilino)lactam and Rhodamine-B-(o-chloroanilino)lactam.

Specific examples of the spiropyran dye precursor include 3-methyl-spirodinaphthopyran, 3-ethyl-spirodinaphthopyran, 3,3'-dichloro-spirodinaphthopyran, 3-benzyl-spirodinaphthopyran, 3-propyl-spirodibenzopyran, 3-phenyl-8'-methoxybenzoindolinospiropyran, 8'-methoxybenzoindolinospiropyan and 4,7,8'-trimethoxybenzoindolinospiropyran.

Other specific examples include spiropyran dye precursors disclosed in JP-A-2000-281920.

In addition, BLD compounds represented by formula (6) in JP-A-2000-284475, leuco dyes disclosed in JP-A-2000-144004, and leuco dyes having the structure shown below can also be suitably used as the acid color-forming dye precursor in the invention.

The acid-increasing agent is preferably represented by any of formulae (34-1) to (34-6).

In formulae (34-1) to (34-6), $R_{101}$ represents a group of becoming, in the form of $R_{101}OH$, an acid having a pKa of 5 or less, preferably an acid having a pKa of 3 or less.

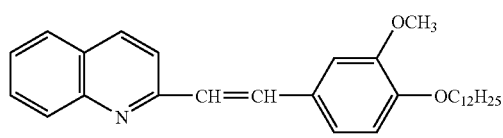

R-1

R-2

R-3

R-4

R-5

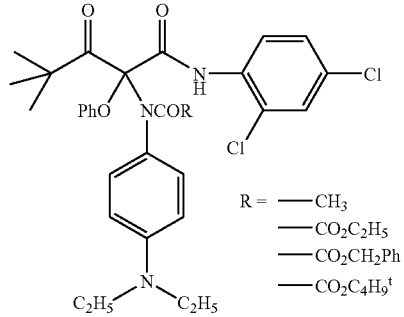

R-6

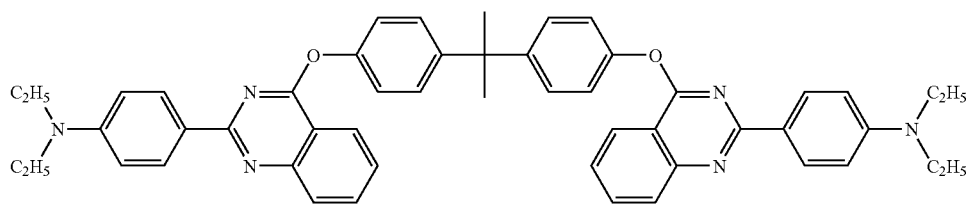

When the recording component in the invention contains at least an acid color-forming dye precursor as a type of the dye precursor, and an acid generator, then it may further contain an acid-increasing agent.

The acid-increasing agent for use in the invention is a compound of increasing an acid by using, as a trigger, a small amount of the acid generated from an acid generator and this compound is stable in the absence of an acid but when an acid is present, decomposes to release an acid which triggers decomposition of another acid-increasing agent to also release an acid.

$R_{101}$ is preferably a group of becoming, in the form of $R_{101}OH$, a sulfonic acid, a carboxylic acid, a phosphoric acid, a phosphonic acid or a phosphinic acid, more preferably a sulfonic acid or an electron-withdrawing group-substituted carboxylic acid. The electron-withdrawing group is preferably a halogen atom, a cyano group, a nitro group, an alkoxycarbonyl group, a carbamoyl group, an alkylsulfonyl group, an arylsulfonyl group or a heterocyclic group. $R_{101}$ is most preferably a group of becoming a sulfonic acid in the form of $R_{101}OH$.

Specific preferred examples of $R_{101}$ are set forth below, however, the invention is not limited thereto.

A-1 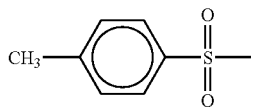
A-2 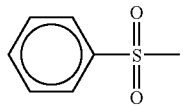
A-3 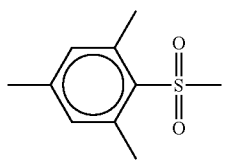
A-4 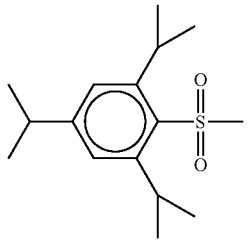
A-5 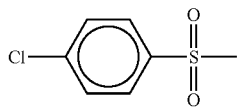
A-6 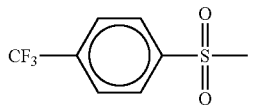
A-7 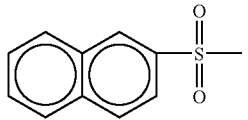
A-8 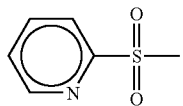
A-9 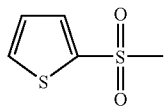
A-10 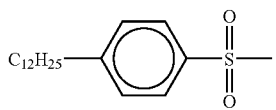
A-11 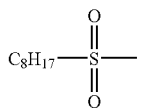
-continued
A-12 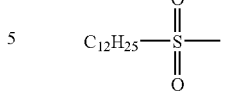
A-13 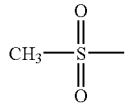
A-14 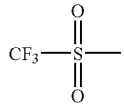
A-15 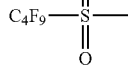
A-16 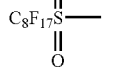
A-17 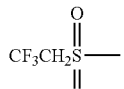
A-18 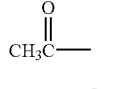
A-19 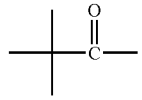
A-20 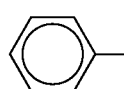
A-21 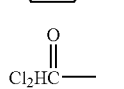
A-22 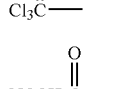
A-23 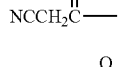
A-24 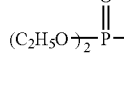
A-25 
A-26 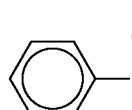

In formula (34-1), $R_{102}$ represents a 2-alkyl-2-propyl group, a 2-aryl-2-propyl group, a cyclohexyl group, a tetrahydropyranyl group or a bis(p-alkoxyphenyl)methyl group, preferably a 2-alkyl-2-propyl group or a 2-aryl-2-propyl group, more preferably a 2-alkyl-2-propyl group, and most preferably a tert-butyl group.

In formula (34-1), $R_{103}$ and $R_{104}$ each independently represent a substituent (preferred examples of the substituent are the same as those of the substituent described for $R_{24}$), more preferably an alkyl group, an alkenyl group, a cycloalkyl group, an aryl group or a heterocyclic group, still more preferably an alkyl group or an aryl group, and most preferably an alkyl group.

In formulae (34-1) to (34-6), $R_{105}$, $R_{106}$, $R_{107}$, $R_{110}$, $R_{113}$ and $R_{116}$ each independently represent a hydrogen atom or a substituent (preferred examples of the substituent are the same as those of the substituent described for $R_{24}$), more preferably a hydrogen atom, an alkyl group, an alkenyl group, a cycloalkyl group, an aryl group or a heterocyclic group, still more preferably a hydrogen atom, an alkyl group or an aryl group.

$R_{105}$, $R_{106}$ and $R_{116}$ all are preferably a hydrogen atom. $R_{107}$, $R_{110}$ and $R_{113}$ are more preferably an alkyl group.

In formula (34-2), $R_{108}$ and $R_{109}$ each independently represent an alkyl group, preferably a methyl group or an ethyl group. Also, $R_{108}$ and $R_{109}$ may combine with each other to form a ring and the ring formed is preferably a dioxal ring or a dioxane ring.

In formula (34-3), $R_{111}$ and $R_{112}$ represent alkyl groups which combine with each other to form a ring. The ring formed is preferably a saturated cycloalkane ring.

In formula (34-4), $R_{114}$ represents a hydrogen atom or a nitro group, preferably a nitro group, $R_{115}$ represents a substituent, and n101 represents an integer of 0 to 3, preferably 0 or 1, more preferably 0.

In formula (34-6), $R_{117}$ represents a substituent (preferred examples of the substituent are the same as those of the substituent described for $R_{24}$), more preferably an alkyl group, an alkenyl group, a cycloalkyl group, an aryl group or a heterocyclic group, still more preferably an alkyl group or an aryl group, and most preferably an alkyl group.

The acid-increasing agent for use in the invention is preferably represented by formula (34-1), (34-3) or (34-4), and most preferably represented by formula (34-1).

Specific examples of the acid-increasing agent for use in the invention are set forth below, however, the invention is not limited thereto.

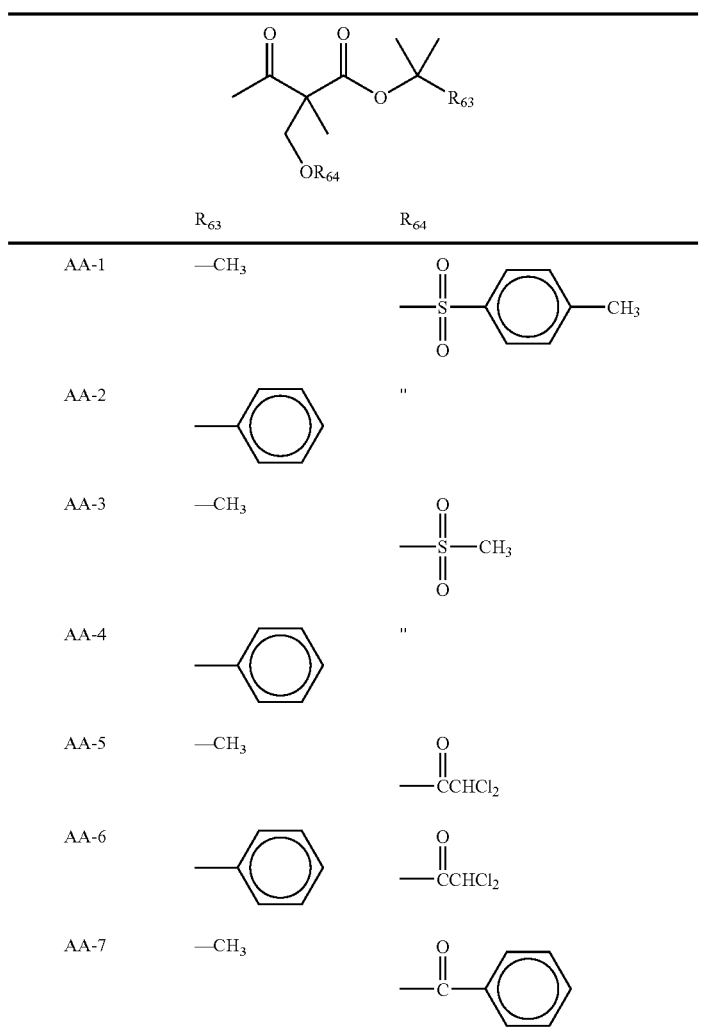

-continued
| | | |
|---|---|---|
| AA-8 | —CH₃ |  |
| AA-9 | —CH₃ | —SO₂CF₃ |
| AA-10 | —CH₃ | —SO₂C₄F₉ |
| AA-11 | 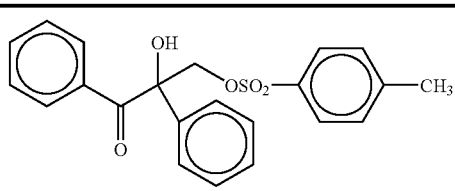 |
|---|---|
| | 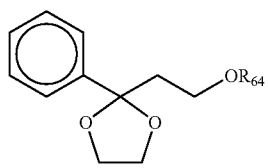 |
| | R₆₄ |
| AA-12 | 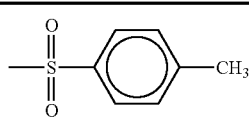 |
|---|---|
| AA-13 | 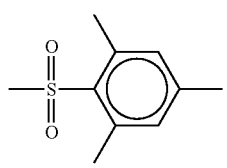 |
| AA-14 | 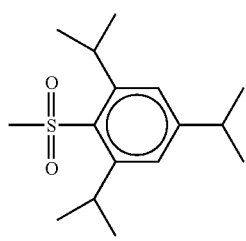 |
| AA-15 | 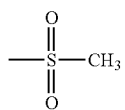 |
| AA-16 | 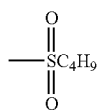 |
| AA-17 |  |
| AA-18 | 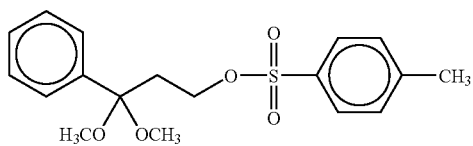 |
|---|---|

-continued
AA-19 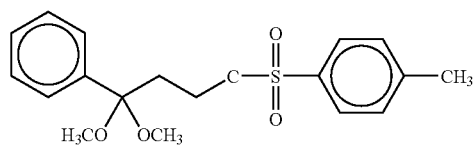
AA-20 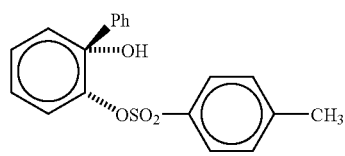
AA-21 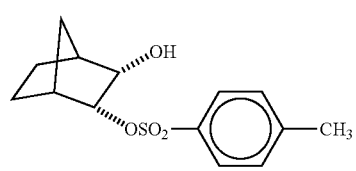
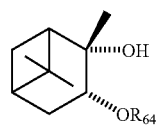
| | $R_{64}$ |
|---|---|
| AA-22 | 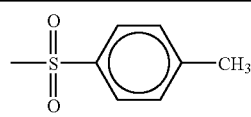 |
| AA-23 | 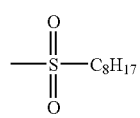 |
| AA-24 | 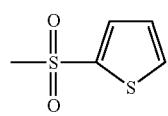 |
| AA-25 | 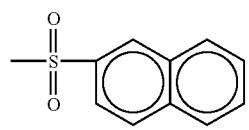 |
AA-26 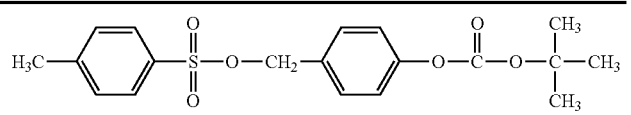
AA-27 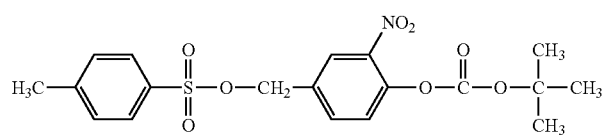
AA-28 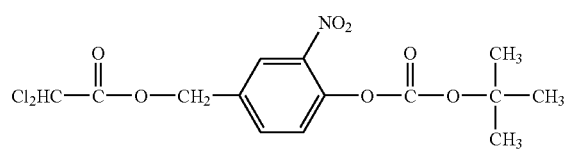

-continued
| | $R_{64}$ |
|---|---|
| | 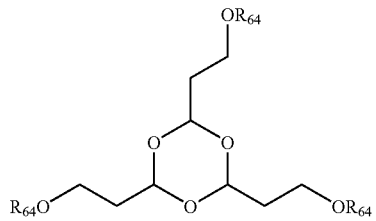 |
| AA-29 | 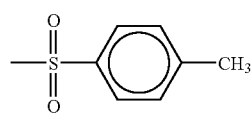 |
| AA-30 | 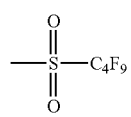 |
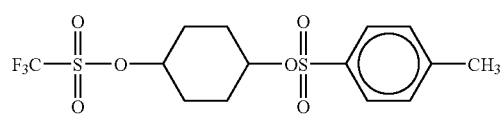
AA-31
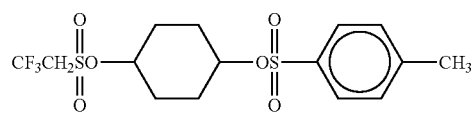
AA-32
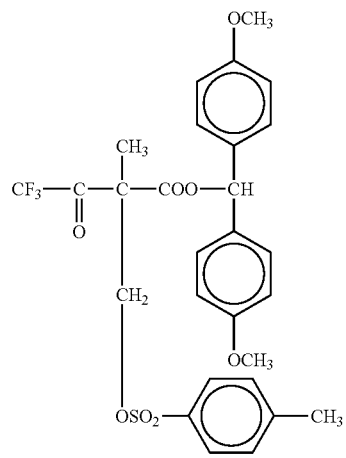
AA-33
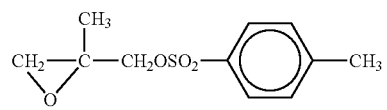
AA-34
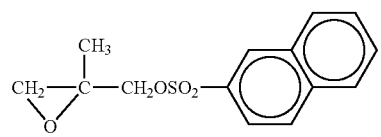
AA-35

During acid increase therein, the system is preferably heated. Therefore, it is desirable that the system is heated, after exposed.

The recording component of the two-photon absorbing optical recording material of the invention may contain at least a base color-forming dye precursor as a type of the dye precursor and a base generator, and this embodiment is described below.

The base generator is a compound capable of generating a base as a result of energy or electron transfer from the excited state of a two-photon absorbing compound. The base generator is preferably stable in a dark place. The base generator for use in the invention is preferably a compound capable of generating a base as a result of electron transfer from the excited state of a two-photon absorbing compound.

The base generator for use in the invention preferably generates a Broensted base by light, more preferably generates an organic base, still more preferably generates an amine as the organic base.

The base generator is preferably represented by formulae (31-1) to (31-4). These base generates may be used, if desired, as a mixture of two or more thereof in any desired ratio.

In formulae (31-1) and (31-2), $R_{201}$ and $R_{202}$ each independently represent a hydrogen atom, an alkyl group (preferably having a carbon number (hereinafter referred to as "a C number") of 1 to 20, e.g., methyl, ethyl, n-propyl, isopropyl, n-butyl, n-pentyl, n-octadecyl, benzyl, 3-sulfopropyl, 4-sulfobutyl, carboxymethyl, 5-carboxypentyl), an alkenyl group (preferably having a C number of 2 to 20, e.g., vinyl, allyl, 2-butenyl, 1,3-butadienyl), a cycloalkyl group (preferably having a C number of 3 to 20, e.g., cyclopentyl, cyclohexyl), an aryl group (preferably having a C number of 6 to 20, e.g., phenyl, 2-chlorophenyl, 4-methoxyphenyl, 3-methylphenyl, 1-naphthyl, 2-naphthyl) or a heterocyclic group (preferably having a C number of 1 to 20, e.g., pyridyl, thienyl, furyl, thiazolyl, imidazolyl, pyrazolyl, pyrrolidino, piperidino, morpholino), preferably a hydrogen atom, an alkyl group or a cycloalkyl group, more preferably a hydrogen atom, a methyl group, an ethyl group, a cyclohexyl group or a cyclopentyl group.

$R_{201}$ and $R_{202}$ may combine with each other to form a ring and the heterocyclic ring formed is preferably a piperidine ring, a pyrrolidine ring, a piperazine ring, a morpholine ring, a pyridine ring, a quinoline ring or an imidazole ring, more preferably a piperidine ring, a pyrrolidine ring or an imidazole ring, and most preferably a piperidine ring.

Examples of the preferred combination of $R_{201}$ and $R_{202}$ include a combination where $R_{201}$ is a cyclohexyl group which may be substituted, and $R_{202}$ is a hydrogen atom, a combination where $R_{201}$ is an alkyl group which may be substituted, and $R_{202}$ is a hydrogen atom, and a combination where $R_{201}$ and $R_{202}$ are combined to form a piperidine ring or an imidazole ring.

In formulae (31-1) and (31-2), n201 is 0 or 1, preferably 1.

In formula (31-1), $R_{203}$ represents a substituent and preferred examples of the substituent include an alkyl group (preferably having a C number of 1 to 20, e.g., methyl, ethyl, n-propyl, isopropyl, n-butyl, n-pentyl, benzyl, 3-sulfopropyl, 4-sulfobutyl, carboxymethyl, 5-carboxypentyl), an alkenyl group (preferably having a C number of 2 to 20, e.g., vinyl, allyl, 2-butenyl, 1,3-butadienyl), a cycloalkyl group (preferably having a C number of 3 to 20, e.g., cyclopentyl, cyclohexyl), an aryl group (preferably having a C number of 6 to 20, e.g., phenyl, 2-chlorophenyl, 4-methoxyphenyl, 3-methylphenyl, 1-naphthyl), a heterocyclic group (preferably having a C number of 1 to 20, e.g., pyridyl, thienyl, furyl, thiazolyl, imidazolyl, pyrazolyl, pyrrolidino, piperidino, morpholino), an alkynyl group (preferably having a C number of 2 to 20, e.g., ethynyl, 2-propynyl, 1,3-butadynyl, 2-phenylethynyl), a halogen atom (e.g., F, Cl, Br, I), an amino group (preferably having a C number of 0 to 20, e.g., amino, dimethylamino, diethylamino, dibutylamino, anilino), a cyano group, a nitro group, a hydroxyl group, a mercapto group, a carboxyl group, a sulfo group, a phosphonic acid group, an acyl group (preferably having a C number of 1 to 20, e.g., acetyl, benzoyl, salicyloyl, pivaloyl), an alkoxy group (preferably having a C number of 1 to 20, e.g., methoxy, butoxy, cyclohexyloxy), an aryloxy group (preferably having a C number of 6 to 26, e.g., phenoxy, 1-naphthoxy), an alkylthio group (preferably having a C number of 1 to 20, e.g., methylthio, ethylthio), an arylthio group (preferably having a C number of 6 to 20, e.g., phenylthio, 4-chlorophenylthio), an alkylsulfonyl group (preferably having a C number of 1 to 20, e.g., methanesulfonyl, butanesulfonyl), an arylsulfonyl group (preferably having a C number of 6 to 20, e.g., benzenesulfonyl, paratoluenesulfonyl), a sulfamoyl group (preferably having a C number of 0 to 20, e.g., sulfamoyl, N-methylsulfamoyl, N-phenylsulfamoyl), a carbamoyl group (preferably having a C number of 1 to 20, e.g., carbamoyl, N-methylcarbamoyl, N,N-dimethylcarbamoyl, N-phenylcarbamoyl), an acylamino group (preferably having a C number of 1 to 20, e.g., acetylamino, benzoylamino), an imino group (preferably having a C number of 2 to 20, e.g., phthalimino), an acyloxy group (preferably having a C number of 1 to 20, e.g., acetyloxy, benzoyloxy), an alkoxycarbonyl group (preferably having a C number of 2 to 20, e.g., methoxycarbonyl, phenoxycarbonyl) and a carbamoylamino group (preferably having a C number of 1 to 20, e.g., carbamoylamino, N-methylcarbamoylamino, N-phenylcarbamoylamino). Among these, more preferred are an alkyl group, an aryl group, a heterocyclic group, a halogen atom, an amino group, a cyano group, a nitro group, a carboxyl group, a sulfo group, an alkoxy group, an alkylthio group, an arylsulfonyl group, a sulfamoyl group, a carbamoyl group and an alkoxycarbonyl group.

In formula (31-1), $R_{203}$ is preferably a nitro group or an alkoxy group, more preferably a nitro group or a methoxy group, and most preferably a nitro group.

In formula (31-1), n202 is an integer of 0 to 5, preferably 0 to 3, more preferably 1 or 2. When n202 is 2 or more, multiple $R_{203}$s may be the same or different and may combine to form a ring. Preferred examples of the ring formed include a benzene ring and a naphthalene ring.

In formula (31-1), when $R_{203}$ is a nitro group, this is preferably substituted to the 2-position or 2,6-position, and when $R_{203}$ is an alkoxy group, this is preferably substituted to the 3,5-position.

In formula (31-1), $R_{204}$ and $R_{205}$ each independently represent a hydrogen atom or a substituent (preferred examples of the substituent are the same as those of the substituent described for $R_{203}$), preferably a hydrogen atom, an alkyl group or an aryl group, more preferably a hydrogen atom, a methyl group or a 2-nitrophenyl group.

Examples of the preferred combination of $R_{204}$ and $R_{205}$ include a combination where $R_{204}$ and $R_{205}$ both are a hydrogen atom, a combination where $R_{204}$ is a methyl group and $R_{205}$ is a hydrogen atom, a combination where $R_{204}$ and $R_{205}$ both are a methyl group, and a combination where $R_{204}$ is a 2-nitrophenyl group and $R_{205}$ is a hydrogen atom. Among these, more preferred is a combination where $R_{204}$ and $R_{205}$ both are a hydrogen atom.

In formula (31-2), $R_{206}$ and $R_{207}$ each independently represent a substituent (preferred examples of the substituent are the same as those of the substituent described for $R_{203}$), preferably an alkoxy group, an alkylthio group, a nitro group or an alkyl group, more preferably a methoxy group.

In formula (31-2), n203 and n204 each independently represent an integer of 0 to 5, preferably from 0 to 2. When n203 and n204 each are 2 or more, multiple $R_{206}$s or $R_{207}$s may be the same or different and may combine to form a ring. Preferred examples of the ring formed include a benzene ring and a naphthalene ring.

In formula (31-2), $R_{206}$ is preferably an alkoxy group substituted to the 3,5-position, more preferably a methoxy group substituted to the 3,5-position.

In formula (31-2), $R_{208}$ represents a hydrogen atom or a substituent (preferred examples of the substituent are the same as those of the substituent described for $R_{203}$), preferably a hydrogen atom or an aryl group, more preferably a hydrogen atom.

In formula (31-3), $R_{209}$ represents a substituent (preferred examples of the substituent are the same as those of the substituent described for $R_{203}$), preferably an alkyl group, an aryl group, a benzyl group or an amino group, more preferably an optionally-substituted alkyl group, a tert-butyl group, a phenyl group, a benzyl group, an optionally-substituted anilino group, or a cyclohexylamino group.

The compound represented by formula (31-3) may be a compound connected to a polymer chain from $R_{209}$.

In formula (31-3), $R_{210}$ and $R_{211}$ each independently represent a hydrogen atom or a substituent (preferred examples of the substituent are the same as those of the substituent described for $R_{203}$), preferably an alkyl group or an aryl group, more preferably a methyl group, a phenyl group or a 2-naphthyl group.

$R_{210}$ and $R_{211}$ may combine with each other to form a ring and preferred examples of the ring formed include a fluorenone ring.

In formula (31-4), $R_{212}$ represents an aryl group or a heterocyclic group, preferably an aryl group or a heterocyclic group shown below:

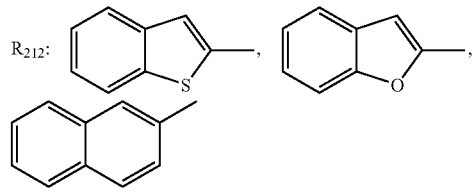

In formula (31-4), $R_{213}$, $R_{214}$ and $R_{215}$ each independently represent a hydrogen atom, an alkyl group, an alkenyl group, a cycloalkyl group, an aryl group or a heterocyclic group (preferred examples of these groups are the same as those described for $R_{201}$ and $R_{202}$), preferably an alkyl group, more preferably a butyl group. $R_{213}$, $R_{214}$ and $R_{215}$ may combine with each other to form a ring and the heterocyclic ring formed is preferably a piperidine ring, a pyrrolidine ring, a piperazine ring, a morpholine ring, a pyridine ring, a quinoline ring or an imidazole ring, more preferably a piperidine ring, a pyrrolidine ring or an imidazole ring.

In formula (31-4), $R_{216}$, $R_{217}$, $R_{218}$ and $R_{219}$ each independently represent an alkyl group or an aryl group and it is preferred that $R_{216}$, $R_{217}$ and $R_{218}$ all are a phenyl group and $R_{219}$ is an n-butyl group or a phenyl group.

The base generator for use in the invention is preferably represented by formula (31-1) or (31-3), more preferably by formula (31-1).

Specific preferred examples of the base generator for use in the invention are set forth below, however, the invention is not limited thereto.

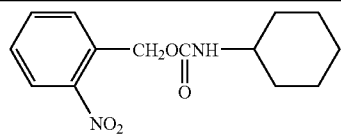

PB-1

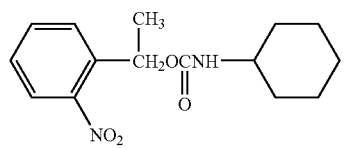

PB-2

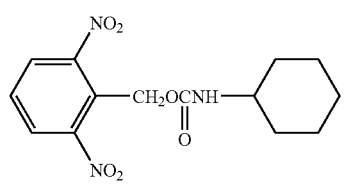

PB-3

-continued
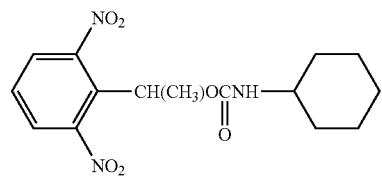
PB-4
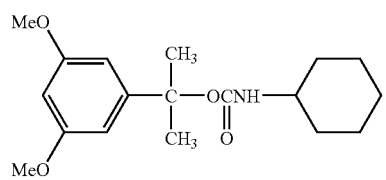
PB-5
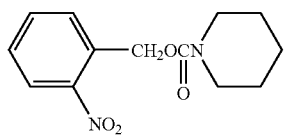
PB-6
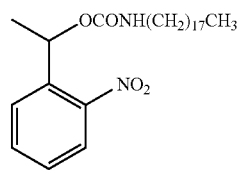
PB-7
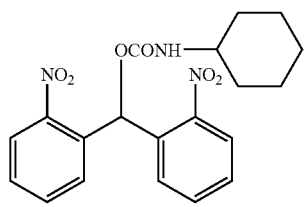
PB-8
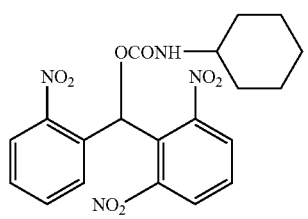
PB-9
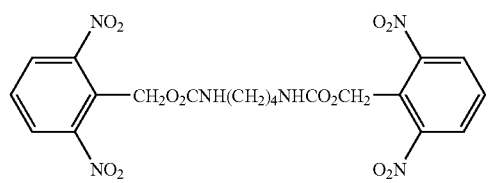
PB-10

-continued
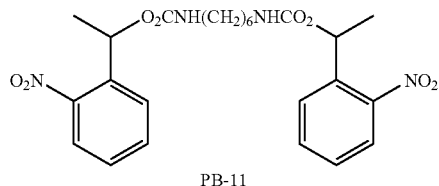
PB-11
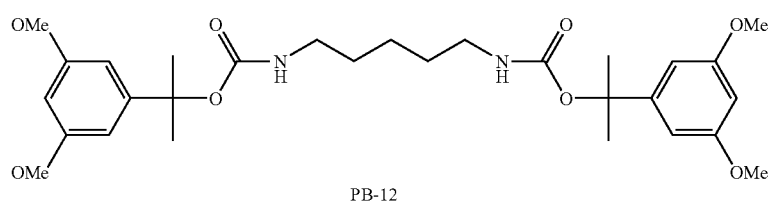
PB-12
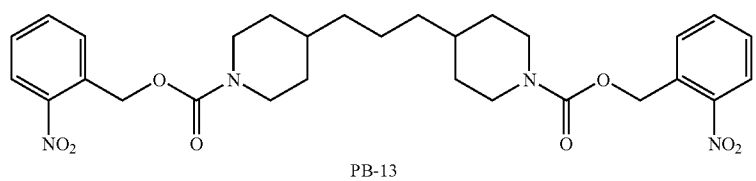
PB-13
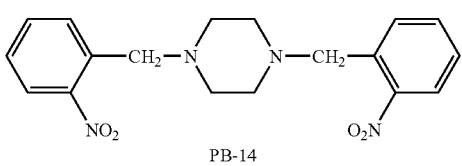
PB-14
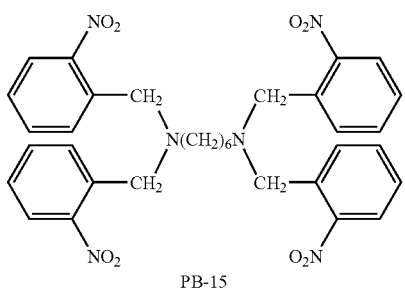
PB-15
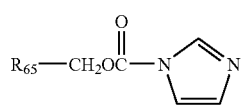
| | $R_{65}$ |
|---|---|
| PB-16 | 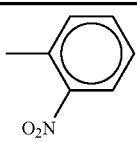 |
| PB-17 | 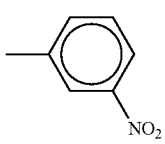 |
| PB-18 | 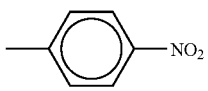 |

-continued
PB-19 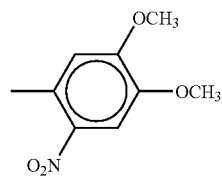
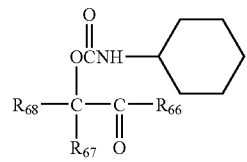
| | $R_{66}$ | $R_{67}$ | $R_{68}$ |
|---|---|---|---|
| PB-20 | 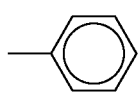 | 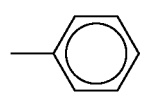 | —H |
| PB-21 | 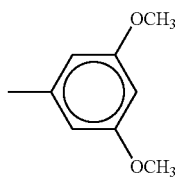 | 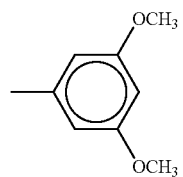 | " |
| PB-22 | 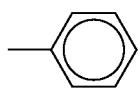 | " | " |
| PB-23 | 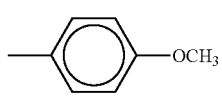 | " | " |

-continued
| | | | |
|---|---|---|---|
| PB-24 | 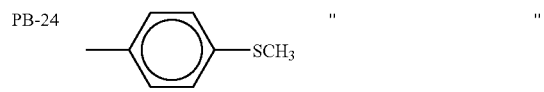 | " | " |
| PB-25 | 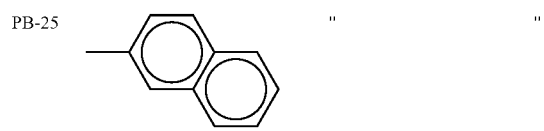 | " | " |
| PB-26 |  | " | |
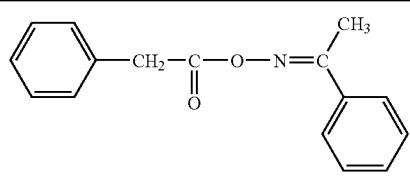
PB-27
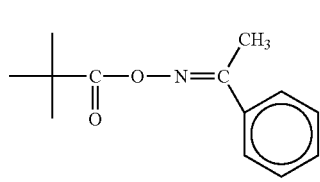
PB-28
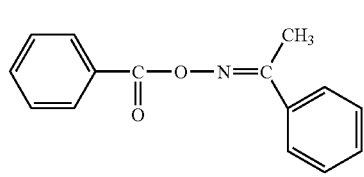
PB-29
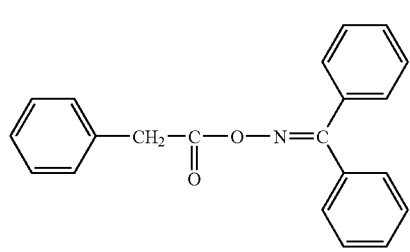
PB-30
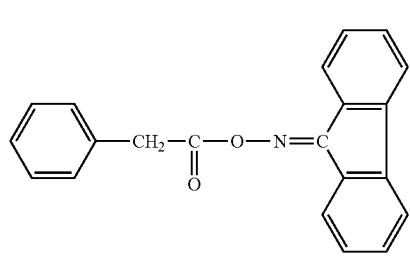
PB-31

-continued
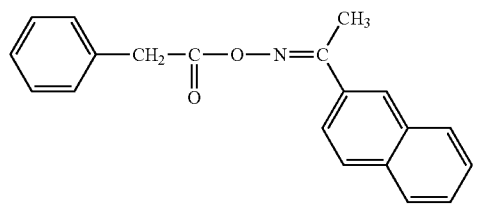
PB-32
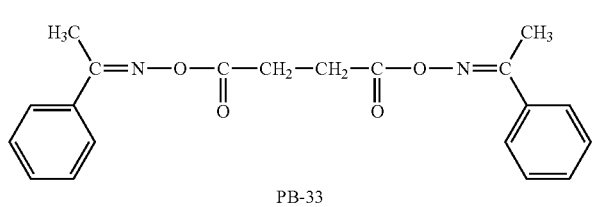
PB-33
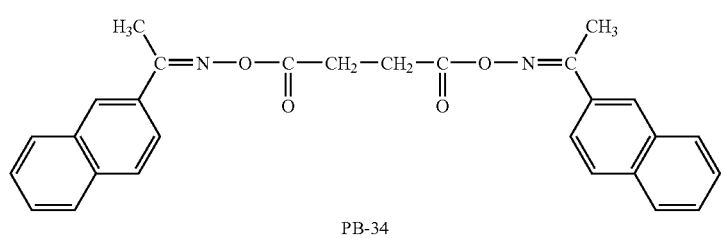
PB-34
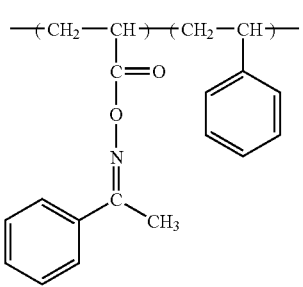
PB-35
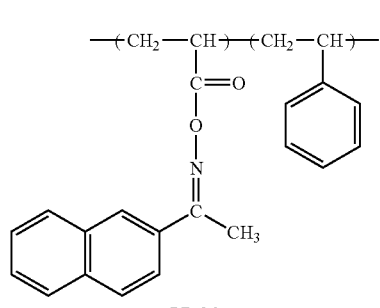
PB-36
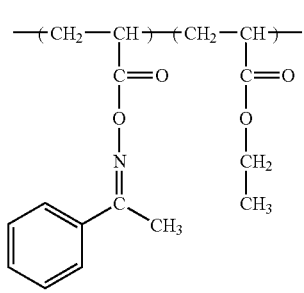
PB-37

-continued
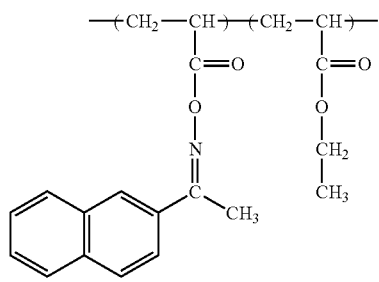
PB-38
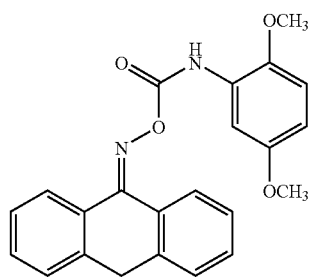
PB-39
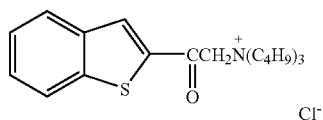
Cl⁻
| PB-40 | 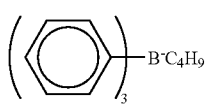 |
| PB-41 | 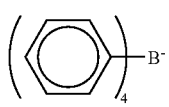 |
| PB-42 |  |
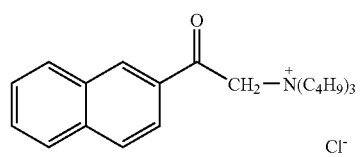
Cl⁻
| PB-43 | 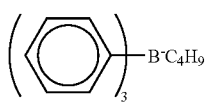 |

-continued
| | |
|---|---|
| PB-44 | 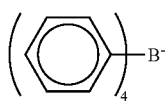 |
| | 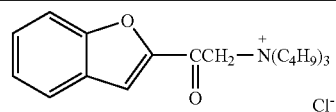 |
| PB-45 | 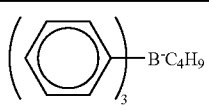 |
| PB-46 | 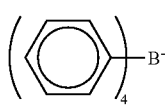 |
| | 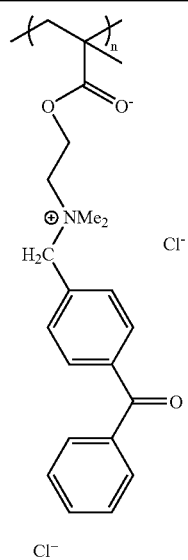 |
| PB-47 | 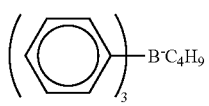 |
| PB-48 | 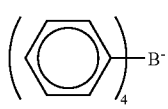 |
| | 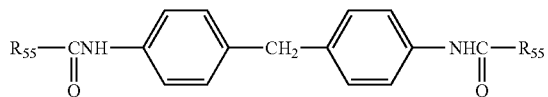 |
| | [Co(III)(NH$_3$)$_5$Br](ClO$_4$)$_2$ |
| | PB-52 |
| | R$_{55}$ |
|---|---|
| PB-49 | —H |
| PB-50 | —CH$_3$ |

-continued

PB-51
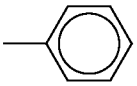

PB-53
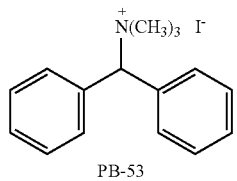

PB-54
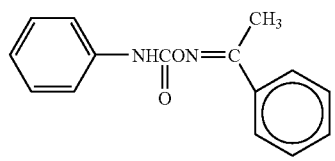

PB-55
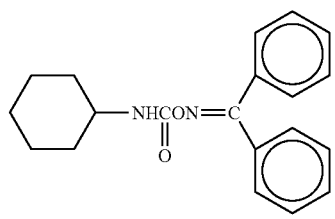

In the embodiment where the recording component of the two-photon absorbing optical recording material of the invention contains at least a base color-forming dye precursor as a type of the dye precursor and a base generator, the base color-forming dye precursor is described below.

The base color-forming dye precursor for use in the invention can be converted into a color-forming material having an absorption shifted to the longer wavelength side than in the original state, by the base generated by the base generator.

Preferably, the base color-forming dye precursor is a compound capable of having an absorption shifted to the longer wavelength side by the action of the base, more preferably the molar absorbance coefficient of the compound significantly increases by the action of the base.

The base color-forming dye precursor for use in the invention is preferably a non-dissociated form of a dissociation-type dye. The dissociation-type dye is a compound in which a dissociative group having a pKa of 12 or less, preferably 10 or less, and capable of readily dissociating to release a proton is present on the dye chromophore and when changed from the non-dissociated form to the dissociated form, absorption is shifted to the longer wavelength side or the colorless state turns to the color-formed state. Preferred examples of the dissociative group include an OH group, an SH group, a COOH group, a $PO_3H_2$ group, a $SO_3H$ group, an $NR_{91}R_{92}H^+$ group, an $NHSO_2R_{93}$ group, a $CHR_{94}R_{95}$ group and an $NHR_{96}$ group.

$R_{91}$, $R_{92}$ and $R_{96}$ each independently represent a hydrogen atom, an alkyl group, an alkenyl group, a cycloalkyl group, an aryl group or a heterocyclic group (preferred examples of these groups are the same as those for $R_{203}$), preferably a hydrogen atom or an alkyl group. $R_{93}$ represents an alkyl group, an alkenyl group, a cycloalkyl group, an aryl group or a heterocyclic group (preferred examples of these groups are the same as those for $R_{203}$), preferably an alkyl group which may be substituted, or an aryl group which may be substituted, more preferably an alkyl group which may be substituted, and the substituent here preferably has electron-withdrawing property and is preferably fluorine.

$R_{94}$ and $R_{95}$ each independently represent a substituent (preferred examples of the substituent are the same as those of the substituent described for $R_{203}$), but an electron-withdrawing group is preferred and this is preferably a cyano group, an alkoxycarbonyl group, a carbamoyl group, an acyl group, an alkylsulfonyl group or an arylsulfonyl group.

The dissociative group in the dissociation-type dye for use in the invention is preferably an OH group, a COOH group, an $NHSO_2R_{93}$ group, an $NHR_{96}$ group or a $CHR_{94}R_{95}$ group, more preferably an OH group or a $CHR_{94}R_{95}$ group, and most preferably an OH group.

The non-dissociated form of a dissociation-type dye, which is preferred as the base-color forming dye precursor for use in the invention, is a non-dissociated form of a dissociation-type azo dye, a dissociation-type azomethine dye, a dissociation-type oxonole dye, a dissociation-type arylidene dye, a dissociation-type xanthene (fluoran) dye or a dissociation-type triphenylamine dye, more preferably a non-dissociated form of a dissociation-type azo dye, a dissociation-type azomethine dye, a dissociation-type oxonole dye or a dissociation-type arylidene dye.

As examples of the base color-forming dye precursor for use in the invention, examples of the non-dissociated form of a dissociation-type dye are set forth below, however, the invention is not limited thereto.

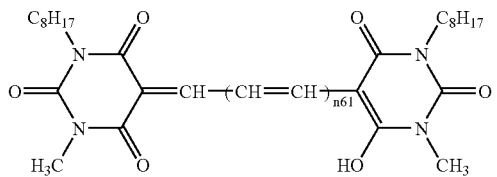
| | $n_{61}$ |
|---|---|
| DD-1 | 1 |
| DD-2 | 2 |
| DD-3 | 3 |
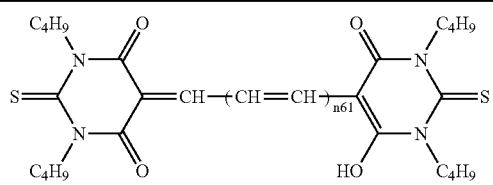
| | $n_{61}$ |
|---|---|
| DD-4 | 0 |
| DD-5 | 1 |
| DD-6 | 2 |
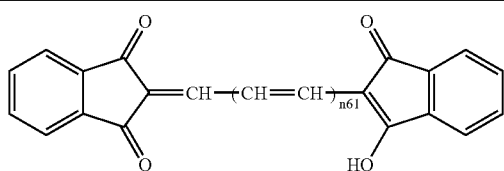
| | $n_{61}$ |
|---|---|
| DD-7 | 0 |
| DD-8 | 1 |
| DD-9 | 2 |
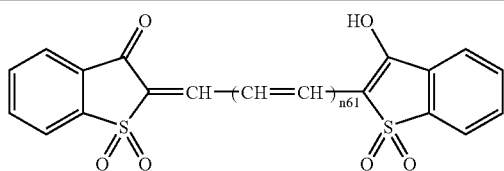
| | $n_{61}$ |
|---|---|
| DD-10 | 0 |
| DD-11 | 1 |
| DD-12 | 2 |
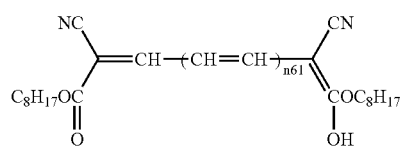
| | $n_{61}$ |
|---|---|
| DD-13 | 0 |
| DD-14 | 1 |
| DD-15 | 2 |

-continued
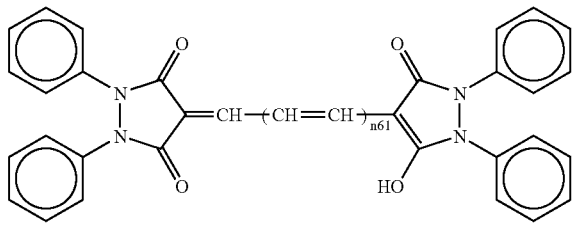
| | $n_{61}$ |
|---|---|
| DD-16 | 0 |
| DD-17 | 2 |
| DD-18 | 3 |
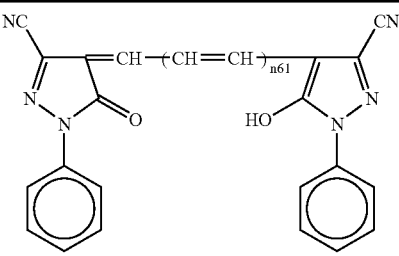
| | $n_{61}$ |
|---|---|
| DD-19 | 1 |
| DD-20 | 2 |
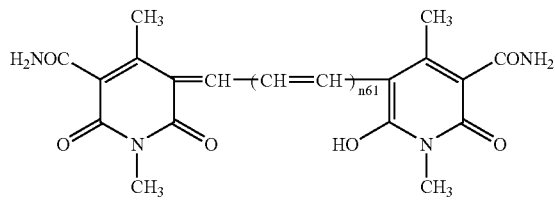
| | $n_{61}$ |
|---|---|
| DD-21 | 1 |
| DD-22 | 2 |
DD-23
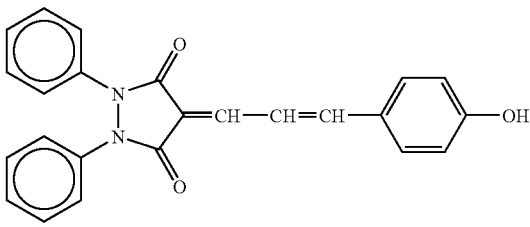
DD-24
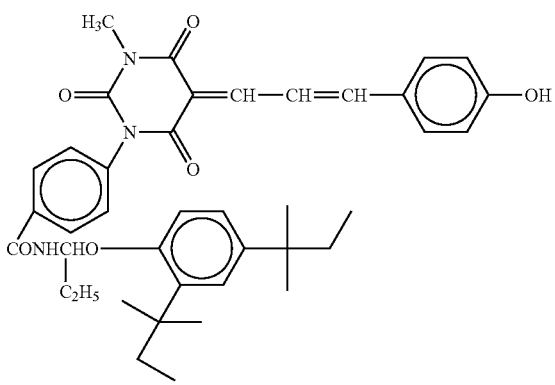

-continued
DD-25 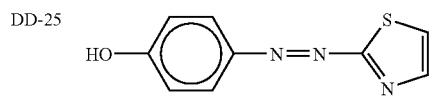
DD-26 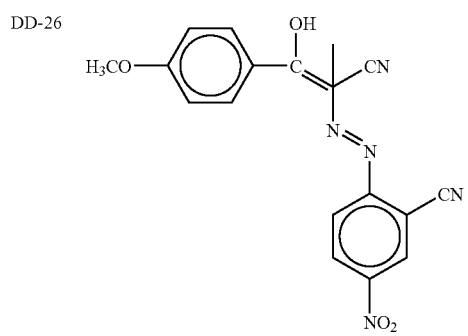
DD-27 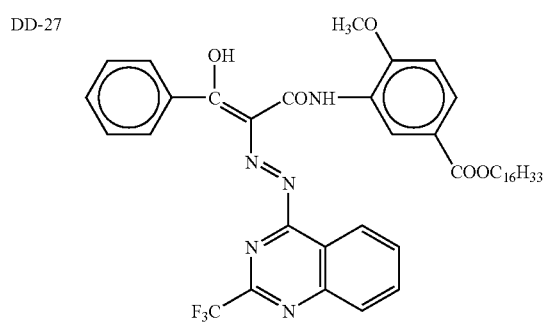
DD-28 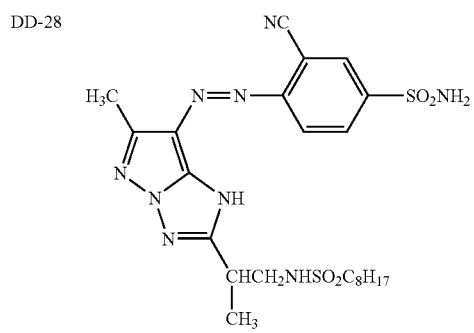
DD-29 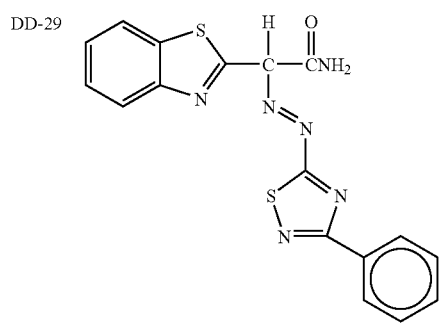

-continued
DD-30
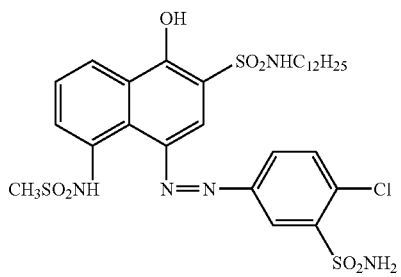
DD-31
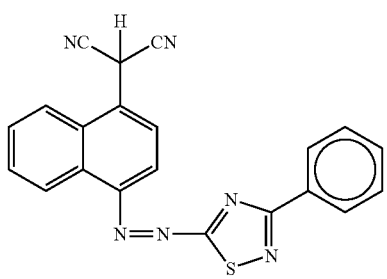
DD-32
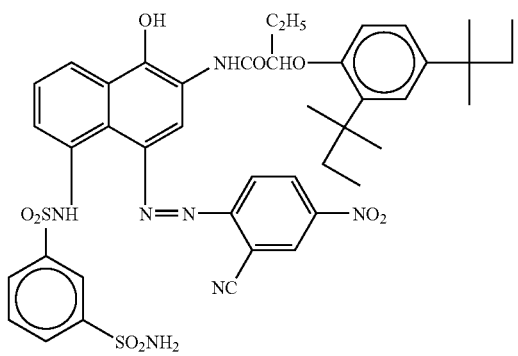
DD-33
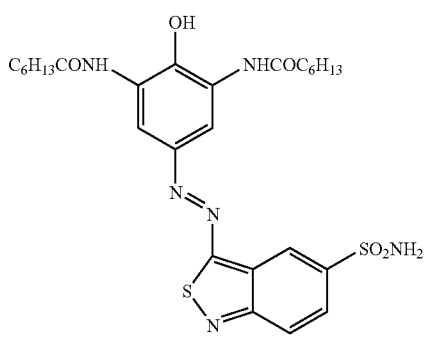
DD-34
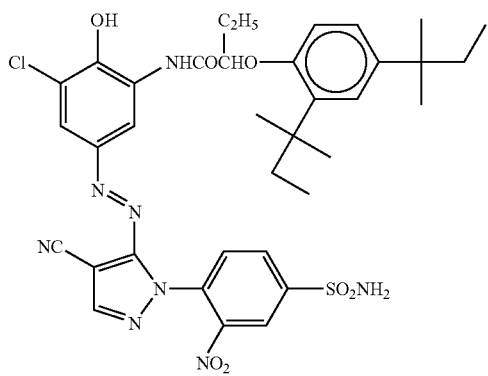

-continued
DD-35
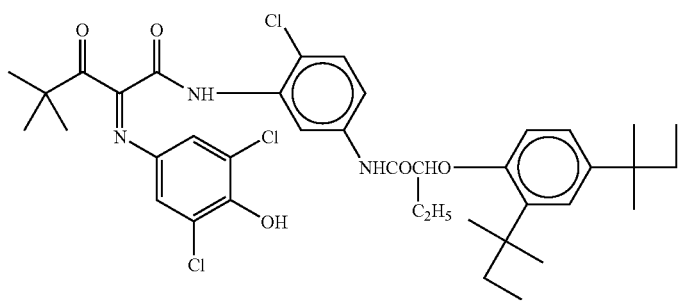
DD-36
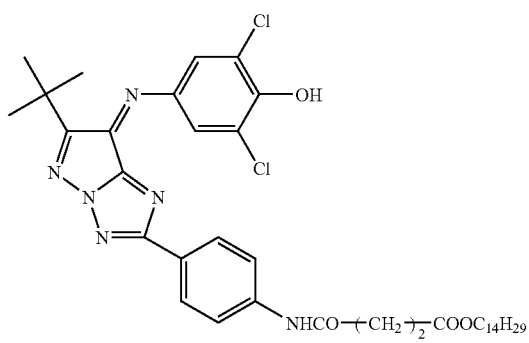
DD-37
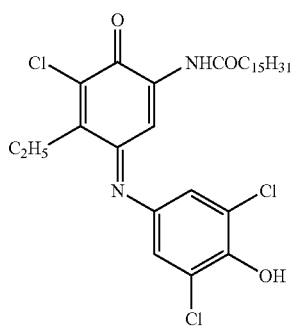
DD-38
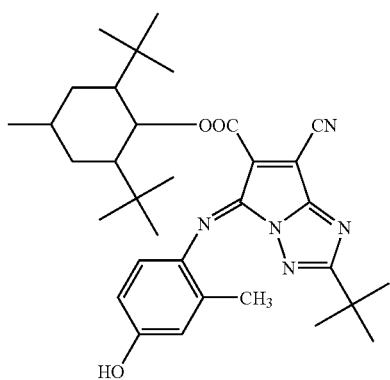

-continued
DD-39
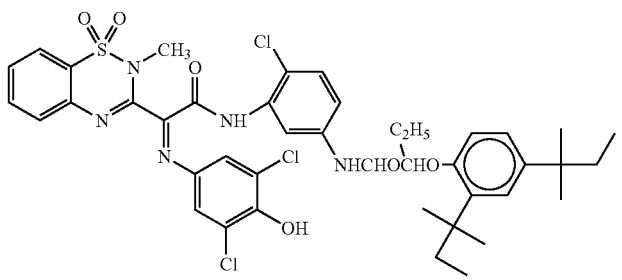
DD-40
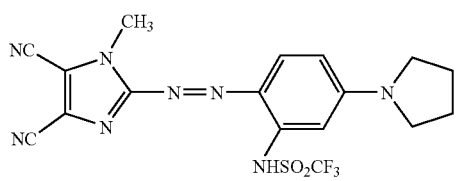
DD-41
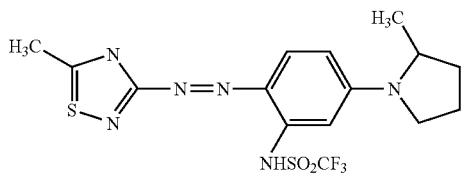
DD-42
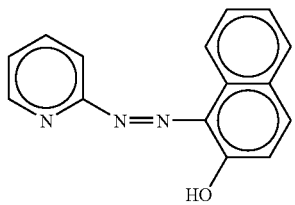
DD-43
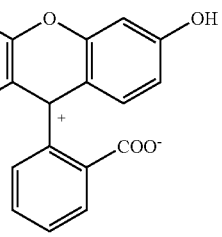
DD-44
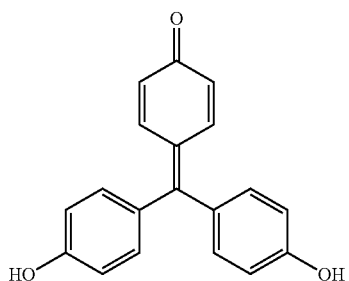

-continued

DD-45
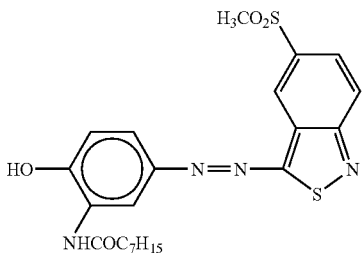

DD-46
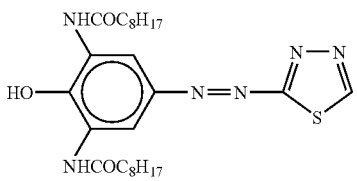

When the recording component for use in the invention contains at least a base color-forming dye precursor as a type of the dye precursor, and a base generator, it may further contain a base-increasing agent.

The base-increasing agent for use in the invention is a compound of increasing a base by using, as a trigger, a small amount of the base generated by the base generator, and this compound is stable in the absence of a base but when a base is present, decomposes to release a base which triggers decomposition of another base-increasing agent to also release a base.

The base-increasing agent is preferably represented by formula (35).

In formula (35), $R_{121}$ and $R_{122}$ each independently represent a hydrogen atom, an alkyl group, an alkenyl group, a cycloalkyl group, an aryl group or a heterocyclic group (preferred examples of these substituents are the same as those of the substituent described for $R_{201}$), more preferably a hydrogen atom, an alkyl group or a cycloalkyl group, even more preferably a hydrogen atom, a methyl group, an ethyl group, a cyclohexyl group or a cyclopentyl group.

$R_{121}$ and $R_{122}$ may combine with each other to form a ring and the heterocyclic ring formed is preferably a piperidine ring, a pyrrolidine ring, a piperazine ring, a morpholine ring, a pyridine ring, a quinoline ring or an imidazole ring, more preferably a piperidine ring, a pyrrolidine ring or an imidazole ring, and most preferably a piperidine ring. Examples of the preferred combination of $R_{121}$ and $R_{122}$ include a combination where $R_{121}$ is a cyclohexyl group which may be substituted, and $R_{122}$ is a hydrogen atom, a combination where $R_{121}$ is an alkyl group which may be substituted, and $R_{122}$ is a hydrogen atom, and a combination where $R_{121}$ and $R_{122}$ are combined to form a piperidine ring or an imidazole ring.

$R_{123}$ and $R_{124}$ each independently represent a hydrogen atom or a substituent (preferred examples of the substituent are the same as those of the substituent described for $R_{203}$), preferably a hydrogen atom, an aryl group or an arylsulfonyl group, more preferably an aryl group.

$R_{123}$ and $R_{124}$ may combine with each other to form a ring and the ring formed is preferably a fluorene ring.

$R_{125}$ and $R_{126}$ each independently represent a hydrogen atom or a substituent (preferred examples of the substituent are the same as those of the substituent described for $R_{203}$), preferably a hydrogen atom or an alkyl group, more preferably a hydrogen atom or a methyl group.

n102 represents an integer of 0 or 1, preferably 1.

The base-increasing agent for use in the invention is more preferably a compound represented by formula (36-1) or (36-2).

In formulae (36-1) and (36-2), $R_{121}$ and $R_{122}$ have the same meanings as in formula (35), and their preferred examples are also the same as therein.

The base-increasing agent for use in the invention is still more preferably a compound represented by formula (36-1).

Specific examples of the base-increasing agent for use in the invention are set forth below, however, the invention is not limited thereto.

BA-1
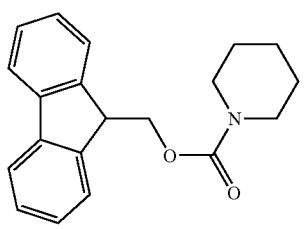

BA-2
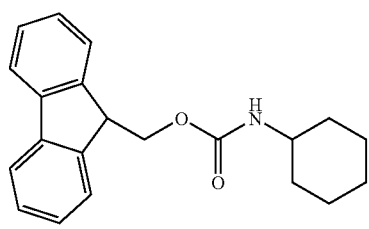

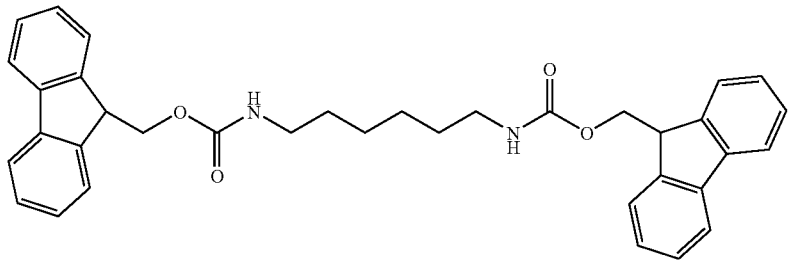

BA-3

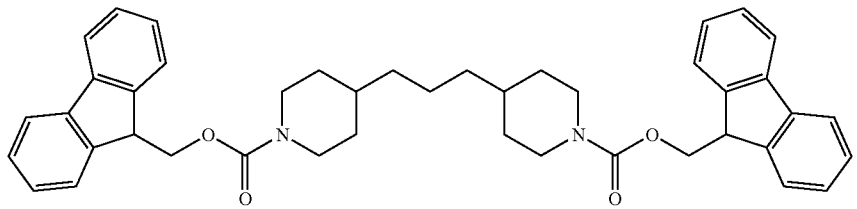

BA-4

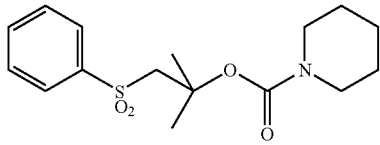

BA-5

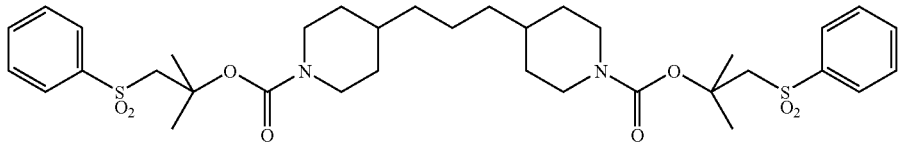

BA-6

During base increase therein, the two-photon absorbing optical recording material of the invention is preferably heated. Therefore, when the material contains a base-increasing agent, it is preferably heated, after exposed.

The recording component in the invention may contain a compound where an organic compound moiety having a function of cutting the covalent bond due to electron or energy transfer with the excited state of a two-photon absorbing compound is covalently bonded with another organic compound moiety to form a compound of which the absorption profile differs when covalently bonded and when released, and this embodiment is described below.

In this embodiment, the recording component preferably contains at least a dye precursor represented by formula (32).

In formula (32), A1 and PD are covalently bonded, A1 represents an organic compound moiety having a function of cutting the covalent bond with PD due to electron or energy transfer with the excited state of a two-photon absorbing compound, and PD represents an organic compound moiety to form a compound of which the absorption profile differs when covalently bonded with A1 and when released from A1 after the covalent bond with A1 has been cut.

A1 is preferably an organic compound moiety having a function of cutting the covalent bond with PD due to electron transfer with the excited state of a two-photon absorbing compound.

PD is preferably a group comprising a dissociation-type dye such as dissociation-type azo dye, dissociation-type azomethine dye, dissociation-type oxonole dye or dissociation-type arylidene dye, or a dye capable of becoming a so-called "leuco dye", such as triphenylmethane dye or xanthene (fluoran) dye, and this is connected to A1 through a covalent bond on the chromophore.

PD is more preferably a dissociation-type azo dye, a dissociation-type azomethine dye, a dissociation-type oxonole dye or a dissociation-type arylidene dye.

Preferably, PD is in the colorless or pale-colored state or showing absorption in the short wavelength region when covalently bonded with A1, but when released as a result of cutting of the covalent bond to A1, it is strongly colored or shows an absorption shifted to the longer wavelength side.

Specific preferred examples of PD are set forth below, however, the invention is not limited thereto.

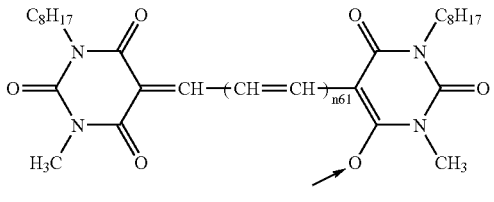

| | $n_{61}$ |
|---|---|
| PD-1 | 1 |
| PD-2 | 2 |
| PD-3 | 3 |

-continued
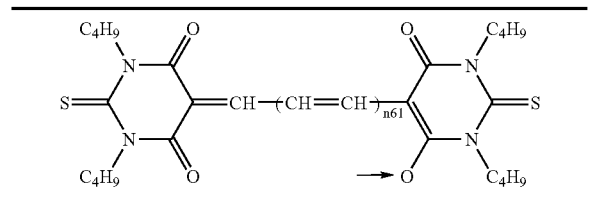
| | $n_{61}$ |
|---|---|
| PD-4 | 0 |
| PD-5 | 1 |
| PD-6 | 2 |
| | $n_{61}$ |
|---|---|
| PD-7 | 0 |
| PD-8 | 1 |
| PD-9 | 2 |
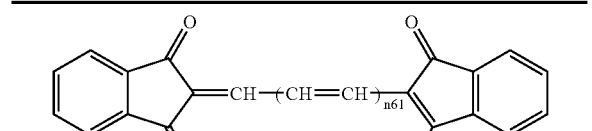
| | $n_{61}$ |
|---|---|
| PD-10 | 0 |
| PD-11 | 1 |
| PD-12 | 2 |
| | $n_{61}$ |
|---|---|
| PD-13 | 0 |
| PD-14 | 1 |
| PD-15 | 2 |
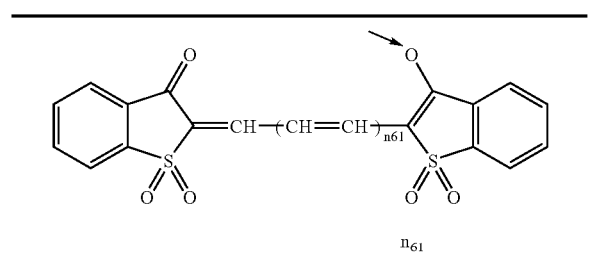
| | $n_{61}$ |
|---|---|
| PD-16 | 0 |
| PD-17 | 2 |
| PD-18 | 3 |
-continued
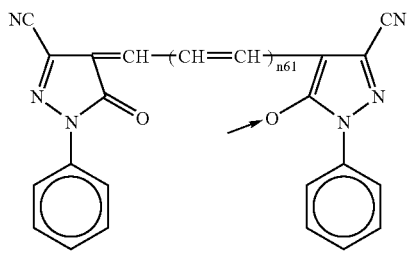
| | $n_{61}$ |
|---|---|
| PD-19 | 1 |
| PD-20 | 2 |
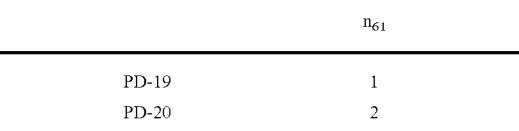
| | $n_{61}$ |
|---|---|
| PD-21 | 0 |
| PD-22 | 1 |
PD-23
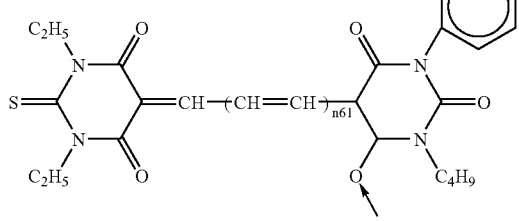
PD-24
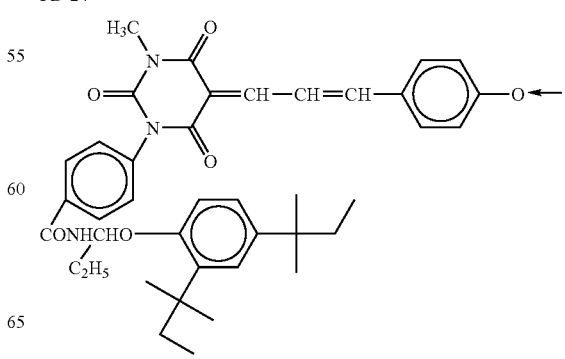

-continued
PD-25
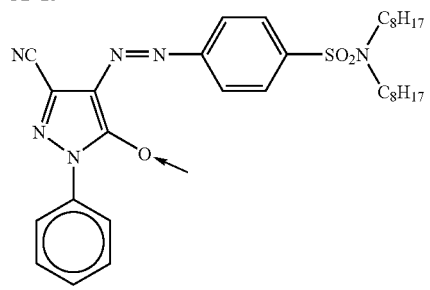
PD-26
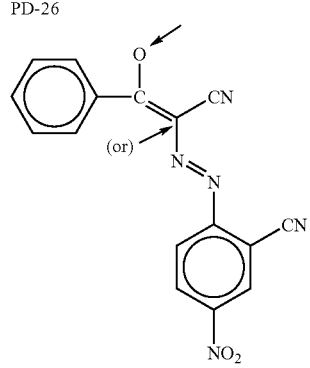
PD-27
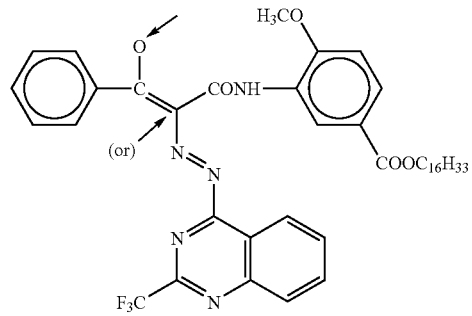
PD-28
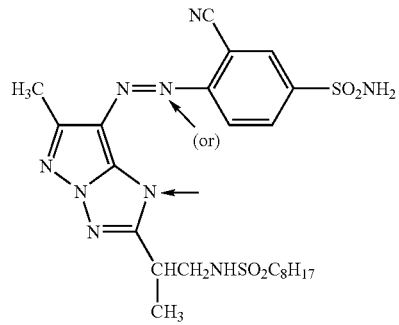
-continued
PD-29
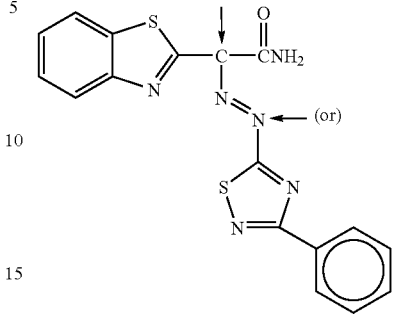
PD-30
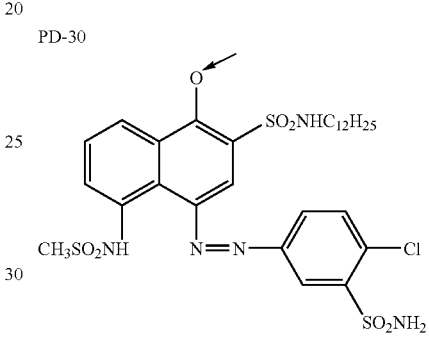
PD-31
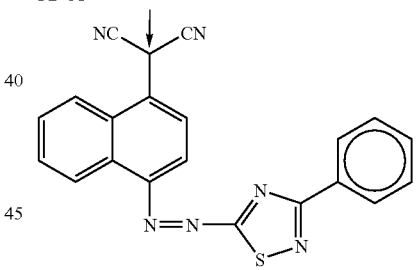
PD-32
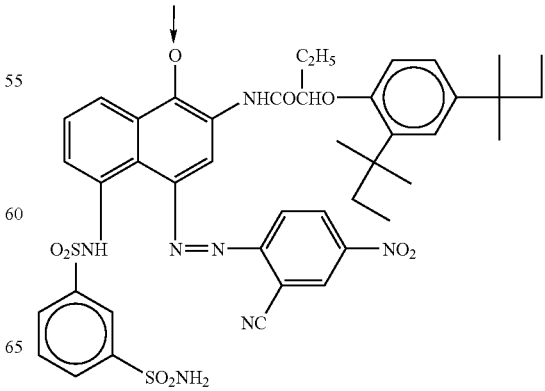

-continued
PD-33
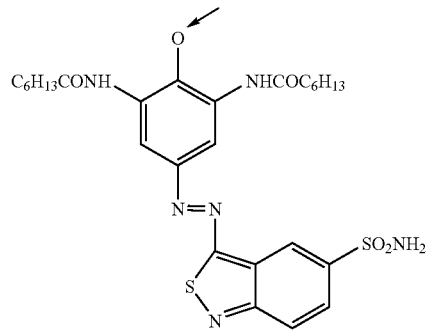
PD-34
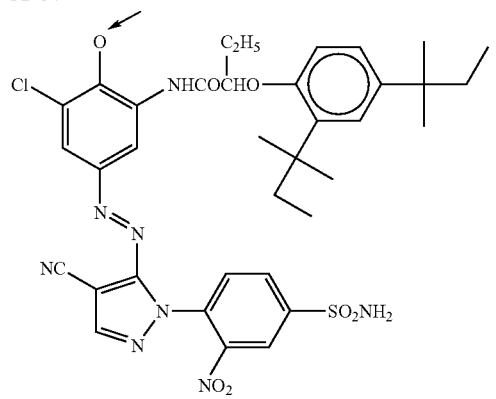
PD-35
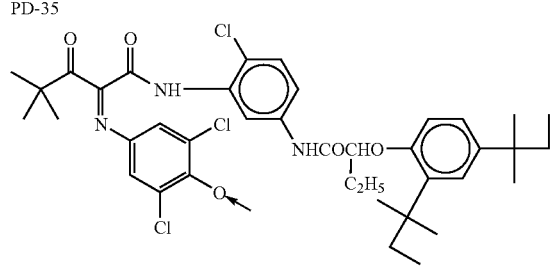
PD-36
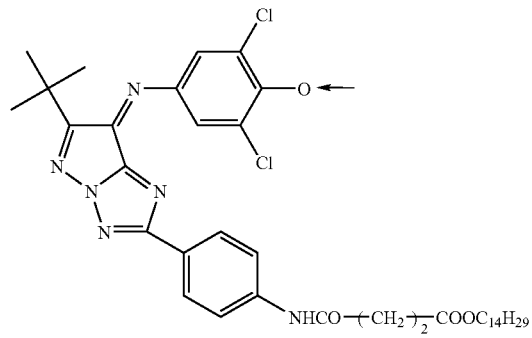
-continued
PD-37
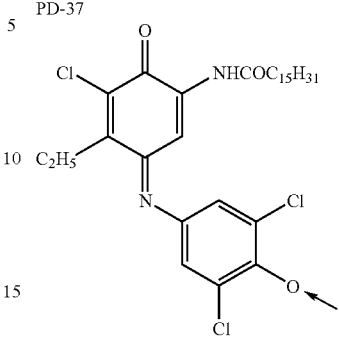
PD-38
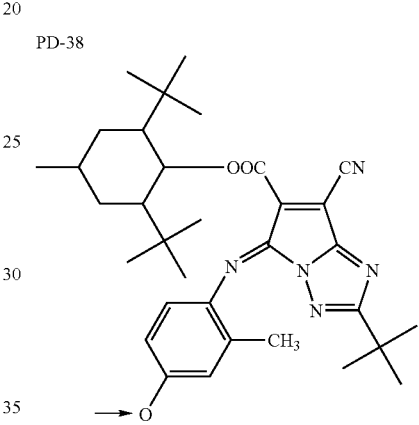
PD-39
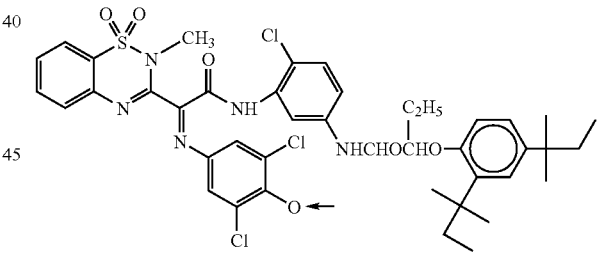
PD-40
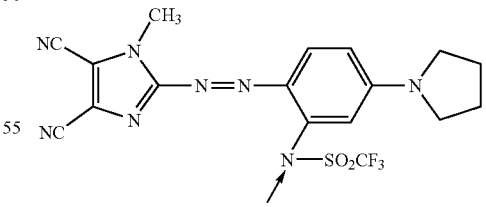
PD-41
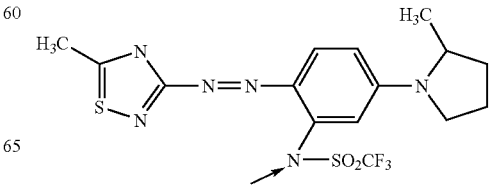

-continued
PD-42
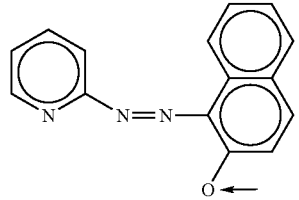
PD-43
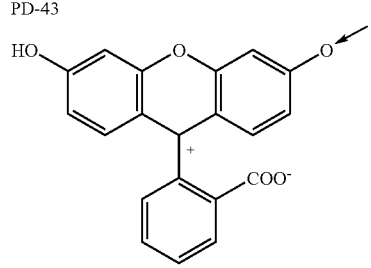
PD-44
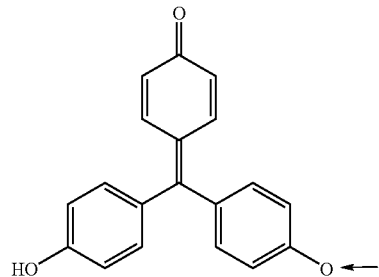
PD-45
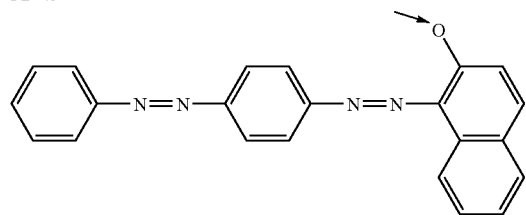
PD-46
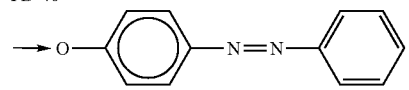
PD-47
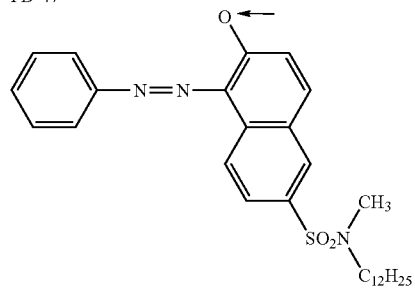
-continued
PD-48
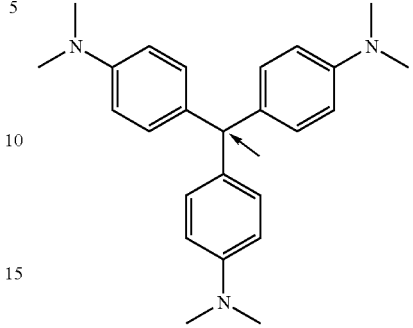
PD-49
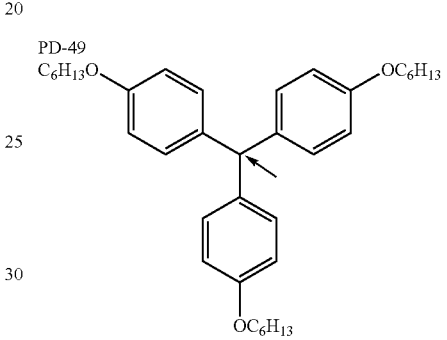
PD-50
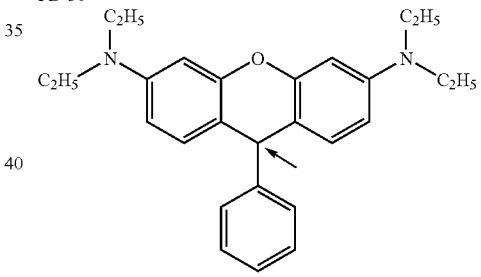
PD-51
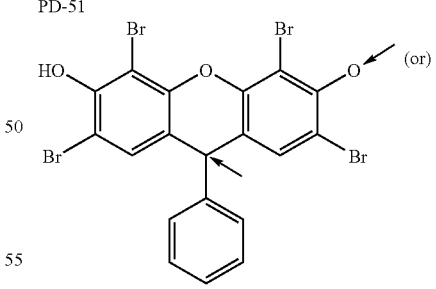
PD-52
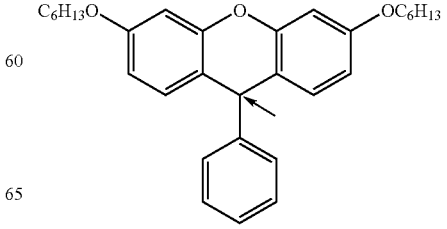

PD-53
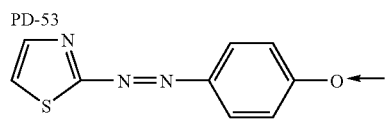

PD-54
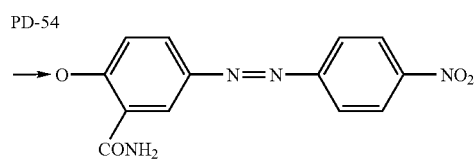

PD-55
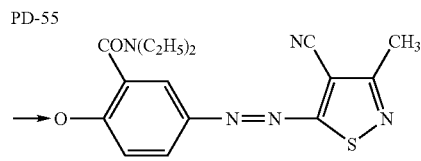

PD-56
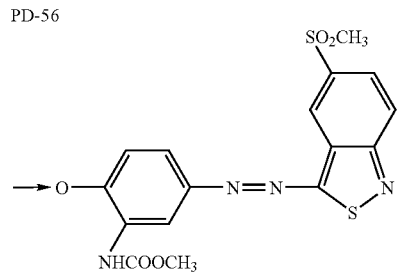

PD-57
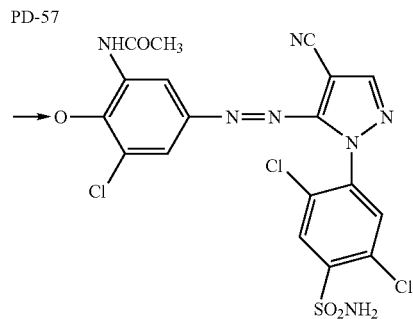

PD-58
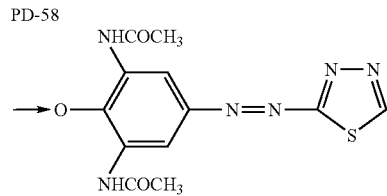

PD-59
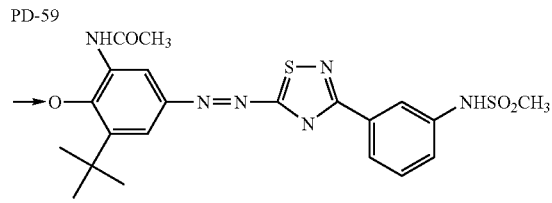

As for the covalent bond with A1, PD may be covalently bonded with any portion of A1 as long as it is on the dye chromophore, but is preferably covalently bonded with A1 at the atom shown by an arrow in the formulae above.

The dye precursor of formula (32) is more preferably a compound represented by any one of formulae (33-1) to (33-6).

In formulae (33-1) to (33-6), PD has the same meaning as in formula (32).

In formula (33-1), $R_{71}$ represents a hydrogen tom or a substituent (preferred examples of the substituent are the same as those of the substituent described for $R_{203}$), preferably an alkyl group or an aryl group, more preferably a tert-butyl group.

$R_{72}$ represents a substituent (preferred examples of the substituent are the same as those of the substituent described for $R_{203}$), preferably an electron-withdrawing group, more preferably a nitro group, a sulfamoyl group, a carbamoyl group, an alkoxycarbonyl group, a cyano group or a halogen atom. a71 represents an integer of 0 to 5 and when a71 is 2 or more, multiple $R_{72}$s may be the same or different and may combine with each other to form a ring. a71 is preferably 1 or 2 and $R_{72}$ is preferably substituted to the 2- or 4-position.

In formula (33-2), $R_{73}$ represents a substituent (preferred examples of the substituent are the same as those of the substituent described for $R_{203}$), preferably an electron-withdrawing group, more preferably a nitro group, a sulfamoyl group, a carbamoyl group, an alkoxycarbonyl group, a cyano group or a halogen atom, still more preferably a nitro group. a72 represents an integer of 0 to 5 and when a72 is 2 or more, multiple $R_{73}$s may be the same or different and may combine with each other to form a ring. a72 is preferably 1 or 2. When a72 is 1, $R_{73}$ is preferably substituted to the 2-position, and when a72 is 2, $R_{73}$ preferably substituted to the 2-position and 4-position or the 2-position and 6-position, more preferably to the 2-position and 6-position.

a73 represents 0 or 1.

In formula (33-3), $R_{74}$ to $R_{77}$ each independently represent an alkyl group, preferably all represent a methyl group.

In formula (33-4), $R_{78}$ and $R_{79}$ each independently represent a substituent (preferred examples of the substituent are the same as those of the substituent described for $R_{203}$), and $R_{79}$ preferably represents an alkoxy group, more preferably a methoxy group. a74 and a75 each independently represent an integer of 0 to 5 and when a74 and a75 each are 2 or more, multiple $R_{78}$s or $R_{79}$s may be the same or different and may combine with each other to form a ring. a74 and a75 each are preferably an integer of 0 to 2, a74 is more preferably 0 or 1 and a73 is more preferably 2. When a 75 is 2, $R_{79}$ is preferably substituted to the 3-position and 5-position.

a76 represents 0 or 1.

In formula (33-5), $R_{80}$ and $R_{81}$ each independently represent a hydrogen atom or a substituent (preferred examples of the substituent are the same as those of the substituent described for $R_{203}$), and $R_{80}$ and $R_{81}$ may combine to form a ring. The ring formed is preferably a benzene ring or a norbornene ring. When a ring is not formed, $R_{80}$ and $R_{81}$ are preferably both a hydrogen atom.

In formula (33-6), $R_{82}$ and $R_{83}$ each independently represent a substituent (preferred examples of the substituent are the same as those of the substituent described for $R_{203}$), preferably an alkyl group, an alkenyl group or an aryl group. $R_{82}$ and $R_{83}$ preferably combine with each other to form a ring and the ring formed is preferably a fluorene ring, a dibenzopyran ring or a tetrahydronaphthalene ring.

The dye precursor represented by formula (32) is more preferably a compound represented by formula (33-1), (33-2) or (33-4).

Preferred examples of the dye precursor represented by formulae (33-1) to (33-6) for use in the invention are set forth below, however, the invention is not limited thereto.

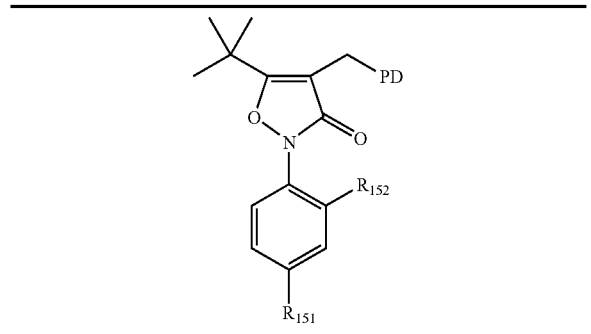

| | R₁₅₁ | R₁₅₂ | PD |
|---|---|---|---|
| E-1 | —CONHC₂H₅ | —NO₂ | PD-2 |
| E-2 | —SO₂N(C₂H₅)₂ | " | PD-9 |
| E-3 | —CONHC₂H₅ | " | PD-12 |
| E-4 | " | " | PD-23 |
| E-5 | " | " | PD-24 |
| E-6 | —SO₂N(C₂H₅)₂ | " | PD-25 |
| E-7 | —CONHC₁₈H₃₃ | —H | PD-26 |
| E-8 | —OC₈H₁₇ | —Cl | PD-28 |
| E-9 | —CONHC₁₆H₃₃ | —CN | PD-36 |
| E-10 | —C₈H₁₇ | —NO₂ | PD-37 |
| E-11 | —CONHC₂H₅ | " | PD-33 |
| E-12 | " | " | PD-34 |
| E-13 | " | " | PD-30 |
| E-14 | " | " | PD-32 |
| E-15 | " | " | PD-35 |
| E-16 | " | " | PD-55 |
| E-17 | " | " | PD-59 |
| E-18 | " | " | PD-56 |
| E-19 | " | " | PD-58 |

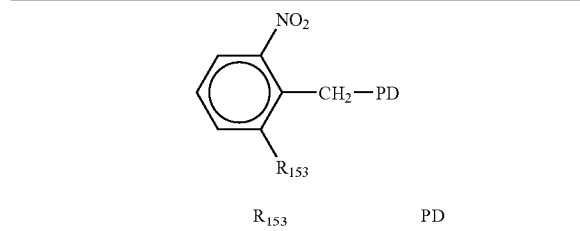

| | R₁₅₃ | PD |
|---|---|---|
| E-20 | H | PD-21 |
| E-21 | " | PD-11 |
| E-22 | —NO₂ | Pd-6 |
| E-23 | H | PD-17 |
| E-24 | " | PD-23 |
| E-25 | —NO₂ | PD-24 |
| E-26 | H | PD-30 |
| E-27 | —NO₂ | PD-33 |
| E-28 | H | PD-29 |
| E-29 | —NO₂ | PD-38 |
| E-30 | H | PD-39 |
| E-31 | " | PD-55 |
| E-32 | —NO₂ | PD-56 |
| E-33 | H | PD-49 |
| E-34 | " | PD-57 |

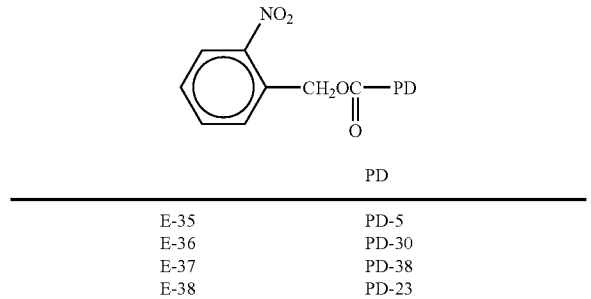

| | PD |
|---|---|
| E-35 | PD-5 |
| E-36 | PD-30 |
| E-37 | PD-38 |
| E-38 | PD-23 |

-continued

| | PD |
|---|---|
| E-39 | PD-59 |
| E-40 | PD-44 |

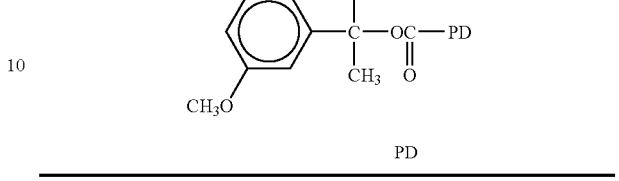

| | PD |
|---|---|
| E-41 | PD-17 |
| E-42 | PD-24 |
| E-43 | PD-31 |
| E-44 | PD-40 |
| E-45 | PD-45 |

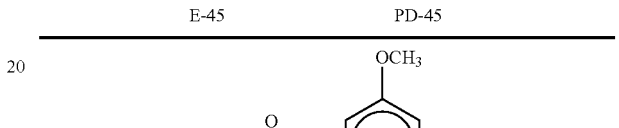

| | PD | n₆₂ |
|---|---|---|
| E-46 | PD-15 | 0 |
| E-47 | PD-32 | 0 |
| E-48 | PD-37 | 0 |
| E-49 | PD-51 | 1 |

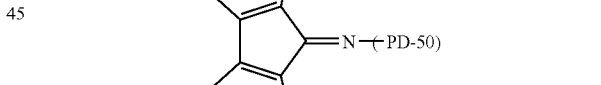

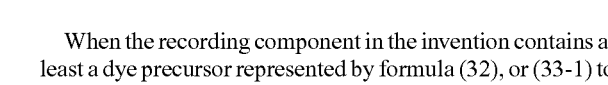

When the recording component in the invention contains at least a dye precursor represented by formula (32), or (33-1) to (33-6), if desired, the two-photon absorbing optical recording material of the invention preferably further contains a base for the purpose of dissociating the produced dissociation-type dye. The base may be either an organic base or an inorganic base and preferred examples thereof include alkylamines, anilines, imidazoles, pyridines, carbonates, hydroxide salts, carboxylates and metal alkoxides. Also, polymers containing such a base are preferably used.

The recording component in the invention may contain a compound capable of undergoing a reaction due to electron transfer with the excited state of a two-photon absorbing compound and changing the absorption profile thereof, and this embodiment is described below.

The compounds capable of undergoing such a reaction are generically named an "electrochromic compound".

Preferred examples of the electrochromic compound for use as the dye precursor in the invention include polypyrroles (preferably, for example, polypyrrole, poly(N-methylpyrrole), poly(N-methylindole) and polypyrrolopyrrole), polythiophenes (preferably, for example, polythiophene, poly(3-hexylthiophene), polyisothianaphthene, polydithienothiophene, poly(3,4-ethylenedioxy)thiophene), polyanilines (preferably, for example, polyaniline, poly(N-naphthylaniline), poly(o-phenylenediamine), poly(aniline-m-sulfonic acid), poly(2-methoxyaniline) and poly(o-aminophenol)), poly(diarylamines), poly(N-vinylcarbazole), Co pyridinoporphyrazine complex, Ni phenanthroline complex and Fe basophenanthroline complex.

In addition, electrochromic materials such as viologens, polyviologens, lanthanoid diphthalocyanines, styryl dyes, TNFs, TCNQ/TTF complexes, Ru trisbipyridyl complexes are also preferred.

The recording component for use in the invention may be a commercially available product or may be synthesized by a known method.

In the two-photon absorbing optical recording material of the invention, an electron-donating compound having an ability to reduce the radical cation of a two-photon absorbing compound, or an electron-accepting compound having an ability to oxidize the radical anion of a two-photon absorbing compound can be preferably used. The use of electron-donating compound is particularly preferable in view of enhancement of color formation property.

Preferred examples of the electron-donating compound include alkylamines (preferably, for example, triethylamine, tributylamine, trioctylamine, N,N-dimethyldodecylamine, triethanolamine and triethoxyethylamine), anilines (preferably for example, N,N-dioctylaniline, N,N-dimethylaniline, 4-methoxy-N,N-dibutylaniline and 2-methoxy-N,N-dibutylaniline), phenylenediamines (preferably for example, N,N,N',N'-tetramethyl-1,4-phenylenediamine, N,N,N',N'-tetramethyl-1,2-phenylenediamine, N,N,N',N'-tetraethyl-1,3-phenylenediamine, N,N'-dibutylphenylenediamine), triphenylamines (preferably, for example, triphenylamine, tri(4-methoxyphenyl)amine, tri(4-dimethylaminophenyl)amine and TPD), carbazoles (preferably, for example, N-vinylcarbazole and N-ethylcarbazole), phenothiazines (preferably, for example, N-methylphenothiazine, N-phenylphenothiazine), phenoxazines (preferably, for example, N-methylphenoxazine, N-phenylphenoxazine), phenazines (preferably, for example, N,N'-dimethylphenazine, N,N'-diphenylphenazine), hydroquinones (preferably, for example, hydroquinone, 2,5-dimethylhydroquinone, 2,5-dichlorohydroquinone, 2,3,4,5-tetrachlorohydroquinone, 2,6-dichloro-3,5-dicyanohydroquinone, 2,3-dichloro-5,6-dicyanohydroquinone, 1,4-dihydroxynaphthalene and 9,10-dihydroxyanthracene), catechols (preferably, for example, catechol and 1,2,4-trihydroxybenzene), alkoxybenzenes (preferably, for example, 1,2-dimethoxybenzene, 1,2-dibutoxybenzene, 1,2,4-tributoxybenzene and 1,4-dihexyloxybenzene), aminophenols (preferably, for example, 4-(N,N-diethylamino)phenol and N-octylaminophenol), imidazoles (preferably, for example, imidazole, N-methylimidazole, N-octylimidazole and N-butyl-2-methylimidazole), pyridines (preferably, for example, pyridine, picoline, lutidine, 4-tert-butylpyridine, 4-octyloxypyridine, 4-(N,N-dimethylamino)pyridine, 4-(N,N-dibutylamino)pyridine and 2-(N-octylamino)pyridine), metallocenes (preferably, for example, ferrocene, titanocene and ruthenocene), metal complexes (preferably, for example, Ru bisbipyridine complexes, Cu phenanthroline complexes, Cu trisbipyridine complexes, Fe EDTA complexes and other complexes of Ru, Fe, Re, Pt, Cu, Co, Ni, Pd, W, Mo, Cr, Mn, Ir and Ag), fine particulate semiconductors (preferably, for example, Si, CdSe, GaP, PbS and ZnS). As the electron-donating compound, phenothiazines is more preferable, still more preferably, N-methylphenothiazine.

Preferred examples of the electron-accepting compound include aromatic compounds having introduced thereinto an electron-withdrawing group (preferably, for example, 1,4-dinitrobenzene, 1,3-dicyanobenzene, 4,5-dichloro-1,2-dicyanobenzene, 4-nitro-1,2-dicyanobenzene, 4-octanesulfonyl-1,2-dicyanobenzene and 1,10-dicyanoanthracene), heterocyclic compounds or heterocyclic compounds having introduced thereinto an electron-withdrawing group (preferably, for example, pyrimidine, pyrazine, triazine, dichloropyrazine, 3-cyanopyrazole, 4,5-dicyano-1-methyl-2-octanoylaminoimidazole, 4,5-dicyano-imidazole, 2,4-dimethyl-1,3,4-thiadiazole, 5-chloro-3-phenyl-1,2,4-thiadiazole, 1,3,4-oxadiazole, 2-chlorobenzothiazole, N-butyl-1,2,4-triazole), N-alkylpyridinium salts (preferably, for example, N-butylpyridinium iodide, N-butylpyridinium bis(trifluoromethanesulfonyl)imide, N-butyl-3-ethoxycarbonyl-pyridinium butanesulfonate, N-octyl-3-carbamoylpyridinium bis(trifluoromethanesulfonyl)imide, N,N-dimethylviologen di(hexafluorophosphate) and N,N-diphenylviologen bis(bis(trifluoromethanesulfonyl)imide)), benzoquinones (preferably, for example, benzoquinone, 2,5-dimethylbenzoquinone, 2,5-dichlorobenzoquinone, 2,3,4,5-tetrachlorobenzoquinone, 2,6-dichloro-3,5-dicyanobenzoquinone, 2,3-dichloro-5,6-dicyanobenzoquinone, naphthoquinone and anthraquinone), imides (preferably, for example, N,N'-dioctylpyromellitimide and 4-nitro-N-octylphthalimide), metal complexes (preferably, for example, Ru trisbipyridine complexes, Ru bisbipyridine complexes, Co trisbipyridine complexes, Cr trisbipyridine complexes, $PtCl_6$ complexes and other complexes of Ru, Fe, Re, Pt, Cu, Co, Ni, Pd, W, Mo, Cr, Mn, Ir and Ag) and fine particulate semiconductors (preferably, for example, $TiO_2$, $Nb_2O_5$, ZnO, $SnO_2$, $Fe_2O_3$ and $WO_3$).

The oxidation potential of the electron-donating compound is preferably baser (on the minus side) than the oxidation potential of a two-photon absorbing compound, or than the reduction potential of the excited state of a two-photon absorbing compound, and the reduction potential of the electron-accepting compound is preferably nobler (on the plus side) than the reduction potential of a two-photon absorbing compound, or than the oxidation potential of the excited state of a two-photon absorbing compound.

The two-photon absorbing optical recording material of the invention preferably contains a binder. The binder is usually used for the purpose of improving the film-forming property of the composition, the uniform film thickness and the storage stability. The binder is preferably well compatible with the two-photon absorbing compound and the recording component in the material.

The binder is preferably a solvent-soluble thermoplastic polymer, and these polymers can be used individually or in combination.

The binder may have a reactive site to react with a crosslinking agent or with a polymerizable monomer or oligomer, thereby to crosslink or harden the recording material. Preferred examples of the reactive site of the binder include, as a radical-reactive site, an ethylenic unsaturated group such as typically an acryl group or a methacryl group, as a cation-reactive site, a residue of an oxirane compound or an oxetane compound, or a vinyl ether group, and, as a polycondensation-reactive site, a residue of a carboxylic acid, an alcohol or an amine.

Specific preferred examples of the binder for use in the invention include acrylates, α-alkyl acrylate esters, acidic polymers and interpolymers (for example, polymethyl methacrylate, polyethyl methacrylate and copolymer of methyl methacrylate with other alkyl(meth)acrylate), polyvinyl esters (for example, polyvinyl acetate, polyvinyl acetate/acrylate, polyvinyl acetate/methacrylate, and hydrolyzed polyvinyl acetate), ethylene/vinyl acetate copolymers, saturated or unsaturated polyurethanes, butadiene and isoprene polymers and copolymers, high molecular weight polyethylene oxides of polyglycol having a weight average molecular weight of around 4,000 to 1,000,000, epoxidates (for example, epoxidate having an acrylate or methacrylate group), polyamides (for example, N-methoxymethyl-polyhexamethylene adipamide), cellulose esters (for example, cellulose acetate, cellulose acetate succinate and cellulose acetate butyrate), cellulose ethers (for example, methyl cellulose, ethyl cellulose, ethyl benzyl cellulose), polycarbonates, polyvinyl acetals (for example, polyvinyl butyral and polyvinyl formal), polyvinyl alcohols, polyvinylpyrrolidones, and acid-containing polymers and copolymers that are disclosed in U.S. Pat. Nos. 3,458,311 and 4,273,857 as those functioning as suitable binders.

In addition, they further include polystyrene polymers and copolymers with, for example, acrylonitrile, maleic anhydride, acrylic acid, methacrylic acid or an ester thereof, vinylidene chloride copolymers (e.g., vinylidene chloride/acrylonitrile copolymer, vinylidene chloride/methacrylate copolymer, vinylidene chloride/vinyl acetate copolymer), polyvinyl chloride and copolymers thereof (e.g., polyvinyl chloride/acetate, vinyl chloride/acrylonitrile copolymer), polyvinyl benzal synthetic rubbers (e.g., butadiene/acrylonitrile copolymer, acrylonitrile/butadiene/styrene copolymer, methacrylate/acrylonitrile/butadiene/styrene copolymer, 2-chlorobutadiene-1,3 polymer, chlorinated rubber, styrene/butadiene/styrene, styrene/isoprene/styrene block copolymer), copolyesters (for example, polymethylene glycol represented by a formula: $HO(CH_2)_nOH$ (wherein n is an integer of 2 to 10), those produced from a reaction product of (1) hexahydroterephthalic acid, sebacic acid and terephthalic acid, (2) terephthalic acid, isophthalic acid and sebacic acid, (3) terephthalic acid and sebacic acid, or (4) terephthalic acid and isophthalic acid, and a mixture of copolyesters produced from (5) the glycol and (i) terephthalic acid, isophthalic acid and sebacic acid or (ii) terephthalic acid, isophthalic acid, sebacic acid and adipic acid), poly-N-vinylcarbazole and copolymers thereof, and carbazole-containing polymers disclosed in H. Kamogawa et al., *Journal of Polymer Science: Polymer Chemistry Edition*, Vol. 18, pp. 9-18 (1979).

In addition, a fluorine atom-containing polymer is also preferred as a low-refractive index binder for use herein. The polymer is preferably a solvent-soluble polymer containing a fluoro-olefin as an essential component and containing, as a copolymerization component, one or more unsaturated monomers selected from an alkyl vinyl ether, an alicyclic vinyl ether, a hydroxyvinyl ether, an olefin, a halo-olefin, an unsaturated carboxylic acid or an ester thereof, and a vinyl carboxylate. The weight average molecular weight thereof is preferably from 5,000 to 200,000 and the fluorine atom content thereof is preferably from 5 to 70% by weight.

As the fluoro-olefin in the fluorine atom-containing polymer, for example, tetrafluoroethylene, chlorotrifluoroethylene, vinyl fluoride or vinylidene fluoride is used. As for another copolymerization component, examples of the alkyl vinyl ether include ethyl vinyl ether, isobutyl vinyl ether and n-butyl vinyl ether, examples of the alicyclic vinyl ether include cyclohexyl vinyl ether and derivatives thereof, examples of the hydroxyvinyl ether include hydroxybutyl vinyl ether, examples of the olefin and halo-olefin include ethylene, propylene, isobutylene, vinyl chloride and vinylidene chloride, examples of the vinyl carboxylate include vinyl acetate and n-vinyl butyrate, examples of the unsaturated carboxylic acid and ester thereof include unsaturated carboxylic acids such as (meth)acrylic acid and crotonic acid, C1-C18 alkyl esters of (meth)acrylic acid, such as methyl(meth)acrylate, ethyl (meth)acrylate, propyl(meth)acrylate, isopropyl (meth)acrylate, butyl(meth)acrylate, hexyl(meth)acrylate, octyl(meth)acrylate and lauryl(meth)acrylate, C2-C8 hydroxyalkyl esters of (meth)acrylic acid, such as hydroxyethyl (meth)acrylate and hydroxypropyl (meth)acrylate, N,N-dimethylaminoethyl(meth)acrylate and N,N-diethylaminoethyl(meth)acrylate. These radical polymerizable monomers may be used individually or in combination of two or more thereof and if desired, a part of the monomer may be replaced by another radical polymerizable monomer, for example, vinyl compound such as styrene, α-methylstyrene, vinyltoluene and (meth)acrylonitrile. Other than these, monomer derivatives such as carboxylic acid group-containing fluoro-olefin and glycidyl group-containing vinyl ether can also be used.

Specific examples of the fluorine atom-containing polymer include "Lumiflon" series (for example, Lumiflon LF200, weight average molecular weight: about 50,000, produced by Asahi Glass Company) having a hydroxyl group and being soluble in an organic solvent. In addition, organic solvent-soluble fluorine atom-containing polymers are commercially available also from Daikin Kogyo Co., Ltd. and Central Glass Co., Ltd. and these can also be used.

Preferably, the binder for use in the two-photon absorbing optical recording material of the invention has a refractive index of at most 1.5.

If desired, the two-photon absorbing optical recording material of the invention may contain various additives such as polymerizable monomer, polymerizable oligomer, crosslinking agent, heat stabilizer, plasticizer and solvent.

Preferred examples of the polymerizable monomer, polymerizable oligomer and crosslinking agent usable in the two-photon absorbing optical recording material of the invention are described, for example, in Japanese Patent Application No. 2003-82732.

A heat stabilizer may be added to the two-photon absorbing optical recording material of the invention for improving the storage storability of the material.

Useful examples of the heat stabilizer include hydroquinone, phenidone, p-methoxyphenol, alkyl- or aryl-substituted hydroquinone or quinone, catechol, tert-butylcatechol, pyrogallol, 2-naphthol, 2,6-di-tert-butyl-p-cresol, phenothiazine and chloranil. In addition, dinitroso dimers described in U.S. Pat. No. 4,168,982 by Pazos are also useful.

The plasticizer is used for varying the adhesive property, flexibility, hardness and other various mechanical properties of the two-photon absorbing optical recording material. Examples of the plasticizer include triethylene glycol dicaprylate, triethylene glycol bis(2-ethylhexanoate), tetraethylene glycol diheptanoate, diethyl sebacate, dibutyl suberate, tris(2-ethylhexyl) phosphate, tricresyl phosphate and dibutyl phthalate.

Generally, the percentage of each component in the two-photon absorbing optical recording material of the invention is preferably in the following range based on the entire mass of the composition:

(Reactive) binder, polymerizable monomer, polymerizable oligomer, crosslinking agent: preferably from 0 to 95% by weight, more preferably from 30 to 95% by weight.

Recording component: preferably from 3 to 80% by weight, more preferably from 5 to 60% by weight.

Two-photon absorbing compound: preferably from 0.01 to 10% by weight, more preferably from 0.1 to 3% by weight.

Compositions for the two-photon absorbing optical recording material of the invention may be prepared by an ordinary method, for example, by adding the above-described essential components and optional components directly as they are or optionally along with a solvent.

Examples of the solvent include a ketone solvent such as methyl ethyl ketone, methyl isobutyl ketone, acetone and cyclohexanone, an ester solvent such as ethyl acetate, butyl acetate, ethylene glycol diacetate, ethyl lactate and cellosolve acetate, a hydrocarbon solvent such as cyclohexane, toluene and xylene, an ether solvent such as tetrahydrofuran, dioxane and diethyl ether, a cellosolve solvent such as methyl cellosolve, ethyl cellosolve, butyl cellosolve and dimethyl cellosolve, an alcohol solvent such as methanol, ethanol, n-propanol, 2-propanol, n-butanol and diacetone alcohol, a fluorine-containing solvent such as 2,2,3,3-tetrafluoropropanol, a halogenated hydrocarbon solvent such as dichloromethane, chloroform and 1,2-dichloroethane, and an amide solvent such as N,N-dimethylformamide.

The composition for the two-photon absorbing optical recording material of the invention may be directly applied onto a substrate by using a spin coater, a roll coater or a bar coater or may be cast as a film and then laminated on a substrate by an ordinary method, whereby the two-photon absorbing optical recording material can be completed.

The term "substrate" as used herein means a natural or synthetic support, preferably in the form of a soft or rigid film, sheet or plate.

Preferred examples of the substrate include polyethylene terephthalate, resin-undercoated polyethylene terephthalate, polyethylene terephthalate subjected to flame or electrostatic discharge treatment, cellulose acetate, polycarbonate, polymethyl methacrylate, polyester, polyvinyl alcohol and glass.

The solvent used can be removed by evaporation at the drying. For the removal by evaporation, heating or reduced pressure may be used.

Furthermore, a protective layer for blocking oxygen may be formed on the two-photon absorbing optical recording material. The protective layer may be formed by laminating a plastic-made film or sheet such as polyolefin (e.g., polypropylene, polyethylene), polyvinyl chloride, polyvinylidene chloride, polyvinyl alcohol, polyethylene terephthalate or cellophane film, with use of electrostatic adhesion or an extruder or by applying a solution of such a polymer. Also, a glass sheet may be laminated. Between the protective layer and the photosensitive film and/or between the substrate and the photosensitive film, an adhesive or a liquid substance may be allowed to be present so as to increase the air tightness.

The second aspect of the invention that provides a photosensitive polymer composition is described in detail hereinunder.

The photosensitive polymer composition of the invention comprises at least 4 components of (A) a polymer compound, (B) a two-photon absorbing compound, (C) an acid generator, and (D) a compound capable of exhibiting or changing its color by an acid, and it undergoes color formation or color change through non-resonant two-photon absorption. If desired, it may contain additives such as heat stabilizer, plasticizer and solvent. These components are described in detail hereinunder.

The polymer compound (A) to be in the photopolymerizable composition of the invention is described.

The polymer compound for use in the invention is not specifically defined, and it may be an organic polymer compound or an inorganic polymer compound. The organic polymer compound is preferably a solvent-soluble thermoplastic polymer, and one or more such polymers may be used herein either singly or as combined. Preferably, the polymer is well miscible with the two-photon absorbing compound, the acid generator and the compound capable of exhibiting or changing its color by an acid, in the composition. Preferred examples of the polymer compound for use in this aspect of the invention may be the same as those mentioned hereinabove for the binder preferably to be in the above-mentioned two-photon absorbing optical recording material.

The description of the two-photon absorbing compound (B) in the photopolymerizable composition of the invention may be the same as that given hereinabove for the two-photon absorbing optical recording material.

The acid generator (C) in the photosensitive polymer composition of the invention is described.

The acid generator for use in the invention is a compound capable of generating an acid (Broensted acid or Lewis acid) as a result of energy or electron transfer from the excited state of a two-photon absorbing compound produced through non-resonant two-photon absorption.

Preferred examples of the acid generator for use in the invention are described below, however, the acid generator for use in the invention is not limited to these compounds. If desired, these acid generators may be used as a mixture of two or more of them combined in any desired ratio.

1) Onium Salt-Based Acid Generator:

The onium salt-based acid generator for use in the invention includes a diazonium salt-based acid generator, an iodonium salt-based acid generator, and a sulfonium salt-based acid generator.

For the diazonium salt-based acid generator for use in the invention, for example, mentioned are the compounds described in S. I. Schlesinger, *Photogr. Sci. Eng.*, 18, 387 (1974), T. S. Bal, et al., *Polymer*, 21, 423 (1980).

The diazonium salt-based acid generator for use in the invention is preferably represented by the following formula (6):

Formula (6):

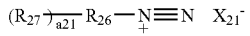

wherein $R_{26}$ represents an aryl group or a heterocyclic group (preferred examples of the substituent are the same as those of the substituent described above for $Za^1$), preferably an aryl group, more preferably a phenyl group;

$R_{27}$ represents a substituent (preferred examples of the substituent are the same as those of the substituent described above for $Za^1$; a21 represents an integer of 0 to 5, preferably 0 to 2, and when a21 is 2 or more, multiple $R_{27}$s may be the same or different or may combine with each other to form a ring; and $X_{21}^-$ is an anion such that $HX_{21}$ becomes an acid having a pKa of 4 or less (in water, 25° C.), preferably 3 or less, more preferably 2 or less, and preferred examples thereof include chloride, bromide, iodide, tetrafluoroborate, hexafluorophosphate, hexafluoroarcenate, hexafluoroantimonate, perchlorate, trifluoromethanesulfonate, 9,10-dimethoxyanthracene-2-sulfonate, methanesulfonate, benzenesulfonate, 4-trifluoromethylbenzenesulfonate, tosylate and tetra(pentafluorophenyl)borate.

Specific examples of the diazonium-based acid generator include the above-described $X_{21}^-$ salts of benzenediazonium, 4-methoxydiazonium and 4-methyldiazonium.

The iodonium salt-based acid generator for use in the invention includes, for example, iodonium salt-based acid generators described in J. V. Crivello, et al., Macromolecules, 10(6), 1307 (1977), Chem. & Eng. News, Nov. 28, 31 (1988), EP 104,143, U.S. Pat. No. 330,049, U.S. Pat. No. 410,201, JP-A-58-29803, JP-A-1-287105, JP-A-2-150848, JP-A-2-296514, and Japanese Patent Application No. 3-5569.

The iodonium salt-based acid generator for use in the invention is preferably a diaryliodonium salt-based acid generator represented by the following formula (7):

Formula (7):

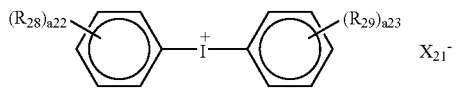

In formula (7), $X_{21}^-$ has the same meaning as in formula (6), $R_{28}$ and $R_{29}$ each independently represent a substituent (preferred examples of the substituent are the same as those of the substituent described above for $Za^1$), preferably an alkyl group, an alkoxy group, a halogen atom, a cyano group or a nitro group, a22 and a23 each independently represent an integer of 0 to 5, preferably 0 or 1, and when a21 is 2 or more, multiple $R_{28}$s or $R_{29}$s may be the same or different and may combine with each other to form a ring.

Specific examples of the diaryliodonium salt-based acid generator include chloride, bromide, iodide, tetrafluoroborate, hexafluorophosphate, hexafluoroarcenate, hexafluoroantimonate, perchlorate, trifluoromethanesulfonate, 9,10-dimethoxyanthracene-2-sulfonate, methanesulfonate, benzenesulfonate, 4-trifluoromethylbenzenesulfonate, tosylate and tetra(pentafluorophenyl)borate of diphenyliodonium, 4,4'-dichlorodiphenyliodonium, 4,4'-dimethoxydiphenyliodonium, 4,4'-dimethyldiphenyliodonium, 4,4'-tert-butyldiphenyliodonium, 3,3'-dinitrodiphenyliodonium, phenyl(p-methoxyphenyl)iodonium and bis(p-cyanophenyl)iodonium, and also I-1 to I-3 mentioned below.

I-1:

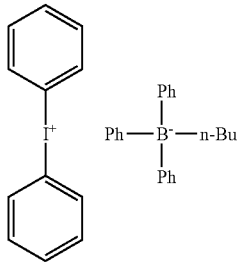

I-2:

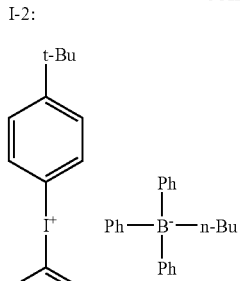

I-3:

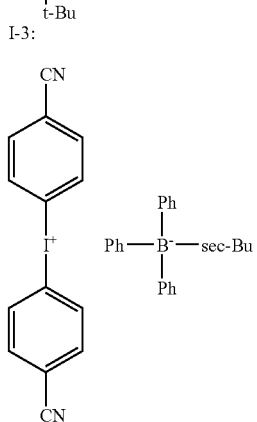

The sulfonium salt-based acid generator for use in the invention includes, for example, sulfonium salts described in J. V. Crivello, et al., Polymer J., 17, 73 (1985), J. V. Crivello, et al., J. Org. Chem., 43, 3055 (1978), W. R. Watt, et al., J. Polymer Sci., Polymer Chem. Ed., 22, 1789 (9184), J. V. Crivello, et al., Polymer Bull., 14, 279 (1985), J. V. Crivello, et al., Macromolecules, 14(5), 1141 (1981), J. V. Crivello, et al., J. Polymer Sci., Polymer Chem. Ed., 17, 2877(1979), EP Nos. 370,693, 390,214,233,567, 397,443,297,442, U.S. Pat. Nos. 4,933,377, 161,811, 410,201, 339,049, 4,760,013, 4,734,444, 2,833,827, German Patent Nos. 2,904,626, 3,604,580, 3,604,581, JP-A-7-25846, 7-28237, 7-92675, 8-27120, J. Photopolym. Sci., Tech., Vol. 7, No. 3, 423 (1994).

The sulfonium salt-based acid generator for use in the invention is preferably represented by the following formula (8):

Formula (8):

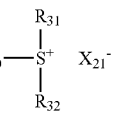

In formula (8), $X_{21}^-$ has the same meaning as in formula (6), and $R_{30}$, $R_{31}$ and $R_{32}$ each independently represent an alkyl group, an aryl group or a heterocyclic group (preferred examples of these groups are the same as those for $Za^1$), preferably an alkyl group, a phenacyl group or an aryl group.

Specific examples of the sulfonium salt-based acid generator include chloride, bromide, tetrafluoroborate, hexafluorophosphate, hexafluoroarcenate, hexafluoroantimonate, perchlorate, trifluoromethanesulfonate, 9,10- dimethoxyanthracene-2-sulfonate, methanesulfonate, benzenesulfonate, 4-trifluoromethylbenzenesulfonate, tosylate and tetra(pentafluorophenyl)borate of sulfonium salts such as triphenylsulfonium, diphenylphenacylsulfonium, dimethylphenacylsulfonium, benzyl-4-hydroxyphenylmethylsulfonium, 4-tertiary-butyltriphenylsulfonium, tris(4-methylphenyl)sulfonium, tris(4-methoxyphenyl)sulfonium and 4-thiophenyltriphenylsulfonium, and I-4 to I-10 mentioned below.

I-4:

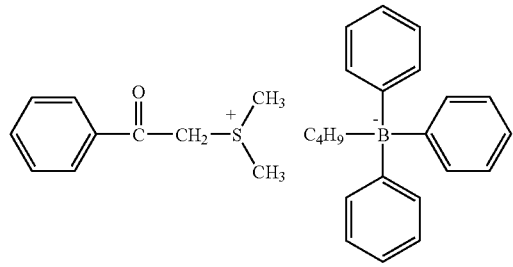

I-5:

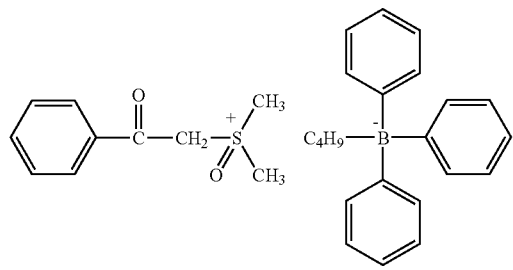

I-6:

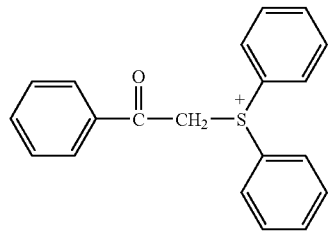

I-7:

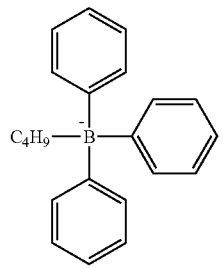
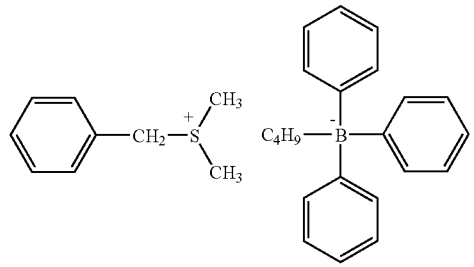

I-8:

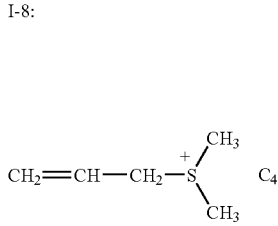

I-9:

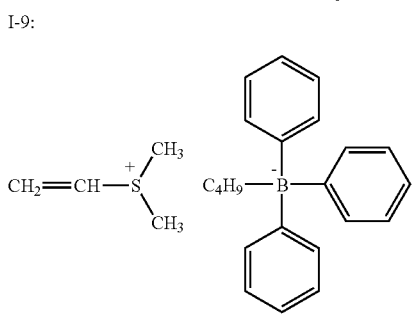

I-10:

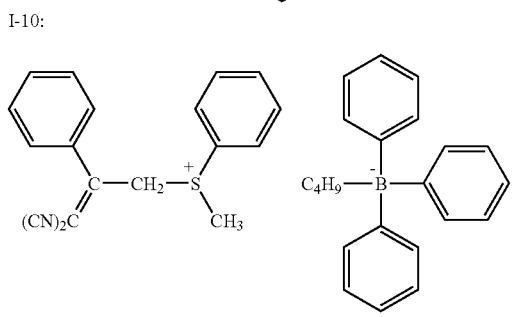

Preferred examples of other onium salts than those mentioned above for use herein include, for example, phosphonium salts as in D. C. Necker, et al., *Macromolecules*, 17, 2468 (1984), C. S. Wen, et al., *Tec. Proc. Conf. Rad. Curing ASIA*, p. 478, Tokyo, October (1988), U.S. Pat. Nos. 4,069,055, 4,069,056, and JP-A-3-140140; ammonium salts as in U.S. Pat. Nos. 4,069,055, 4,069,056, Re. 27,992, JP-A-4-365049; selenonium salts as in J. V. Crivello, et al., *Macromolecules*, 10(6), 1307 (1977), J. V. Crivello, et al., *J. Polymer Sci., Polymer Chem.* Ed. 17, 1047 (1979): and arsonium salts as in C. S. Wen, et al., *Tec. Proc. Conf. Rad. Curing ASIA*, p. 478, Tokyo, October (1988).

2) Sulfonic Acid Ester-Based Acid Generator:

The sulfonic acid ester-based acid generator for use in the invention includes, for example, iminosulfonates as in M. Tunooka et al., Polymer Preprints, Japan, 38(8), G. Berner et al., J. Rad. Curing, 13(4), W. J. Mijs et al., Coating Technol., 55(697), 45 (1983), Akzo, H. Adachi et al., Polymer Preprints, Japan, 37(3), EP Nos. 199,672, 84,515, 199,672, 44,115, 101,122, U.S. Pat. Nos. 4,618,564, 4,371,605, 4,431,774, JP-A-64-18143, 2-245756, and Japanese Patent Application No. 3-140109; oximesulfonates as in JP-A-9-96900 and 6-67433; and N-hydroxyimide sulfonates as in JP-A-6-236024, 6-214391, 6-214392, 7-244378.

Specific examples of the acid generator include benzoin tosylate, pyrogallol trimesylate, o-nitrobenzyl tosylate, 2,5-dinitrobenyl tosylate, N-tosylphthalimide, α-cyanobenzylidenetosylamine, and p-nitrobenzyl-9,10-diethoxyanthracene-2-sulfonate.

3) Disulfone-Based Acid Generator:

The disulfone-based acid generator for use in the invention includes, for example, the compounds disclosed in JP-A-61-166544, 1-284554, JP-B-1-57777, JP-A-2-71270, 3-103854, 3-103856, 4-1210960. Concretely mentioned are 1,2-diphenyl disulfone, 1,2-di-n-propyl disulfone and 1-(4-methylphenyl)-2-phenyl disulfone.

4) Metal Arene Complex-Based Acid Generator:

In the metal arene complex-based acid generator for use in the invention, the center metal is preferably iron or titanium. For example, iron-arene complex comprises a divalent iron ion that forms a complex with an aromatic ring such as a cyclopentadiene ring, and specific examples thereof are shown in A. N. Nesmeyanov et al., *Docl. Acad. Nauk. USSR*, Vol. 160, p. 1327 (1965), and K. Meler et al., *J. Imaging Sci.*, Vol. 30, p. 174 (1986). The aromatic ring that coordinates with the metal ion is preferably a benzene ring, a naphthalene ring, an anthracene ring, a pyrene ring or a perylene ring, and these aromatic rings may be substituted. Examples of the substituent include an alkyl group such as methyl or ethyl group, an alkoxy group such as methoxy or ethoxy group, a halogen atom such as chlorine or bromine, and an acyl group, an ester group, and a carboxyl group. Iron arene complexes described in JP-A-1-54440, EP Nos. 109851 and 126712, and *J. Imag. Sci.*, Vol. 30, p. 174 (1986) are also preferred examples for use herein. The metal arene complex for use in the invention may be combined with any counter anion, and the counter anion that may be combined with it includes tetrafluoroborate, hexafluorophosphate, hexafluoroantimonate, and trifluoromethanesulfonate. Specific examples of iron arene complex organic borates are disclosed in *Organometalllics*, Vol. 8, p. 2737 (1989). In addition titanocenes disclosed in JP-A-61-151197 are also preferred examples for use herein.

5) Organic Halogen Compound-Based Acid Generator:

The organic halogen compound-based acid generator for use in the invention includes, for example, the compounds described in JP-B-46-4605, JP-A-48-36281, 55-32070, 59-180543, 59-148784, 60-138539, JP-B-60-27673, JP-A-60-239736, JP-B-49-21601, JP-A-63-58440, JP-B-57-1819, U.S. Pat. No. 3,905,815, JP-A-61-169835, 61-169837, 62-58241, 62-212401, 63-70243, 63-298339, 4-19666, 59-107344.

Specific examples of the compounds include halogen-containing hydrocarbons having a C number of 1 to 20, especially halogen-containing hydrocarbons having a C number of 1 to 10, such as carbon tetrabromide, 1,2,3-tribromopropane, 1,2,3,4-tetrabromobutane, 1,1,2,2-tetrabromoethane, dibromotetrachloroethane, 1,6-dibromohexane, 1,4-dibromobutane, iodoform, hexabromocyclohexane, hexabromocyclododecane.

6) Triazine-Based Acid Generator:

The triazine-based acid generator for use in the invention includes, for example, triazine-based compounds disclosed in JP-A-53-133428, 63-153542, 53-36223.

The triazine-based acid generator for use in the invention is preferably a trihalomethyl-substituted triazine compound represented by the following formula (9):

Formula (9):

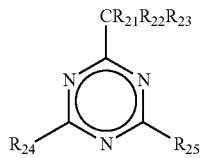

In formula (9), $R_{21}$, $R_{22}$ and $R_{23}$ each independently represent a hydrogen atom, preferably a chlorine atom, $R_{24}$ and $R_{25}$ each independently represent a hydrogen atom, —$CR_{21}R_{22}R_{23}$ or other substituent (preferred examples of the substituent are the same as those mentioned above for $Za^1$). $R_{24}$ is preferably —$CR_{21}R_{22}R_{23}$, more preferably —$CCl_3$, and $R_{25}$ is preferably —$CR_{21}R_{22}R_{23}$, an alkyl group, an alkenyl group or an aryl group.

Specific examples of the trihalomethyl-substituted triazine-based acid generator include 2-methyl-4,6-bis(trichloromethyl)-1,3,5-triazine, 2,4,6-tris(trichloromethyl)-1,3,5-triazine, 2-phenyl-4,6-bis(trichloromethyl)-1,3,5-triazine, 2-(4'-methoxyphenyl)-4,6-bis(trichloromethyl)-1,3,5-triazine, 2-(4'-trifluoromethylphenyl)-4,6-bis(trichloromethyl)-1,3,5-triazine, 2,4-bis(trichloromethyl)-6-(p-methoxyphenylvinyl)-1,3,5-triazine, and 2-(4'-methoxy-1'-naphthyl)-4,6-bis(trichloromethyl)-1,3,5-triazine. Preferred examples thereof also include the compounds described in British Patent 1,388,492 and JP-A-53-133428.

7) Isocyanuric Acid-Based Acid Generator:

The isocyanuric acid-based acid generator for use in the invention is, for example, the isocyanuric acid-based acid generator described in JP-A-62-164045. Concretely mentioned is tris(2,3-dibromopropyl) isocyanurate.

8) Azole-Based Acid Generator:

The azole-based acid generator for use in the invention includes, for example, halomethyl-vinyl-oxadiazole compounds and bisimidazole compounds as in JP-A-55-77742.

The bisimidazole-based acid generator is preferably a bis (2,4,5-triphenyl) imidazole derivative, and examples thereof include bis(2,4,5-triphenyl)imidazole, 2-(o-chlorophenyl)-4, 5-bis(m-methoxyphenyl)-imidazole dimer (CDM-HABI), 1,1'-biimidazole, 2,2'-bis(o-chlorophenyl)-4,4',5,5'-tetraphenyl(o-Cl-HABI), 1H-imidazole, and 2,5-bis(o-chlorophenyl)-4-[3,4-dimethoxyphenyl]-dimer (TCTM-HABI).

The bisimidazole-based acid generator is preferably used together with a hydrogen donor. Preferred examples of the hydrogen donor include 2-mercaptobenzoxazole, 2-mercaptobenzothiazole, and 4-methyl-4H-1,2,4-triazole-3-thiol.

9) Ionic Two-Photon Absorbing Dye-Acid Generator Pair Salt Complex:

For the acid generator (polymerization initiator) in the invention, a two photon absorbing compound-acid generator complex may also be employed, in which an ionic two-photon absorbing dye of the above-mentioned (B) is pair-salted with an ionic acid generator having a counter charge opposite to the charge of the dye. When the two-photon absorbing dye is a cationic dye having a positive charge, then it is combined with an acid generator having a negative charge to form a pair salt; but on the contrary, when the two-photon absorbing dye is an anionic dye having a negative charge, then it is combined with an acid generator having a positive charge to form a pair salt. Thus constructed, the pair salt may serve as the acid generator in the invention.

When the acid generator in the invention is such an ionic two-photon absorbing dye-acid generator pair salt complex, then the ionic two-photon absorbing compound may play the role of the two-photon absorbing compound to be in the composition of the invention.

One example of the ionic two-photon absorbing dye-acid generator pair salt complex for use in the invention is an anionic two-photon absorbing compound onium salt complex-bases acid generator represented by the following formula (10). However, the ionic two-photon absorbing dye-acid generator pair salt complex for use in the invention is not limited to it.

$$(Dye\text{-}2)^- X_{23}^+ \quad \text{Formula (10)}$$

In formula (10), (Dye-2)⁻ represents an anionic non-resonant two-photon absorbing compound and preferred examples thereof are mentioned above. $X_{23}^+$ represents a cation moiety of the diazonium salt of formula (6), a cation moiety of the diaryliodonium salt of formula (7) or a cation moiety of the sulfonium salt of formula (8) (preferred examples thereof are as described above), preferably a cation moiety of the diaryliodonium salt of formula (7) or a cation moiety of the sulfonium salt of formula (8).

Specific examples of the anionic two-photon absorbing compound onium salt complex compound (polymerization initiator) include I-15 to I-32 shown below.

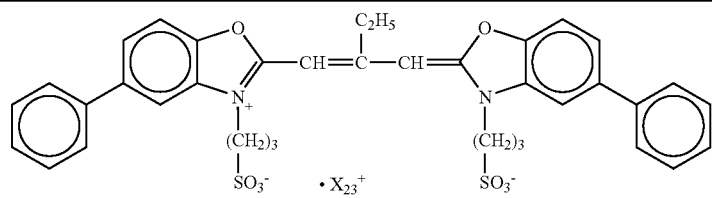

I-15

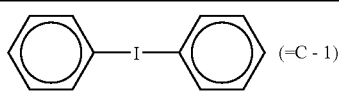

I-16

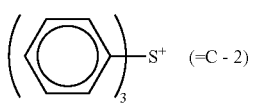

I-17

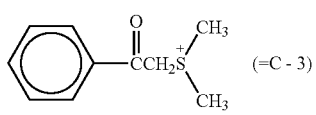

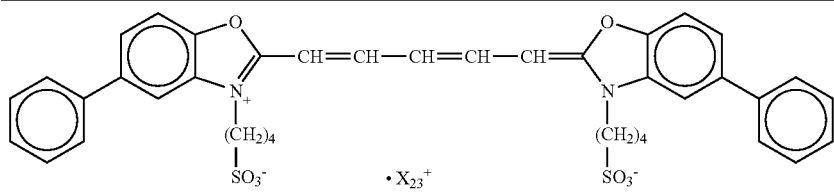

| | $X_{23}^+$ |
|---|---|
| I-18 | C-1 |
| I-19 | C-2 |
| I-20 | C-3 |

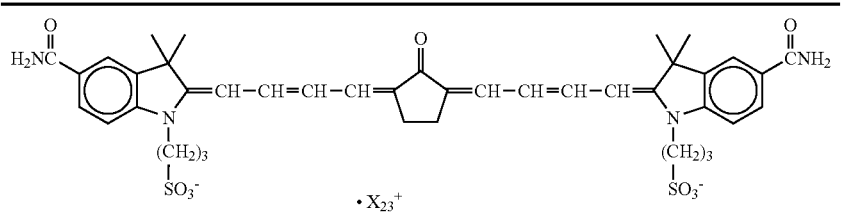

| | $X_{23}^+$ |
|---|---|
| I-21 | C-1 |
| I-22 | C-2 |
| I-23 | C-3 |

-continued

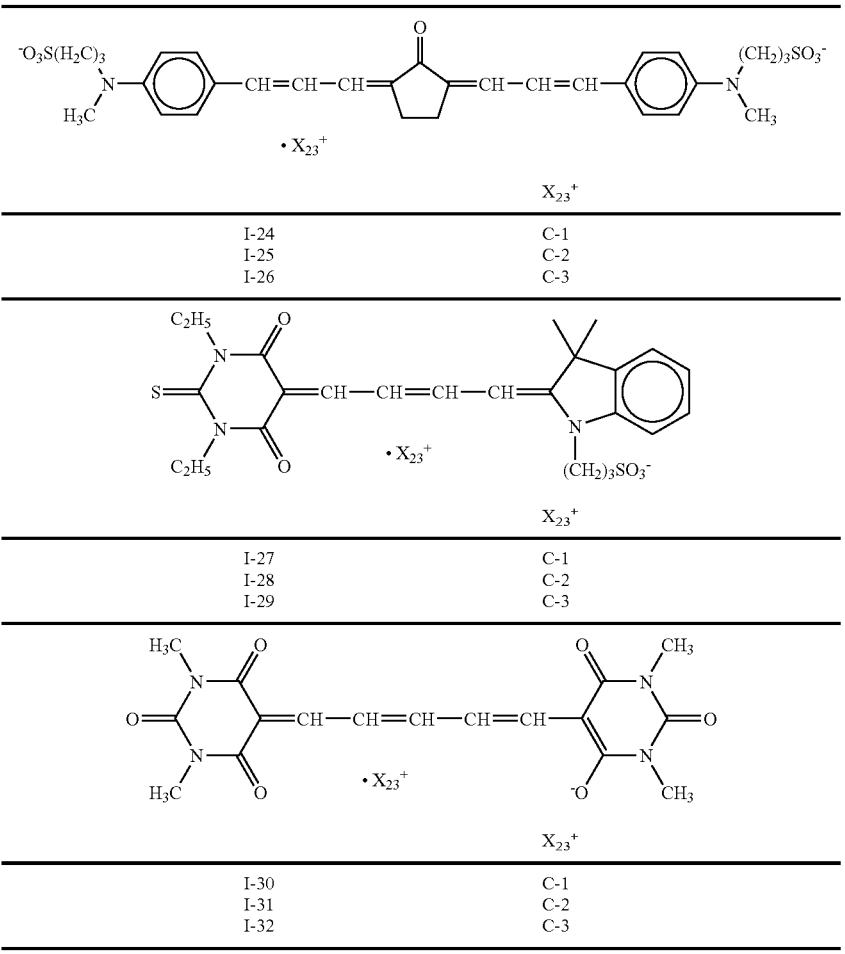

| | $X_{23}^+$ |
|---|---|
| I-24 | C-1 |
| I-25 | C-2 |
| I-26 | C-3 |
| I-27 | C-1 |
| I-28 | C-2 |
| I-29 | C-3 |
| I-30 | C-1 |
| I-31 | C-2 |
| I-32 | C-3 |

10) Other Acid Generators:

Other acid generators than the above for use in the invention are, for example, o-nitrobenzyl-protected acid generators as in S. Hayase et al., J. Polymer Sci., 25,753 (1987), E. Reichmanis et al., J. Polymer Sci., Polymer Chem. Ed., 23, 1 (1985), D. H. R. Barton et al., J. Chem. Soc., 3571 (1965), P. M. Collins et al., J. Chem. Soc., Perkin I, 1695 (1975), M. Rudinstein et al., Tetrahedron Lett., (17), 1445 (1975), J. W. Walker et al., J. Am. Chem. Soc., 110, 7170 (1988), S. C. Busman et al., J. Imaging Technol., 11(4), 191 (1985), H. M. Houlihan et al., Macromolecules, 21, 2001 (1988), P. M. Collins et al., J. Chem. Soc., Chem. Commun., 532 (1972), S. Hayase et al., Macromolecules, 18, 1977 (1985), E. Reichmanis et al., J. Electrochem. Soc., Solid State Sci. Technol., 130(6), F. M. Houlihan et al., Macromolecules, 21, 2001 (1988), EP Nos. 290,750, 046,083, 156,535, 271,851, 388, 343, U.S. Pat. Nos. 3,901,710, 4,181,531, JP-A-60-198538, 53-133022; halogenosulforane derivatives (concretely, 3,4-dibromosulforane, 3,4-dichlorosulforane), halogen-containing alkylene glycol ether compounds such as methyleneglycol bis(2,3-dibromopropyl) ether, halogen-containing ketones such as 1,1,3,3-tetrabromoacetone and hexachloroacetone, and halogen-containing alcohols such as 2,3-dibromopropanol, as in JP-A-4-338757.

11) Polymer with Acid-generating Group Introduced into the Backbone Chain or Side Chain thereof:

For the acid generator for the invention, also usable is a polymer with an acid-generating group introduced into the backbone chain or the side chain thereof. In case where the acid generator in the invention is such a polymer with an acid-generating group introduced into the backbone chain or the side chain thereof, the polymer may play the role of the polymer compound (A).

Concretely, the polymer for use in the invention, which has an acid-generating group or compound introduced into the backbone chain or the side chain thereof, includes, for example, the compounds disclosed in M. E. Woodhouse et al., J. Am. Chem. Soc., 104, 5586 (1982), S. P. Pappas et al., J. Imaging Sci., 30(5), 218 (1986), S. Kondo et al., Makromol. Chem., Rapid Commun., 9, 625 (1988), J. V. Crivello et al., J. Polymer Sci., Polymer Chem. Ed., 17, 3845 (1979), U.S. Pat. No. 3,849,137, German Patent 3,914,407, JP-A-63-26653, 55-164824, 62-69263, 63-146037, 63-163452, 62-153853, 63-146029, 2000-143796.

The compound (D) capable of exhibiting or changing its color by an acid, which is in the photopolymerizable composition of the invention, is described.

The compound capable of exhibiting or changing its color by an acid in the invention is not specifically defined, provided that it is a compound having the property of reacting with an acid to change its structure and to exhibit or change its color (absorption spectrum). Preferably, it includes triphenylmethane dyes, phthalide dyes, indolylphthalide dyes, azaphthalide dyes, triphenylmethanephthalide dyes, phenothiazine dyes, phenoxazine dyes, fluoran dyes, thiofluoran dyes, xanthene dyes, diphenylmethane dyes, chromenopyrazole dyes, leucoauramine dyes, methine dyes, azomethine dyes, rhodamine lactam dyes, quinazoline dyes, diazaxanthene dyes, fluorene dyes and spiropyran dyes. Specific examples of these compounds are disclosed, for example, in JP-A-2002-156454 and patents cited therein, JP-A-2000-281920, 11-279328 and 8-240908.

The compound (D) for use in the invention which exhibits or changes its color by an acid is more preferably a leuco dye having a partial structure such as lactone, lactam, oxazine or spiropyran, and examples thereof include phthalide dyes (including triphenylmethanephthalide dyes, indolylphthalide dyes, azaphthalide dyes), fluoran dyes, thiofluoran dyes, rhodamine lactam dyes and spiropyran dyes. More preferred are triphenylmethanephthalide dyes.

Specific examples of these dyes are mentioned below, but the compound (D) for use in the invention which exhibits or changes its color by an acid is not limited to these.

The phthalide dyes are preferably represented by the following formula (11):

Formula (11):

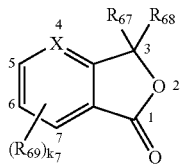

In formula (11), X represents a carbon atom or a nitrogen atom, $R_{67}$ and $R_{68}$ each independently represent an alkyl group having a C number of 1 to 20, an aryl group having a C number of 6 to 24, a heterocyclic group having a C number of 1 to 24 or a group represented by the following formula (12), $R_{69}$ represents a substituent (preferred examples of the substituent are the same as those of the substituent described for $Za_1$ and $Za_2$ in formula (1)), $R_{69}$ more preferably represents a halogen atom such as chlorine atom or bromine atom, an alkyl group having a C number of 1 to 20, an alkoxy group having a C number of 1 to 20, an amino group, an alkylamino group containing an alkyl group having a C number of 1 to 20, a dialkylamino group containing alkyl groups each independently having a C number of 1 to 20, an arylamino group containing an aryl group having a C number of 6 to 24, a diarylamino group containing aryl groups each independently having a C number of 6 to 24, a hydroxyl group, an alkoxy group having a C number of 1 to 20, or a heterocyclic group, $k_7$ represents an integer of 0 to 4, and when $k_7$ is an integer of 2 or more, multiple $R_{65}$s each independently represent a group described above. These groups each may further have a substituent and preferred examples of the substituent include the groups for $Za_1$ and $Za_2$ in formula (1).

Formula (12):

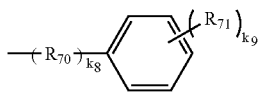

In formula (12), $R_{70}$ represents an alkylene group having a C number of 1 to 3, $k_8$ represents an integer of 0 or 1, $R_{71}$ represents a substituent (preferred examples of the substituent are the same as those of the substituent described for $Za_1$ and $Za_2$ in formula (1)), $R_{70}$ more preferably represents a halogen atom such as chlorine atom and bromine atom, an alkyl group having a C number of 1 to 20, an alkoxy group having a C number of 1 to 20, an amino group, an alkylamino group containing an alkyl group having a C number of 1 to 20, a dialkylamino group containing alkyl groups each independently having a C number of 1 to 20, an arylamino group containing an aryl group having a C number of 6 to 24, a diarylamino group containing aryl groups each independently having a C number of 6 to 24, a hydroxyl group, an alkoxy group having a C number of 1 to 20, or a heterocyclic group, $k_9$ represents an integer of 0 to 5, and when $k_9$ is an integer of 2 or more, multiple $R_{71}$s each independently represent a group described above. These groups each may further have a substituent and preferred examples of the substituent include the groups for $Za_1$ and $Za_2$ in formula (1).

The heterocyclic group represented by $R_{67}$ and $R_{68}$ in formula (11) is preferably an indolyl group represented by the following formula (13):

Formula (13):

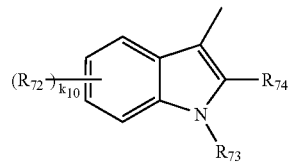

In formula (13), $R_{72}$ represents a substituent (preferred examples of the substituent are the same as those of the substituent described for $Za_1$ and $Za_2$ in formula (1)), $R_{72}$ more preferably represents a halogen atom such as chlorine atom and bromine atom, an alkyl group having a C number of 1 to 20, an alkoxy group having a C number of 1 to 20, an amino group, an alkylamino group containing an alkyl group having a C number of 1 to 20, a dialkylamino group containing alkyl groups each independently having a C number of 1 to 20, an arylamino group containing an aryl group having a C number of 6 to 24, a diarylamino group containing aryl groups each independently having a C number of 6 to 24, a hydroxyl group, an alkoxy group having a C number of 1 to 20, or a heterocyclic group, $k_{10}$ represents an integer of 0 to 4, and when $k_{10}$ is an integer of 2 or more, multiple $R_{72}$s each independently represent a group described above, $R_{73}$ represents an alkyl group having a C number of 1 to 20, $R_{74}$ represents an alkyl group having a C number of 1 to 20 or an alkoxy group having a C number of 1 to 20. These groups each may further have a substituent and preferred examples of the substituent include the groups for $Za_1$ and $Za_2$ in formula (1).

Specific examples of the phthalide dyes (including indolylphthalide dyes and azaphthalide dyes) include 3,3-bis(4-diethylaminophenyl)-6-diethylaminophthalide, 3-(4-diethylaminophenyl)-3-(1-ethyl-2-methylindol-3-yl)phthalide, 3-(4-dimethylaminophenyl)-3-(1,3-dimethylindol-3-yl)phthalide, 3,3-bis(1-n-butyl-2-methylindol-3-yl)phthalide, 3,3-bis(1-ethyl-2-methylindol-3-yl)phthalide, 3-(4-diethylamino-2-ethoxyphenyl)-3-(1-ethyl-2-methylindol-3-yl)-4-azaphthalide, 3,3-bis(4-hydroxyphenyl)-6-hydroxyphthalide, 3,3-bis(4-hexyloxyphenyl)phthalide, and 3,3-bis(4-hexyloxyphenyl)-6-methoxyphthalide.

The phthalide dyes represented by formula (11) are more preferably triphenylmethanephthalide dyes represented by the following formula (14):

Formula (14):

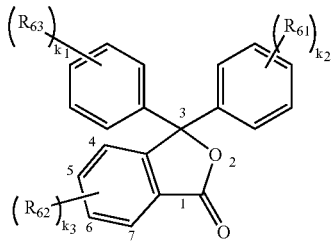

In formula (14), $R_{61}$, $R_{62}$ and $R_{63}$ each independently represent a substituent (preferred examples of the substituent are the same as those of the substituent described for $Za_1$ and $Za_2$ in formula (1)), the substituent represented by $R_{61}$, $R_{62}$ and $R_{63}$ is more preferably a halogen atom such as chlorine atom and bromine atom, an alkyl group having a C number of 1 to 20, an alkoxy group having a C number of 1 to 20, an amino group, an alkylamino group containing an alkyl group having a C number of 1 to 20, a dialkylamino group containing alkyl groups each independently having a C number of 1 to 20, an arylamino group containing an aryl group having a C number of 6 to 24, a diarylamino group containing aryl groups each independently having a C number of 6 to 24, a hydroxyl group, an alkoxy group having a C number of 1 to 20, or a heterocyclic group, $k_1$, $k_2$ and $k_3$ each independently represent an integer of 0 to 4, and when, $k_1$, $k_2$ and $k_3$ each are an integer of 2 or more, multiple $R_{61}$s, $R_{62}$s or $R_{63}$s each independently represent a group described above. These groups each may further have a substituent and preferred examples of the substituent include the groups described for $Za_1$ and $Za_2$ in formula (1).

Specific examples of the triphenylmethanephthalide dyes include 3,3-bis(p-dimethylaminophenyl)-6-dimethylaminophthalide (that is, crystal violet lactone), 3,3-bis(p-dimethylaminophenyl)phthalide, 3,3-bis(p-dihexylaminophenyl)-6-dimethylaminophthalide, 4-hydroxy-4'-dimethylaminotriphenylmethane lactone, 4,4'-bisdihydroxy-3,3'-bisdiaminotriphenylmethane lactone, 3,3-bis(p-dioctylaminophenyl)phthalide, 3,3-bis(4-hydroxyphenyl)-4-hydroxyphthalide, 3,3-bis(4-hexyloxyphenyl)phthalide, and 3,3-bis(4-hexyloxyphenyl)-6-methoxyphthalide.

The fluoran dyes are preferably represented by the following formula (15):

Formula 15:

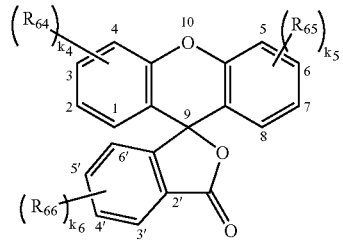

In formula (15), $R_{64}$, $R_{65}$ and $R_{66}$ each independently a halogen atom such as chlorine atom and bromine atom, an alkyl group having a C number of 1 to 20, an alkoxy group having a C number of 1 to 20, an amino group, an alkylamino group containing an alkyl group having a C number of 1 to 20, a dialkylamino group containing alkyl groups each independently having a C number of 1 to 20, an arylamino group containing an aryl group having a C number of 6 to 24, a diarylamino group containing aryl groups each independently having a C number of 6 to 14, a hydroxyl group or a heterocyclic group, $k_4$, $k_5$ and $k_6$ each independently represent an integer of 0 to 4, and when $k_4$, $k_5$ and $k_6$ each are an integer of 2 or more, multiple $R_{64}$s, $R_{65}$s or $R_{66}$s each independently represent a group described above. These groups each may further have a substituent and preferred examples of the substituent include the groups described for $Za_1$ and $Za_2$ in formula (1).

Specific examples of the fluoran dyes include 3-diethylamino-6-(2-chloroanilino)fluoran, 3-dibutylamino-6-(2-chloroanilino)fluoran, 3-diethylamino-7-methyl-6-anilinofluoran, 3-dibutylamino-7-methyl-6-anilinofluoran, 3-dipentylamino-7-methyl-6-anilinofluoran, 3-(N-ethyl-N-isopentylamino)-7-methyl-6-anilinofluoran, 3-diethylamino-7-methyl-6-xylidinofluoran, 3-diethylamino-6,7-benzofluoran, 3-diethylamino-7-methoxy-6,7-benzofluoran, 1,3-dimethyl-6-diethylaminofluoran, 2-bromo-3-methyl-6-dibutylaminofluoran, 2-N,N-dibenzylamino-6-diethylaminofluoran, 3-dimethylamino-6-methoxyfluoran, 3-diethylamino-7-methyl-6-chlorofluoran, 3-diethylamino-6-methoxyfluoran, 3,6-bisdiethylaminofluoran, 3,6-dihexyloxyfluoran, 3,6-dichlorofluoran, and 3,6-diacetyloxyfluoran.

Specific examples of the rhodamine lactam dyes include Rhodamine-B-anilinolactam, rhodamine-(p-nitroanilino)lactam, Rhodamine-B-(p-chloroanilino)lactam and Rhodamine-B-(o-chloroanilino)lactam.

Specific examples of the spiropyran dyes include 3-methyl-spirodinaphthopyran, 3-ethyl-spirodinaphthopyran, 3,3'-dichloro-spirodinaphthopyran, 3-benzyl-spirodinaphthopyran, 3-propyl-spirodibenzopyran, 3-phenyl-8'-methoxybenzoindolinospiropyran, 8'-methoxybenzoindolinospiropyran and 4,7,8'-trimethoxybenzoindolinospiropyran.

Other specific examples include spiropyran dyes disclosed in JP-A-2000-281920.

In addition, BLD compounds represented by formula (6) in JP-A-2000-284475, leuco dyes disclosed in JP-A-2000-144004, and leuco dyes having a structure shown below can also be suitably used as the compound (D) capable of exhibiting or changing its color by an acid in thee invention.

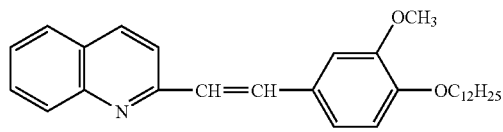 R-1
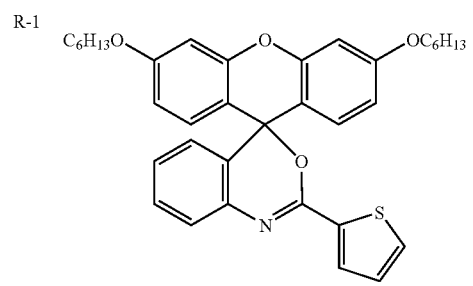 R-2
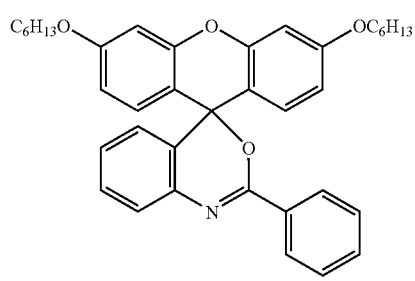 R-3
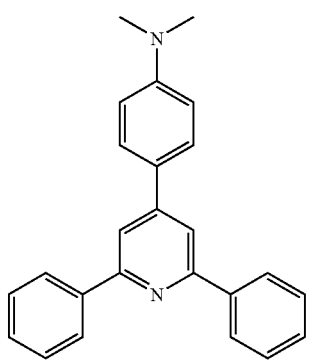 R-4
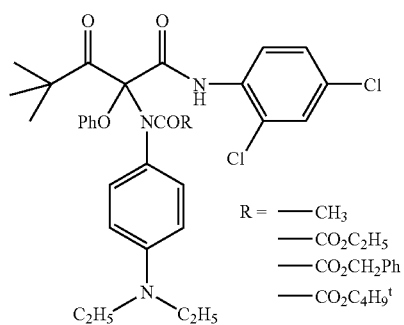 R-5
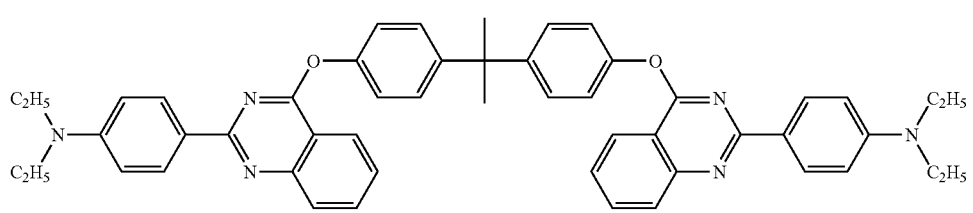 R-6
In addition, the dye precursor in the present invention is preferably a compound represented by the following formula (26), which forms a color with an addition of acid (proton):
Formula 26:
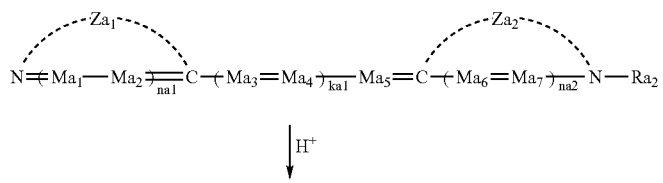

-continued

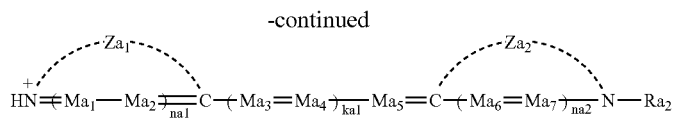

Wherein Za1, Za2, Ma1 to Ma7, na1, na2, ka1 and Ra2 have the same meaning as in the formula (3), respectively, and preferable examples of them is the same as those in the formula (3).

Specific examples of the dye precursor represented by the formula (26) for use in the invention are set forth below, however, the invention is not limited thereto.

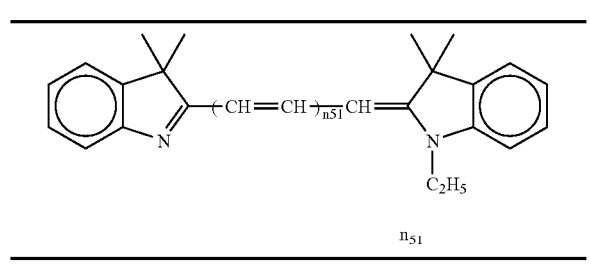

| | |
|---|---|
| LC-1 | 0 |
| LC-2 | 1 |
| LC-3 | 2 |

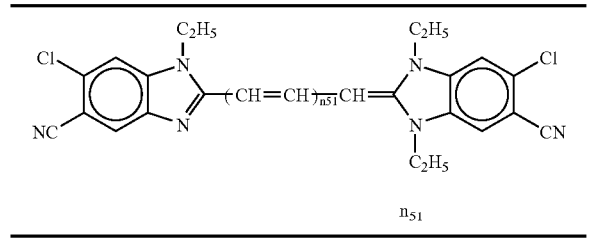

| | |
|---|---|
| LC-4 | 0 |
| LC-5 | 1 |
| LC-6 | 2 |

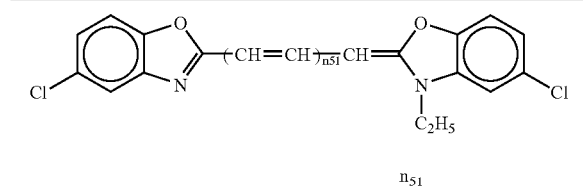

| | |
|---|---|
| LC-7 | 0 |
| LC-8 | 1 |
| LC-9 | 2 |

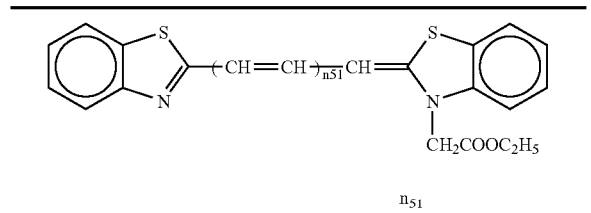

| | |
|---|---|
| LC-10 | 0 |
| LC-11 | 1 |
| LC-12 | 2 |

-continued

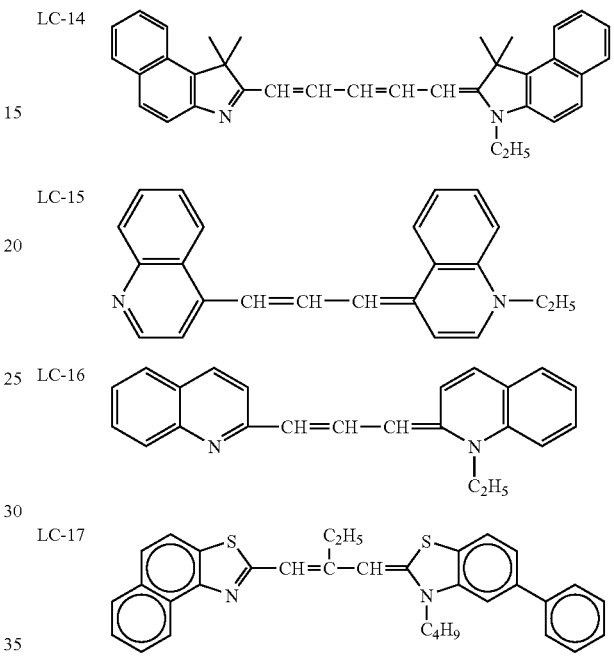

The photosensitive polymer composition of the invention may optionally contain additives such as acid-increasing agent, heat stabilizer, plasticizer and solvent.

The photosensitive polymer composition of the invention may contain, as the acid-increasing agent, a compound having a function of increasing an acid owing to the action of the acid generated by the above-mentioned acid generator.

The acid-increasing agent usable herein includes, for example, the compounds described in U.S. Pat. Nos. 5,286,612, 5,395,736, 5,441,850, JP-T-8-503081, 8-503082, JP-A-8-248561, K. Ichimura, *Chem. Lett.* 1995, p. 551, and JP-A-11-180048.

In addition, the polymers having an acid-generating function and an acid-increasing function imparted thereto may also be favorably used in the invention.

The photosensitive polymer composition of the invention may contain a heat stabilizer (thermal polymerization inhibitor) for preventing polymerization during storage of the composition and for ensuring the storage stability of the composition.

Useful examples of the heat stabilizer include hydroquinone, phenidone, p-methoxyphenol, alkyl- or aryl-substituted hydroquinones or quinones, catechol, tert-butylcatechol, pyrogallol, 2-naphthol, 2,6-di-tert-butyl-p-cresol, phenothiazine and chloranil. In addition, dinitroso dimers described in U.S. Pat. No. 4,168,982 by Pazos are also useful.

Preferably, the amount of the heat stabilizer to be in the composition is from 0.001 to 5 parts by weight relative to 100 parts by weight of the polymer compound in the composition.

The plasticizer is used for varying the adhesive property, flexibility, hardness and other various mechanical properties of the photosensitive polymer composition. Examples of the plasticizer include triethylene glycol dicaprylate, triethylene glycol bis(2-ethylhexanoate), tetraethyleneglycol diheptanoate, diethyl sebacate, dibutyl suberate, tris(2-ethylhexyl) phosphate, tricresyl phosphate and dibutyl phthalate.

Compositions for the photosensitive polymer composition of the invention may be prepared by an ordinary method, for example, by adding the above-described essential components and optional components directly as they are or optionally along with a solvent.

Examples of the solvent include a ketone solvent such as methyl ethyl ketone, methyl isobutyl ketone, acetone and cyclohexanone, an ester solvent such as ethyl acetate, butyl acetate, ethylene glycol diacetate, ethyl lactate and cellosolve acetate, a hydrocarbon solvent such as cyclohexane, toluene and xylene, an ether solvent such as tetrahydrofuran, dioxane and diethyl ether, a cellosolve solvent such as methyl cellosolve, ethyl cellosolve, butyl cellosolve and dimethyl cellosolve, an alcohol solvent such as methanol, ethanol, n-propanol, 2-propanol, n-butanol and diacetone alcohol, a fluorine-containing solvent such as 2,2,3,3-tetrafluoropropanol, a halogenated hydrocarbon solvent such as dichloromethane, chloroform and 1,2-dichloroethane, and an amide solvent such as N,N-dimethylformamide.

The photopolymerizable composition of the invention may be directly applied onto a substrate in a mode of spin coating, or may be cast as a film and then laminated on a substrate by an ordinary method. The solvent may be evaporated and removed when the coated substrate is dried.

Generally, the percentage of each component in the two-photon absorbing polymerizable composition of the invention is preferably in the following range based on the entire mass of the composition:

Polymer compound: preferably from 0 to 90% by weight, more preferably from 45 to 80% by weight.

Two-photon absorbing compound: preferably from 0.01 to 10% by weight, more preferably from 0.03 to 7% by weight.

Acid generator: preferably from 0.01 to 10% by weight, more preferably from 0.1 to 7% by weight.

Compound capable of exhibiting or changing its color by acid: preferably from 0.01 to 20% by weight, more preferably from 0.1 to 10% by weight.

The photosensitive polymer composition of the invention may be applied to optical recording materials, especially to three-dimensional optical recording mediums. Information is recorded on the three-dimensional optical recording medium by utilizing the property thereof that the absorption wavelength (transmittance, reflectance) of the compound (D) therein capable of exhibiting or changing its color by an acid changes in the light-irradiated part thereof or the refractive index changes therein, and the transmittance change or the reflectance change or the refractivity change in the light-irradiated part of the medium can be read out as the recorded information. As the characteristic thereof, two-photon absorption induces polymerization-color formation at any desired point in a three-dimensional space owing to the extremely high three-dimensional space resolution thereof, and therefore, the composition of the invention enables ultra-high-density optical recording mediums on which three-dimensional information can be written.

The third aspect of the invention that provides a photon-mode recording material is described in detail hereinunder.

The photon-mode recording material of the invention contains a recording component that comprises at least 1) a sensitizing dye and 2) a dye precursor capable of being a color-forming material of which the absorption wavelength is longer than that of the original state thereof and which has an absorption in a wavelength range differing from that of the sensitizing dye, and the recording component therein has the ability to record the refractivity difference or the absorbance difference caused by the electron transfer or the energy transfer from the sensitizing dye or the excited-state color-forming material.

In this, the sensitizing dye may function as a two-photon absorbing sensitizing dye that undergoes non-resonant two-photon absorption, or may function as an ordinary sensitizing dye that undergoes linear (one-photon) absorption.

The photon-mode recording method of the invention comprises at least a first step of forming the color-forming material having a different absorption profile from that of the sensitizing dye, as a latent image through irradiation with light, and a second step of irradiating the latent image of the color-forming material with light that has a wavelength range where the molar absorbance coefficient for linear absorption of the sensitizing dye is at most 5000, to thereby induce linear absorption of the latent image of the color-forming material for self-sensitizing and amplifying the color-forming material and for recording the refractivity difference or the absorbance difference thereof, and in the method, these steps are effected in dry.

In the wavelength range of the light radiated in the second step, the molar absorbance coefficient in linear absorption of the sensitizing dye is preferably at most 1000, more preferably at most 500.

In the wavelength range of the light radiated in the second step, the molar absorbance coefficient of the color-forming material is preferably at least 5000, more preferably at least 10000.

Preferably, the wavelength of the light radiated in the first step differs from that in the second step. Also preferably, the light radiated in the second step is for entire surface exposure (so-called solid exposure, blanket exposure or non-image-wise exposure).

The term "latent image" in the first step of the invention indicates an "image by the difference in refractive index or absorbance of preferably ½ or less of the difference in refractive index or absorbance formed after the second step" (that is, the amplification in the second step is preferably 2 times or more), more preferably an image by the difference in refractive index or absorbance of ⅕ or less, still more preferably 1/10 or less, particularly preferably 1/30 or less (that is, the amplification in the second step is more preferably 5 times or more, still more preferably 10 times or more, particularly preferably 30 times or more).

The photon-mode recording material of the invention is preferably used for an optical recording medium such as DVD-R and DVD-BL(BR), a near-field optical recording medium, a three-dimensional optical recording medium, an imaging material, a three-dimensional imaging material (three-dimensional volume display material) and the like. More preferably, it is used for a three-dimensional optical recording medium and a three-dimensional imaging material (three-dimensional volume display material).

The photon-mode recording method and the photon-mode recording material that enables the recording of the invention are preferably a two-photon absorbing optical recording method that comprises at least a first step of forming a latent image through two-photon absorption caused by light irradiation and a second step of amplifying the latent image to form a refractivity difference or an absorbance difference, and a two-photon absorbing optical recording material that enables the recording.

These are preferably used for an optical recording medium such as DVD-R and DVD-BL(BR), a near-field optical recording medium, a three-dimensional optical recording medium, a three-dimensional imaging material (three-dimensional volume display material) and the like.

More preferably, the photon-mode recording method and the photon-mode recording material that enables the recording of the invention are a two-photon absorbing three-dimensional optical recording method having the characteristics as above, and a two-photon absorbing three-dimensional optical recording material that enables the recording. These are preferably used for a three-dimensional recoding medium and a three-dimensional imaging material (three-dimensional volume display material).

Also in these cases, the term "latent image" in the first step of the invention indicates an "image by the difference in refractive index or absorbance of preferably ½ or less of the difference in refractive index or absorbance formed after the second step" (that is, the amplification in the second step is preferably 2 times or more), more preferably an image by the difference in refractive index or absorbance of ⅕ or less, still more preferably ⅒ or less, particularly preferably ⅓₀ or less (that is, the amplification in the second step is more preferably 10 times or more, still more preferably 30 times or more).

Preferably, the second step comprises any of light irradiation, heat application, electric field application or magnetic field application. Also preferably, this is effected on the entire surface of the recording material.

More preferably, the second step comprises any of light irradiation, heat application or electric field application, even more preferably light irradiation or heat application, most preferably light irradiation.

Preferably, the light irradiation in the second step is for entire surface exposure (so-called solid exposure, blanket exposure or non-imagewise exposure).

As for the light source to be used, preferred examples thereof include visible light laser, UV light laser, IR light laser, carbon arc, high-pressure mercury lamp, xenon lamp, metal halide lamp, fluorescent lamp, tungsten lamp, LED and organic LED. In order to irradiate light in a specific wavelength region, a sharp-cut filter, band-pass filter, diffraction grating or the like is preferably used, if desired.

The two-photon absorbing optical recording method and the two-photon absorbing optical recording material that enables the recording of the invention preferably comprise at least a first step of forming the color-forming material having a different absorption profile from that of the two-photon absorbing compound, as a latent image through two-photon absorption exposure, and a second step of irradiating the latent image of the color-forming material with light that has a wavelength range where the molar absorbance coefficient for linear (one-photon) absorption of the two-photon absorbing compound is at most 5000, to thereby induce linear absorption of the color-forming material for self-sensitizing, and amplifying the color-forming material and for recording the refractivity difference or the absorbance difference thereof.

In the wavelength range of the light radiated in the second step, the molar absorbance coefficient in linear absorption of the two-photon absorbing compound is preferably at most 1000, more preferably at most 500.

In the wavelength range of the light radiated in the second step, the molar absorbance coefficient of the color-forming material is preferably at least 5000, more preferably at least 10000.

The two-photon absorbing optical recording method and the two-photon absorbing optical recording material that enables the recording of the invention preferably comprise, as the compound group capable of attaining refractivity difference or absorbance difference recording owing to two-photon absorption, at least 1) a two-photon absorbing compound capable of absorbing two photons to form an excited state in the first step, and 2) a recording component that contains a dye precursor capable of being a color-forming material of which the absorption wavelength is longer than that of the original state thereof and which therefore has a different absorption profile from the linear absorption of the two-photon absorbing compound, and that enables refractivity difference or absorbance difference recording through electron transfer or energy transfer from the two-photon absorbing compound or the excited color-forming material.

Preferred Embodiments of the Case are:

a) an embodiment where the wavelength of the light for latent image formation in two-photon absorption recording in the first step is the same as the wavelength of the light for amplifying the latent image for forming the refractivity difference or the absorbance difference in the second step, b) an embodiment where the wavelength of the light for latent image formation in two-photon absorption recording in the first step is shorter than the wavelength of the light for amplifying the latent image for forming the refractivity difference or the absorbance difference in the second step, and falls within a wavelength range where the molar absorbance coefficient in linear (one-photon) absorption of the two-photon absorbing compound is at most 5000.

In the embodiment a), it is desirable that at the wavelength of the light radiated in the first step and in the second step, the molar absorbance coefficient in linear (one-photon) absorption of the two-photon absorbing compound is at most 10, more preferably at most 1, even more preferably at most 0.1, most preferably the compound has no linear absorption.

In the embodiment b), it is desirable that at the wavelength of the light radiated in the second step, the molar absorbance coefficient in linear absorption of the two-photon absorbing compound is at most 1000, more preferably at most 500.

In both embodiments a) and b), it is desirable that at the wavelength of the light radiated in the second step, the molar absorbance coefficient of the color-forming material is at least 1000, most preferably at least 10000.

Of the embodiments a) and b), more preferred is b).

Preferably, the photon-mode recording material or the two-photon absorbing optical recording material of the invention is processed according to the above-mentioned first and second steps for recording and amplification of information to thereby record thereon the refractivity difference or the absorbance difference, and then this is irradiated with light so as to detect the light reflectance or transmittance difference based on the refractivity difference or the absorbance difference between the recorded area and the unrecorded area of the material for information reproduction.

This is because, in optical recording mediums, digital signals can be recorded and reproduced by radiating light on the material modulated in the absorbance or the refractive index thereof; while in imaging (display) materials, images can be seen by radiating light on the material modulated in the absorbance or the refractive index thereof.

In this case, it is desirable that the wavelength of the light radiated for detecting the reflectance or transmittance difference in information reproduction is the same as that of the light radiated in the first or second step, more preferably, it is the same as that of the light radiated in the first step.

Accordingly, a two-photon absorbing optical recording and reproducing method and a two-photon absorbing optical recording material that enables the recording and reproduction is the most preferred in the invention, in which the wavelength of the light for latent image formation through two-photon absorption recording in the first step is shorter than the wavelength of the light for amplifying the latent image for forming the refractivity difference or the absorbance difference in the second step, and falls within a wavelength range where the molar absorbance coefficient for linear (one-photon) absorption of the two-photon absorbing compound is at most 5000, and the wavelength of the light radiated for recording through two-photon absorption is the same as that of the light radiated for detecting the reflectance difference for reproduction.

In general, the refractive index of dye may have a high value within a region of from around the linear absorption maximum wavelength ($\lambda max$) to a wavelength longer than it, and, in particular, it may have an extremely high value within a region of from $\lambda max$ to a wavelength longer by around 200 nm than $\lambda max$. Some dyes may have a refractive index of more than 2, as the case may be, more than 2.5 in that region. On the other hand, other organic compounds for binder polymer or the like, not serving as dye, generally have a refractive index of from 1.4 to 1.6 or so.

Accordingly, it is understood that, when a dye precursor is colored, then it preferably forms not only absorbance difference but also great refractivity difference.

Preferably, the refractive index of the film of the dye alone formed from the recording component is at least 1.8, more preferably at least 2, most preferably at least 2.2 at the recording wavelength.

Accordingly, when recording on the photon-mode recording material or the two-photon absorbing optical recording material of the invention is based on the refractivity difference of the material, then the recording material is preferably so designed that the refractivity difference between the recorded area and the unrecorded area could be the largest at around the reproduction wavelength, or that is, it is more desirable that the absorption maximum of the color-forming material could be between the reproduction wavelength and a wavelength shorter by around 200 nm than the reproduction wavelength.

When recording on the photon-mode recording material or the two-photon absorbing optical recording material of the invention is based on the absorbance difference of the material, then the recording material is preferably so designed that the absorbance difference between the recorded area and the unrecorded area could be the largest at around the reproduction wavelength.

Preferably, the photon-mode recording material and the two-photon absorbing optical recording material of the invention is an unrewritable system. The unrewritable system means that recording is made thereon in a mode of irreversible reaction, and the data once recorded on it are stored, not substituted with any others (that is, not rewrote). Accordingly, this is suitable for long-term storage of important data. In this, however, the unwritten area may be additionally written. To that effect, this is referred to as a write-once system. Also preferably, the two-photon absorbing optical recording material of the invention is not processed in wet, or that is, the material is processed in dry.

Preferably, laser is used in the first step for recording through two-photon absorption on the photon-mode recording material and the two-photon absorbing optical recording material of the invention. The light for use in the invention is preferably UV light, visible light or IR light at a wavelength of 200 to 2,000 nm, more preferably UV light, visible light or IR light at a wavelength of 300 to 1,000 nm, even more preferably visible light or IR light at 400 to 800 nm.

The laser which can be used is not particularly limited, but specific examples of the laser which can be preferably used include a solid or fiber laser having an oscillation wavelength in the vicinity of center wavelength of 1,000 nm, such as Ti-sapphire, a semiconductor, solid or fiber laser having an oscillation wavelength in the vicinity of 780 nm, which is also used in CD-R and the like, a semiconductor or solid laser having an oscillation wavelength in the range from 620 to 680 nm, which is also used in DVD-R and the like, and a GaN laser having an oscillation wavelength in the vicinity of 400 to 415 nm.

In addition, a solid or semiconductor SHG laser having an oscillation wavelength in the visible light region, such as YAG.SHG laser, may also be preferably used.

The laser for use in the invention may be either a pulse oscillation laser or a CW laser.

The light used at the time of information reproduction is also preferably laser light and although the power or pulse shape may be the same or different, the reproduction is preferably performed by using the same laser as used for recording the information.

When recording is made on the two-photon absorbing optical recording material of the invention, then it is desirable that the two-photon absorption induced through irradiation with laser light having a longer wavelength than that of the linear absorption band of the two-photon absorbing compound but not having linear absorption is utilized for the recording.

More preferably, therefore, the refractivity difference or absorbance difference recording is effected by utilizing the phenomenon that the linear absorption of the color-forming material formed by inducing two-photon absorption through irradiation with laser light having a longer wavelength than that of the linear absorption band of the two-photon absorbing compound but not having linear absorption appears in a longer wavelength range than the longest wavelength absorption end of the linear absorption of the two-photon absorbing compound.

Preferably, the photon-mode recording material (two-photon absorbing optical recording material) of the invention contains, in addition to the sensitizing dye (two-photon absorbing compound) and the recording component, a binder, and if desired, an electron-donating compound, an electron-accepting compound, a polymerizable monomer, a polymerizable oligomer, a polymerization initiator, a crosslinking agent, a heat stabilizer, a plasticizer, a solvent and other additives.

Preferably, the size of the reacted part or the colored part formed through recording on the photon-mode recording material and the two-photon absorbing optical recording material of the invention falls within a range of from 10 nm to 100 μμ, more preferably from 50 nm to 5 μm, even more preferably from 50 nm to 2 μm.

For enabling the reproduction from the recorded material, the size of the reacted part or the colored part is preferably from 1/20 to 20 times, more preferably from 1/10 to 10 times, most preferably from 1/5 to 5 times the wavelength of the radiated light.

After recording on the photon-mode recording material and the two-photon absorbing optical recording material of the invention, the material may be processed for fixation with light (one-photon) or heat, or with the two.

In particular, when an acid-increasing agent or a base-increasing agent is used in the photon-mode recording material and the two-photon absorbing optical recording material of the invention, it is especially desirable that the recorded material is fixed under heat in order that the acid-increasing agent or the base-increasing agent therein could function more effectively.

For fixation by light, the photon-mode recording material or the two-photon absorbing optical recording material is irradiated with UV light or visible light in the entire surface thereof (non-interference exposure). The light source to be used is preferably visible light laser, UV laser, carbon arc, high-pressure mercury lamp, xenon lamp, metal halide lamp, fluorescent lamp, tungsten lamp, LED, organic EL, etc.

For the light source in the fixing by light, the laser used for the recording is also preferably used as it is or by changing the power, pulse, concentration, wavelength or the like.

In the case of fixing by heat, the fixing step is preferably performed at from 40 to 160° C., more preferably at from 60 to 130° C.

In the case of performing the fixing by using both light and heat, the light and the heat may be applied simultaneously or separately.

In the invention, the first and second steps may also serve for fixation, but preferably the second step serves for fixation.

In the photon-mode recording material of the invention, it is desirable that the chemical reaction or color-forming reaction to be caused through light absorption by sensitizing dye does not include pyrolysis, or that is, the reaction is not a heat-mode reaction.

In the two-photon absorbing optical recording material of the invention, it is also desirable that the chemical reaction or color-forming reaction to be caused through two-photon absorption does not include pyrolysis, or that is, the reaction is a photon-mode reaction for higher sensitivity of the material.

Specifically, it is desirable that information recording on the recording material of the invention is effected in a mechanism differing from that popularized for ordinary CD-R and DVD-R, for high-speed writing and transferring on the it.

When the photon-mode recording material and the two-photon absorbing optical recording material of the invention are used in optical recording mediums, then the recording material is preferably stored in a light-shielding cartridge at the storage. When the two-photon absorbing optical recording material of the invention is used in optical recording mediums, then the recording material is preferably covered with a filter layer capable of absorbing light having the same wavelength as that of linear absorption of the two-photon absorbing compound for better storability of the recording material.

The two-photon absorbing compound and the two-photon absorbing optical recording material of the invention may be for three-photon or more multi-photon absorption.

The concept of the photon-mode recording material (especially, the two-photon absorbing optical recording material) of the invention is described below, however, the invention is of course not limited thereto. Also, the values given in the following description are only for exemplification.

For example, a laser of 780 nm is radiated on the two-photon absorbing optical recording material and absorbed by the two-photon absorbing compound to produce an excited state thereof (the two-photon absorbing compound does not have linear absorption at 780 nm). From the excited state of the two-photon absorbing compound, an energy or electron is transferred to a recording component, whereby a part of the dye precursor is changed into a color-forming material and a latent image is formed by the color formation (first step).

Next, light in a wavelength region of 680 to 740 nm is radiated to bring about linear absorption of the color-forming material, and the color-forming material is thereby amplified through self-sensitization thereof (second step). No latent image is formed in the unrecorded area not irradiated with layer in the first step, and self-sensitization and color formation occurs little in the part in the second step, and, as a result, a great refractivity modulation or absorbance modulation can be formed between the recorded area and the unrecorded area. For example, when a laser of 780 nm is again used and radiated on the two-photon absorbing optical recording material once processed for recording thereon, then reproduction can be performed by using the light reflectance difference based on the great refractivity difference between the recorded area and the unrecorded area of the material. Therefore, the invention enables to provide a two-photon absorbing (three-dimensional) optical recording medium that enables recording and reproduction thereon by using light of 780 nm.

The components to constitute the photon-mode recording material and the two-photon absorbing optical recording material of the invention are described in detail hereinunder.

The sensitizing dye in the photon-mode recording material of the invention is described.

The sensitizing dye for use in the invention may function as a two-photon absorbing sensitizing dye that undergoes non-resonant two-photon absorption, or may function as a sensitizing dye that undergoes ordinary linear (one-photon) absorption.

Preferably, the sensitizing dye for use in the invention functions as a two-photon absorbing sensitizing dye (two-photon absorbing compound). Accordingly, the photon-mode recording material of the invention is preferably a two-photon absorbing optical recording material.

The two-photon absorbing compound for use in the invention is a compound of undergoing non-resonant two-photon absorption (a phenomenon that two photons are simultaneously absorbed in the energy region having no (linear) absorption band of the compound to cause excitation).

At the application to the two-photon absorbing optical recording material, particularly, two-photon absorbing three-dimensional optical recording material, in order to achieve a high transfer (recording) rate, a two-photon absorbing compound capable of undergoing two-photon absorption with high sensitivity and efficiently producing an excited state thereof is necessary.

The efficiency of two-photon absorption by the two-photon absorbing compound is expressed by a two-photon absorbing cross-sectional area $\delta$ and defined by 1 GM=$1\times10^{-50}$ cm$^4$s/photon. In the two-photon absorbing optical recording material of the invention, the two-photon absorbing cross-sectional area $\delta$ of the two-photon absorbing compound is preferably 100 GM or more in view of, for example, increase in the writing speed or reduction in the size and cost of laser, more preferably 1,000 GM or more, still more preferably 5,000 GM or more, and most preferably 10,000 GM or more.

Preferred examples of the sensitizing dye in the photon-mode recording material of the invention and those of the two-photon absorbing compound in the two-photon absorbing optical recording material of the invention are described below. In the invention, examples of the preferred compounds for the sensitizing dye are the same as those of the preferred compounds for the two-photon absorbing compound. Compounds that undergo linear absorption function as sensitizing dyes, and those that undergo non-linear two-photon absorption function as two-photon absorbing compounds.

The sensitizing dye or the two-photon absorbing compound for use in the invention is preferably an organic compound, more preferably an organic dye.

In the invention, when a specific moiety is called "a group", unless otherwise indicated, this means that the group may or may not be substituted by one or more (up to the maximum possible number) substituent. For example, "an alkyl group" means a substituted or unsubstituted alkyl group. The substituent which can be used for the compound in the invention may be any substituent.

Also, in the invention, when a specific moiety is called "a ring" or when "a ring" is contained in "a group", unless otherwise indicated, the ring may be a monocyclic ring or a condensed ring or may or may not be substituted.

For example, "an aryl group" may be a phenyl group or a naphthyl group or may be a substituted phenyl group.

The description of the sensitizing dye or the two-photon absorbing compound may be the same as that given hereinabove in the section of the two-photon absorbing recording material.

The recording component in the photon-mode recording material or the two-photon absorbing recording material of the invention is described in detail.

The recording component in the invention contains a dye precursor capable of being a color-forming material of which the absorption wavelength is longer than that of the original state thereof and which has an absorption in a wavelength range differing from that of the sensitizing dye (or differing from the linear absorption of two-photon absorbing compound), and contains a compound group capable of recording the refractivity difference or the absorbance difference resulting from the electron or energy transfer from the sensitizing dye (two-photon absorbing compound) or the excited color-forming material.

In this case, it is important that the refractivity difference or the absorbance difference occurs between the site where the color-forming reaction has occurred (recorded area or laser-focused area) and the site where no reaction has occurred (unrecorded area or laser-unfocused area).

As so mentioned hereinabove, in general, the refractive index of dye may have a high value within a region of from around the absorption maximum wavelength ($\lambda$max) to a wavelength longer than it, and, in particular, it may have an extremely high value within a region of from $\lambda$max to a wavelength longer by around 200 nm than $\lambda$max. Some dyes may have a refractive index of more than 2, as the case may be, more than 2.5 in that region.

On the other hand, other organic compounds for binder polymer or the like, not serving as dye, generally have a refractive index of from 1.4 to 1.6 or so.

Accordingly, it is desirable that the recording component in the invention contains a dye precursor capable of being a color-forming material through direct electron transfer or energy transfer from the excited state of a sensitizing dye or from the two-photon excited state of a two-photon absorbing compound or by the action of an acid or a base generated through electron transfer or energy transfer to an acid generator or a base generator from the excited state of a sensitizing dye or from the two-photon excited state of a two-photon absorbing compound, in which the absorption of the resulting color-forming material differs from that of the original dye precursor.

As the recording component in the photo-mode recording material or the two-photon absorbing optical recording material of the invention, the following combinations are preferred:

A) a combination comprising at least an acid color-forming dye precursor as the dye precursor and an acid generator and if desired, further containing an acid-increasing agent, B) a combination comprising at least a base color-forming dye precursor as the dye precursor and a base generator and if desired, further containing a base-increasing agent, C) a combination comprising a compound where an organic compound moiety having a function of cutting the covalent bond due to electron or energy transfer with the excited state of a sensitizing dye or with the two-photon excited state of a two-photon absorbing compound is covalently bonded with an organic compound moiety of becoming a color-forming material when covalently bonded and when released, and if desired, further containing a base, and D) a combination comprising a compound capable of undergoing a reaction due to electron transfer with the excited state of a sensitizing dye or with the two-photon excited state of a two-photon absorbing compound and changing the absorption profile.

In any of these cases, when an energy transfer mechanism from the excited state of a sensitizing dye or from the two-photon excited state of a two-photon absorbing compound is used, the mechanism may be either a Forster mechanism where energy transfer occurs from the singlet excited state of the compound, or a Dexter mechanism where energy transfer occurs from the triplet excited state thereof.

At this time, in order to cause energy transfer with good efficiency, the excitation energy of the excited sensitizing dye or the two-photon excited two-photon absorbing compound is preferably larger than the excitation energy of the dye precursor.

In the case of electron transfer mechanism from the excited state of a sensitizing dye or from the two-photon excited state of a two-photon absorbing compound, this may be either a mechanism where electron transfer occurs from the singlet excited state of the compound, or a mechanism where electron transfer occurs from the triplet excited state thereof.

The excited state of a sensitizing dye or the two-photon excited state of a two-photon absorbing compound may give an electron to a dye precursor, acid generator or base generator or may receive an electron. In the case of giving an electron from the excited state of a sensitizing dye or from the two-photon excited state of a two-photon absorbing compound, in order to cause efficient occurrence of electron transfer, the orbital (LUMO) where an excited electron is present in the excited state of the sensitizing dye or in the two-photon excited state of the two-photon absorbing compound preferably has a higher energy than the LUMO orbital of the dye precursor or acid or base generator.

In the case where the excited state of a sensitizing dye or the two-photon excited state of a two-photon absorbing compound receives an electron, in order to cause efficient occurrence of electron transfer, the orbital (HOMO) where a hole is present in the excited state of the sensitizing dye or in the two-photon excited state of the two-photon absorbing compound preferably has a lower energy than the HOMO orbital of the dye precursor or acid or base generator.

The preferred combinations of the recording component in the photon-mode recording material and the two-photon absorbing optical recording material of the invention are described in detail below.

The case where the recording component in the photon-mode recording material and the two-photon absorbing optical recording material of the invention contains at least an acid color-forming dye precursor as a type of the dye precursor and further contains an acid generator is described below.

The acid generator is a compound capable of generating an acid as result of energy or electron transfer from the excited state of a sensitizing dye or from the two-photon excited state of a two-photon absorbing compound. The acid generator is preferably stable in a dark place. The acid generator for use in the invention is preferably a compound capable of generating an acid as a result of electron transfer from the excited state of a sensitizing dye or from the two-photon excited state of a two-photon absorbing compound.

As the acid generator for use in the invention, the following 6 systems are preferred.

If desired, two or more of these acid generators may be combined into a mixture for use in the invention.

1) Trihalomethyl-substituted triazine-based acid generator,

2) Diazonium salt-based acid generator,

3) Diaryliodonium salt-based acid generator,

4) Sulfonium salt-based acid generator,

5) Metal arene complex-based acid generator,

6) Sulfonic acid ester-based acid generator.

The concrete description of the above-mentioned preferred systems may be the same as that given hereinabove in the section of the two-photon absorbing optical material.

The photon-mode recording material and the two-photon absorbing recording material of the invention as well as the composition comprising the material may contain a polymerizable monomer, a polymerizable binder, a reactive binder and a crosslinking agent in order that the material and the composition could be hardened through polymerization or crosslinking thereof during recoding on it.

Regarding the recoding component in the photon-mode recording material and the two-photon absorbing optical recording material of the invention, which contains an acid color-forming dye precursor as a type of the dye precursor and further contains an acid generator, the description of the acid color-forming dye precursor may be the same as that given hereinabove in the section of the two-photon absorbing optical recording material.

When the recording component in the invention contains at least an acid color-forming dye precursor as a type of the dye precursor, and an acid generator, it may further contain an acid-increasing agent.

The acid-increasing agent for use in the invention is a compound of increasing an acid by using, as a trigger, a small amount of the acid generated by the acid generator, and this compound is stable in the absence of an acid but when an acid is present, decomposes to release an acid which triggers decomposition of another acid-increasing agent to also release an acid.

The description of the acid-increasing agent may be the same as that given hereinabove in the section of the two-photon absorbing recording material.

The description of the photon-mode recording material and the two-photon absorbing optical recording material where the recording component contains at least a base color-forming dye precursor as a type of the dye precursor, and a base generator may be also the same as that given hereinabove in the section of the two-photon absorbing recording material.

Regarding the photon-mode recording material and the two-photon absorbing optical recording material where the recording component contains at least a base color-forming dye precursor as a type of the dye precursor, and a base generator, the description of the base color-forming dye precursor may be also the same as that given hereinabove in the section of the two-photon absorbing recording material.

When the recording component in the invention contains at least a base color-forming dye precursor as a type of the base precursor, and a base generator, it may further contain a base-increasing agent. The description of the base-increasing agent may be the same as that given hereinabove in the section of the two-photon absorbing recording material.

During base increase, heating is preferred. Therefore, when the photon-mode recording material and the two-photon absorbing optical recording material of the invention contains a base-increasing agent, the material is preferably heated, after exposed.

The recording component in the invention may contain a compound where an organic compound moiety having a function of cutting the covalent bond due to electron or energy transfer with the excited state of a sensitizing dye or with the two-photon excited state of a two-photon absorbing compound is covalently bonded with another organic compound moiety to give a color-forming material when covalently bonded and when released, and this embodiment is described below.

In this embodiment, the recording component preferably contains at least a dye precursor represented by formula (32).

In formula (32), A1 and PD are covalently bonded, A1 represents an organic compound moiety having a function of cutting the covalent bond with PD due to electron or energy transfer with the excited state of a sensitizing dye or with the two-photon excited state of a two-photon absorbing compound, and PD represents an organic compound moiety to give a color-forming material when covalently bonded with A1 and when released from A1 after the covalent bond with A1 has been cut.

A1 is preferably an organic compound moiety having a function of cutting the covalent bond with PD due to electron transfer with the excited state of a sensitizing dye or with the two-photon excited state of a two-photon absorbing compound.

PD is preferably a group comprising a dissociation-type dye such as dissociation-type azo dye, dissociation-type azomethine dye, dissociation-type oxonole dye or dissociation-type arylidene dye, or a dye capable of becoming a so-called "leuco dye", such as triphenylmethane dye or xanthene (fluoran) dye, and this is connected to A1 through a covalent bond on the chromophore.

PD is more preferably a dissociation-type azo dye, a dissociation-type azomethine dye, a dissociation-type oxonole dye or a dissociation-type arylidene dye.

Preferably, PD is in the colorless or pale-colored state or showing absorption in the short wavelength region when covalently bonded with A1, but when released as a result of cutting of the covalent bond to A1, it is strongly colored or shows an absorption shifted to the longer wavelength side.

The description of the base-increasing agent including the specific preferred examples of PD may be the same as that given hereinabove in the section of the two-photon absorbing optical recording material.

The recording component in the invention may contain a compound capable of undergoing a reaction due to electron transfer with the excited state of a sensitizing dye or the two-photon excited state of a two-photon absorbing compound and changing the absorption profile thereof, and this embodiment is described below.

The compounds capable of undergoing such a reaction are generically named an "electrochromic compound".

Preferred examples of the electrochromic compound for use as the dye precursor in the invention include polypyrroles (preferably, for example, polypyrrole, poly(N-methylpyrrole), poly(N-methylindole) and polypyrrolopyrrole), polythiophenes (preferably, for example, polythiophene, poly(3-hexylthiophene), polyisothianaphthene, polydithienothiophene, poly(3,4-ethylenedioxy)thiophene), polyanilines (preferably, for example, polyaniline, poly(N-naphthylaniline), poly(o-phenylenediamine), poly(aniline-m-sulfonic acid), poly(2-methoxyaniline) and poly(o-aminophenol), poly(diarylamine)), poly(N-vinylcarbazole), Co pyridinoporphyrazine complex, Ni phenanthroline complex and Fe basophenanthroline complex.

In addition, electrochromic materials such as viologens, polyviologens, lanthanoid diphthalocyanines, styryl dyes, TNFs, TCNQ/TTF complexes, Ru trisbipyridyl complexes are also preferred.

The recording component for use in the invention may be a commercially available product or may be synthesized by a known method.

In the two-photon absorbing optical recording material of the invention, an electron-donating compound having an ability to reduce the radical cation of a sensitizing dye, a two-photon absorbing compound or a color-forming material, or an electron-accepting compound having an ability to oxidize the radical anion of a sensitizing dye, a two-photon absorbing compound or a color-forming material can be preferably used. The use of the electron-donating compound is more preferable in view of enhancement of color forming property.

Preferred examples of the electron-donating compound include alkylamines (preferably, for example, triethylamine, tributylamine, trioctylamine, N,N-dimethyldodecylamine, triethanolamine and triethoxyethylamine), anilines (preferably for example, N,N-dioctylaniline, N,N-dimethylaniline, 4-methoxy-N,N-dibutylaniline and 2-methoxy-N,N-dibutylaniline), phenylenediamines (preferably for example, N,N,N',N'-tetramethyl-1,4-phenylenediamine, N,N,N',N'-tetramethyl-1,2-phenylenediamine, N,N,N',N'-tetraethyl-1,3-phenylenediamine, N,N'-dibutylphenylenediamine), triphenylamines (preferably, for example, triphenylamine, tri (4-methoxyphenyl)amine, tri(4-dimethylaminophenyl) amine and TPD), carbazoles (preferably, for example, N-vinylcarbazole and N-ethylcarbazole), phenothiazines (preferably, for example, N-methylphenothiazine, N-phenylphenothiazine), phenoxazines (preferably, for example, N-methylphenoxazine, N-phenylphenoxazine), phenazines (preferably, for example, N,N'-dimethylphenazine, N,N'-diphenylphenazine), hydroquinones (preferably, for example, hydroquinone, 2,5-dimethylhydroquinone, 2,5-dichlorohydroquinone, 2,3,4,5-tetrachlorohydroquinone, 2,6-dichloro-3,5-dicyanohydroquinone, 2,3-dichloro-5,6-dicyanohydroquinone, 1,4-dihydroxynaphthalene and 9,10-dihydroxyanthracene), catechols (preferably, for example, catechol and 1,2,4-trihydroxybenzene), alkoxybenzenes (preferably, for example, 1,2-dimethoxybenzene, 1,2-dibutoxybenzene, 1,2,4-tributoxybenzene and 1,4-dihexyloxybenzene), aminophenols (preferably, for example, 4-(N,N-diethylamino)phenol and N-octylaminophenol), imidazoles (preferably, for example, imidazole, N-methylimidazole, N-octylimidazole and N-butyl-2-methylimidazole), pyridines (preferably, for example, pyridine, picoline, lutidine, 4-tert-butylpyridine, 4-octyloxypyridine, 4-(N,N-dimethylamino)pyridine, 4-(N,N-dibutylamino)pyridine and 2-(N-octylamino)pyridine), metallocenes (preferably, for example, ferrocene, titanocene and ruthenocene), metal complexes (preferably, for example, Ru bisbipyridine complexes, Cu phenanthroline complexes, Cu trisbipyridine complexes, Fe EDTA complexes and other complexes of Ru, Fe, Re, Pt, Cu, Co, Ni, Pd, W, Mo, Cr, Mn, Ir and Ag), fine particulate semiconductors (preferably, for example, Si, CdSe, GaP, PbS and ZnS). As the electron-donating compound, phenothiazines is more preferable, still more preferable N-methylphenothiazine.

Preferred examples of the electron-accepting compound include aromatic compounds having introduced thereinto an electron-withdrawing group (preferably, for example, 1,4-dinitrobenzene, 1,3-dicyanobenzene, 4,5-dichloro-1,2-dicyanobenzene, 4-nitro-1,2-dicyanobenzene, 4-octanesulfonyl-1,2-dicyanobenzene and 1,10-dicyanoanthracene), heterocyclic compounds or heterocyclic compounds having introduced thereinto an electron-withdrawing group (preferably, for example, pyrimidine, pyrazine, triazine, dichloropyrazine, 3-cyanopyrazole, 4,5-dicyano-1-methyl-2-octanoylaminoimidazole, 4,5-dicyano-imidazole, 2,4-dimethyl-1,3, 4-thiadiazole, 5-chloro-3-phenyl-1,2,4-thiadiazole, 1,3,4-oxadiazole, 2-chlorobenzothiazole, N-butyl-1,2,4-triazole), N-alkylpyridinium salts (preferably, for example, N-butylpyridinium iodide, N-butylpyridinium bis(trifluoromethanesulfonyl)imide, N-butyl-3-ethoxycarbonyl-pyridinium butanesulfonate, N-octyl-3-carbamoylpyridinium bis(trifluoromethanesulfonyl)imide, N,N-dimethylviologen di(hexafluorophosphate) and N,N-diphenylviologen bis(bis (trifluoromethanesulfonyl)imide)), benzoquinones (preferably, for example, benzoquinone, 2,5-dimethylbenzoquinone, 2,5-dichlorobenzoquinone, 2,3,4,5-tetrachlorobenzoquinone, 2,6-dichloro-3,5-dicyanobenzoquinone, 2,3-dichloro-5,6-dicyanobenzoquinone, naphthoquinone and anthraquinone), imides (preferably, for example, N,N'-dioctylpyromellitimide and 4-nitro-N-octylphthalimide), metal complexes (preferably, for example, Ru trisbipyridine complexes, Ru bisbipyridine complexes, Co trisbipyridine complexes, Cr trisbipyridine complexes, $PtCl_6$ complexes and other complexes of Ru, Fe, Re, Pt, Cu, Co, Ni, Pd, W, Mo, Cr, Mn, Ir and Ag) and fine particulate semiconductors (preferably, for example, $TiO_2$, $Nb_2O_5$, $ZnO$, $SnO_2$, $Fe_2O_3$ and $WO_3$).

The oxidation potential of the electron-donating compound is preferably baser (on the minus side) than the oxidation potential of a sensitizing dye, a two-photon absorbing compound or a color-forming material, or than the reduction potential of the excited state thereof, and the reduction potential of the electron-accepting compound is preferably nobler (on the plus side) than the reduction potential of a sensitizing dye, a two-photon absorbing compound or a color-forming material, or than the oxidation potential of the excited state thereof.

The photon-mode recording material and the two-photon absorbing optical recording material of the invention preferably contain a binder. The binder is usually used for the purpose of improving the film-forming property of the composition, the uniform film thickness and the storage stability. The binder is preferably well compatible with the sensitizing dye, the two-photon absorbing compound and the recording component in the material.

The binder is preferably a solvent-soluble thermoplastic polymer, and these polymers can be used individually or in combination.

The binder may have a reactive site to react with a crosslinking agent or with a polymerizable monomer or oligomer, thereby to crosslink or harden the recording material. Preferred examples of the reactive site of the binder include, as a radical-reactive site, an ethylenic unsaturated group such as typically an acryl group or a methacryl group, as a cation-reactive site, a residue of an oxirane compound or an oxetane compound, or a vinyl ether group, and, as a polycondensation-reactive site, a residue of a carboxylic acid, an alcohol or an amine.

Specific preferred examples of the binder for use in the invention include acrylates, α-alkyl acrylate esters, acidic polymers and interpolymers (for example, polymethyl methacrylate, polyethyl methacrylate and copolymer of methyl methacrylate with other alkyl(meth)acrylate), polyvinyl esters (for example, polyvinyl acetate, polyvinyl acetate/acrylate, polyvinyl acetate/methacrylate, and hydrolyzed polyvinyl acetate), ethylene/vinyl acetate copolymers, saturated or unsaturated polyurethanes, butadiene and isoprene polymers and copolymers, high molecular weight polyethylene oxides of polyglycol having a weight average molecular weight of around 4,000 to 1,000,000, epoxidates (for example, epoxidate having an acrylate or methacrylate group), polyamides (for example, N-methoxymethyl-polyhexamethylene adipamide), cellulose esters (for example, cellulose acetate, cellulose acetate succinate and cellulose acetate butyrate), cellulose ethers (for example, methyl cellulose, ethyl cellulose, ethyl benzyl cellulose), polycarbonates, polyvinyl acetals (for example, polyvinyl butyral and polyvinyl formal), polyvinyl alcohols, polyvinylpyrrolidones, and acid-containing polymers and copolymers that are disclosed in U.S. Pat. Nos. 3,458,311 and 4,273,857 as those functioning as suitable binders.

In addition, they further include polystyrene polymers and copolymers with, for example, acrylonitrile, maleic anhydride, acrylic acid, methacrylic acid or an ester thereof, vinylidene chloride copolymers (e.g., vinylidene chloride/acrylonitrile copolymer, vinylidene chloride/methacrylate copolymer, vinylidene chloride/vinyl acetate copolymer), polyvinyl chloride and copolymers thereof (e.g., polyvinyl chloride/acetate, vinyl chloride/acrylonitrile copolymer), polyvinyl benzal synthetic rubbers (e.g., butadiene/acrylonitrile copolymer, acrylonitrile/butadiene/styrene copolymer, methacrylate/acrylonitrile/butadiene/styrene copolymer, 2-chlorobutadiene-1,3 polymer, chlorinated rubber, styrene/butadiene/styrene, styrene/isoprene/styrene block copolymer), copolyesters (for example, polymethylene glycol represented by a formula: $HO(CH_2)_nOH$ (wherein n is an integer of 2 to 10), those produced from a reaction product of (1) hexahydroterephthalic acid, sebacic acid and terephthalic acid, (2) terephthalic acid, isophthalic acid and sebacic acid, (3) terephthalic acid and sebacic acid, or (4) terephthalic acid and isophthalic acid, and a mixture of copolyesters produced from (5) the glycol and (i) terephthalic acid, isophthalic acid and sebacic acid or (ii) terephthalic acid, isophthalic acid, sebacic acid and adipic acid), poly-N-vinylcarbazole and copolymers thereof, carbazole-containing polymers disclosed in H. Kamogawa et al., *Journal of Polymer Science: Polymer Chemistry Edition*, Vol. 18, pp. 9-18 (1979), and polycarbonate made of bisphenol and carbonic acid ester.

In addition, a fluorine atom-containing polymer is also preferred as a low-refractive index binder for use herein. The polymer is preferably a solvent-soluble polymer containing a fluoro-olefin as an essential component and containing, as a copolymerization component, one or more unsaturated monomers selected from an alkyl vinyl ether, an alicyclic vinyl ether, a hydroxyvinyl ether, an olefin, a halo-olefin, an unsaturated carboxylic acid or an ester thereof, and a vinyl carboxylate. The weight average molecular weight thereof is preferably from 5,000 to 200,000 and the fluorine atom content thereof is preferably from 5 to 70% by weight.

As the fluoro-olefin in the fluorine atom-containing polymer, for example, tetrafluoroethylene, chlorotrifluoroethylene, vinyl fluoride or vinyl idene fluoride is used. As for another copolymerization component, examples of the alkyl vinyl ether include ethyl vinyl ether, isobutyl vinyl ether and n-butyl vinyl ether, examples of the alicyclic vinyl ether include cyclohexyl vinyl ether and derivatives thereof, examples of the hydroxyvinyl ether include hydroxybutyl vinyl ether, examples of the olefin and halo-olefin include ethylene, propylene, isobutylene, vinyl chloride and vinylidene chloride, examples of the vinyl carboxylate include vinyl acetate and n-vinyl butyrate, examples of the unsaturated carboxylic acid and ester thereof include unsaturated carboxylic acids such as (meth)acrylic acid and crotonic acid, C1-C18 alkyl esters of (meth)acrylic acid, such as methyl(meth)acrylate, ethyl (meth)acrylate, propyl(meth)acrylate, isopropyl (meth)acrylate, butyl(meth)acrylate, hexyl(meth)acrylate, octyl(meth)acrylate and lauryl(meth)acrylate, C2-C8 hydroxyalkyl esters of (meth)acrylic acid, such as hydroxyethyl (meth)acrylate and hydroxypropyl (meth)acrylate, N,N-dimethylaminoethyl(meth)acrylate and N,N-diethylaminoethyl(meth)acrylate. These radical polymerizable monomers may be used individually or in combination of two or more thereof and if desired, a part of the monomer may be replaced by another radical polymerizable monomer, for example, vinyl compound such as styrene, α-methylstyrene, vinyltoluene and (meth)acrylonitrile. Other than these, monomer derivatives such as carboxylic acid group-containing fluoro-olefin and glycidyl group-containing vinyl ether can also be used.

Specific examples of the fluorine atom-containing polymer include "Lumiflon" series (for example, Lumiflon LF200, weight average molecular weight: about 50,000, produced by Asahi Glass Company) having a hydroxyl group and being soluble in an organic solvent. In addition, organic solvent-soluble fluorine atom-containing polymers are commercially available also from Daikin Kogyo Co., Ltd. and Central Glass Co., Ltd. and these can also be used.

Preferably, the binder for use in the photon-mode recording material and the two-photon absorbing optical recording material of the invention has a refractive index of at most 1.5.

If desired, the photon-mode recording material and the two-photon absorbing optical recording material of the invention may contain various additives such as polymerizable monomer, polymerizable oligomer, crosslinking agent, heat stabilizer, plasticizer and solvent.

Preferred examples of the polymerizable monomer, polymerizable oligomer and crosslinking agent usable in the photon-mode recording material and the two-photon absorbing optical recording material of the invention are described, for example, in Japanese Patent Application No. 2003-82732.

A heat stabilizer may be added to the photon-mode recording material and the two-photon absorbing optical recording material of the invention for improving the storage storability of the material.

Useful examples of the heat stabilizer include hydroquinone, phenidone, p-methoxyphenol, alkyl- or aryl-substituted hydroquinone or quinone, catechol, tert-butylcatechol, pyrogallol, 2-naphthol, 2,6-di-tert-butyl-p-cresol, phenothiazine and chloranil. In addition, dinitroso dimers described in U.S. Pat. No. 4,168,982 by Pazos are also useful.

The plasticizer is used for varying the adhesive property, flexibility, hardness and other various mechanical properties of the photon-mode recording material and the two-photon absorbing optical recording material. Examples of the plasticizer include triethylene glycol dicaprylate, triethylene glycol bis(2-ethylhexanoate), tetraethylene glycol diheptanoate, diethyl sebacate, dibutyl suberate, tris(2-ethylhexyl) phosphate, tricresyl phosphate and dibutyl phthalate.

Generally, the percentage of each component in the photon-mode recording material and the two-photon absorbing optical recording material of the invention is preferably in the following range based on the entire mass of the composition:

(Reactive) binder, polymerizable monomer, polymerizable oligomer, crosslinking agent: preferably from 0 to 95% by weight, more preferably from 30 to 95% by weight.

Recording component: preferably from 3 to 80% by weight, more preferably from 5 to 60% by weight.

Sensitizing dye or two-photon absorbing compound: preferably from 0.01 to 10% by weight, more preferably from 0.1 to 3% by weight.

Electron-donating compound or electron-accepting compound: preferably from 0.1 to 30% by weight, more preferably from 1 to 20% by weight.

Compositions for the photon-mode recording material and the two-photon absorbing optical recording material of the invention may be prepared by an ordinary method, for example, by adding the above-described essential components and optional components directly as they are or optionally along with a solvent.

Examples of the solvent include a ketone solvent such as methyl ethyl ketone, methyl isobutyl ketone, acetone and cyclohexanone, an ester solvent such as ethyl acetate, butyl acetate, ethylene glycol diacetate, ethyl lactate and cellosolve acetate, a hydrocarbon solvent such as cyclohexane, toluene and xylene, an ether solvent such as tetrahydrofuran, dioxane and diethyl ether, a cellosolve solvent such as methyl cellosolve, ethyl cellosolve, butyl cellosolve and dimethyl cellosolve, an alcohol solvent such as methanol, ethanol, n-propanol, 2-propanol, n-butanol and diacetone alcohol, a fluorine-containing solvent such as 2,2,3,3-tetrafluoropropanol, a halogenated hydrocarbon solvent such as dichloromethane, chloroform and 1,2-dichloroethane, an amide solvent such as N,N-dimethylformamide, and a nitrile solvent such as acetonitrile and propyonitrile.

The composition for the photon-mode recording material and the two-photon absorbing optical recording material of the invention may be directly applied onto a substrate by using a spin coater, a roll coater or a bar coater or may be cast as a film and then laminated on a substrate by an ordinary method, whereby the photon-mode recording material and the two-photon absorbing optical recording material can be completed.

The term "substrate" as used herein means a natural or synthetic support, preferably in the form of a soft or rigid film, sheet or plate.

Preferred examples of the substrate include polyethylene terephthalate, resin-undercoated polyethylene terephthalate, polyethylene terephthalate subjected to flame or electrostatic discharge treatment, cellulose acetate, polycarbonate, polymethyl methacrylate, polyester, polyvinyl alcohol and glass.

The solvent used can be removed by evaporation at the drying. For the removal by evaporation, heating or reduced pressure may be used.

Furthermore, a protective layer for blocking oxygen may be formed on the photon-mode recording material and the two-photon absorbing optical recording material. The protective layer may be formed by laminating a plastic-made film or sheet such as polyolefin (e.g., polypropylene, polyethylene), polyvinyl chloride, polyvinylidene chloride, polyvinyl alcohol, polyethylene terephthalate or cellophane film, with use of electrostatic adhesion or an extruder or by applying a solution of such a polymer. Also, a glass sheet may be laminated. Between the protective layer and the photosensitive film and/or between the substrate and the photosensitive film, an adhesive or a liquid substance may be allowed to be present so as to increase the air tightness.

EXAMPLES

Examples of the invention are specifically described below based on experimental results. Needless to say, the invention is not limited to these examples.

Synthesis of Two-Photon Absorbing Compound for Use in the Optical Recording Material of the Invention (1) Synthesis of D-73

Two-Photon Absorbing Compound D-73 of the invention can be synthesized by the following method.

Synthesis Example of D-73

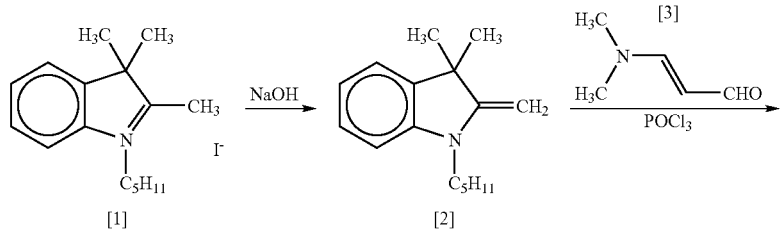

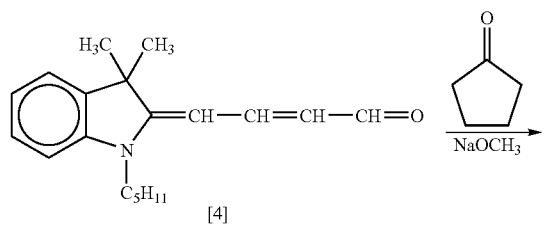

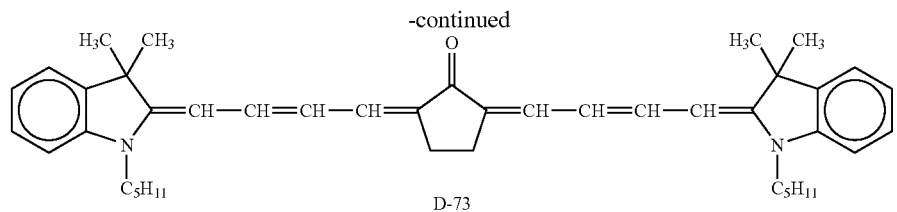

A quaternary salt [1] (14.3 g (40 mmols)) was dissolved in 50 ml of water and thereto, 1.6 g (40 mmols) of sodium hydroxide was added. The resulting solution was stirred at room temperature for 30 minutes and the obtained reaction solution was extracted three times with ethyl acetate, dried over magnesium sulfate and then concentrated to obtain 9.2 g (yield: 100%) of an oil of methylene base [2].

D-75 and D-77 were produced in the same manner as above.

(2) Synthesis of D-84

Two-Photon Absorbing Compound D-84 of the invention can be synthesized by the following method.

Synthesis Example of D-84

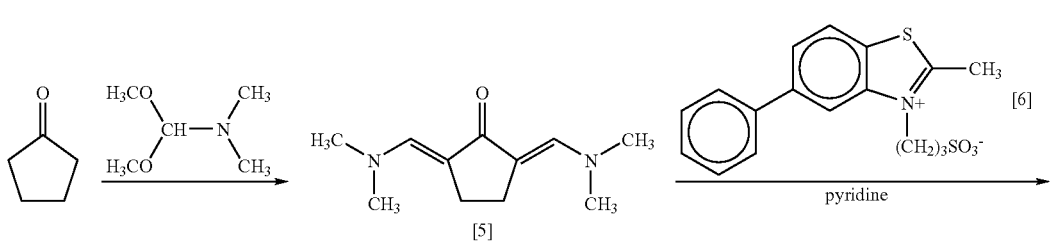

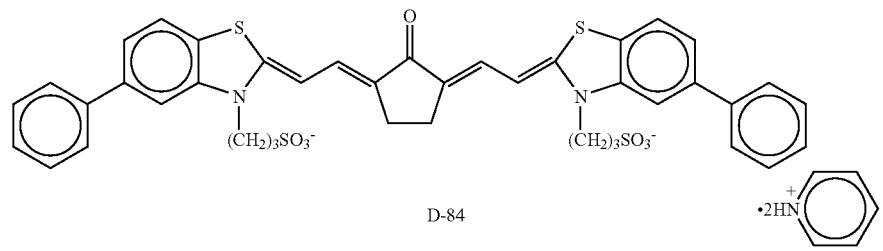

Cyclopentanone (33.6 g (0.4 mols)), 2 ml of DBN and 400 g of N,N-dimethylformamide dimethylacetal were refluxed for 5 days. The resulting solution was concentrated and after adding acetone thereto, cooled and the crystal was separated by filtration and washed with cold acetone to obtain 32.4 g (yield: 42%) of a crystal of [5].

0.78 g (4 mmols) of [5], 2.78 g (8 mmols) of a quaternary salt [6] and 20 ml of pyridine were refluxed in a nitrogen atmosphere for 4 hours in a dark place. The resulting solution was cooled and after adding ethyl acetate thereto, the crystal was separated by filtration and washed with ethyl acetate. The crystal was dispersed in methanol and then separated by filtration to obtain 2.14 g (yield: 56%) of the objective D-84 as a dark blue crystal.

Its structure was confirmed by NMR spectrum, MS spectrum and elemental analysis.

Other two-photon absorbing compounds represented by formula (1) of the invention can also be synthesized according to the synthesis method of D-74 or D-84 or the method described, for example, in *Tetrahedron. Lett.*, Vol. 42, page 6129 (2001).

(3) Synthesis of D-1

Two-Photon Absorbing Compound D-1 of the invention can be synthesized by the following method.

Synthesis Example of D-1

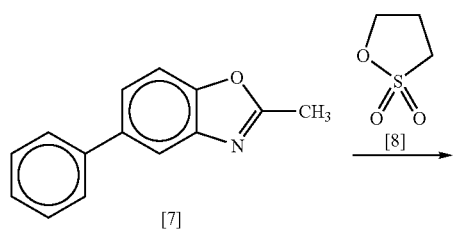

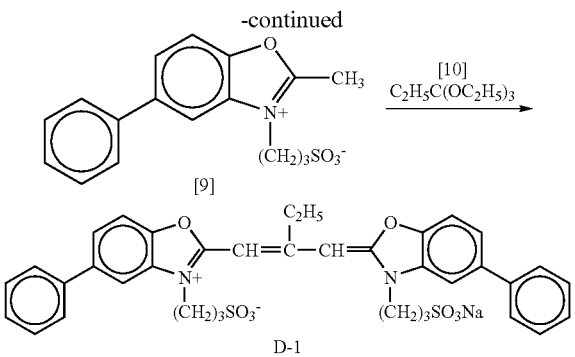

Benzoxazole [7] (52.25 g (0.2 mols)) and propane sultone [8] (45.75 g (0.375 mmols)) were heated and stirred at 140° C. for 4 hours. After this was cooled, acetone was added thereto, the resulting crystal was taken out by filtration and washed with acetone to obtain 70.42 g (yield 85%) of a quaternary salt [9].

The quaternary salt [9] (66.2 g (0.2 mols)), 200 ml of triethyl orthopropionate [10], 200 ml of pyridine and 80 ml of acetic acid were heated and stirred at 120° C. for 1 hour. After cooled, this was washed three times through decantation with ethyl acetate. This was dissolved in 100 ml of methanol and stirred and thereto, a solution of sodium acetate (4.0 g (50 mmols))/methanol (20 ml) was added. The resulting crystal was taken out by filtration. This was dispersed in methanol and again filtered to obtain the intended D-1 (31.36 g (yield 43.4%)) as a vermilion crystal.

Its structure was confirmed by NMR spectrum, MS spectrum and elemental analysis.

(4) Synthesis of D-42

Two-Photon Absorbing Compound D-42 of the invention can be synthesized by the following method.

Synthesis Example of D-42

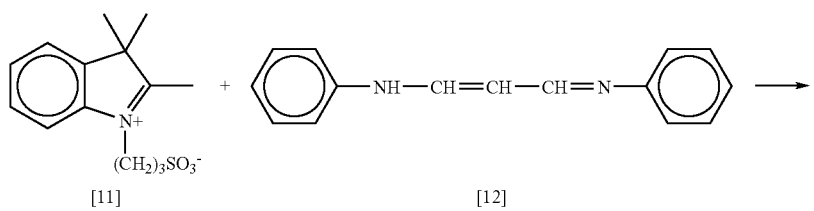

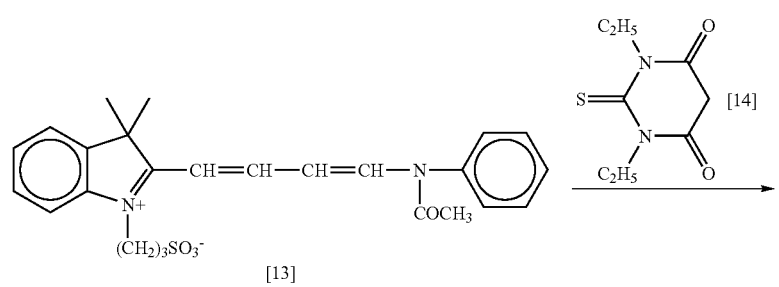

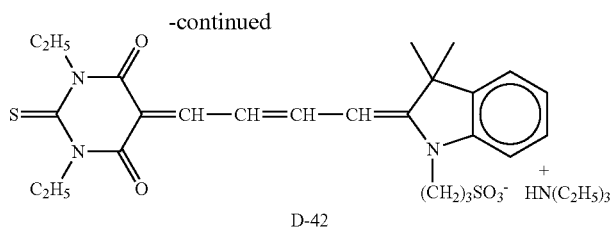

D-42

Quaternary salt [11] (2.81 g (10 mols)), [12] (6.67 g (30 mmols)), 10 g of acetic anhydride and 50 ml of acetonitrile were refluxed for 30 minutes. After concentrated, this was subjected to decantation with ethyl acetate to obtain a crude product of an anile compound [13].

Thiobarbituric acid [14] (2.00 g (10 mmols), triethylamine (3.0 g (30 mmols)) and 100 ml of ethanol were added to the crude anile compound [13], and refluxed for 1 hours. After concentrated, this was purified by silica gel column chromatography (developing solvent: chloroform:methanol=20:1→10:1) and recrystallized from methanol-isopropyl alcohol to obtain 2.55 g (overall yield: 41.3%) of a crystal of the intended D-42.

Its structure was confirmed by NMR spectrum, MS spectrum and elemental analysis.

(5) Synthesis of D-56

Two-Photon Absorbing Compound D-56 of the invention can be synthesized by the following method.

Synthesis Example of D-56

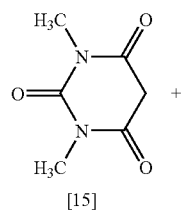

[15]

-continued

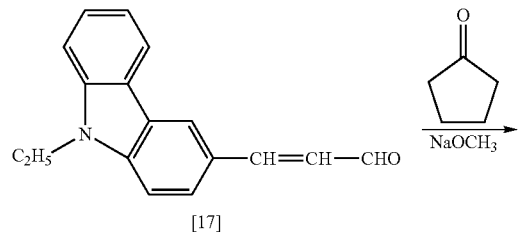

D-56

Barbituric acid [15] (3.12 g (20 mmols), [16] (2.85 g (10 mmols)) and triethylamine (4.1 g (40 mmols)) were dissolved in 30 ml of DMF, and stirred at room temperature for 2 hours. Diluted hydrochloric acid was added to it, and the resulting crystal was taken out by filtration, washed with water and dried to obtain 2.99 g (yield 80.0%) of a crystal of the intended D-56.

Its structure was confirmed by NMR spectrum, MS spectrum and elemental analysis.

(6) Synthesis of D-104

Two-Photon Absorbing Compound D-104 of the invention can be synthesized by the following method.

Synthesis Example of D-104

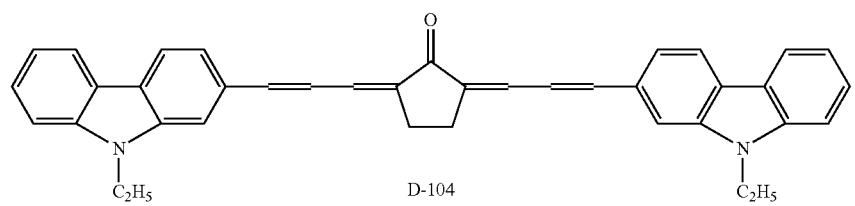

D-104

3-(9-Ethylcarbazol-3-yl)propenal [17] (3.3 g (13 mmols)) and cyclopentanone (0.55 g (6.6 mmols)) were dissolved in dewatered methanol and thereto, 1 ml of a methanol solution of 28% sodium methoxide was dropwise added, and stirred at room temperature for 2 hours. The precipitated crystal was taken out by filtration, washed with methanol and dried to obtain 2.5 g (yield 70.0%) of a crystal of the intended D-104.

Its structure was confirmed by NMR spectrum, MS spectrum and elemental analysis.

Other cyanine dyes, merocyanine dyes and oxonole dyes may be produced according to the method described, for example, in F. M. Harmer, *Heterocyclic Compounds-Cyanine Dyes and Related Compounds*, John Wiley & Sons, New York, London (1964), and D. M. Sturmer, *Heterocyclic Compounds-Special Topics in Heterocyclic Chemistry*, Chap. 18, Section 14, pp. 482-515, John Wiley & Sons, New York, London.

Other cyanine dyes, merocyanine dyes and oxonole dyes may be produced according to the method described, for example, in F. M. Harmer, *Heterocyclic Compounds-Cyanine Dyes and Related Compounds*, John Wiley & Sons, New York, London (1964), and D. M. Sturmer, *Heterocyclic Compounds-Special Topics in Heterocyclic Chemistry*, Chap. 18, Section 14, pp. 482-515, John Wiley & Sons, New York, London.

Many of the dye precursors for use in the invention are commercially available or can be synthesized by a known method.

Example 1

Evaluation of Reflectance Change by Refractivity Modulation or Absorbance Modulation A method of light reflectance modulation that results from the absorbance and refractivity modulation through two-photon absorption of the two-photon absorbing optical recoding material of the invention is described below.

Samples 101 to 103 of the two-photon absorbing three-dimensional optical recording material of the invention, and comparative samples 1 to 3, each having the composition mentioned below, were prepared.

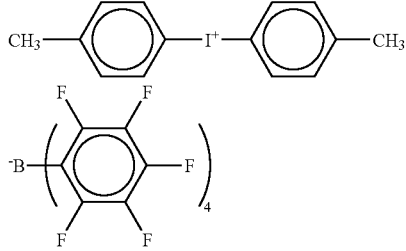

I-101

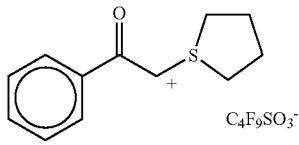

I-102

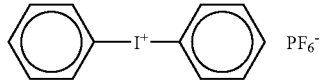

I-103

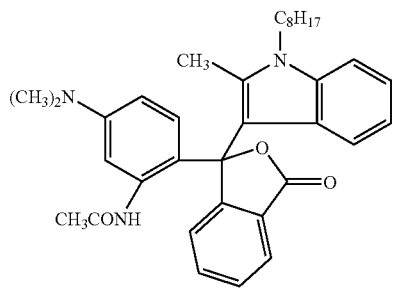

R-7

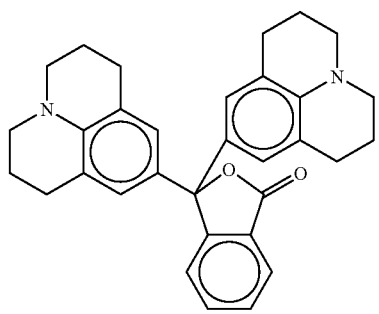

R-8

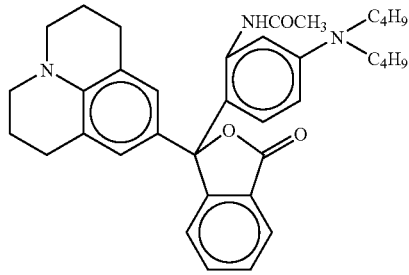

R-9

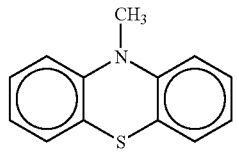

ED-1

<Sample 101: Two-photon Absorbing Optical Recording Material of the Invention>

| | |
|---|---|
| Two-photon absorbing compound: D-128 | 1 mas. pt. |
| Electron-donating compound: ED-1 | 20 mas. pt. |
| Recording component: | |
| Acid generator I-103 | 23 mas. pts. |
| Acid color-forming dye precursor R-9 | 10 mas. pts. |
| Binder: Aldrich's poly(methyl methacrylate-ethyl acrylate copolymer(mean molecular weight, 101,000) | 46 mas. pts. |
| Solvent: chloroform (if necessary, acetonitrile was used) | 3 times by weight the total of the above components |

<Comparative Sample 1>

Recording componet:

| | |
|---|---|
| Acid generator I-103 | 23 mas. pts. |
| Acid color-forming dye precursor R-9 | 10 mas. pts. |
| Binder: Aldrich's poly(methyl methacrylate-ethyl acrylate copolymer(mean molecular weight, 101,000) | 67 mas. pts. |
| Solvent: chloroform(if necessary, acetonitrile was used) | 3 times by weight the total of the above components |

<Sample 102: two-photon absorbing optical recording material of the invention>

| | |
|---|---|
| Two-photon absorbing compound: D-128 | 1 mas. pt. |
| Electron-donating compound: ED-1 | 20 mas. pt. |
| Recording component: | |
| Base generator PB-3 | 20 mas. pts. |
| Base color-forming dye precursor DD-17 | 10 mas. pts. |
| Binder: Aldrich's polymethyl methacrylate (mean molecular weight, 120,000) | 49 mas. pts. |
| Solvent: chloroform | 3 times by weight the total of the above components |

<Comparative Sample 2>

| | |
|---|---|
| Recording component: | |
| Base generator PB-3 | 20 mas. pts. |
| Base color-forming dye precursor DD-17 | 10 mas. pts. |
| Binder: Aldrich's polymethyl methacrylate (mean molecular weight, 120,000) | 70 mas. pts. |
| Solvent: chloroform | 3 times by weight the total of the above components |

<Sample 103: two-photon absorbing optical recording material of the invention>

| | |
|---|---|
| Two-photon absorbing compound: D-128 | 1 mas. pt. |
| Electron-donating compound: ED-1 | 20 mas. pt. |
| Recording component: dye precursor E-14 | 24 mas. pts. |
| Binder: Aldrich's polymethyl methacrylate (mean molecular weight, 120,000) | 55 mas. pts. |
| Solvent: chloroform | 3 times by weight the total of the above components |

<Comparative Sample 3>

| | |
|---|---|
| Recording component: dye precursor E-14 | 24 mas. pts. |
| Binder: Aldrich's polymethyl methacrylate (mean molecular weight, 120,000) | 76 mas. pts. |
| Solvent: chloroform | 3 times by weight the total of the above components |

Samples 101 to 103 and Comparative Samples 1 to 3 each were bar-coated on a preparation glass plate and after removing the solvent by drying, another preparation glass plate was placed thereon to obtain samples for evaluation. The film thickness was about 10 μm.

Using an ellipsometer, the refractive index of Samples 101 to 103 was measured, and was 1.49, 1.48 and 1.49, respectively, at 720 nm.

In the performance evaluation of the two-photon absorbing recording material of the invention, a Ti:sapphire pulse laser (pulse width: 100 fs, repetition: 80 MHz, average output: 1 W, peak power: 100 kW) capable of performing the measurement in a wavelength range from 700 to 1,000 nm was used and the two-photon absorbing recording material of the invention was irradiated with the laser light while converging the light through an NA 0.6 lens.

The wavelength of light used for irradiation was in the vicinity of a wavelength where the two-photon absorbing cross-sectional area 6 becomes the maximum in a $10^{-4}$ M solution of the two-photon absorbing compound.

Two-photon absorption was caused in Samples 101 to 103 and Comparative Samples 1 to 3 by irradiating laser light at 740 nm. As a result, in the case of Samples 101 to 103, color formation was confirmed in the laser-focused (recorded) area that had been irradiated with light. The absorbance change between the recorded area and the unrecorded area was visually confirmed.

Using an ellipsometer, the refractive index of Samples 101 to 103 was measured, and it was 1.56, 1.55 and 1,56, respectively, at 740 nm, and the data increased as compared with the laser-unfocused area (unrecorded area). When a laser at 740 nm was radiated to the samples, then a refractivity difference (about 20%) was confirmed resulting from the difference in the refractive index between the colored recorded area and the unrecorded area of each sample of the invention.

In addition, when a 660 nm laser was radiated to the recorded Samples 101 to 103, then a refractivity difference was confirmed resulting from the difference in the absorbance between the recorded area and the unrecorded area of the samples.

As opposed to these, however, Comparative Samples 1 to 3 not containing the two-photon absorbing compound D-128 of the invention underwent no change even when irradiated with a 740 nm laser, from which it is obvious that the coloration (refractivity modulation) of the samples of the invention is caused by the formation of the excited state of the two-photon absorbing compound therein through two-photon absorption of the compound.

When the laser-focusing position was scanned in the horizontal direction and in the depth direction, then the samples of the invention could be colored in any desired position in the three-dimensional direction thereof, and this confirms that the three-dimensional refractivity modulation and absorbance modulation in the samples of the invention brings about a light reflectance modulation therein.

When the two-photon absorbing compound was changed to any of D-1, D-5, D-22, D-41, D-56, D-58, D-73, D-75, D-77, D-117, D-118, D-123, D-131, D-142 or D-143 and when the binder was changed to any of polyvinyl acetal, cellulose acetate butyrate or polymethylphenylsiloxane, the same results as above were obtained.

In addition, in Sample 101, when the acid generator in the recording component was changed to any of I-101, I-102, 2-(4'-methoxyphenyl)-4,6-bis(trichloromethyl)-1,3,5-triazine, 4-diethylaminophenyldiazonium tetrafluoroborate, di(tert-butylphenyl)iodonium tetra(pentafluorophenyl)borate, tris(4-methylphenyl)sulfonium tetra(pentafluorophenyl)borate, triphenylsulfonium methanesulfonate, triphenylsulfonium perfluoropentanoate, bis(1-(4-diphenylsulfonium) phenylsulfide ditriflate, benzoin tosylate, 2,6-dinitrobenzyl tosylate, or N-tosylphthalic acid imide; and in Sample 101, when the acid color-forming dye precursor in the recording component was changed to crystal violet lactone, R-7 or R-8, the same results were also obtained.

In Sample 102, when the base generator in the recording component was changed to any of PB-4, PB-8, PB-10, PB-12, PB-13, PB-19, PB-22, PB-32, PB-33 or PB-52, or when the base color-forming dye precursor (non-dissociated form of dissociation-type dye) was changed to DD-3, DD-9, DD-12, DD-23, DD-24, DD-30, DD-32, DD-33, DD-34, DD-37, DD-38, DD-43, DD-45 or DD-46, the same results were obtained.

In Sample 103, when the recording component was changed to any of E-4, E-5, E-11, E-12, E-13, E-16, E-17, E-18, E-19, E-20, E-25, E-26, E-27, E-29, E-32, E-34, E-37, E-38, E-39 or E-42, the same results were obtained.

In the evaluations above, as for the wavelength of laser for causing two-photon absorption, the wavelength of light for confirming the reflectance change due to refractivity modulation, and the wavelength of light for confirming the reflectance change due to absorbance change, optimal wavelengths for the two-photon absorbing compound and the recording component in the respective systems were used.

Example 2

Preparation of Photosensitive Polymer Composition of the Invention

Photosensitive Polymer Composition (1):

| Polymer compound: | |
|---|---|
| Aldrich's poly(butyl methacrylate-co-isobutyl methacrylate) | 100 mas. pts. |
| Two-photon absorbing compound: D-104 | 0.5 mas. pts. |
| Acid generator: | |
| Diphenyliodonium tetrafluoroborate | 3.0 mas. pts. |
| Compound (D): Crystal violet lactone | 3.0 mas. pts. |

Photosensitive Polymer Composition (2):

| Polymer compound: | |
|---|---|
| Aldrich's poly(butyl methacrylate-co-isobutyl methacrylate) | 100 mas. pts. |
| Two-photon absorbing compound: D-104 | 0.05 mas. pts. |
| Acid generator: | |
| Diphenyliodonium tetrafluoroborate | 3.0 mas. pts. |
| Compound (D): Crystal violet lactone | 3.0 mas. pts. |

Photosensitive Polymer Composition (3):

| Polymer compound: | |
|---|---|
| Aldrich's poly(butyl methacrylate-co-isobutyl methacrylate) | 100 mas. pts. |
| Two-photon absorbing compound: D-104 | 0.5 mas. pts. |
| Acid generator: | |
| Diphenyliodonium tetrafluoroborate | 3.0 mas. pts. |
| Compound (D): Rhodamine B base | 3.0 mas. pts. |

Comparative Composition (1):

| Polymer compound: | |
|---|---|
| Aldrich's poly(butyl methacrylate-co-isobutyl methacrylate) | 100 mas. pts. |
| Acid generator: | |
| Diphenyliodonium tetrafluoroborate | 3.0 mas. pts. |
| Compound (D): Crystal violet lactone | 3.0 mas. pts. |

Comparative Composition (2):

| Polymer compound: | |
|---|---|
| Aldrich's poly(butyl methacrylate-co-isobutyl methacrylate) | 100 mas. pts. |
| Two-photon absorbing compound: D-104 | 0.5 mas. pts. |
| Acid generator: | |
| Diphenyliodonium tetrafluoroborate | 3.0 mas. pts. |

Comparative Composition (3):

| Polymer compound: | |
|---|---|
| Aldrich's poly(butyl methacrylate-co-isobutyl methacrylate) | 100 mas. pts. |
| Two-photon absorbing compound: | |
| Diarylethene described in S. Kawata et al., Chem. Rev. 2000, Vol. 100, p. 1777. | |

The diarylethene used as the two-photon absorbing compound is a photochromic compound having an additional absorption at around 520 nm. The maximum value of the two-photon absorbing cross-sectional area of the compound is 10 GM.

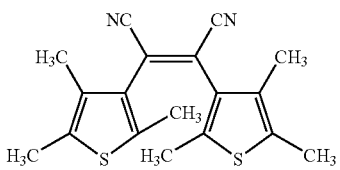

[Performance Evaluation]

The performance of the photopolymerizable composition of the invention was evaluated as follows: The photosensitive polymer composition prepared as above was sandwiched between two sheets of cover glass (thickness, about 100 μm), and irradiated with a femtosecond laser pulse light of which the wavelength corresponds to the maximum wavelength of two-photon absorption of the two-photon absorbing compound, and then the light-irradiated part of the sample was visually checked for the presence or absence of color formation from the acid color-forming dye or the photochromic compound. The intensity of the laser pulse light radiated to the samples and the light irradiation time were the same for all the samples.

The results are given in Table 1.

TABLE 1

| Sample | Wavelength of Radiated Light | Color Formation | Formed Color |
|---|---|---|---|
| Composition (1) | 820 nm | yes | cyan |
| Composition (2) | 820 nm | yes | cyan |
| Composition (3) | 820 nm | yes | magenta |
| Comparative Composition (1) | 820 nm | no | — |
| Comparative Composition (2) | 820 nm | no | — |
| Comparative Composition (3) | 760 nm | no | — |

When the two-photon absorbing compound D-104 was changed to D-4, D-5, D-42, D-56, D-76, D-77, D-94, D-117, D-128, D-139, D-142, or D-143; or when the acid generator was changed to tris(4-methylphenyl)sulfonium tetra(pentafluorophenyl)borate, I-1, I-2, I-4, I-6, I-9,4-methyldiazonium 2,5-dinitrobenzyltosylate, or 2-methyl-4,6-bis(trichloromethyl)-1,3,5-triazine; or when the compound (D) was changed to 3,3-bis(4-diethylaminophenyl)-6-diethylaminophthalide, 4,4'-bishydroxy-3,3'-bisdiaminotriphenylmethanelactone, 3-diethylamino-7-methoxyfluoran, rhodamine (p-nitroanilinolactam, 3-methyl-spirodinaphthopyran, R-1, R-2, R-3, R-4, R-5 or F-6, all gave the same results.

In the colored polymer composition mentioned above, the information can be read, based on the light transmittance difference or the light reflectance difference between the colored area and the non-colored area of the composition. In addition, a refractivity modulated image may be formed owing to the refractivity difference between the colored area and the non-colored area of the composition, and the refractivity difference in those area can be read as the reflectance change of the radiated light. Accordingly, the photosensitive polymer composition of the invention may be applied to three-dimensional optical recoding mediums and to a recording-reproduction method with the recording mediums.

Example 3

Evaluation of Refractivity Modulation and Absorbance Modulation Increase Owing to Two-Photon Absorbing Latent Image Color Formation-Amplification Reaction Hereinunder described is a method of refractivity modulation and reflectance modulation increase in the two-photon absorbing optical recording material in which the latent image color formation resulting from two-photon absorption can be subjected to self-sensitization and amplification, and according to the recording method with the material Samples 101 to 103 of the two-photon absorbing three-dimensional optical recording material of the invention, and comparative samples 1 to 3, each having the composition mentioned below, were prepared.

I-101

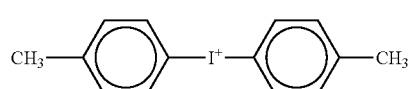

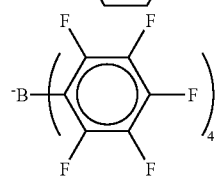

I-102

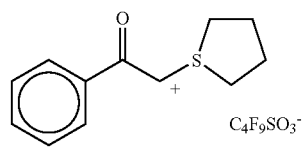

I-103

R-7

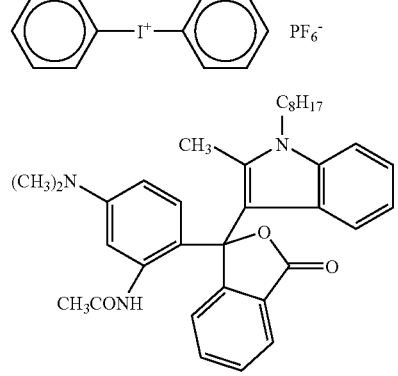

R-8

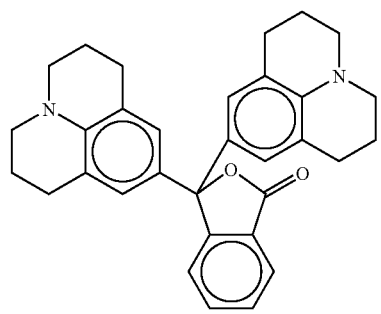

-continued

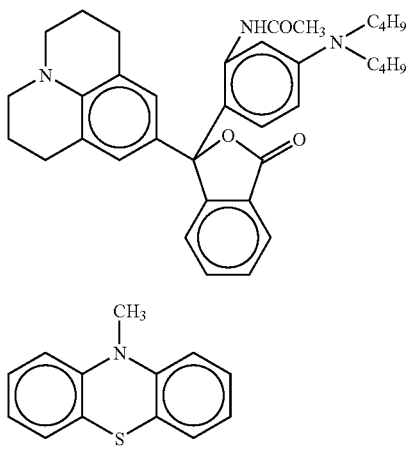

R-9

ED-1

<Sample 101: Two-photon Absorbing Optical Recording Material of the Invention>

| | |
|---|---|
| Two-photon absorbing compound: D-128 | 1 mas. pt. |
| Recording component: | |
| Acid generator I-103 | 23 mas. pts. |
| Acid color-forming dye precursor R-9 | 10 mas. pts. |
| Electron-donating compound ED-1 | 20 mas. pts. |
| Binder: Aldrich's poly(methyl methacrylate-ethyl acrylate) copolymer (mean molecular weight, 101,000) | 46 mas. pts. |
| Solvent: chloroform (if necessary, acetonitrile was used) | 3 times by weight the total of the above components |

<Comparative Sample 1>

| | |
|---|---|
| Recording component: | |
| Acid generator I-103 | 23 mas. pts. |
| Acid color-forming dye precursor R-9 | 10 mas. pts. |
| Electron-donating compound ED-1 | 20 mas. pts. |
| Binder: Aldrich's poly(methyl methacrylate-ethyl acrylate) copolymer (mean molecular weight, 101,000) | 47 mas. pts. |
| Solvent: chloroform (if necessary, acetonitrile was used) | 3 times by weight the total of the above components |

<Sample 102: Two-photon Absorbing Optical Recording Material of the Invention>

| | |
|---|---|
| Two-photon absorbing compound: D-128 | 1 mas. pt. |
| Recording component: | |
| Base generator PB-3 | 20 mas. pts. |
| Base color-forming dye precursor DD-17 | 10 mas. pts. |
| Electron-donating compound ED-1 | 20 mas. pts. |
| Binder: Aldrich's polymethyl methacrylate (mean molecular weight, 120,000) | 49 mas. pts. |
| Solvent: chloroform | 3 times by weight the total of the above components |

<Comparative Sample 2>

| | |
|---|---|
| Recording component: | |
| Base generator PB-3 | 20 mas. pts. |
| Base color-forming dye precursor DD-17 | 10 mas. pts. |
| Binder: Aldrich's polymethyl methacrylate (mean molecular weight, 120,000) | 70 mas. pts. |
| Solvent: chloroform | 3 times by weight the total of the above components |

<Sample 103: two-photon absorbing optical recording material of the invention>

| | |
|---|---|
| Two-photon absorbing compound: D-128 | 1 mas. pt. |
| Recording component: dye precursor E-14 | 24 mas. pts. |
| Electron-donating compound ED-1 | 20 mas. pts. |
| Binder: Aldrich's polymethyl methacrylate (mean molecular weight, 120,000) | 55 mas. pts. |
| Solvent: chloroform | 3 times by weight the total of the above components |

<Comparative Sample 3>

| | |
|---|---|
| Recording component: dye precursor E-14 | 24 mas. pts. |
| Binder: Aldrich's polymethyl methacrylate (mean molecular weight, 120,000) | 76 mas. pts. |
| Solvent: chloroform | 3 times by weight the total of the above components |

Samples 101 to 103 and Comparative Samples 1 to 3 each were bar-coated on a preparation glass plate and after removing the solvent by drying, another preparation glass plate was placed thereon to obtain samples for evaluation. The film thickness was about 10 μm.

Using an ellipsometer, the refractive index of Samples 101 to 103 was measured, and was 1.49, 1.48 and 1.49, respectively, at 720 nm.

In the performance evaluation of the two-photon absorbing recording material of the invention, a Ti:sapphire pulse laser (pulse width: 100 fs, repetition: 80 MHz, average output: 1 W, peak power: 100 kW) capable of performing the measurement in a wavelength range from 700 to 1,000 nm was used and the two-photon absorbing recording material of the invention was irradiated with the laser light while converging the light through an NA 0.6 lens.

The wavelength of light used for irradiation was in the vicinity of a wavelength where the two-photon absorbing cross-sectional area δ becomes the maximum in a $10^{-4}$ M solution of the two-photon absorbing compound.

When two-photon absorption was caused in Samples 101 to 103 and Comparative Samples 1 to 3 by irradiating laser light at 740 nm (first step), in the case of Samples 101 to 103, color formation was slightly confirmed in the laser-focused (recorded) area irradiated with light. Using an ellipsometer, the refractive index of the color-formed area of the samples was again measured, and it was 1.50, 1.48 and 1.49, respectively, and increased only slightly but little as compared with the laser-unfocused area (unrecorded area) thereof.

Furthermore, light in a wavelength region of 680 to 740 nm was radiated to effect entire surface exposure (second step), as a result, it was confirmed that definite color formation occurred in the recorded area in the first step. It was possible to visually confirm the difference in the absorbance between the recorded area and the unrecorded area of the samples. Using an ellipsometer, the refractive index of the color-formed area of the samples was still again measured, and it was 1.57, 1.56 and 1.57, respectively, and increased as compared with the laser-unfocused area (unrecorded area) thereof. When a 740 nm laser was radiated to the samples, then the reflectance difference between the colored recorded area and the unrecorded area of the samples owing to the refractivity difference therebetween was confirmed.

In addition, when a 660 nm laser was radiated to the recorded Samples 101 to 103, then the reflectance difference between the recorded area and the unrecorded area owing to the absorbance difference therebetween was confirmed.

On the other hand, when Samples 101 to 103 was irradiated with 740 nm laser alone in the first step and then processed in the second step and when the same absorbance and refractivity modulation was tried as above, then it took a long irradiation time about 10 times the previous case. This indicates that the latent image color formation/self sensitization and amplification recording system of the invention enables about 10-fold amplification in the second step. When the irradiation time in the second step is further prolonged, it enables further more amplification.

On the other hand, in the case of Comparative Samples 1 to 3 not containing the two-photon absorbing compound D-128 of the invention, no change occurred even when they were irradiated with a laser of 740 nm. As apparent from this, the color formation (modulation of refractive index) is caused when the two-photon absorbing compound produces an excited state by two-photon absorption.

Also, when the laser focal position is scanned in the horizontal direction and in the depth direction, then color may be formed in any desired position in the three-dimensional direction of the samples processed, and this confirms the possibility of processing the recording material of the invention for light reflectance change owing to the three-dimensional refractivity modulation and absorbance modulation thereof.

When the two-photon absorbing compound was changed to any of D-1, D-5, D-22, D-41, D-56, D-58, D-73, D-75, D-77, D-84, D-117, D-118, D-123, D-132, D-142 or D-143, and when the binder was changed to any of polyvinyl acetal, cellulose acetate butyrate or polymethylphenylsiloxane, the same results as above were obtained.

In addition, in Sample 101, when the acid generator in the recording component was changed to any of 2-(4'-methoxyphenyl)-4,6-bis(trichloromethyl)-1,3,5-triazine, 4-diethylaminophenyldiazonium tetrafluoroborate, di(tert-butylphenyl)iodonium tetra(pentafluorophenyl)borate, tris(4-methylphenyl)sulfonium tetra(pentafluorophenyl)borate, triphenylsulfonium methanesulfonate, triphenylsulfonium perfluoropentanoate, bis(1-(4-diphenylsulfonium)phenylsulfide ditriflate, benzoin tosylate, 2,6-dinitrobenzyl tosylate, or N-tosylphthalic acid imide; and in Sample 101, when the acid color-forming dye precursor in the recording component was changed to crystal violet lactone, R-7 or R-8, the same results were also obtained.

In Sample 102, when the base generator in the recording component was changed to any of PB-4, PB-8, PB-10, PB-12, PB-13, PB-19, PB-22, PB-32, PB-33 or PB-52, or when the base color-forming dye precursor (non-dissociated form of dissociation-type dye) was changed to DD-3, DD-9, DD-12, DD-23, DD-24, DD-30, DD-32, DD-33, DD-34, DD-37 or DD-38, DD-43, DD-45, DD-46, the same results were obtained.

In Sample 103, when the recording component was changed to any of E-4, E-5, E-11, E-12, E-13, E-16, E-17, E-18, E-19, E-25, E-26, E-27, E-29, E-32, E-34, E-37, E-38, E-39 or E-42, the same results were obtained.

In the evaluations above, as for the wavelength of laser for causing two-photon absorption, the wavelength of light for entire surface exposure, the wavelength of light for confirming the reflectance change due to refractivity modulation, and the wavelength of light for confirming the reflectance change due to absorbance change, optimal wavelengths for the systems were used.

Even when the same experiments as above were carried out where the first step was not for two-photon absorption but was for linear absorption, the same results were also obtained so far as the recording was effected only in the plane direction. This means that the recording system of the invention is applicable also to linear-absorption photon-mode recording systems and materials.

This application is based on Japanese patent applications JP 2003-184932, filed on Jun. 27, 2003, JP 2003-284959, filed on Aug. 1, 2003, and JP 2003-300058, filed on Aug. 25, 2003, the entire content of which is hereby incorporated by reference, the same as if set forth at length.

What is claimed is:

1. A two-photon absorbing optical recording material comprising a two-photon absorbing compound and a recording component, in which a recorded area and an unrecorded area are formed by utilizing a two-photon absorption of the two-photon absorbing compound, and a reflectance or transmittance differs between the recorded area and the unrecorded area, wherein the recording component contains a dye precursor capable of becoming a color-forming material, the dye precursor containing at least a dye precursor of the following formula (32):

A1-PD　　　　　Formula (32)

wherein A1 and PD are covalently bonded, A1 represents an organic compound moiety having a function of cutting the covalent bond with PD due to electron or energy transfer with the excited state of a two-photon absorbing compound, and PD represents an organic compound moiety capable of becoming a color-forming material when covalently bonded with A1 and becoming colored when released by the cutting of the covalent bond with A1, wherein the dye precursor of formula (32) is a compound represented by any one of the following formulae (33-1) to (33-6):

Formula (33-1)

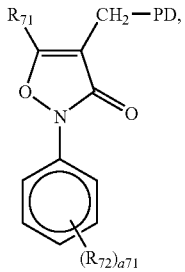

Formula (33-2)

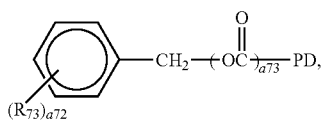

Formula (33-3)

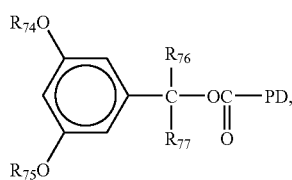

Formula (33-4)

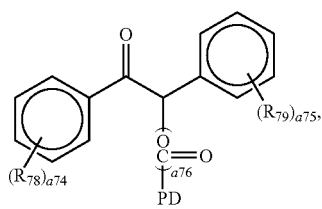

Formula (33-5)

Formula (33-6)

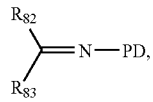

in formulae (33-1) to (33-6), PD has the same meaning as in formula (32), $R_{71}$, $R_{80}$, and $R_{81}$ each independently represent a hydrogen atom or a substituent, $R_{72}$, $R_{73}$, $R_{78}$, $R_{79}$, $R_{82}$ and $R_{83}$ each represent a substituent, a71, a72, a74 and a75 each independently represent an integer of 0 to 5, a73 and a76 each independently represent 0 or 1, provided that when a71, a72, a74 and a75 each are 2 or more, multiple $R_{72}$s, $R_{73}$s, $R_{78}$s or $R_{79}$s may be the same or different and may combine with each other to form a ring, and each of the pairs $R_{80}$ and $R_{81}$, and $R_{82}$ and $R_{83}$ may combine with each other to form a ring.

2. The two-photon absorbing optical recording material as claimed in claim 1, which is a write-once type material.

3. The two-photon absorbing optical recording material as claimed in claim 1, wherein the difference of reflectance or transmittance is caused by any of difference in refractive index, absorbance difference, foaming, scattering, specular reflection, diffraction or interference.

4. The two-photon absorbing optical recording material as claimed in claim 1, wherein the dye precursor is capable of becoming a color-forming material having an absorption shifted to a longer wavelength than in the original state owing to the electron transfer or the energy transfer from the excited state of the two-photon absorbing compound that has been generated by a two-photon absorption, in which the color-forming material does not absorb the light for reproduction irradiated for detecting the difference of reflectance or transmittance.

5. The two-photon absorbing optical recording material as claimed in claim 4, wherein the color-forming material has an absorption maximum within a wavelength range falling between a wavelength of the light for reproduction and a wavelength shorter by 200 nm than that of the light for reproduction.

6. The two-photon absorbing optical recording material as claimed in claim 1, wherein the dye precursor is capable of becoming a color-forming material having an absorption shifted to a longer wavelength than in the original state owing to the electron transfer or the energy transfer from the excited state of the two-photon absorbing compound that has been generated by a two-photon absorption, in which the color-forming material absorbs the light for reproduction irradiated for detecting the difference of reflectance or transmittance.

7. The two-photon absorbing optical recording material as claimed in claim 1, wherein the dye precursor is an acid color-forming dye precursor and the recording material further contains an acid generator.

8. The two-photon absorbing optical recording material as claimed in claim 7, wherein the acid generator is diaryliodonium salts, sulfonium salts, diazonium salts, metal arene complexes, trihalomethyl-substituted triazines or sulfonates.

9. The two-photon absorbing optical recording material as claimed in claim 7, wherein the color-forming material generated from the acid color-forming dye precursor is a xanthene dye, a fluoran dye or a triphenylmethane dye.

10. The two-photon absorbing optical recording material as claimed in claim 1, wherein the dye precursor is a base color-forming dye precursor and the recording material further contains a base generator.

11. The two-photon absorbing optical recording material as claimed in claim 10, wherein the base generator is represented by any of the following formulae (31-1) to (31-4):

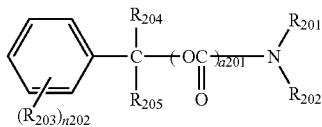

Formula (31-1)

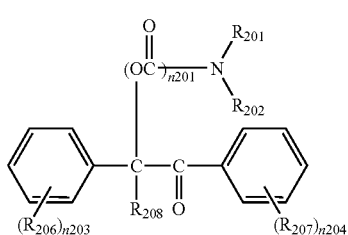

Formula (31-2)

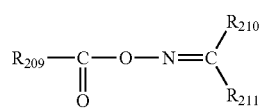

Formula (31-3)

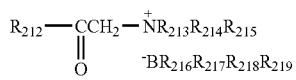

Formula (31-4)

wherein $R_{201}$, $R_{202}$, $R_{213}$, $R_{214}$ and $R_{215}$ each independently represent a hydrogen atom, an alkyl group, an alkenyl group, a cycloalkyl group, an aryl group or a heterocyclic group, $R_{201}$ and $R_{202}$ may combine with each other to form a ring, $R_{213}$, $R_{214}$ and $R_{215}$ may combine with each other to form a ring, $R_{203}$, $R_{206}$, $R_{207}$ and $R_{209}$ each independently represent a substituent, $R_{204}$, $R_{205}$, $R_{208}$, $R_{210}$ and $R_{211}$ each independently represent a hydrogen atom or a substituent, $R_{210}$ and $R_{211}$ may combine with each other to form a ring, $R_{216}$, $R_{217}$, $R_{218}$ and $R_{219}$ each independently represent an alkyl group or an aryl group, $R_{212}$ represents an aryl group or a heterocyclic group, n201 represents an integer of 0 or 1, and n202 to n204 each independently represent an integer of 0 to 5.

12. The two-photon absorbing optical recording material as claimed in claim 10, wherein the base color-forming dye precursor is a non-dissociated form of a dissociation-type azo dye, a dissociation-type azomethine dye, a dissociation-type oxonole dye, a dissociation-type xanthene dye, a dissociation-type fluoran dye or a dissociation-type triphenylmethane-based dye.

13. The two-photon absorbing optical recording material as claimed in claim 1, wherein the two-photon absorbing compound is a methine dye or a phthalocyanine dye.

14. A two-photon absorbing optical recording medium comprising the two-photon absorbing optical recording material of claim 1.

15. A two-photon absorbing optical recording method, which comprises irradiating the two-photon absorbing optical recording material of claim 1 with laser light at a wavelength being longer than the linear absorption band of the two-photon absorbing compound and having no linear absorption to thereby induce a two-photon absorption, and performing a recording by utilizing the two-photon absorption.

16. A two-photon absorbing optical recording and reproduction method for recording and reproducing on and from a two-photon absorbing optical recording material that contains a two-photon absorbing compound and a recording component, the method comprising: performing a recording by utilizing a two-photon absorption of the two-photon absorbing compound; and then irradiating the material with light to thereby detect a difference in the reflectance or transmittance between the recorded area and the unrecorded area of the material to perform a reproduction, wherein the recording component contains a dye precursor capable of becoming a color-forming material, the dye precursor containing at least a dye precursor of the following formula (32):

A1-PD    Formula (32)

wherein A1 and PD are covalently bonded, A1 represents an organic compound moiety having a function of cutting the covalent bond with PD due to electron or energy transfer with the excited state of a two-photon absorbing compound, and PD represents an organic compound moiety capable of becoming a color-forming material when covalently bonded with A1 and becoming colored when released by the cutting of the covalent bond with A1, wherein the dye precursor of formula (32) is a compound represented by any one of the following formulae (33-1) to (33-6):

Formula (33-1)

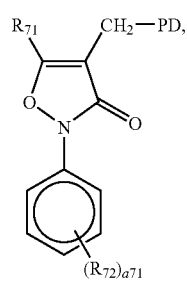

Formula (33-1)

Formula (33-2)

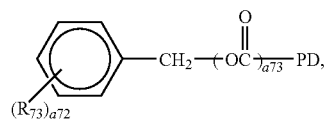

Formula (33-2)

Formula (33-3)

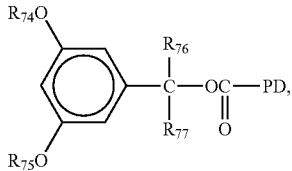

Formula (33-4)

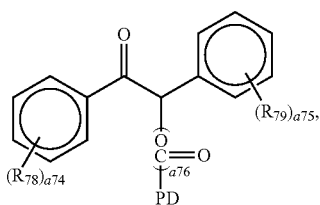

Formula (33-5)

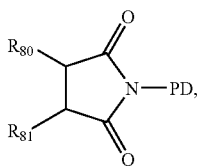

Formula (33-6)

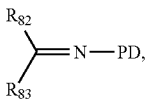

in formulae (33-1) to (33-6), PD has the same meaning as in formula (32), $R_{71}$, $R_{80}$, and $R_{81}$ each independently represent a hydrogen atom or a substituent, $R_{72}$, $R_{73}$, $R_{78}$, $R_{79}$, $R_{82}$ and $R_{83}$ each represent a substituent, a71, a72, a74 and a75 each independently represent an integer of 0 to 5, a73 and a76 each independently represent 0 or 1, provided that when a71, a72, a74 and a75 each are 2 or more, multiple $R_{72}$s, $R_{73}$s, $R_{78}$s or $R_{79}$s may be the same or different and may combine with each other to form a ring, and each of the pairs $R_{80}$ and $R_{81}$, and $R_{82}$ and $R_{83}$ may combine with each other to form a ring.

17. The two-photon absorbing optical recording and reproduction method as claimed in claim 16, wherein the wavelength of the light irradiated to the material for recording thereon through two-photon absorption is the same as that of the light irradiated thereto for detecting the difference of reflectance or transmittance of the material at the reproduction.

18. A method for coloring a photosensitive polymer composition, which comprises irradiating the photosensitive polymer composition of claim 1 with light that has a longer wavelength than the longest absorption wavelength of the composition and is not absorbed by the composition, to color the composition.

19. The coloration method as claimed in claim 18, which comprises irradiating the photosensitive polymer composition with light that corresponds to the non-resonant two-photon absorption maximum wavelength of the two-photon absorbing compound (B) in the polymer composition, to obtain a colored photosensitive polymer composition.

* * * * *